US006208360B1

(12) United States Patent
Doi et al.

(10) Patent No.: US 6,208,360 B1
(45) Date of Patent: Mar. 27, 2001

(54) METHOD AND APPARATUS FOR GRAFFITI ANIMATION

(75) Inventors: Miwako Doi, Kawasaki; Akira Morishita, Tokyo; Naoko Umeki, Kawasaki; Shunichi Numazaki, Yokohama; Yasunobu Yamauchi, Kawasaki, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/038,932

(22) Filed: Mar. 9, 1998

(30) Foreign Application Priority Data

| Mar. 10, 1997 | (JP) | 9-055217 |
| Jun. 16, 1997 | (JP) | 9-158676 |
| Aug. 7, 1997 | (JP) | 9-213436 |
| Aug. 11, 1997 | (JP) | 9-216258 |

(51) Int. Cl.[7] .................................................. G06T 15/00
(52) U.S. Cl. ........................................ 345/474; 345/473
(58) Field of Search .................................... 345/473, 474, 345/475, 418, 420

(56) References Cited

U.S. PATENT DOCUMENTS

| 4,189,743 | * | 2/1980 | Schure et al. ........................ 345/473 |
| 5,594,853 | * | 1/1997 | Salesin et al. ........................ 345/433 |
| 5,598,182 | * | 1/1997 | Berend et al. ........................ 345/441 |

OTHER PUBLICATIONS

J.–D. Fekete, et al., Computer Graphics Proceedings, Annual Conference Series, pp. 79–90, "Tictactoon: A Paperless System For Professional 2D Animation", Aug. 6, 1995.

A. Bruderlin, et al., Computer Graphics Proceedings, Annual Conference Series, pp. 97–104, "Motion Signal Processing", Aug. 6, 1995.

P.A. Fishwick, et al., Proceedings of the Winter Simulation Conference, pp. 1156–1164, "Using Discrete Event Modeling For Effective Computer Animation Control", Dec. 8, 1991.

A.J. Maeder, Proceedings of the Conference on Visualization, pp. 67–73, "Animation Techniques For Chain–Coded Objects", Oct. 23, 1990.

* cited by examiner

*Primary Examiner*—Cliff N. Vo
(74) *Attorney, Agent, or Firm*—Oblon, Spivak, McClelland, Maier & Neustadt, P.C.

(57) ABSTRACT

An apparatus having an input for inputting a plurality of line drawings indicating changed shapes of a stroke and a quantizer for quantizing corresponding strokes between the plural line drawings input by the input into unit vectors each having a predetermined length. A portion between the plural line drawings is interpolated by obtaining an interpolating vector for interpolating a portion between the corresponding unit vectors in accordance with an amount of change between the corresponding unit vectors of the plural line drawings obtained by the quantization performed by the quantizer.

59 Claims, 120 Drawing Sheets

| ADDRESS | SKELETON NUMBER | KEY-FRAME NUMBER | UNIT VECTOR 1 | UNIT VECTOR 2 | ---- | UNIT VECTOR n |
|---|---|---|---|---|---|---|
| | 1 | 0 | V110 | V120 | ---- | p1 |
| | 2 | 0 | V210 | V220 | NULL | |
| | 3 | 0 | V310 | V320 | NULL | |
| | 4 | 0 | V410 | V420 | NULL | |
| | 5 | 0 | V510 | V520 | NULL | |
| | 6 | 0 | V610 | V620 | NULL | |
| | NULL | NULL | NULL | NULL | NULL | |

FIG. 8

NULL: NO FOLLOWING VECTOR

| ADDRESS | SKELETON NUMBER | KEY-FRAME NUMBER | UNIT VECTOR 1 | UNIT VECTOR 2 | ---- | UNIT VECTOR n |
|---|---|---|---|---|---|---|
| | 1 | 0 | V110 | V120 | ---- | p1 |
| | 2 | 0 | V210 | V220 | NULL | |
| | 3 | 0 | V310 | V320 | NULL | |
| | 4 | 0 | V410 | V420 | NULL | |
| | 5 | 0 | V510 | V520 | NULL | |
| | 6 | 0 | V610 | V620 | NULL | |
| | 1 | 1 | V111 | V121 | ---- | |
| p1 | NULL | NULL | NULL | NULL | ---- | NULL |

FIG. 11

LINE DRAWN BY USER

QUANTIZE LINE DRAWN BY USER INTO UNIT VECTORS

CHUNK CUT FOR EACH UNIT VECTOR

| UNIQUE ID | 1 | 2 | ----- |
|---|---|---|---|
| DATA OF UNIT VECTOR | DATA ENTITY OR POINTER FOR DATA ENTITY | DATA ENTITY OR POINTER FOR DATA ENTITY | ----- |
| DATA OF CHUNK | DATA ENTITY OR POINTER FOR DATA ENTITY | DATA ENTITY OR POINTER FOR DATA ENTITY | ----- |

FIG. 28

| ADDRESS | SKELETON NUMBER | KEY-FRAME NUMBER | UNIT VECTOR 1 | UNIT VECTOR 2 | ---- | UNIT VECTOR n |
|---|---|---|---|---|---|---|
| | 1 | 0 | V110 | V120 | ---- | p1 |
| | 2 | 0 | V210 | V220 | NULL | |
| | 3 | 0 | V310 | V320 | NULL | |
| | 4 | 0 | V410 | V420 | NULL | |
| | 5 | 0 | V510 | V520 | NULL | |
| | 6 | 0 | V610 | V620 | NULL | |
| | NULL | NULL | NULL | NULL | NULL | |

FIG. 29

NULL: NO FOLLOWING VECTOR

| ADDRESS | SKELETON NUMBER | KEY-FRAME NUMBER | UNIT VECTOR 1 | ADDRESS OF TEXTURE | UNIT VECTOR 2 | ADDRESS OF TEXTURE | --- | UNIT VECTOR 3 | ADDRESS OF TEXTURE | ADDRESS FOR CALCULATIONS FOR DEFORMATION |
|---|---|---|---|---|---|---|---|---|---|---|
| | 1 | 0 | V110 | q11 | V120 | q12 | --- | p1 | NULL | NULL |
| | 2 | 0 | V210 | q21 | V220 | q22 | NULL | | | |
| | 3 | 0 | V310 | q31 | V320 | q32 | NULL | | | |
| | 4 | 0 | V410 | q41 | V420 | q42 | NULL | | | |
| | 5 | 0 | V510 | q51 | V520 | q52 | NULL | | | |
| | 6 | 0 | V610 | q61 | V620 | q62 | NULL | | | |
| p1 | 1 | 1 | V111 | NULL | V121 | NULL | --- | NULL | NULL | NULL |
| | NULL | NULL | NULL | | NULL | | NULL | | | |

FIG. 33

FIRST IMAGE
(IN ACCORDANCE WITH INTERPOLATING VECTOR 1)

SECOND IMAGE
(IN ACCORDANCE WITH INTERPOLATING VECTOR 2)

THIRD IMAGE

| ADDRESS | SKELETON NUMBER | KEY-FRAME NUMBER | UNIT VECTOR 1 | ADDRESS OF TEXTURE | UNIT VECTOR 2 | ADDRESS FOR CALCULATIONS FOR DEFORMATION | ADDRESS OF TEXTURE | ADDRESS FOR CALCULATIONS FOR DEFORMATION | --- | UNIT VECTOR n | ADDRESS OF TEXTURE | ADDRESS FOR CALCULATIONS FOR DEFORMATION |
|---|---|---|---|---|---|---|---|---|---|---|---|---|
| 1 | 0 | V110 | q11 | NULL | V120 | q12 | NULL | | --- | p1 | NULL | NULL |
| 2 | 0 | V210 | q12 | NULL | V220 | q22 | NULL | NULL | | | | |
| 3 | 0 | V310 | q31 | NULL | V320 | q32 | NULL | NULL | | | | |
| 4 | 0 | V410 | q41 | NULL | V420 | q42 | NULL | NULL | | | | |
| 5 | 0 | V510 | q51 | NULL | V520 | q52 | NULL | NULL | | | | |
| 6 | 0 | V610 | q61 | NULL | V620 | q62 | NULL | NULL | | | | |
| p1 | 1 | 1 | V111 | NULL | ∘110 | V121 | NULL | ∘120 | --- | NULL | NULL | NULL |
| NULL | NULL | NULL | | | NULL | | | NULL | | | | |

FIG. 36

| ADDRESS | INTERPOLATING FRAME | ROTATIONAL ANGLE | BIAS | CONTINUED ADDRESS |
|---|---|---|---|---|
| 0110 | 1 | $\alpha 1$ | (0,0) | 0111 |
| 0111 | 2 | $\beta 1$ | (0,0) | 0112 |
| 0112 | 3 | $\gamma 1$ | (0,0) | NULL |
| 0120 | 1 | $\alpha 2$ | (x20, y20) | 0121 |
| 0121 | 2 | $\beta 2$ | (x21, y21) | 0122 |
| 0122 | 3 | $\gamma 2$ | (x22, y22) | NULL |
| ⋮ | ⋮ | ⋮ | ⋮ | ⋮ |

| ADDRESS | INTERPOLATING FRAME | COORDINATE p1 | COORDINATE p2 | COORDINATE p3 | COORDINATE p4 | CONTINUED ADDRESS |
|---|---|---|---|---|---|---|
| ○110 | 1 | x111,y111 | x121,y121 | x131,y131 | x141,y141 | ○111 |
| ○111 | 2 | x111,y111 | x121,y121 | | | ○112 |
| ○112 | 3 | x111,y111 | x121,y121 | | | NULL |
| ○120 | 1 | x111,y111 | x121,y121 | | | ○121 |
| ○121 | 2 | x111,y111 | x121,y121 | | | ○122 |
| ○122 | 3 | x111,y111 | x121,y121 | | | NULL |
| -- | -- | -- | -- | | | -- |

FIG. 43

UNIT VECTOR OF FIRST KEY-FRAME

| UNIQUE ID | 1-1 | 1-2 | 1-3 | ... |
|---|---|---|---|---|
| DATA OF UNIT VECTOR | DATA ENTITY OR POINTER FOR DATA ENTITY | DATA ENTITY OR POINTER FOR DATA ENTITY | DATA ENTITY OR POINTER FOR DATA ENTITY | ... |
| POINTER FOR CORRESPONDING VECTOR | DATA SEQUENCE FOR CORRESPONDING DATA ENTITY (2-1) | DATA SEQUENCE FOR CORRESPONDING DATA ENTITY (2-2, 2-3) | DATA SEQUENCE FOR CORRESPONDING DATA ENTITY (NULL) | ... |

FIG. 60A

UNIT VECTOR OF SECOND KEY-FRAME

| UNIQUE ID | 2-1 | 2-2 | 2-3 | ... |
|---|---|---|---|---|
| DATA OF UNIT VECTOR | DATA ENTITY OR POINTER FOR DATA ENTITY | DATA ENTITY OR POINTER FOR DATA ENTITY | DATA ENTITY OR POINTER FOR DATA ENTITY | ... |
| POINTER FOR CORRESPONDING VECTOR | DATA SEQUENCE FOR CORRESPONDING DATA ENTITY (3-1) | DATA SEQUENCE FOR CORRESPONDING DATA ENTITY (3-2) | DATA SEQUENCE FOR CORRESPONDING DATA ENTITY (3-3) | ... |

FIG. 60B

UNIT VECTOR OF FIRST KEY-FRAME

| UNIQUE ID | 1-1 | 1-2 | 1-3 | ... |
|---|---|---|---|---|
| DATA OF UNIT VECTOR | DATA ENTITY OR POINTER FOR DATA ENTITY | DATA ENTITY OR POINTER FOR DATA ENTITY | DATA ENTITY OR POINTER FOR DATA ENTITY | ... |
| LINK DATA OF GROUP | GROUP 1 | GROUP 1 | GROUP 2 | ... |

FIG. 61A

UNIT VECTOR OF SECOND KEY-FRAME

| UNIQUE ID | 2-1 | 2-2 | 2-3 | ... |
|---|---|---|---|---|
| DATA OF UNIT VECTOR | DATA ENTITY OR POINTER FOR DATA ENTITY | DATA ENTITY OR POINTER FOR DATA ENTITY | DATA ENTITY OR POINTER FOR DATA ENTITY | ... |
| LINK DATA OF GROUP | GROUP 1 | GROUP 1 | GROUP 1 | ... |

FIG. 61B

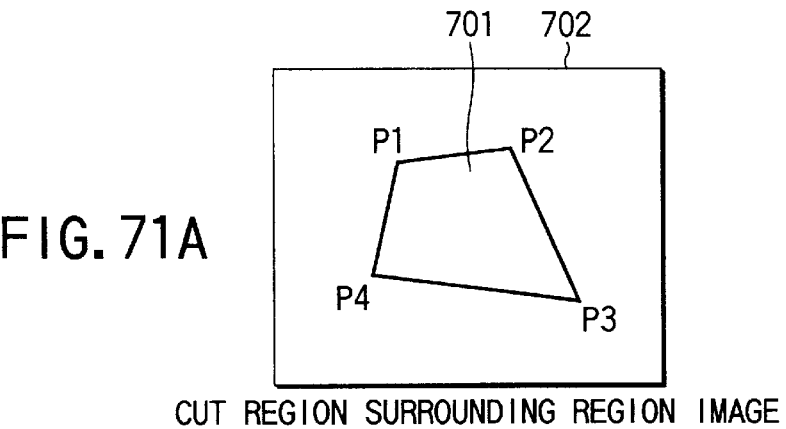
FIG. 71A CUT REGION SURROUNDING REGION IMAGE
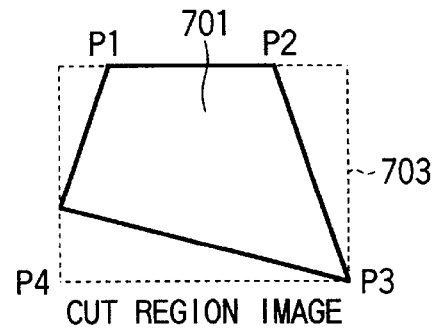
FIG. 71B CUT REGION IMAGE
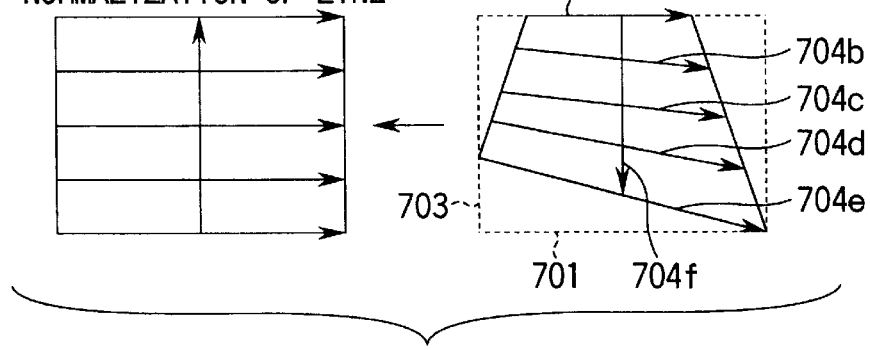
FIG. 71C
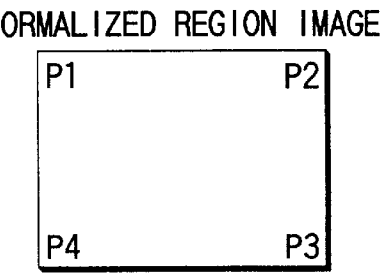
FIG. 71D NORMALIZED REGION IMAGE

SCAN LINE BEFORE NORMALIZATION

SCAN LINE AFTER NORMALIZATION

CUTTING OF REGION SURROUNDING REGION IMAGE

CUTTING OF REGION IMAGE

NORMALIZED REGION IMAGE

| UNIQUE ID | 1 | 2 | ... |
|---|---|---|---|
| DATA OF UNIT VECTOR | DATA ENTITY OR POINTER FOR DATA ENTITY | DATA ENTITY OR POINTER FOR DATA ENTITY | ... |
| DATA OF UNIT IMAGE | DATA ENTITY OR POINTER FOR DATA ENTITY | DATA ENTITY OR POINTER FOR DATA ENTITY | ... |
| DATA OF CALCULATION FOR SPECIAL EFFECT | DATA ENTITY OR POINTER FOR DATA ENTITY | REPEAT, v1 | ... |

FIG. 81

| UNIQUE ID | 1 | 2 | ... |
|---|---|---|---|
| DATA OF UNIT VECTOR | DATA ENTITY OR POINTER FOR DATA ENTITY | DATA ENTITY OR POINTER FOR DATA ENTITY | ... |
| DATA OF UNIT IMAGE | DATA ENTITY OR POINTER FOR DATA ENTITY | DATA ENTITY OR POINTER FOR DATA ENTITY | ... |
| DATA OF CALCULATION FOR SPECIAL EFFECT | DATA ENTITY OR POINTER FOR DATA ENTITY | DATA ENTITY OR POINTER FOR DATA ENTITY | ... |

FIG. 82

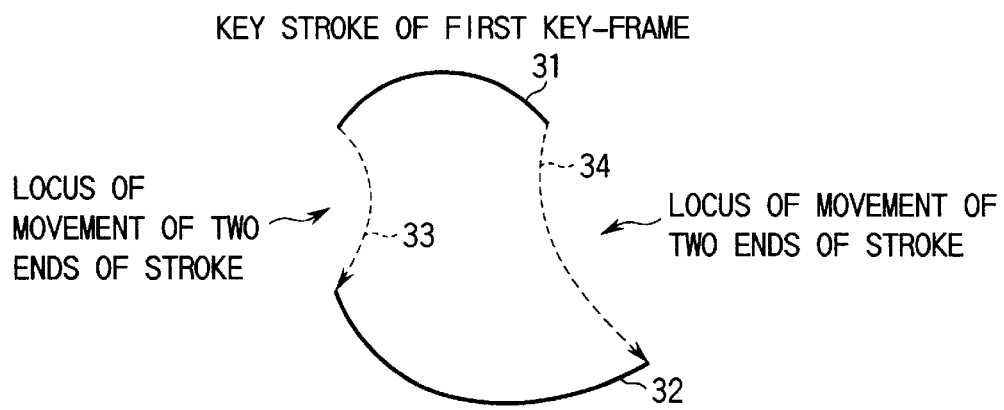
KEY STROKE OF FIRST KEY-FRAME
LOCUS OF MOVEMENT OF TWO ENDS OF STROKE
LOCUS OF MOVEMENT OF TWO ENDS OF STROKE
FIG. 88A   KEY STROKE OF SECOND KEY-FRAME
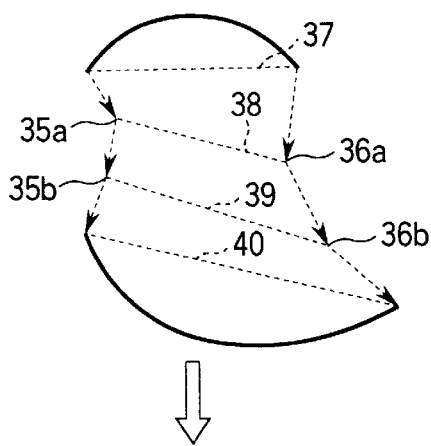
FIG. 88B
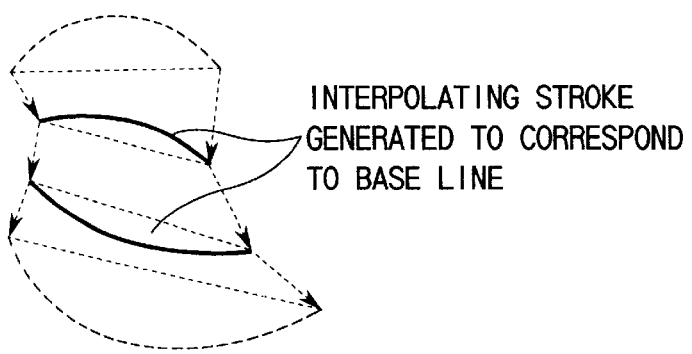
FIG. 88C
INTERPOLATING STROKE GENERATED TO CORRESPOND TO BASE LINE $Vx = Vs' + Ve'$ $Vs' = (1-s) * (Lx/Ls) * Vs$ $Ve' = s * (Lx/Le) * Ve$ Vs: UNIT VECTOR GENERATED BY QUANTIZING FIRST KEY STROKE (START STROKE)
VE: UNIT VECTOR GENERATED BY QUANTIZING SECOND KEY STROKE (END STROKE)
Vx: UNIT VECTOR GENERATED BY COMBINING VECTORS
Ls: LENGTH OF BASE LINE OF FIRST KEY STROKE
Le: LENGTH OF BASE LINE OF SECOND KEY STROKE

○ CURVE CONTROL POINT

| ADDRESS | STROKE NUMBER(j) | KEY-FRAME NUMBER(i) | VECTOR OF CONTROL POINT 1 (Vj1i) | VECTOR OF CONTROL POINT 2 (Vj2i) | ... | UNIT VECTOR n (Vjni) |
|---|---|---|---|---|---|---|
| | 1 | 0 | V110 | V120 | ---- | p1 |
| | 2 | 0 | V210 | V220 | NULL | |
| | 3 | 0 | V310 | V320 | NULL | |
| | 4 | 0 | V410 | V420 | NULL | |
| | 5 | 0 | V510 | V520 | NULL | |
| | 6 | 0 | V610 | V620 | NULL | |
| | 1 | 1 | V111 | V121 | ---- | |
| p1 | NULL | NULL | NULL | NULL | NULL | NULL |

FIG. 93

| ADDRESS | STROKE NUMBER(j) | KEY-FRAME NUMBER(i) | LIMITING FUNCTION 1 (Fj1i) | LIMITING FUNCTION 2 (Fj2i) | ... | LIMITING FUNCTION n (Fjni) |
|---|---|---|---|---|---|---|
| | 1 | 0 | F110(s,t) | F120(s,t) | ---- | p1 |
| | 2 | 0 | F210(s,t) | F220(s,t) | NULL | |
| | 3 | 0 | F310(s,t) | F320(s,t) | NULL | |
| | 4 | 0 | F410(s,t) | F420(s,t) | NULL | |
| | 5 | 0 | F510(s,t) | F520(s,t) | NULL | |
| | 6 | 0 | F610(s,t) | F620(s,t) | ---- | |
| | 1 | 1 | F111(s,t) | F121(s,t) | NULL | |
| | NULL | NULL | NULL | NULL | NULL | |
| p1 | | | | | | NULL |

FIG. 94

KEY STROKE OF FIRST KEY-FRAME

KEY STROKE OF SECOND KEY-FRAME

ROTATE TO MAKE DIRECTION OF BASE LINE TO COINCIDE

FIG. 95C  ADD AMPLITUDE VALUES AT A RATIO THAT STROKE OF FIRST KEY-FRAME=2 AND STROKE OF SECOND KEY-FRAME=1

INTERPOLATION FOR SIMILARLY ENLARGING TO CORRESPOND TO THE BASE LINE

INTERPOLATION FOR ENLARGING IN ONLY DIRECTION x TO CORRESPOND TO BASE LINE

LIMITING FUNCTION $F(s, t) = (Lf/2)\sin(2(f-t)\pi) * \sin((Ls-s)\pi)$

WHEREIN f: NUMBER OF ALL INTERPOLATING FRAMES
t: NUMBER OF FRAMES TO BE INTERPOLATED
s: DISTANCE FROM END OF INTERPOLATING STROKE

CANDIDATES OF GOAL FRAMES
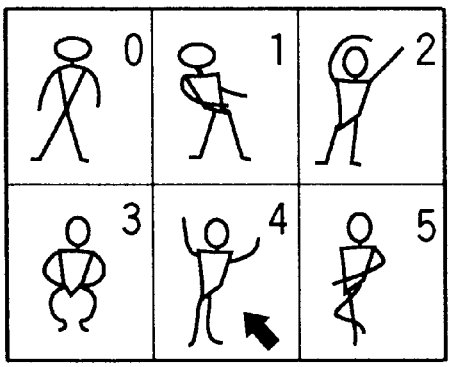
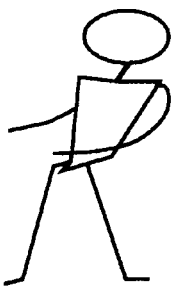
DRAWN IMAGE
FIG. 107

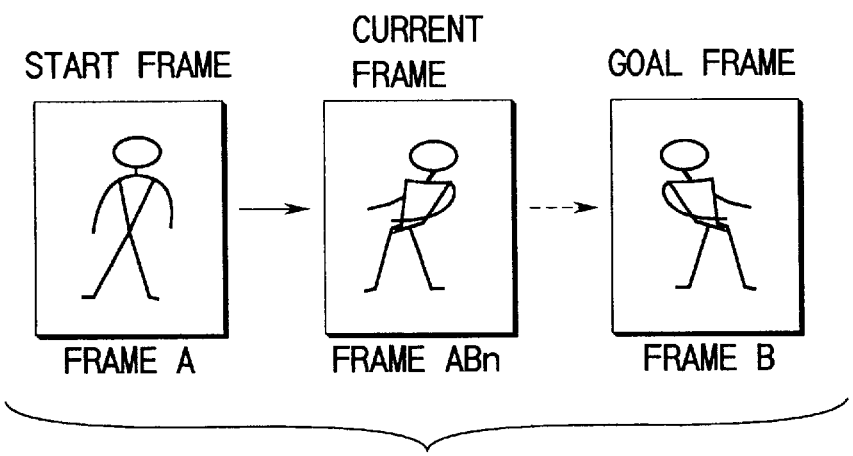
FIG. 111A
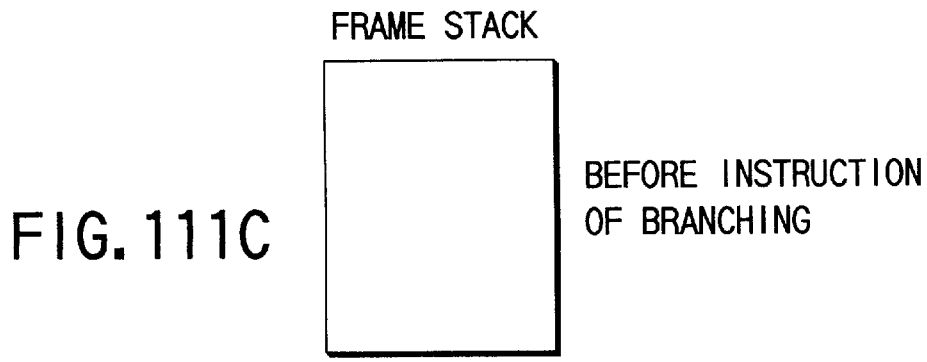
FIG. 111B
FIG. 111C
FRAME STACK
BEFORE INSTRUCTION OF BRANCHING

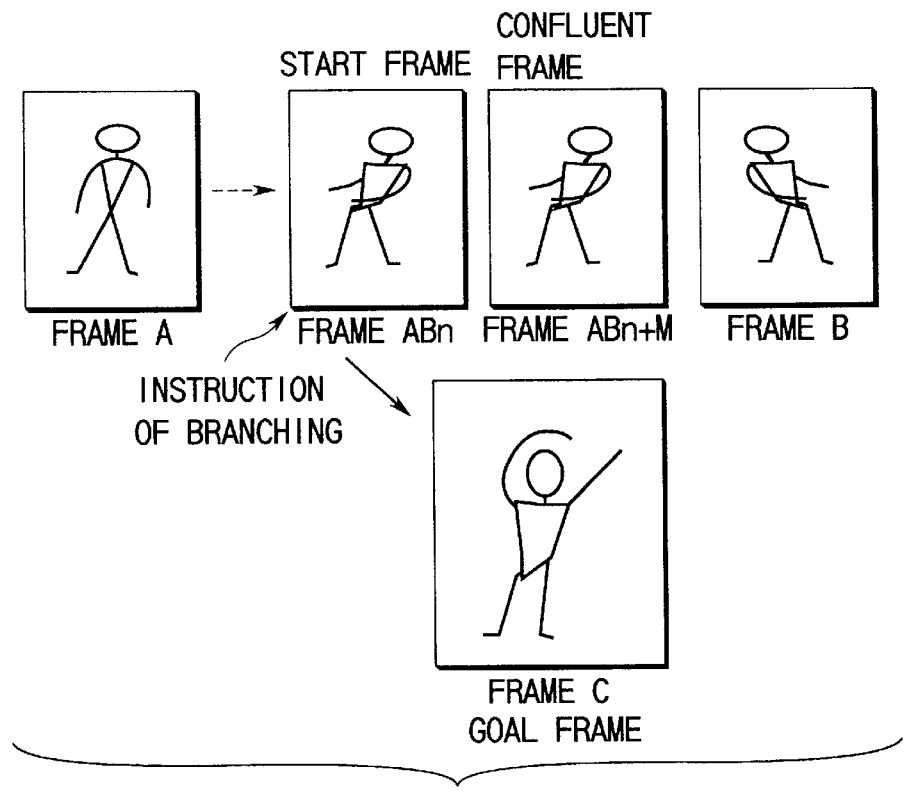
FIG. 112A
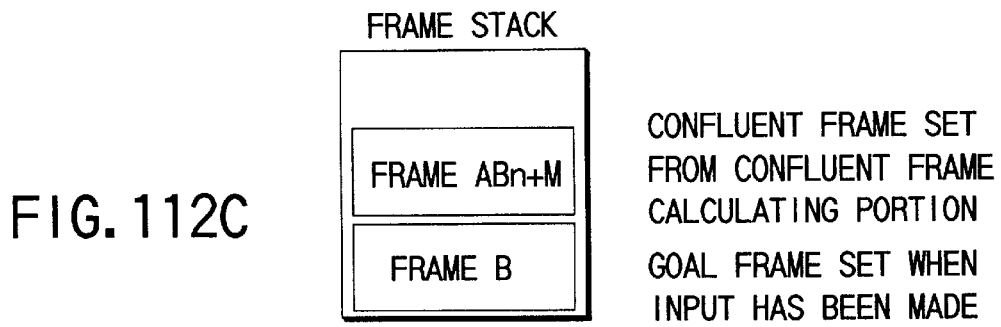
FIG. 112B
FIG. 112C
CONFLUENT FRAME SET
FROM CONFLUENT FRAME
CALCULATING PORTION
GOAL FRAME SET WHEN
INPUT HAS BEEN MADE

METHOD AND APPARATUS FOR GRAFFITI ANIMATION

BACKGROUND OF THE INVENTION

The entire contents of Japanese Patent Application No. 9-55217 filed on Mar. 10, 1997 are incorporated herein by reference.

The present invention relates to an apparatus for performing control relating to processing and edition of CG animation.

Improvement in the performance of personal computers (PC) has enabled computer graphics (CG animation) to be handled on the personal computer in real time. It leads to a fact that computer graphic applications which can be manipulated on the personal computer have been increased. Moreover, a person has frequent opportunities to generate and appreciate computer graphic contents. Since the opportunities have been increased, a variety of applications for producing computer graphic animation on a personal computer have been researched and developed.

Computer graphic animation can be generated by a means based on a 3D coordinate data set (3D computer graphic animation) and that based on a bitmap data set (2D computer graphic animation).

The means for producing computer graphic animation on the basis of the bitmap data set uses a prepared bitmap data set corresponding to each scene in such a manner that computer graphic animation is displayed while bitmap data is switched. The foregoing method is very similar to a known animation of a character drawn on successive pages of a notebook which are riffled, the method being an institute method allowing a person to easily produce animation. A plurality of bitmap data called "sprites" are prepared which correspond to each object attempted to be displayed. The sprites are sometimes superimposed and displayed so that one scene is constituted. In the foregoing case, the position of the sprite is changed in each scene or a plurality of sprites corresponding to the scenes are switched. Thus, animation is produced.

Since the 2D computer graphic animation is constituted by bitmap data sets, each scene can be generated only by drawing pictures. Therefore, an ordinary person is able to produce animation in a certain period of time. Since only a bitmap image is required to be displayed, the quantity of data required to reproduce animation is constant regardless of the fineness and complication (the contents of the bitmap image) of the object which must be displayed in each scene.

However, generation of 2D computer graphic animation which moves complicatedly as required by a user must be performed in such a manner that each bitmap image is generated. Thus, a time-consuming manipulation must be performed. As a matter of course, time can be shortened if a simple 2D computer graphic animation is generated which is composed of a small number of generated bitmap images and they are simply moved as sprites or displayed while the bitmap images are switched. In the foregoing case, an unsatisfactorily simply animation is permitted to be displayed.

If a great bitmap image can be generated, a storage unit having a great capacity is required to store all of bitmap data. To efficiently compress data above, exclusive hardware having an encoding function, such as objective MPEG, is required.

On the other hand, a means called "warping" is known with which one bitmap serving as an original image is deformed to generate different scenes. As shown in FIGS. 1A and 1B, warping is performed in such a manner that control points are disposed in a lattice configuration. Moreover, the control points are moved so as to deform a bitmap image in a region surrounded by the control points in accordance with change in the region surrounded by the control points so that a new scene is generated.

Since the warping means is a means for creating a new scene by deforming a mesh-shape rectangular region surrounded by the neighboring control points, scenes which can be generated are, however, limited considerably. Since the movable range permitted for the control points is limited to the region surrounded by the control points, movement of only an image region corresponding to the hand of a human being as shown in FIG. 2 cannot easily be performed. In another case in which the portion including the moved hand overlaps the portion including the face, the original shape of the image region corresponding to the face cannot be maintained.

To prevent this, the original image must be divided into a plurality of parts consisting of the face portions and the like. To use one existing bitmap original image, the bitmap original image must be previously divided into a plurality of sprites. Therefore, a considerably complicated previous process must be performed.

If a warping process is forcibly performed to generate a scene which is not required, computer graphic animation such as an action of the joint requires a great number of control points must be moved one by one. Since each control point must be moved while conditions, such as keeping of the balance of the shape of the hand, which must be maintained are considered, the above-mentioned means is not a practical means.

A means called "morphing", which is an application of the "warping" is arranged in such a manner that interpolated image between two bitmap images is generated to enable different images to be generated. As shown in FIGS. 3A and 3B, the morphing manipulation requires control points for indicating the corresponding positional relationship between two bitmap images to be instructed. In the case shown in FIG. 3B, control points a1 and b1 are instructed for the purpose of making the positions of the hand in scenes A and B to correspond to each other. Internal division point m1 is determined on a straight line which connects control points a1 and b1 to each other. In the scene A. The control point is shifted from a1 to m1. In the scene B, the control point is shifted from b1 to m1. Then, the warping process is performed so that the position of the hand in the two scenes can be moved to substantially the same positions. The generated two warping scenes are blended at an appropriate ratio, an interpolated scene can automatically be generated.

When intermediate scenes are generated and continuously displayed while the interior division point m1 is slightly moved on the straight line from a1 to b1, computer graphic animation which changes from the scene A to the scene B is generated.

Since the morphing is the application of the warping means, a similar limit to that for the warping means is imposed. Since the movable range for the control point of the warping means is limited, morphing of a scene in which the arms are opened and a scene in which the arms are crossed each other cannot generate natural animation. Since the control points indicating the same position must be set to correspond to each other between the two images, a time-consuming manipulation is required to recognize the correspondence among a multiplicity of control points if a multiplicity of the control points are set.

To generate computer graphic animation, such as movement of the joint of the hand, two bitmap images different from each other in only the degree of warping of the hand must be prepared. Moreover, the positional relationship between the two bitmap images must be instructed as the control points. What is worse, a great number of control points must be instructed one by one to generate smooth animation. Therefore, the foregoing means is not a practical means.

To generate computer graphic animation by only an intuitive and simple manipulation, a means is required which is capable of producing animation capable of performing all movements from one bitmap image. As described above, the conventional computer graphic animation producing means structured on the basis of the bitmap data set cannot satisfy the above-mentioned requirement.

That is, the conventional computer graphic animation producing means structured on the basis of the bitmap data set cannot generate computer graphic animation capable of performing arbitrary movements by only an intuitive and simple manipulation of one bitmap image, which is an original image, or a bitmap image which is one sprite constituting the original image.

A process for producing computer graphic animation of movements of the hand's joint of a person will now be considered. A means structured on the basis of 3D computer graphic animation is arranged in such a manner that a human-body model (a skeleton model) formed by setting 3D coordinate data indicating the shape of the hand is generated. The movement is generated by performing inverse calculations called "inverse kinetics" for each angle of the joint. The above-mentioned process is an extremely heavy load and thus it cannot be employed to generate interactive animation which requires a real-time process.

When animation of the above-mentioned stroke-base movements expressing the movements of the hand is performed on the basis of the bitmap data set, animation is performed with unnatural expansion and contraction is performed because the overall shape cannot be preserved. When animation of a subject (the movement of the hand) familiar with the human being is attempted to be generated, curious movements are performed.

If the key-frame of the animation is divided finely, the above-mentioned unnatural movements become inconspicuous. On the contrary, know-how for setting the key-frame and animation producing process required to realize the natural movements are increased. As a result, animation cannot be generated by an intuitive manipulation. If interpolated strokes are automatically generated by defining start and end strokes, a satisfactory effect cannot be obtained when complicated animation is expressed.

Hitherto, display of 3D shape data acquired by using a distance measuring device, such as a range finder, enables the irregularity of the shape to be recognized in accordance with the spatial density of the lattices. The foregoing method structured to recognize the shape has not been attempted to produce animation by changing the states of the lattice as time elapses.

Since the states of strokes between key-frames cannot be controlled in terms of time and space, the shape of animation has considerably been limited. In particular, a method of mapping the bitmap images assigned to the strokes cannot be changed to correspond to the shape and position of the stroke.

The conventional method of producing animation by sequentially reproducing only the prepared key-frames cannot produce animation which is capable of expressing movements in addition to the generated movements. Therefore, a time-consuming process has been required to produce animation which expresses movements which are delicately changed in accordance with rhythms. Moreover, animation cannot be switched by performing an interactive manipulation which is performed by a user during the reproducing manipulation. If interchange to another frame is performed and animation is switched during the reproducing process, the continuity of the movements cannot be maintained. In this case, there arises a problem in that unnatural animation is generated. To produce animation expressing, for example, a scene in which petals are scattered, a multiplicity of different key-frames must be generated. It leads to an excessively time-consuming manipulation must be performed. What is worse, animation of this type cannot be generated by the interactive manipulation.

On the other hand, computer graphics on the basis of modeling data enable animation to be generated by the interactive manipulation because computer graphic of the foregoing type is arranged to produce animation (movements) by changing coordinates. However, a multiplicity of control points cannot easily be changed by a user as required. The manipulation for the change is a complicated work. When computer graphic image of a human being is moved, a motion capturing method has usually been performed. In this case, a costly input device such as data suits must be used. Another method of producing animation is known which has a step of mapping a multiplicity of data, such as MIDI data, which is changed, to each control point. It is very difficult for a user to intuitively recognize animation which is resulted from data mapping. Therefore, complicated animation required for the user cannot be generated.

BRIEF SUMMARY OF THE INVENTION

An object of the present invention is to provide an animation producing method which is capable of easily producing an animation capable of arbitrarily moving by performing only an intuitive and easily manipulation for inputting a stroke expressing a sequential manipulation of a bitmap image to one bitmap image which serves as an original image or a bitmap image which is one sprite constituting the original image and an animation producing apparatus employing the method.

A further object of the present invention is to provide an animation producing apparatus which is capable of producing an animation exhibiting excellent power of expression, such as a 3D image effect by changing the shape of an interpolating stroke between key-frames and mapping of a bitmap image corresponding to the interpolating stroke as the time elapses and in terms of a space.

A still further object of the present invention is to provide an animation producing apparatus and an animation producing method which permit switch of a certain animation flow which is generated from a plurality of key-frames to another animation flow to be performed arbitrarily and smoothly by a user's manipulation and with which infinite number of patterns can easily be produced from a small number of key-frames though the animation is a key-frame animation.

Another object of the present invention is to provide an animation producing apparatus and an animation producing method capable of easily producing a new animation by inserting a new animation flow into an original animation flow as well as switching of the animation flow.

According to one aspect of the present invention, there is provided an animation producing apparatus for producing animation constituted by a key-frame image composed of one or more strokes and an interpolating frame image composed of interpolating strokes which are generated by interpolating a portion between the strokes of each key-frame image, the animation producing apparatus comprising: input means for inputting one or more strokes to the key-frame; and generating means for generating interpolating stroke for interpolating a portion between strokes input to each key-frame by the input means. Thus, an animation capable of sequentially moving as required by a user can easily be produced with a simple manipulation.

According to another aspect of the present invention, there is provided an animation producing apparatus for producing animation constituted by a key-frame image composed of one or more strokes and an interpolating frame image composed of interpolating strokes which are generated by interpolating a portion between the strokes of each key-frame image, the animation producing apparatus comprising: input means for inputting one or more strokes to the key-frame; quantizing means for quantizing each stroke input to each key-frame by the input means into unit vectors each having a predetermined length; and generating means for generating an interpolating vector for interpolating a portion between the corresponding unit vectors in accordance with an amount of change between corresponding unit vectors between the key-frames obtained by a quantization manipulation performed by the quantizing means. Thus, an animation capable of sequentially moving as required by a user can easily be produced with a simple manipulation.

According to another aspect of the present invention, there is provided an animation producing apparatus for producing animation composed of a plurality of image frames in accordance with one or more original images, the animation producing apparatus comprising: first input means for inputting one or more strokes to portions along image portion of an original image required to be moved; second input means for inputting one or more strokes which indicate shapes of changes of the strokes input by the first input means; first generating means for generating interpolating strokes for interpolating portions between strokes input by the first and second input means; and second generating means for generating a plurality of image frames by deforming and/or moving image regions adjacent to the strokes input by the first input means in accordance with the positions and shapes of the strokes input by the second input means and those of interpolating strokes and by combining the image regions with the original image.

Thus, an animation capable of sequentially moving as required by a user can easily be produced with a simple manipulation.

According to another aspect of the present invention, there is provided an animation producing apparatus for producing animation composed of a plurality of image frames in accordance with one or more original images, the animation producing apparatus comprising: first input means for inputting one or more strokes to portions along image portion of an original image required to be moved; second input means for inputting one or more strokes which indicate shapes of changes of the strokes input by the first input means; quantizing means for quantizing the strokes input by the first and second input means into unit vectors each having a predetermined length; first generating means for generating interpolating vectors for interpolating portions between unit vectors obtained by the quantizing manipulation performed by the quantizing means and corresponding to the strokes input by the first and second input means; and second generating means for generating a plurality of image frames by moving and/or deforming image regions adjacent to the unit vectors obtained by quantizing the strokes input by the first input means by the quantizing means in accordance with unit vectors obtained by quantizing the strokes input by the second input means by the quantizing means and the interpolating vectors and by combining the image regions with the original images. Thus, an animation capable of sequentially moving as required by a user can easily be produced with a simple manipulation.

According to another aspect of the present invention, there is provided an animation producing method for producing animation constituted by a key-frame image composed of one or more strokes and an interpolating frame image composed of interpolating strokes which are generated by interpolating a portion between the strokes of each key-frame image, the animation producing method comprising the step of: generating interpolating strokes for interpolating portions between one or more strokes input from a user to the key-frame. Thus, an animation capable of sequentially moving as required by a user can easily be produced with a simple manipulation.

According to another aspect of the present invention, there is provided an animation producing method for producing animation constituted by a key-frame image composed of one or more strokes and an interpolating frame image composed of interpolating strokes which are generated by interpolating a portion between the strokes of each key-frame image, the animation producing method comprising the step of: quantizing one or more strokes input from a user to the key-frame into unit vectors each having a predetermined length; and generating an interpolating vector for interpolating a portion between the corresponding unit vectors in accordance with an amount of change between the corresponding unit vectors between the key-frames. Thus, an animation capable of sequentially moving as required by a user can easily be produced with a simple manipulation.

According to another aspect of the present invention, there is provided an animation producing method for producing animation constituted by a plurality of image frames in accordance with one or more original images, the animation producing method comprising the steps of: generating one or more strokes along an image portion of an original image input by a user which is required to be moved and interpolating strokes for interpolating a portion between one or more change strokes indicating change shapes of the strokes; and moving and/or deforming image regions adjacent to the one or more strokes along the image portion of the original image which is required to be moved in accordance with positions and shapes of the change strokes and the interpolating strokes so as to be combined with the original images so that a plurality of image frames are generated. Thus, an animation capable of sequentially moving as required by a user can easily be produced with a simple manipulation.

According to another aspect of the present invention, there is provided an animation producing method for producing animation constituted by a plurality of image frames in accordance with one or more original images, the animation producing method comprising the steps of: quantizing one or more strokes input by a user and along an image portion of an original image which is required to be moved and one or more change strokes indicating change shapes of the strokes into unit vectors each having a predetermined length; generating interpolating vectors for interpolating portions between the strokes and unit vectors in accordance with amounts of changes between one or more strokes along the image portion of the original images which are required to be moved and the unit vectors to which the change strokes correspond; and moving and/or deforming image regions adjacent to each of unit vectors of the one or more strokes along the image portions of the original images which are required to be moved in accordance with the unit vectors of the corresponding change strokes and the interpolating vectors so that a plurality of image frames are generated. Thus, an animation capable of sequentially moving as required by a user can easily be produced with a simple manipulation.

According to another aspect of the present invention, there is provided an animation producing apparatus for producing an animation composed of a plurality of line drawings and interpolating frames for interpolating portions between the line drawings, the animation producing apparatus comprising: input means for inputting a plurality of line drawing indicating changed shapes of strokes; and generating means for generating interpolating frames for interpolating portion between the plural line drawings in accordance with an amount of change between the corresponding strokes between the plural line drawings input by the input means. Thus, an animation capable of sequentially moving as required by a user can easily be produced with a simple manipulation.

According to another aspect of the present invention, there is provided an animation producing apparatus for producing an animation composed of a plurality of line drawings and interpolating frames for interpolating portions between the line drawings, comprising: input means for inputting a plurality of line drawings indicating changed shapes of strokes; quantizing means for quantizing each of corresponding strokes between the plural line drawings input by the input means into unit vectors each having a program length; and generating means for generating interpolating frames for interpolating portions between the plural line drawings by obtaining interpolating vectors for interpolating portions between corresponding unit vectors in accordance with an amount of change between the corresponding unit vectors between the plural line drawings obtained by the quantizing manipulation performed by the quantizing means. Thus, an animation capable of sequentially moving as required by a user can easily be produced with a simple manipulation.

According to another aspect of the present invention, there is provided an animation producing apparatus for producing animation composed of a plurality of image frames in accordance with one or more original images, the animation producing apparatus comprising: first input means for inputting a first stroke along an image portion in an original image required to be moved; second input means for inputting one or a plurality of change strokes indicating changed shapes of the first stroke; and first generating means for generating an interpolating stroke for interpolating a portion between the first stroke and the change stroke or between change strokes in accordance with an amount of a change of the portion; second generating means for generating a plurality of image frames by moving an image region adjacent to the first stroke in accordance with an amount of a change and the shape of the interpolating stroke and by, if necessary, deforming to blend the image region to the original image. Thus, an animation capable of sequentially moving as required by a user can easily be produced with a simple manipulation.

According to another aspect of the present invention, there is provided an animation producing apparatus for producing an animation composed of a plurality of image frames in accordance with one or a plurality of original images, the animation producing apparatus comprising: first input means for inputting a first stroke along an image portion in the original image required to be moved; second input means for inputting one or a plurality of change strokes indicating changed shapes of the first stroke; quantizing means for quantizing the first stroke and the change stroke into unit vectors each having a predetermined length; calculating means for calculating an interpolating vector for interpolating a portion between the first stroke and the change stroke in accordance with an amount of change between the corresponding unit vectors of the first stroke and the change stroke obtained by the quantizing manipulation performed by the quantizing means; extracting means for extracting an image region adjacent to each unit vector of the first stroke from the original image; and generating means for generating a plurality of image frames by moving the image region adjacent to each unit vector of the first stroke extracted by the extracting means in accordance with the corresponding unit vector of the change stroke and the interpolating vector so as to be blended to the original image. Thus, an animation capable of sequentially moving as required by a user can easily be produced with a simple manipulation.

According to another aspect of the present invention, there is provided an animation producing method for producing an animation composed of a plurality of line drawings and interpolating frames for interpolating a portion between the line drawings, the animation producing method comprising the steps of:

generating an interpolating frame for interpolating a portion between the plural line drawings in accordance with an amount of change between the corresponding strokes between the plural line drawings indicating changed shape of the stroke input by a user. Thus, an animation capable of sequentially moving as required by a user can easily be produced with a simple manipulation.

According to another aspect of the present invention, there is provided an animation producing method for producing an animation composed of a plurality of line drawings and interpolating frames for interpolating a portion between the line drawings, the animation producing method comprising the steps of:

quantizing each of corresponding strokes between a plurality of line drawings indicating the changed shape of strokes input by a user into unit vectors each having a predetermined length; and obtaining an interpolating vector for interpolating a portion between the corresponding unit vectors in accordance with an amount of change between the corresponding unit vectors of the plurality of the line drawing obtained by the quantizing manipulation to generate an interpolating frame for interpolating a portion between the plural line drawings. Thus, an animation capable of sequentially moving as required by a user can easily be produced with a simple manipulation.

According to one aspect of the present invention, there is provided an animation composed of a plurality of image frames in accordance with one or a plurality of original images, the animation producing method comprising the steps of: generating an interpolating stroke for interpolating a portion between a first stroke and one or a plurality of changed strokes in accordance with an amount of change between the first stroke along an image portion of the original image input by a user and required to be moved and the changed strokes; moving an image region adjacent to the first stroke in accordance with an amount of change and the shapes of the changed stroke and the interpolating stroke and, if necessary, deforming so as to blend the image region to the original image so that a plurality of image frames are generated. Thus, an animation capable of sequentially moving as required by a user can easily be produced with a simple manipulation.

According to another aspect of the present invention, there is provided an animation producing method of producing an animation composed of a plurality of image frames on the basis of one or a plurality of original images, the animation producing method comprising the steps of: quantizing a first stroke along an image portion of an original image input by a user and required to be moved and one or a plurality of changed strokes indicating changed shapes of the first stroke into unit vectors each having a predetermined length; calculating an interpolating vector for interpolating a portion between the first stroke and the changed stroke in accordance with an amount of changed in the corresponding unit vectors of the first stroke and the changed stroke obtained by the quantizing manipulation; moving an image region adjacent to each unit vector of the first stroke extracted from the original image in accordance with the unit vector of the corresponding changed stroke and the interpolating vector and, if necessary, deforming the same to be blended to the original image so that a plurality of image frames are generated. Thus, an animation capable of sequentially moving as required by a user can easily be produced with a simple manipulation.

According to one aspect of the present invention, there is provided an animation producing apparatus for producing an animation by generating a plurality of interpolating images for interpolating the strokes between the plural frame images from a plurality of frame images each of which is composed of one or a plurality of strokes, the animation producing apparatus comprising: input means for inputting one or a plurality of strokes to each of the frame images; correspondence making means for making the strokes input by the input means between the plural frame images; and generating means for generating an interpolating stroke for interpolating a portion between the strokes made to correspond to each other by the correspondence making means. Thus, an animation capable of sequentially moving as required by a user can easily be produced with a simple manipulation. That is, the strokes for instructing the movement of the animation are made to correspond when the strokes are input. Even if the strokes between the plurality of the frame images have an arbitrary correspondence relationship, such as 1:0, 1:1, 1:a multiplicity or a multiplicity: a multiplicity, interpolating strokes are generated in accordance with the correspondence. Therefore, the strokes can be input for each frame image without a limitation of the number. Moreover, the strokes corresponding between the plurality of the frame images are not required to have the same length. A necessity of drawing a stroke to conform to a frame image having the largest number of strokes can be eliminated in a case where the strokes between the frame images must have the correspondence (the number of strokes in each frame image must be the same). When a complicated animation is produced in which, for example, a stroke existing in a certain frame image disappears in a next frame image or one stroke in a certain frame image is decomposed into n sections, a necessity of drawing a dummy stroke which cannot visually be recognized can be eliminated. Thus, an animation can easily be produced by only freely drawing strokes on a frame image without any limitation.

According to another aspect of the present invention, there is provided an animation producing apparatus for producing an animation by generating a plurality of interpolated images for interpolating strokes between the plural frame images from a plurality of the frame images each of which is composed of one or more strokes, the animation producing apparatus comprising: input means for inputting one or a plurality of strokes to each of the frame images; first correspondence making means for making the strokes input by the input means to correspond to each other between the plural frame images; quantizing means for quantizing the strokes into unit vectors each having an arbitrary length; second correspondence making means for making the unit vectors to each other between the strokes made to correspond to each other in accordance with the number of unit vectors of each of the strokes made to correspond by the first correspondence making means; and generating means for generating an interpolating vector for interpolating a portion between the unit vectors in accordance with the amount of change between the unit vectors made to correspond to each other by the second correspondence making means. Thus, an animation capable of sequentially moving as required by a user can easily be produced with a simple manipulation. That is, the strokes for instructing the movement of the animation are made to correspond when the strokes are input. Moreover, unit vectors are made to correspond to each other between the stroke made to correspond to each other. In accordance with the made correspondence, the interpolating vector is generated. Therefore, the strokes can be input for each frame image without a limitation of the number. Moreover, the strokes corresponding between the plurality of the frame images are not required to have the same length. Thus, an animation can easily be produced by only freely drawing strokes on a frame image without any limitation.

According to another aspect of the present invention, there is provided an animation producing apparatus for producing an animation by generating a plurality of frame images in accordance with one or a plurality of original images, the animation producing apparatus comprising: first input means for inputting one or a plurality of first strokes along an image portion; second input means for inputting one or a plurality of second strokes indicating the change shapes of the first strokes input by the first input means; correspondence making means for making the first and second strokes to correspond to each other; first generating means for generating an interpolating stroke for interpolating a portion between the first and second strokes made to correspond to each other by the correspondence making means; second generating means for moving or deforming or moving and deforming an image region adjacent to the first stroke in accordance with the position and shape of the second stroke made correspond to the first stroke and those of the interpolating stroke to generate a unit image corresponding to each of the second stroke and the interpolating stroke; and third generating means for generating a frame image by blending the unit image to the original image in accordance with the second stroke or the interpolating stroke. Thus, an animation capable of sequentially moving as required by a user can easily be produced with a simple manipulation. That is, the strokes for instructing the movement of the animation are made to correspond when the strokes are input. Even if the strokes between the plurality of the frame images have an arbitrary correspondence relationship, such as 1:0, 1:1, 1:a multiplicity or a multiplicity: a multiplicity, interpolating strokes are generated in accordance with the correspondence. Therefore, the strokes can be input for each frame image without a limitation of the number. Moreover, the strokes corresponding between the plurality of the frame images are not required to have the same length. A necessity of drawing a stroke to conform to a frame image having the largest number of strokes can be eliminated in a case where the strokes between the frame images must have the correspondence (the number of strokes in each frame image must be the same). When an image adjacent to a portion to which the first stroke has been input is freely deformed in accordance with the positions and shapes of the second stroke and the interpolating vector, an animation capable of moving arbitrarily can be produced. Since the unit vectors of the strokes can dynamically be made to correspond to each other (quantization and making correspondence in accordance with the number of the unit vectors of the corresponding strokes), an animation can easily be produced in which the unit images corresponding to the strokes are expanded/contracted in accordance with the difference in the length of the stroke.

According to another aspect of the present invention, there is provided an animation producing apparatus for producing an animation by generating a plurality of frame images in accordance with one or a plurality of original images, the animation producing apparatus comprising: first input means for inputting one or a plurality of first strokes along an image portion; second input means for inputting one or a plurality of second strokes indicating the change shapes of the first strokes input by the first input means; first correspondence making means for making the first and second strokes to correspond to each other; quantizing means for quantizing the first and second strokes into unit vectors each having an arbitrary length; second correspondence making means for making the unit vectors between the first and second strokes made to correspond to each other by the first correspondence making means in accordance with the number of the unit vectors of the first and second strokes; first generating means for generating an interpolating vector for interpolating a portion between the unit vectors in accordance with an amount of change between the unit vectors made to correspond to each other by the second correspondence making means; second generating means for generating a unit image corresponding to the unit vector of the second stroke and the interpolating vector by moving or deforming or moving and deforming an image region adjacent to each unit vector of the first stroke in accordance with the position and shape of the second stroke corresponding to each of the unit vectors and the interpolating vector; and third generating means for generating a frame image by blending the unit image to the original image in accordance with the unit vector of the second stroke or the interpolating vector. Thus, an animation capable of sequentially moving as required by a user can easily be produced with a simple manipulation. That is, the strokes for instructing the movement of the animation are made to correspond when the strokes are input. The unit vectors are made to correspond to each other between the strokes made to correspond to each other. In accordance with the correspondence, the interpolating vector is generated. Therefore, the strokes can be input for each frame image without a limitation of the number. Moreover, the strokes corresponding between the plurality of the frame images are not required to have the same length. When an image adjacent to a portion to which the first stroke has been input is freely deformed in accordance with the positions and shapes of the second stroke and the interpolating vector, an animation capable of moving arbitrarily can be produced. Since the unit vectors of the strokes can dynamically be made to correspond to each other (quantization and making correspondence in accordance with the number of the unit vectors of the corresponding strokes), an animation can easily be produced in which the unit images corresponding to the strokes are expanded/contracted in accordance with the difference in the length of the stroke.

Since storage means for shaping the unit image into a regular shape and storing the shaped unit image is provided and when the frame image is generated, the unit image stored in the storage means is restored to the original shape and blended to the original image. Therefore, when an image region adjacent to the first stroke is cut, even an image region having an irregular shape (that is, an arbitrary rectangle or triangle) can be cut. Therefore, limitation of the animation image which can be produced can significantly be suspended.

Since storage means for making processed data for an instructed special effect to correspond to the unit image and storing the processed data is provided and when the frame image is generated, the unit image stored in the storage means is subjected to the special effect in accordance with processed data so as to be blended to the original image. Since a special effect, such as shading or noise addition, is performed, and then the image region is drawn, an animation exhibiting excellent power of expression can be produced.

According to another aspect of the present invention, there is provided an animation producing apparatus for producing an animation by generating an image for interpolating a portion between a plurality of frame images, the animation producing apparatus comprising: first input means for inputting one or a plurality of strokes to each of the frame images; second input means for inputting limiting information (for example, a limiting stroke or a limiting function) of the changed shape of the stroke when the stroke input by the first input means is interpolated between the plurality of the frame images; and generating means for generating an interpolating stroke in accordance with the interpolation position at which the stroke input by the first input means is interpolated between the plural frame images, limiting information and the stroke input by the first input means. Therefore, animation capable of moving naturally can easily be generated while the overall shape in the vicinity of the key stroke is maintained.

According to another aspect of the present invention, there is provided an animation producing apparatus for producing an animation by generating an image for interpolating a portion between plural frame images, the animation producing apparatus comprising: first input means for inputting one or a plurality of strokes to each of the frame images; quantizing means for quantizing each of the strokes made to correspond to each other between the plural frame images and input by the first input means into unit vectors each having a predetermined length; second input means for inputting a limiting condition for limiting a changed shape of the stroke when the stroke input by the first input means is interpolated between the plural frame images; and generating means for generating an interpolating vector in accordance with the interpolation position at which a portion between the strokes made to correspond to each other is interpolated, limiting information and the corresponding unit vectors of the strokes made to correspond to each other and an interpolating stroke for interpolating a portion between the stroke made to correspond to each other in accordance with the generated interpolating vector. Therefore, the generated interpolating stroke is deformed by using the limiting function. Thus, an animation having a 3D visual effect, such as convex and irregularity, can easily be generated.

The animation producing apparatus according to the present invention further comprises an interpolating image generating means for generating an image for interpolating a portion between the frame images by moving or deforming or moving and deforming an image adjacent to the stroke input by the first input means in accordance with the position and shape of the interpolating stroke generated by the generating means. Since the interpolating stroke for a portion between the input key strokes is generated in accordance with a limiting stroke for limiting the positions of the two ends of the interpolating stroke, an animation capable of moving naturally can easily be produced while the overall shape in the vicinity of the key stroke is maintained. Therefore, the generated interpolating stroke is deformed by using the limiting function. Thus, an animation having a 3D visual effect, such as convex and irregularity, can easily be generated. Since an image in the vicinity of the cut stroke is subjected to a process such as deformation or shading when mapping of the image to the interpolating stroke is performed, also an animation having power of expression with a special visual effect can easily be produced.

According to another aspect of the present invention, there is provided an animation producing apparatus for producing a sequential animation composed of a plurality of image frames and a plurality of interpolating frames by generating the plurality of the interpolating frames for interpolating a portion between the plurality of the supplied image frames, the animation producing apparatus comprising: image-frame storage means in which a plurality of image frames are stored; first producing means for producing a first animation from a first image frame to a second image frame by generating a plurality of interpolating frames for interpolating portions between an instructed first image frame and a second image frame of the image frames stored in the image-frame storage means; and second generating means arranged in such a manner that when at least one interpolating frame of a plurality of interpolating frames in the first animation and a third image frame stored in the image-frame storage means are instructed and branching from the first animation is instructed, the second generating means generates a plurality of interpolating frames for interpolating a portion between the instructed interpolating frame in the first animation and the third image frame so as to generate a second animation branched from the instructed interpolating frame.

Therefore, switching from a certain animation flow generated from a plurality of key-frames to anther animation flow can smoothly be performed at arbitrary timing in accordance with an instruction from a user. Thus, an animation having an infinite patterns can easily be generated from a key-frame having a small number of patterns.

According to another aspect of the present invention, there is provided an animation producing apparatus for producing a sequential animation composed of a plurality of image frames and a plurality of interpolating frames by generating a plurality of interpolating frames for interpolating a portion between the plurality of the supplied image frames, the animation producing apparatus comprising: image-frame storage means for storing a plurality of image frames; first producing means for producing a first animation from a first image frame to a second image frame by generating a plurality of interpolating frames for interpolating a portion between the first image frame of the image frames stored in the image-frame storage means and the second image frame; second generating means arranged in such a manner that when at least one interpolating frame of a plurality of interpolating frames in the first animation and a third image frame stored in the image-frame storage means are instructed and branching from the first animation is instructed, the second generating means generates a plurality of interpolating frames for interpolating a portion between the instructed interpolating frame in the first animation and the third image frame so as to generate a second animation branched from the instructed interpolating frame; and third generating means arranged in such a manner that when branching from the first animation is instructed, the third generating means selects one interpolating frame from the plural interpolating frames in the first animation and generates a plurality of interpolating frames for interpolating a portion between the third image frame and the selected interpolating frame so as to generate a third animation which is jointed from the second animation to the first animation. Therefore, switching from a certain animation flow generated from a plurality of key-frames to anther animation flow can smoothly be performed at arbitrary timing in accordance with an instruction from a user. Thus, an animation having an infinite patterns can easily be generated from a key-frame having a small number of patterns.

According to another aspect of the present invention, there is provided an animation producing apparatus for producing a sequential animation composed of a plurality of image frames and a plurality of interpolating frames by generating the plural interpolating frames for interpolating a portion between the plurality of the supplied image frames, the animation producing apparatus comprising: image-frame storage means in which the plural image frames are stored; first producing means for producing a first animation from a first image frame to a second image frame by generating a plurality of interpolating frames for interpolating a portion between the instructed first image frame of the image frame stored in the image frame storage means and the second image frame; second generating means arranged in such a manner that when at least one interpolating frame of the plural interpolating frames in the first animation and a third image frame stored in the image-frame storage means are instructed and branching from the first animation is instructed, the second generating means generates a plurality of interpolating frames for interpolating a portion between the instructed interpolating frame in the first animation and the third image frame so as to produce a second animation branched from the instructed interpolating frame; third producing means for producing a third animation which is joined from the second animation to the first animation by selecting one interpolating frame of the plural interpolating frames in the first animation when branching from the first animation is instructed and by generating a plurality of interpolating frames for interpolating a portion between the third image frame and the selected interpolating frame; and interpolating frame number calculating means for calculating the number of interpolating frames for interpolating a portion between the instructed interpolating frame in the first animation and the third image frame and the number of interpolating frames for interpolating a portion between the third image frame and the selected interpolating frame in the first animation. Therefore, switching from a certain animation flow generated from a plurality of key-frames to anther animation flow can smoothly be performed at arbitrary timing in accordance with an instruction from a user. Thus, an animation having an infinite patterns can easily be generated from a key-frame having a small number of patterns.

According to another aspect of the present invention, there is provided an animation producing apparatus for producing a sequential animation composed of a plurality of image frames and a plurality of interpolating frames by generating the plurality of the interpolating frames for interpolating a portion between the plurality of the supplied image frames, the animation producing apparatus comprising: image-frame storage means in which a plurality of image frames are stored; first producing means for producing a first animation from a first image frame to a second image frame by generating a plurality of interpolating frames for interpolating a portion between the instructed first image frame of the image frames stored in the image-frame storage means and the second image frame; and animation insertion means arranged in such a manner that when at least one interpolating frame of the plural interpolating frames in the first animation and one or a plurality of the third image framed stored in the image-frame storage means are instructed and insertion of one or a plurality of second animations which are different from the first animation into the first animation is instructed, the animation insertion means inserts the second animation from the instructed interpolating frame formed by generating the plurality of the interpolating frames for interpolating a portion between the instructed interpolating frame in the first animation and the third image frame to the third image frame into the first animation following the instructed interpolating frame. When a new animation flow is inserted into an original animation flow, a new animation can easily be generated.

According to another aspect of the present invention, there is provided a recording medium which can mechanically be read, comprising: a program stored therein, the program being arranged to generate a sequential animation composed of a plurality of image frames and a plurality of interpolating frames by generating the plural interpolating frames for interpolating a portion between the plurality of the supplied image frames, the program being arranged to perform the steps of: producing a first animation from a first image frame to a second image frame by generating a plurality of interpolating frames for interpolating a portion between the instructed first image frame of the plurality of the supplied image frames and the second image frame, and producing a second animation branched from the instructed interpolating frame by generating a plurality of interpolating frames for interpolating a portion between the instructed interpolating frame in the first animation and the third image frame when at least one interpolating frame of the plural interpolating frames in the first animation and the third image frame of the plural image frames are instructed and branching from the first animation is instructed. Therefore, switching from a certain animation flow generated from a plurality of key-frames to anther animation flow can smoothly be performed at arbitrary timing in accordance with an instruction from a user. Thus, an animation having an infinite patterns can easily be generated from a key-frame having a small number of patterns.

According to another aspect of the present invention, there is provided a program which can mechanically be read, comprising: a program stored therein, the program being arranged to generate a sequential animation composed of a plurality of image frames and a plurality of interpolating frames by generating the plural interpolating frames for interpolating a portion between the plurality of the supplied image frames, the program being arranged to perform the steps of: producing a first animation from a first image frame to a second image frame by generating a plurality of interpolating frames for interpolating a portion between the instructed first image frame of the plurality of the supplied image frames and the second image frame; producing a second animation branched from the instructed interpolating frame by generating a plurality of interpolating frames for interpolating a portion between the instructed interpolating frame in the first animation and the third image frame when at least one interpolating frame of the plural interpolating frames in the first animation and the third image frame of the plural image frames are instructed and branching from the first animation is instructed; and producing a third animation which is joined from the second animation to the first animation by selecting one interpolating frame from the plural interpolating frames in the first animation when branching from the first animation is instructed and by generating a plurality of interpolating frames for interpolating a portion between the third image frame and the selected interpolating frame. Thus, switching from a certain animation flow generated from a plurality of key-frames to anther animation flow can smoothly be performed at arbitrary timing in accordance with an instruction from a user. Thus, an animation having an infinite patterns can easily be generated from a key-frame having a small number of patterns.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 is a diagram showing an example of storage in a unit vector storage means;

FIG. 11 is a diagram showing an example of storage in a unit vector storage means for storing the correspondence between a skeltal skeleton and a unit vector of a skeleton indicating the changed shape;

FIG. 28 is a diagram showing a case in which data of a unit vector and data of a chunk are made to correspond to each other;

FIG. 29 is a diagram showing an example of storage in the unit vector storage means;

FIG. 33 is a diagram showing storage data of a unit vector and data of a chunk made to correspond to each other;

FIG. 36 is a diagram showing an example of storage of data relating to deformation calculation of a chunk in such a manner that it is made to correspond to a corresponding interpolating vector;

FIG. 43 is a diagram showing an example of storage of data relating to calculations for deforming a chunk, in which calculations for deforming the chunk into a trapezoid are performed;

FIGS. 60A and 60B are diagrams showing an example of storage of a unit vector between corresponding strokes in a unit vector storage means;

FIGS. 61A and 61B are diagrams showing another example of storage of a unit vector between corresponding strokes in the unit vector storage means;

FIGS. 71A to 71D are diagrams showing a method of normalizing a unit image having irregular shape into a square or a rectangular shape;

FIG. 81 is a diagram showing an example of storage of a unit vector, a unit image and data for calculating a special effect;

FIG. 82 is a diagram showing another example of storage of a unit vector, a unit image and data for calculating a special effect;

FIGS. 87A to 87D are flow charts of the process which is performed by the animation producing apparatus shown in FIG. 86, in which FIG. 87A is a flow chart of the overall process, and FIG. 87B is a flow chart of a manipulation for inputting a key stroke;

FIG. 87C is a flow chart of the manipulation for inputting a limiting stroke;

FIG. 87D is a flow chart of the manipulation for reproducing an animation;

FIGS. 88A to 88C are diagrams showing a process for generating a limiting stroke from the limiting stroke and a key stroke;

FIG. 93 is a diagram showing an example of storage of control points of a key stroke which is performed by a key stroke administration means;

FIG. 94 is a diagram showing an example of storage of a limiting function in a limiting function administrating means;

FIGS. 95A to 95C are diagrams showing a method of generating an interpolating stroke by deforming and blending a key stroke in accordance with the interpolation position at which the key stroke is interpolated;

FIG. 107 is a diagram showing an example of display of candidates of animation flows when branching is instructed;

FIGS. 111A to 111C are diagrams showing a process for generating a usual animation flow when branching is not instructed;

FIGS. 112A to 112C are diagrams showing a process for branching and joining of an animation flow when branching is instructed, in which a process is shown which is performed when branching from an original animation flow to a goal frame set newly is performed;

DETAILED DESCRIPTION OF THE INVENTION

Embodiments of the present invention will now be described with reference to the drawings.

First Embodiment

A process for producing animation composed of line drawings (an image composed of a plurality of line segments composed of strokes and sometimes called key-frames) will now be described.

Figures 1A, 1B:
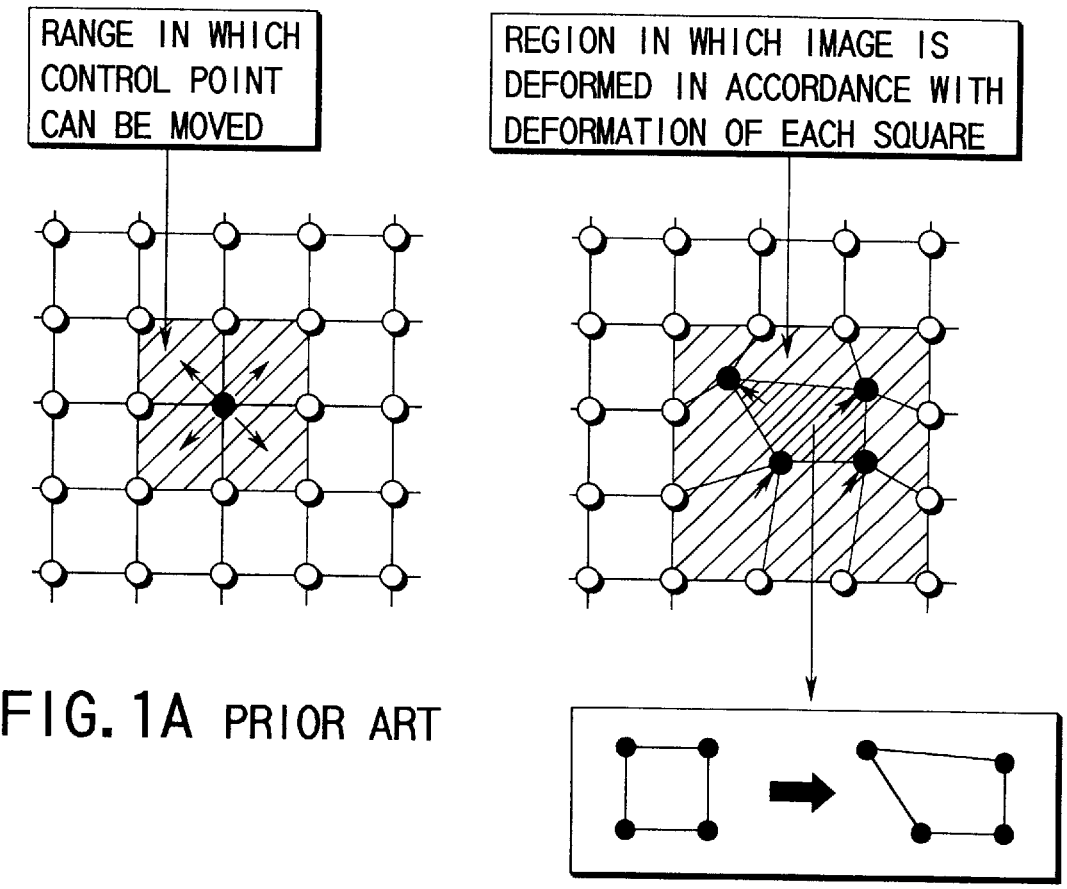
FIGS. 1A and 1B are diagrams showing generation of an animation by means of warping which is performed by a conventional animation producing apparatus.
Figure 2:
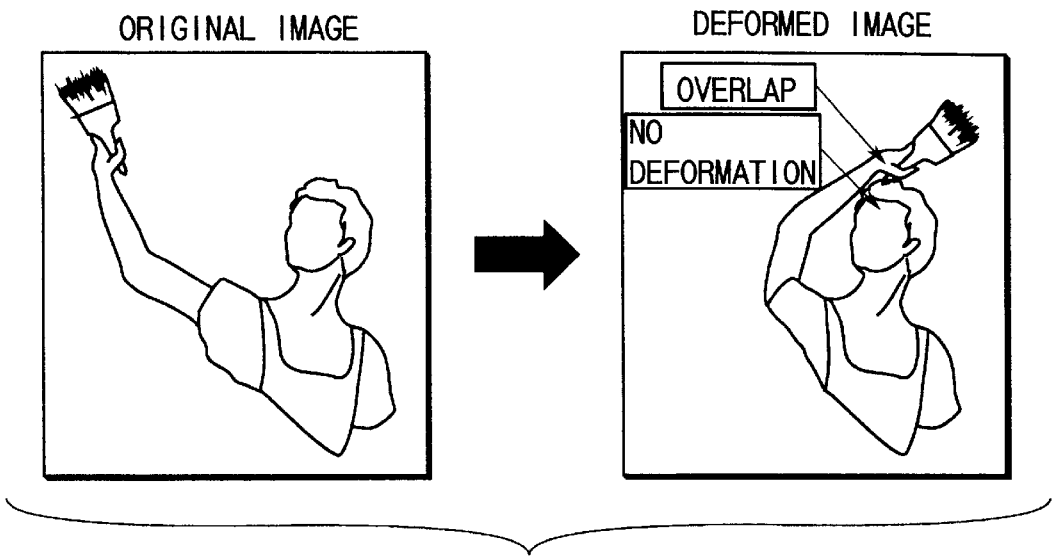
FIG. 2 is a diagram showing an example of an animation produced by warping.
Figure 3A:
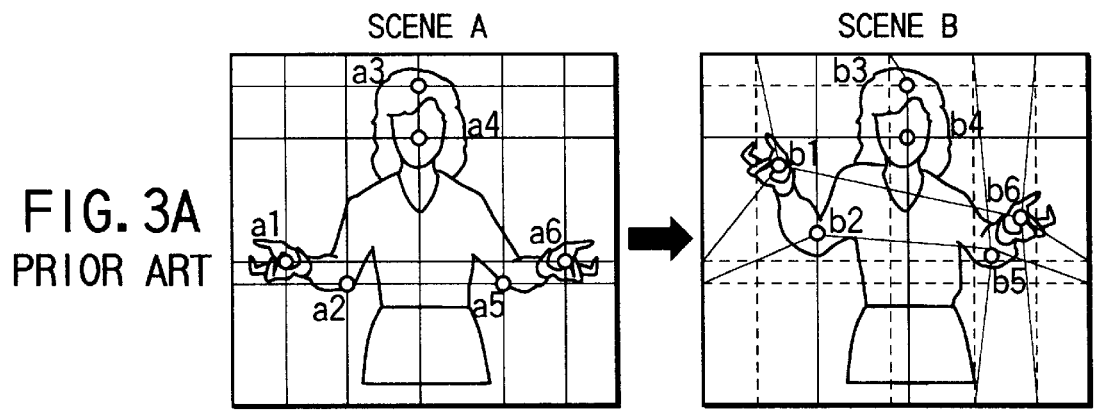
FIGS. 3A and 3B are diagrams showing production of an animation by morphing which is performed by the conventional animation producing apparatus.
Figure 3B:
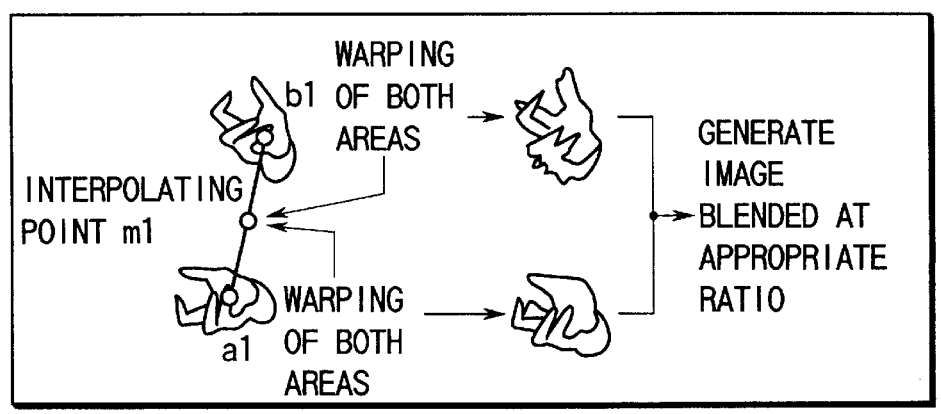
Figure 4:
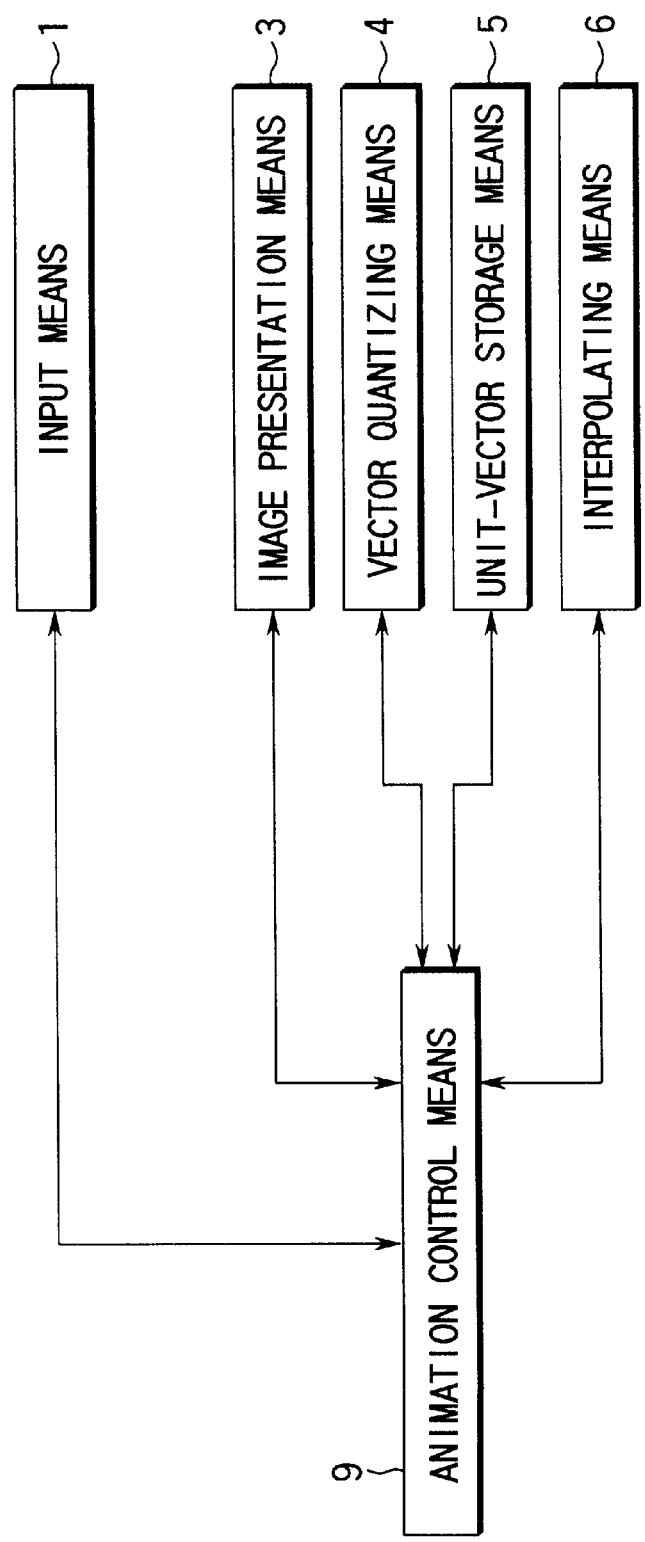
FIG. 4 is a diagram schematically showing an example of an animation producing apparatus according to a first embodiment of the present invention.

FIG. 4 is a diagram schematically showing an example of the structure of an animation producing apparatus according to a first embodiment of the present invention. As shown in FIG. 4, the animation producing apparatus comprises an input means 1 for inputting line drawings or the like, the line drawings inputted through the input means 1, an image presentation means 3 for displaying animation or the like generated on the basis of the supplied line drawings, a vector quantizing means 4 for decomposing strokes in the line drawing into a plurality of unit vectors each having a predetermined length, a unit-vector storage means 5 for storing the generated unit vectors, an interpolating means 6 for generating interpolating vector between the two strokes and an animation control means 9 for producing sequential animation by performing control to synchronize the above-mentioned means.

The structure is constituted as described above. When a plurality of line drawings indicating change in the shape of the strokes have been supplied from a user to the animation producing apparatus through the input means 1, the vector quantizing means 4 quantizes each of corresponding strokes between the plurality of the supplied line drawings into unit vectors each having the predetermined length. The interpolating means 6 generates interpolating frames between the plural line drawings on the basis of change in the amount between corresponding unit vectors between the plural line drawings and the number of interpolating frames. Thus, animation is generated.

Terms which will be used hereinafter will now be described.

A term "key-frame" means a line drawing (composed of a (curved or) line segment of change in the movement input by, for example, a user by using the input means 1.

A term "skeleton" has a concept which is substantially the same as that of the stroke constituting the line drawing.

The term "interpolating frame" means a frame image interpolated between key-frames, the number of the frame images being previously instructed by the user as the number of interpolations.

A term "reproduction interval" means an interval of reproducing time between the interpolating frames.

The manipulation of the animation producing apparatus shown in FIG. 4 will now be described with reference to FIGS. 5A and 5B.

Figure 5A:
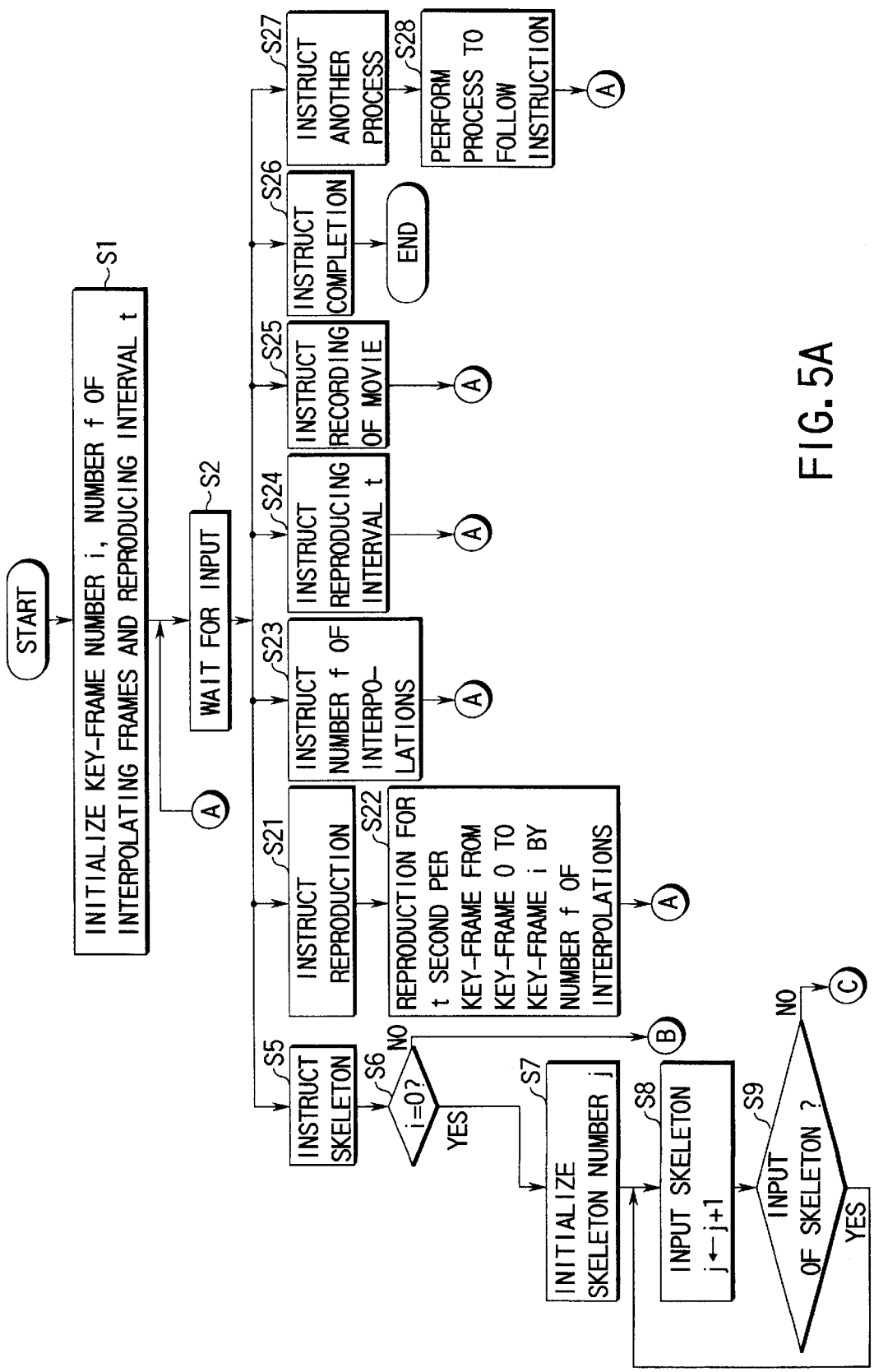
FIGS. 5A and 5B are flow charts showing the overall process of the animation producing apparatus shown in FIG. 1.
Figure 5B:
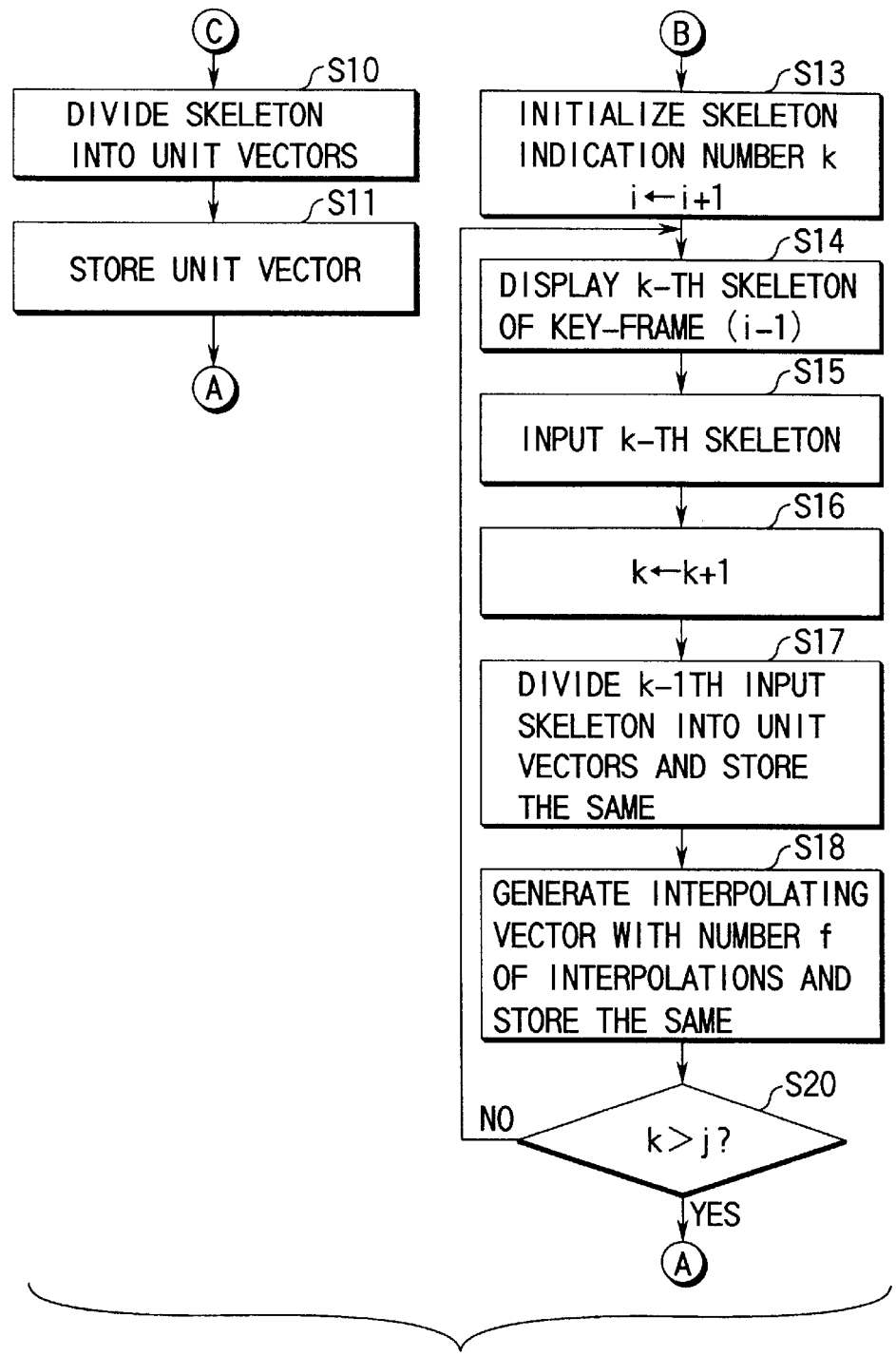

FIGS. 5A and 5B are flow charts showing the overall processing manipulation of the animation producing apparatus shown in FIG. 4.

Initially, the key-frame number i (i=0 to n), the number f of interpolating frames and the reproducing interval t are initialized (step S1). Then, a state in which input is waited for is realized (step S2). At this time, a user is able to perform instruction of input of a skeleton (which is sometimes called a "stroke")(step S5), instruction to reproduce animation (step S21), instruction of the number f of interpolating frames (step S23), instruction of reproducing interval t (step S24), for example, instruction of recording of a movie which is able to serve as an original image (step S25), instruction of completion (step S26) and another instruction (step S27).

When the user has instructed to input a skeleton (step S5) and a key-frame having 0-th frame number is instructed (step S6), skeleton number j is initialized (step S7). The skeleton number is used to identify a plurality of skeletons which are input by the user.

Figure 6:
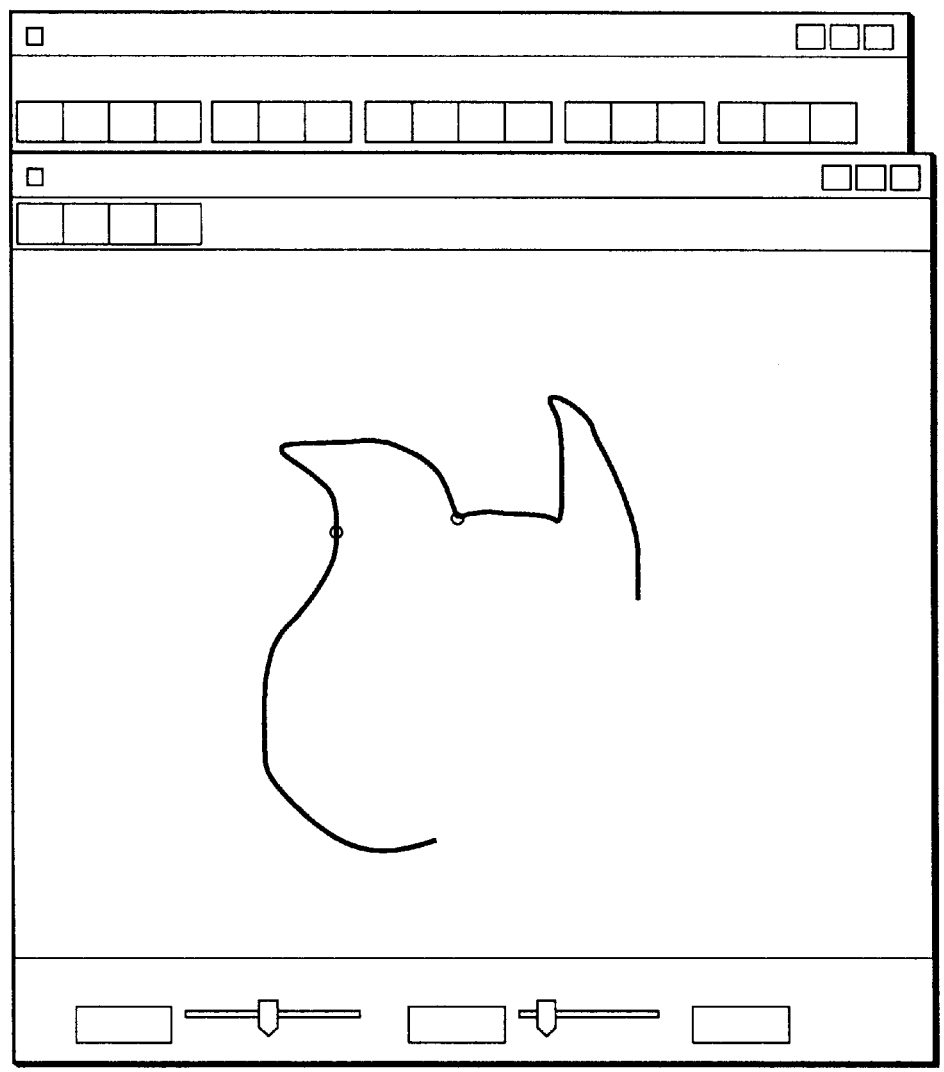
FIG. 6 is a diagram showing an example of a skeleton input from a user through a user interface of an input means.

The user sequentially inputs required skeletons through a user interface of the input means 1 having a structure, for example, as shown in FIG. 6. At this time, each skeleton is given the skeleton number (step S8).

Figure 7A:
FIGS. 7A and 7B are diagrams showing quantization of a unit vector of a skeleton (a stroke)
Figure 7B:
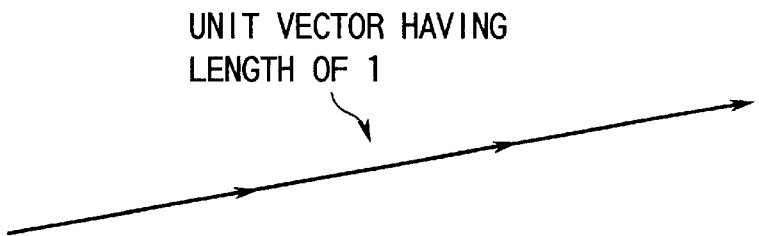

When skeletons in one frame have been input (step S9), the vector quantizing means 4 decomposes (quantizes) each of the supplied skeletons into a unit vector (step S10). An example case in which a skeleton (which is a straight line in this case) drawn by the user as shown in FIG. 7A is quantized into the unit vector is shown in FIG. 7B. The unit vector is a vector having a predetermined length (for example, "1").

The unit vector is stored in the unit-vector storage means 5 (step S11).

FIG. 8 shows an example of stored unit vectors in the unit-vector storage means 5. As shown in FIG. 8, the unit-vector storage means 5 stores the values of a plurality of unit vectors obtained by quantizing the plural skeletons (for example, skeletons having numbers 1 to 6) drawn on the key-frame number "0". Note that a fact that no successive vector exists is indicated as "NULL" in FIG. 8.

When skeletons are input into frames having the key-frame number from "0" (step S6), that is, when skeletons for changing the skeletons on the key-frame number "0" are drawn, skeleton number k is initialized, and the key-frame number i is updated in such a manner that, for example, i=1 (step S13). A key-frame which is one key-frame before (for example, the key-frame having key-frame number "0") is displayed on a predetermined display unit. At this time, it is preferable that the color of the skeleton drawn on key-frame before is changed in accordance with the skeleton number or the skeleton is caused to blink as shown in FIG. 9 in order to facilitate the user to easily drawn a next skeleton.

Figure 9:
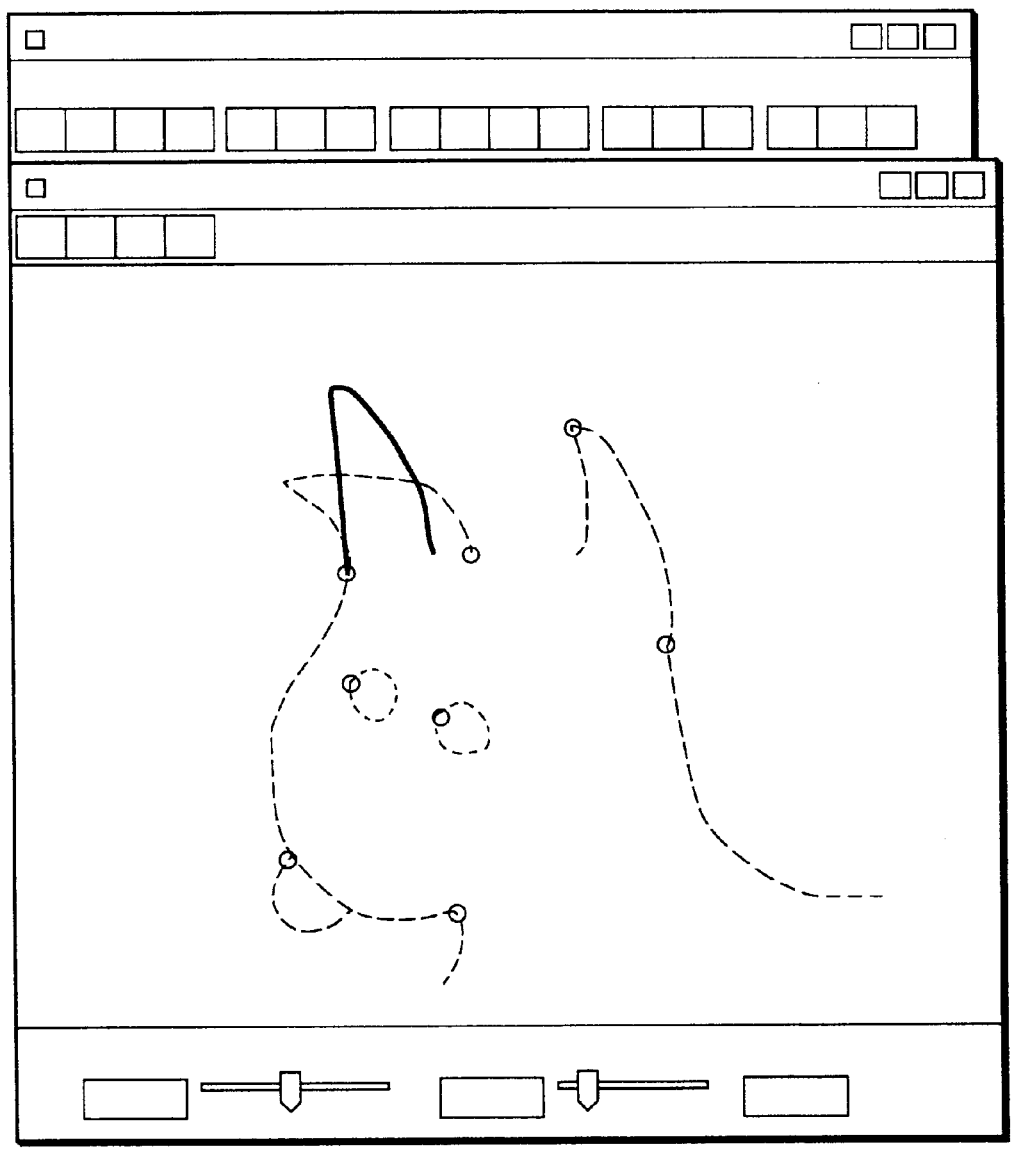
FIG. 9 is a diagram showing an example of display performed when a skeleton is input in addition to a skeleton input through the user interface of the input means.

FIG. 9 shows a case in which the head of a dog is drawn in a key-frame having the key-frame number "0". When the user inputs a k-th skeleton to deform, for example, the left ear of the dog (step S15), the value of k is updated (step S16). The vector quantizing means 4 divides the supplied skeleton (a k−1 th skeleton) into unit vectors which are then stored in the unit-vector storage means 5 (step S17).

Figure 10A:
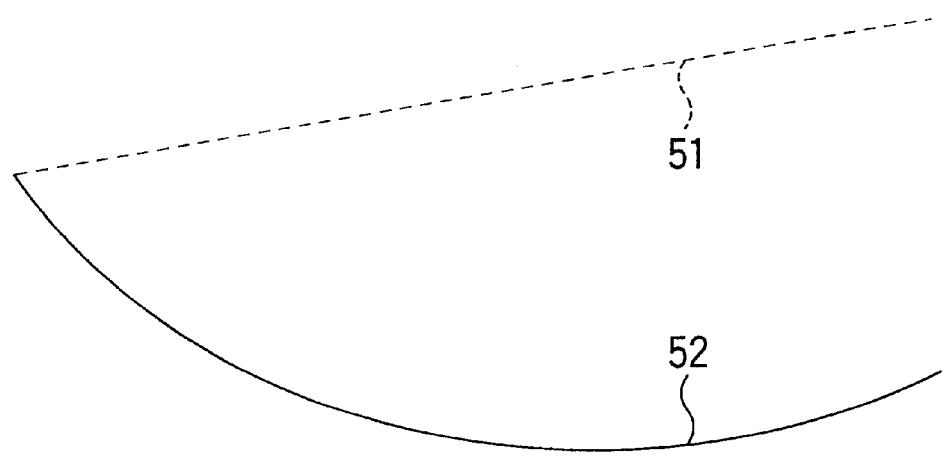
FIGS. 10A and 10B are diagrams showing quantization of a skeleton on a key-frame.
Figure 10B:
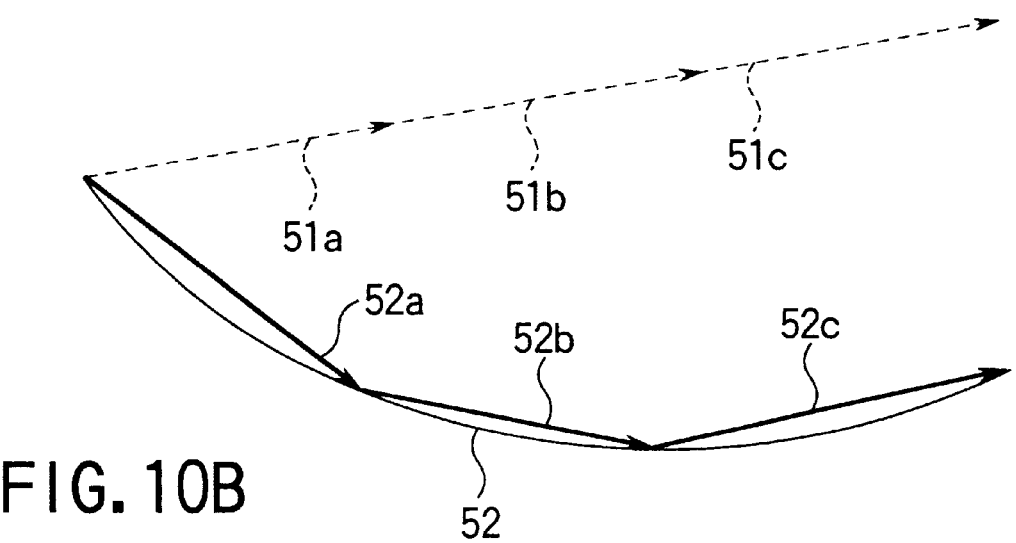

An assumption as shown in FIG. 10A is made that a skeleton 52 exists which is drawn by a user in such a manner that the skeleton, in a next key-frame, corresponds to a skeleton 51 drawn on a key-frame having a key-frame number i=0. As shown in FIG. 10B, the skeleton 51 is quantized into unit vectors 51a, 51b and 51c, while the skeleton 52 is quantized into unit vectors 52a, 52b and 52c. Changed data is, in the key-frame having the key-frame number "1", added to the skeleton 51 (for example, the skeleton number is made to be "1") on the frame having the key-frame number i=0. Therefore, the address (for example, p1) in the unit-vector storage means 5, to which movement is, as shown in FIG. 8, made to be stored in the "NULL" position having the key-frame number i=0, as shown in FIG. 11. Data in the key-frame number i=1 of the skeleton number k=1, that is, the value of the unit vector of the skeleton 51 shown in FIG. 10A is stored.

In accordance with the number f of interpolations communicated in step S23 shown in FIG. 5A, the interpolating means 6 generates an interpolating vector between key-frames having the key-frame numbers "0" and "1", the generated interpolating vector being then stored (step S18).

Figure 12:
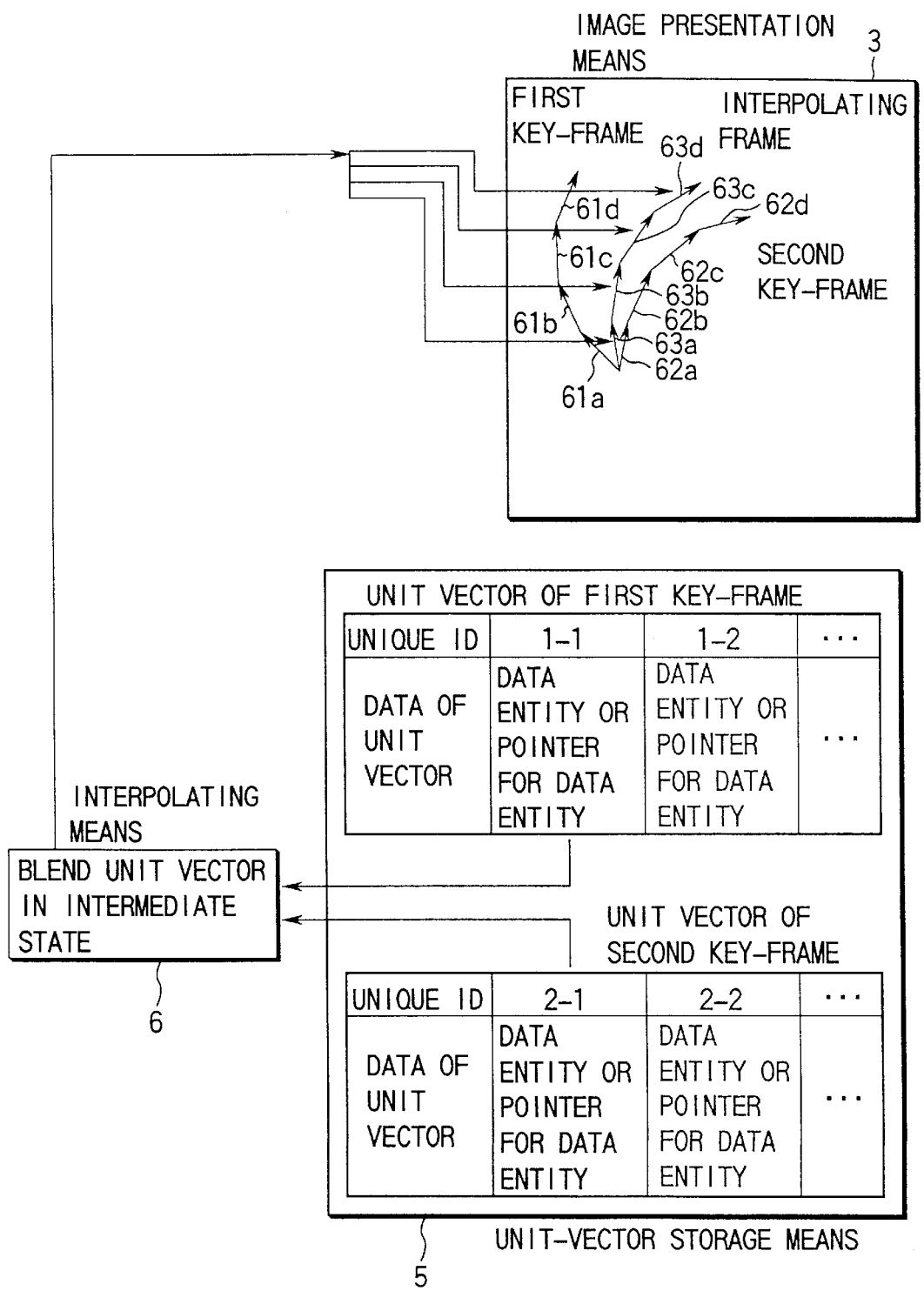
FIG. 12 is a diagram schematically showing the manipulation of each means shown in FIG. 4 which is performed when an interpolating frame is generated from two different key-frames.

FIG. 12 schematically shows the manipulation of each means shown in FIG. 4 which is performed when an interpolating frame is generated from two different key-frames. Note that a case is illustrated in which the number of interpolations is f=1, that is, one interpolating frame is generated between two key-frames.

As shown in FIG. 12, in accordance with data of unit vectors 61a to 61d obtained by quantizing skeletons on the key-frame (the first key-frame) having the key-frame number i=0 stored in the unit-vector storage means 5 and data (each of which is given a unique identifier (ID) and stored) of unit vectors 62a to 62d obtained by quantizing skeletons on the key-frames (the second key-frame) having the key-frame number i=1 corresponding to the skeletons on the first key-frame, the interpolating means 6 obtains interpolating vectors 63a to 63d between the two key-frames. The image, in which the skeleton composed of the interpolating vectors 63a to 63d is drawn, is the interpolating vector between the first key-frame and the second key-frame.

The principle of the method of generating the interpolating vector will now be described with reference to FIGS. 13A and 13B. In this case, the number of interpolations is f=2, that is, two interpolating vectors are generated.

Figure 13A:
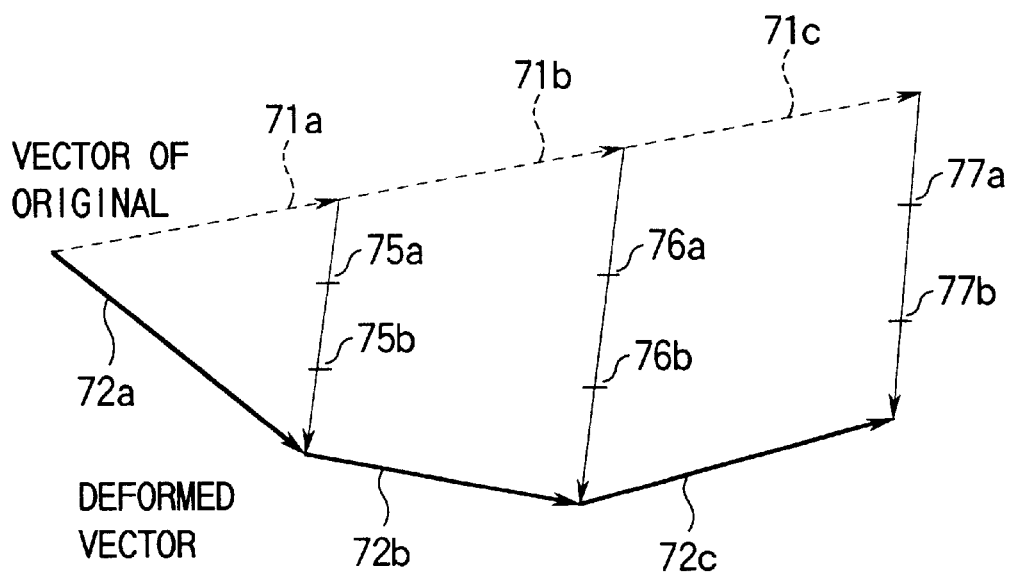
FIGS. 13A and 13B are diagrams showing the principle of a method of generating an interpolating vector.
Figure 13B:
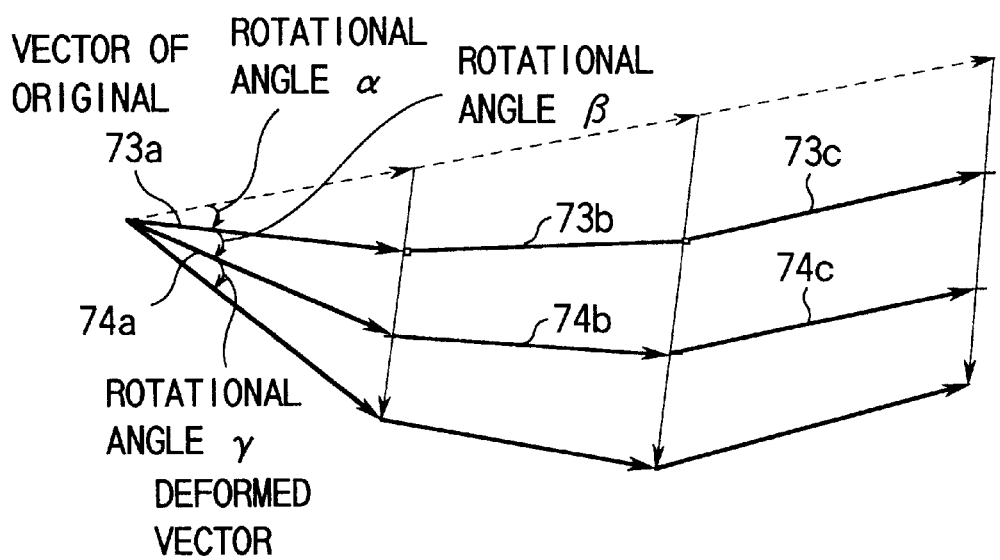

As shown in FIG. 13A, when interpolating vector between unit vectors 71a to 71c obtained by quantizing a skeleton on the first key-frame and unit vectors 72a to 72c on the second key-frame corresponding to the first key-frame is obtained, the corresponding unit vectors are connected to each other. Then, the distance is divided by (f+1) to correspond to the number f (f=2 in this case) of interpolating frames so that interpolating points 75a, 76b, 76a, 76b, 77a and 77b are obtained. Then, the interpolating points are connected to one another so that interpolating vectors 73a to 73c and 74a to 74c are generated, as shown in FIG. 13B.

Referring back to FIG. 5B, the processes in steps S14 to S28 are repeated until the user completes input of new skeletons which indicate the movement to the desired skeleton drawn on the key-frame having the key-frame number i=0 (step S20).

A specific example of animation realized by generating the above-mentioned interpolating vector is shown in FIGS. 14 to 17.

Figure 14:
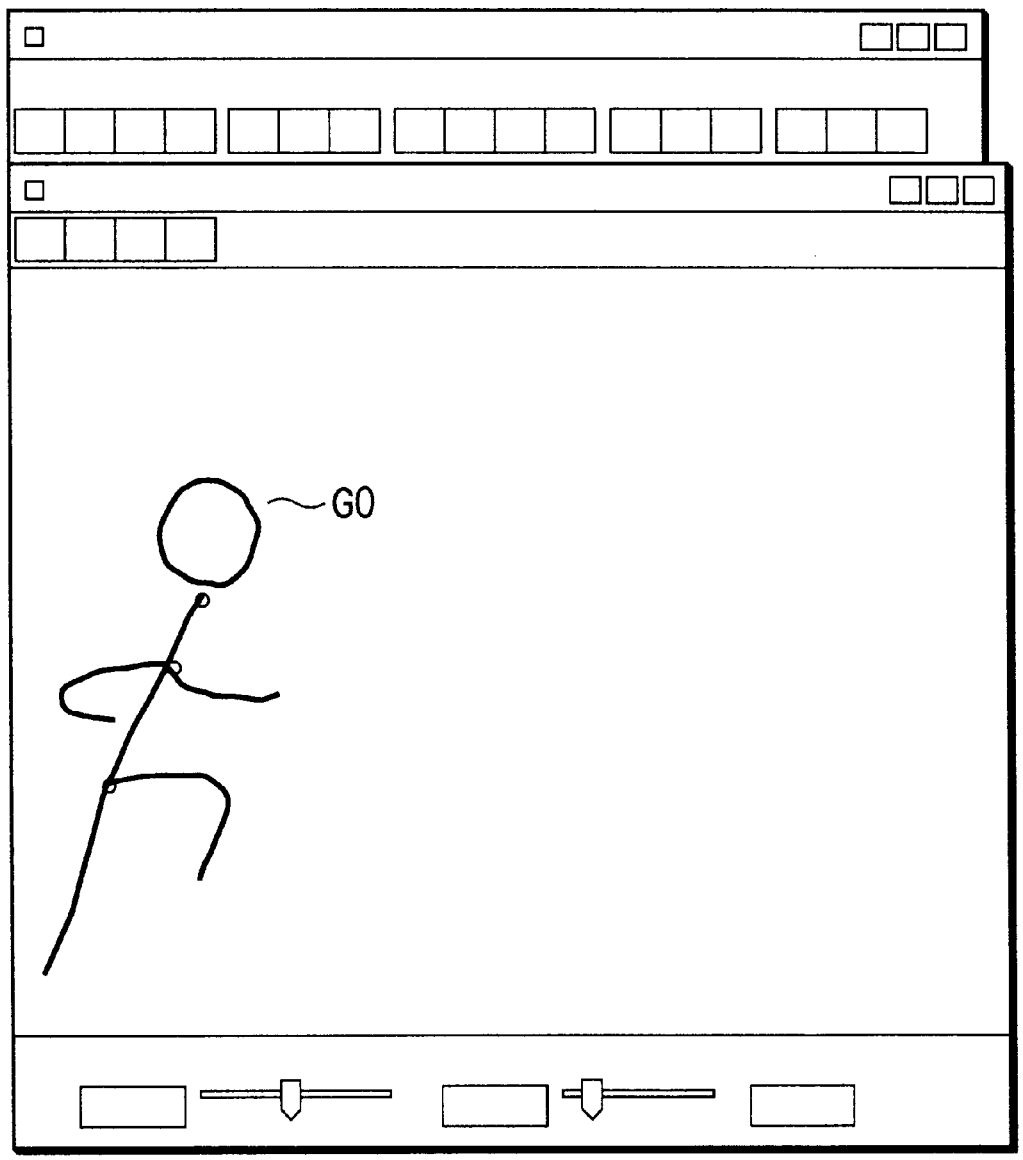
FIG. 14 is a diagram of a specific example of an animation produced by generating an interpolating vector.

FIG. 14 shows a line drawing composed of a plurality of skeletons drawn on a key-frame having key-frame number i=0.

Figure 15:
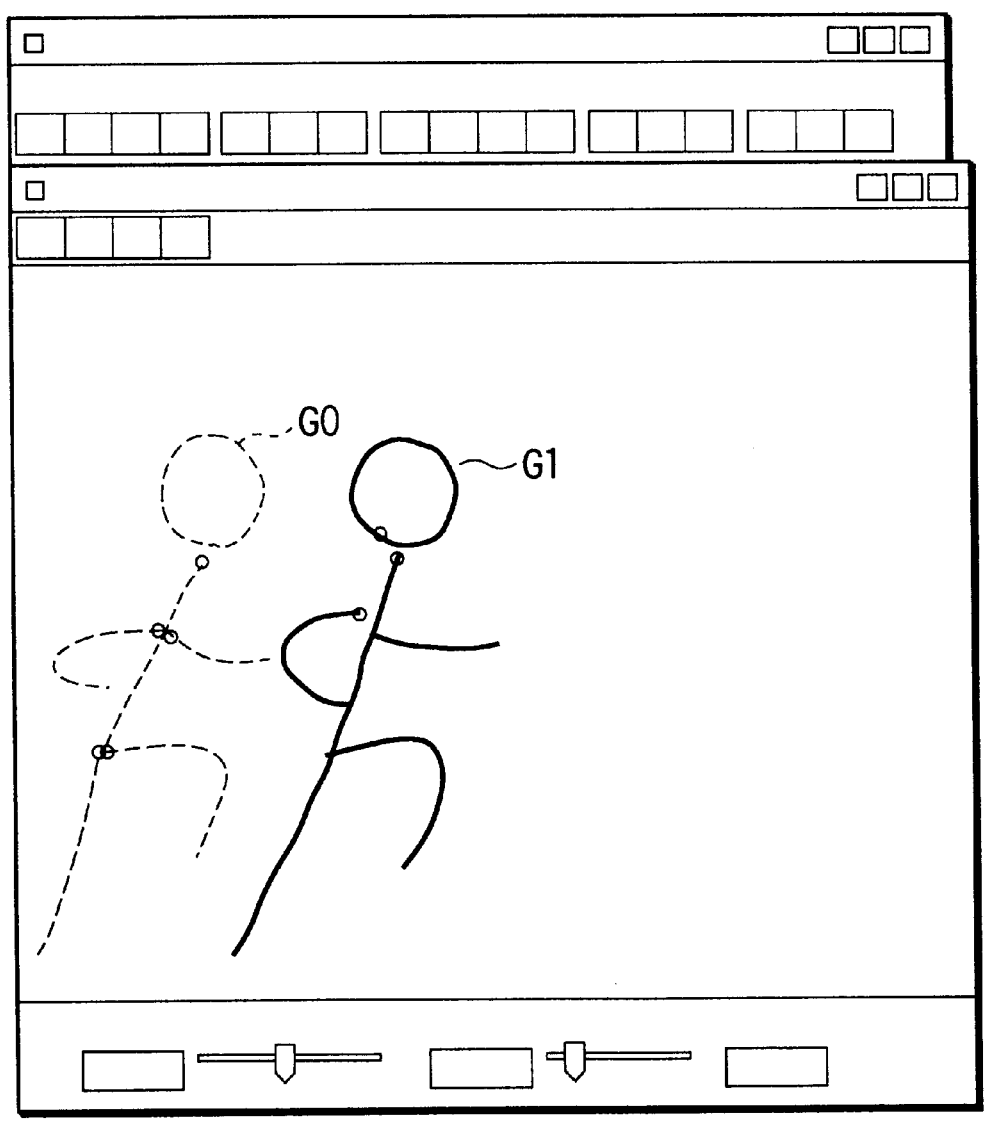
FIG. 15 is a diagram showing specific example of an animation produced by generating an interpolating vector.

The user draws skeleton G1 in the key-frame having the key-frame number "1", as shown in FIG. 15. At this time, skeleton G0 which is one key-frame before is displayed in such a manner that, for example, color of the key-frame is changed so as to be identified.

Figure 16:
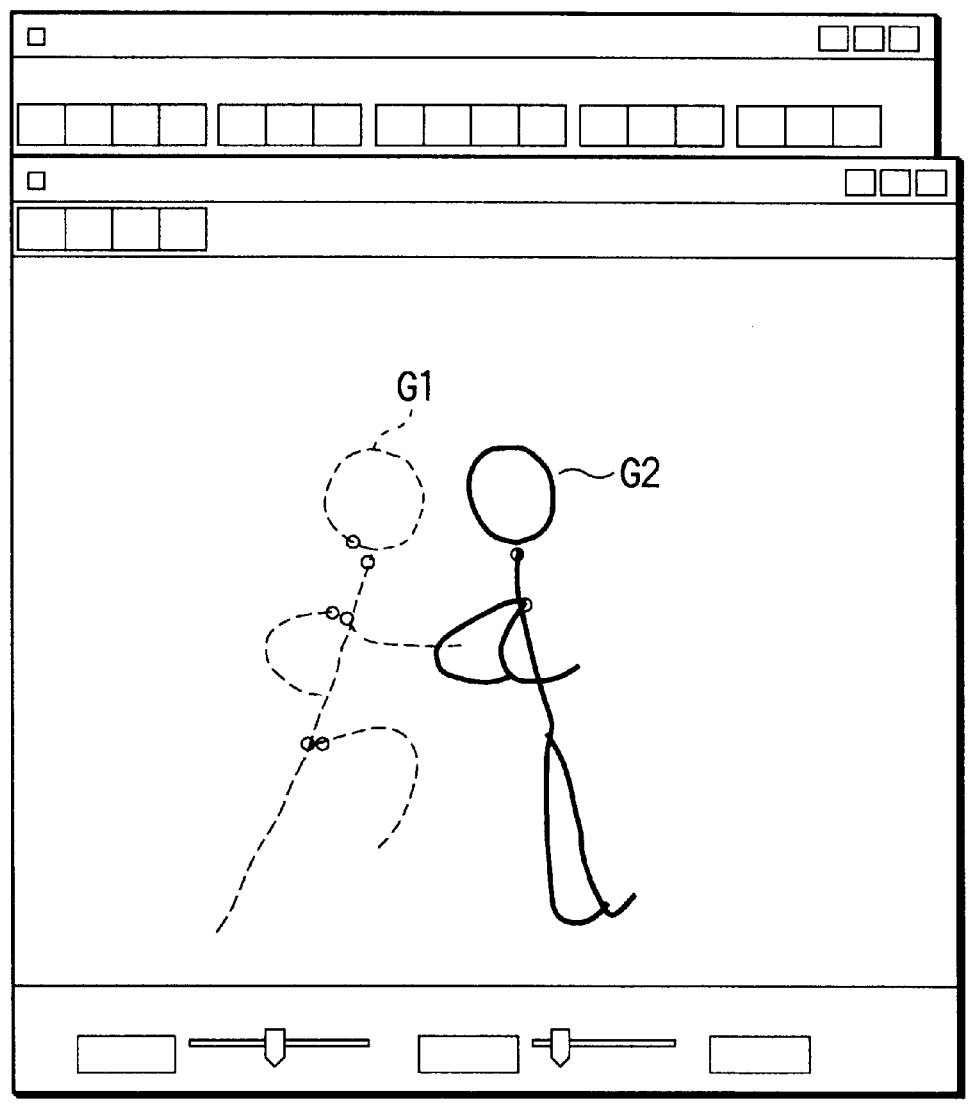
FIG. 16 is a diagram showing specific example of an animation produced by generating an interpolating vector.

Then, skeleton G2 is drawn in the key-frame having the key-frame number "2", as shown in FIG. 16. At this time, skeleton G1 which is one key-frame before is displayed in such a manner that, for example, color of the key-frame is changed so as to be identified.

Figure 17:
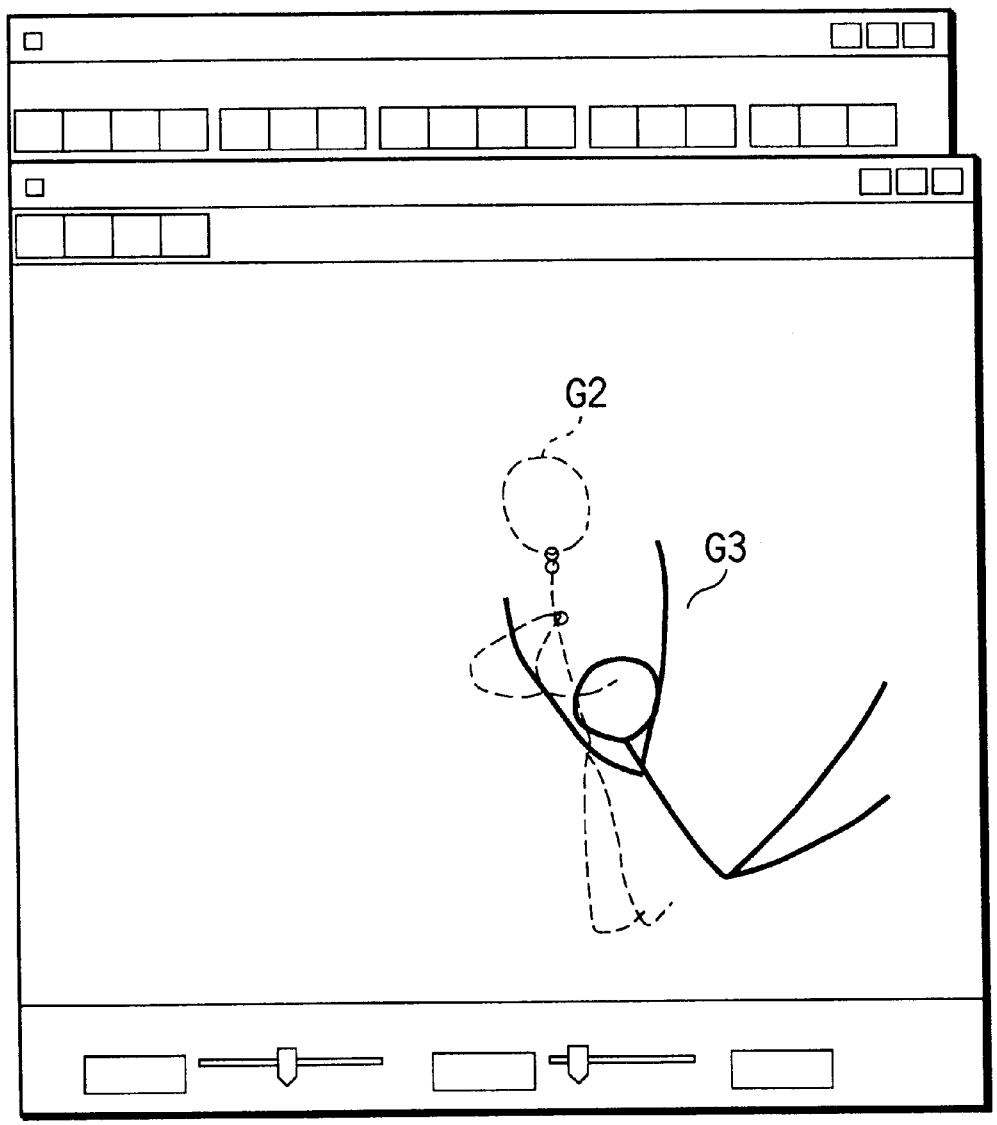
FIG. 17 is a diagram showing specific example of an animation produced by generating an interpolating vector.

Then, skeleton G3 is drawn in the key-frame having the key-frame number "3", as shown in FIG. 17. At this time, skeleton G2 which is one key-frame before is displayed in such a manner that, for example, color of the key-frame is changed so as to be identified.

Then, the skeletons G0 to G3 drawn on the key-frames as shown in FIGS. 14 to 17 are quantized into unit vectors as described above. Then, interpolating vectors are generated in accordance with the number f of interpolations previously instructed by the user so that interpolating frames are generated. As a result, sequential animation is generated.

An example of application of animation created by generating interpolating vectors will now be described.

Figure 18:
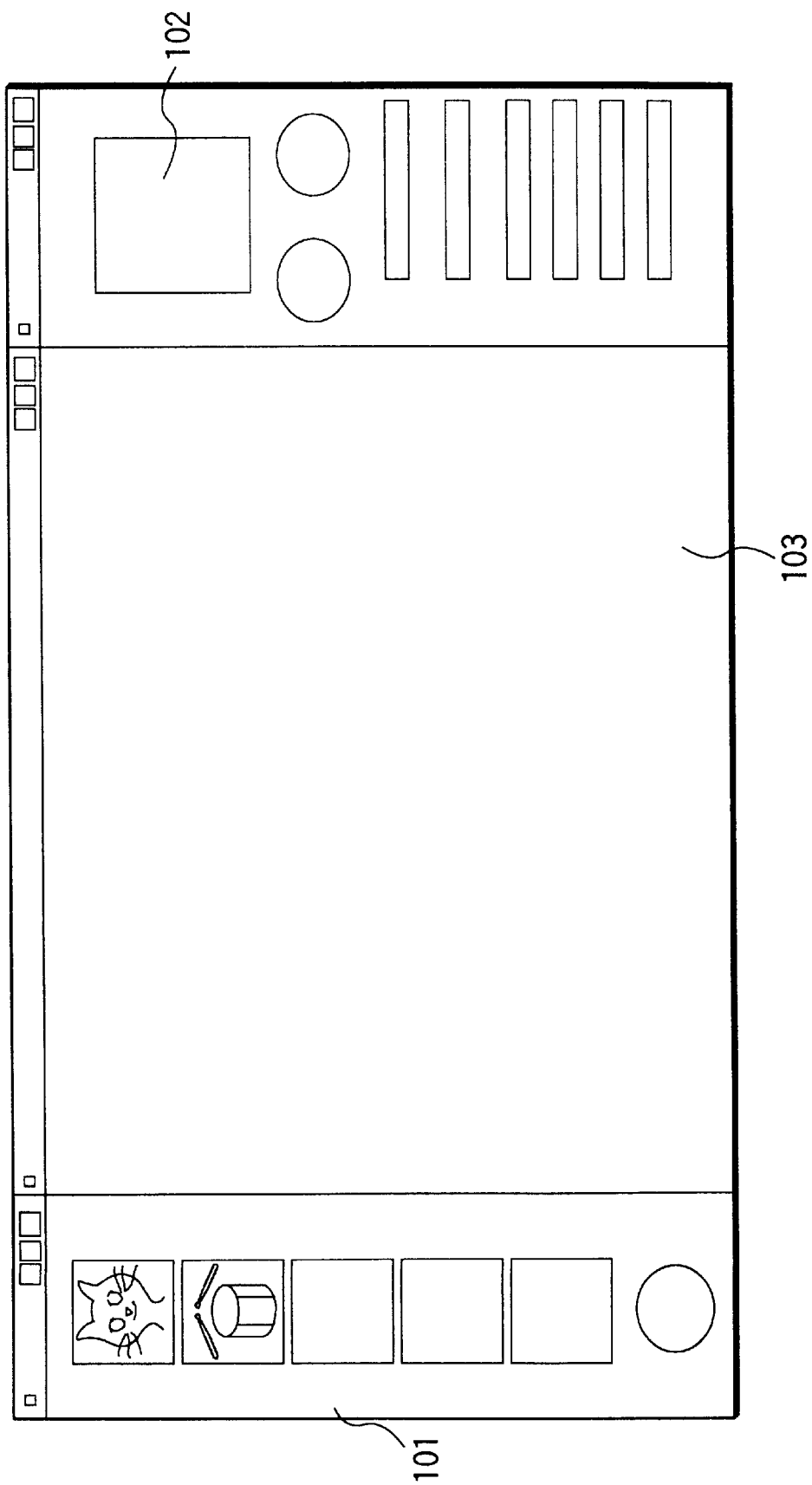
FIG. 18 is a diagram showing an example of application of an animation produced by generating an interpolating vector.

A user interface as shown in FIG. 18 is displayed on the display unit. A window 101 for displaying a plurality of animation items generated by means of the above-mentioned interpolating vectors are displayed so as to be selected by a user is displayed in the left-hand portion of the user interface.

An assumption is made that the user has selected animation of a cat at the uppermost position in the window 101. At this time, a method as disclosed in, for example, Japanese Patent Application No. H8-275949 may be employed with which the gesture of the hand of the user is recognized by a recognizing portion 102 so as to determine that animation of the cat has been selected.

Figure 19:
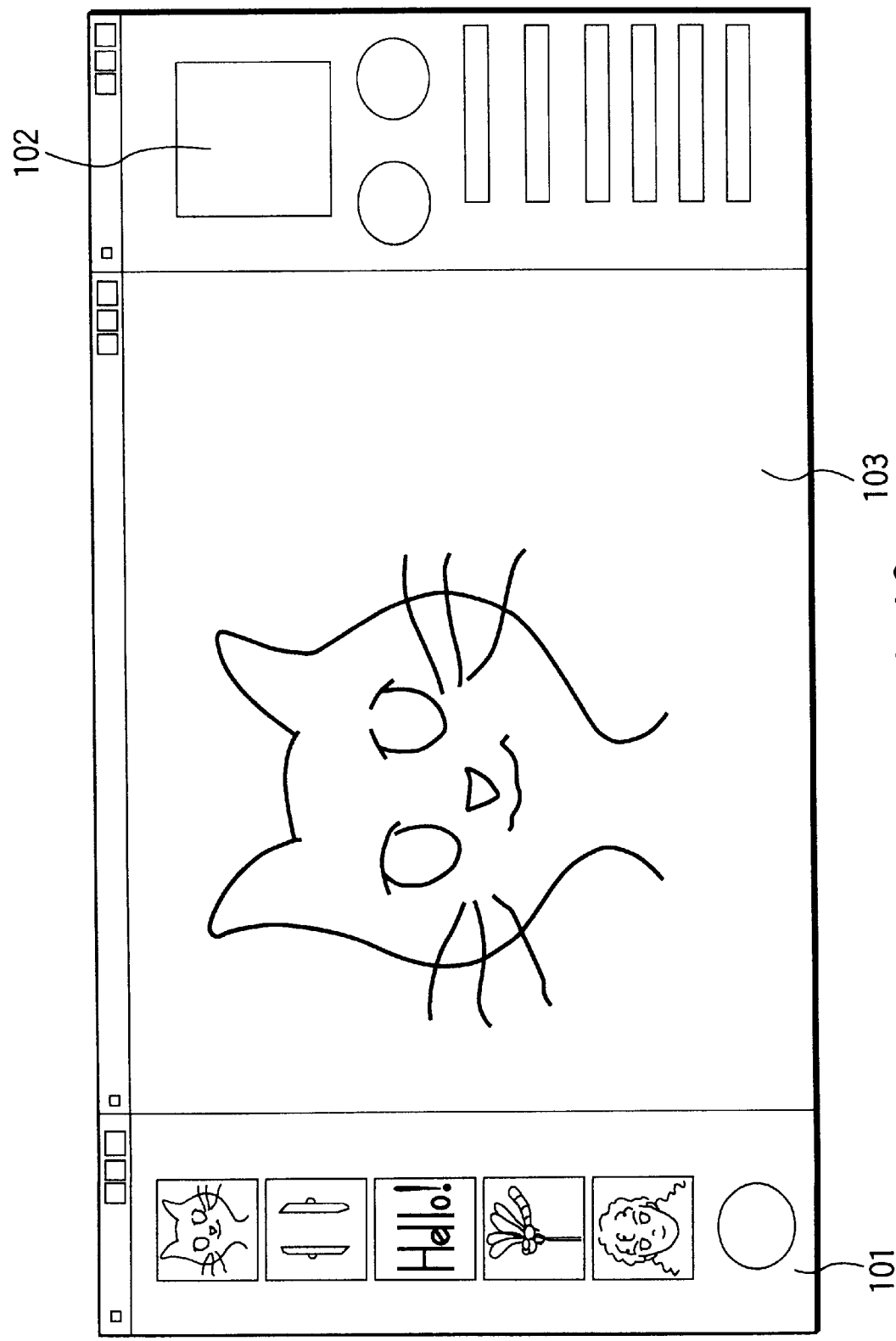
FIG. 19 is a diagram showing an example of application of an animation reduced by generating an interpolating vector.
Figure 20:
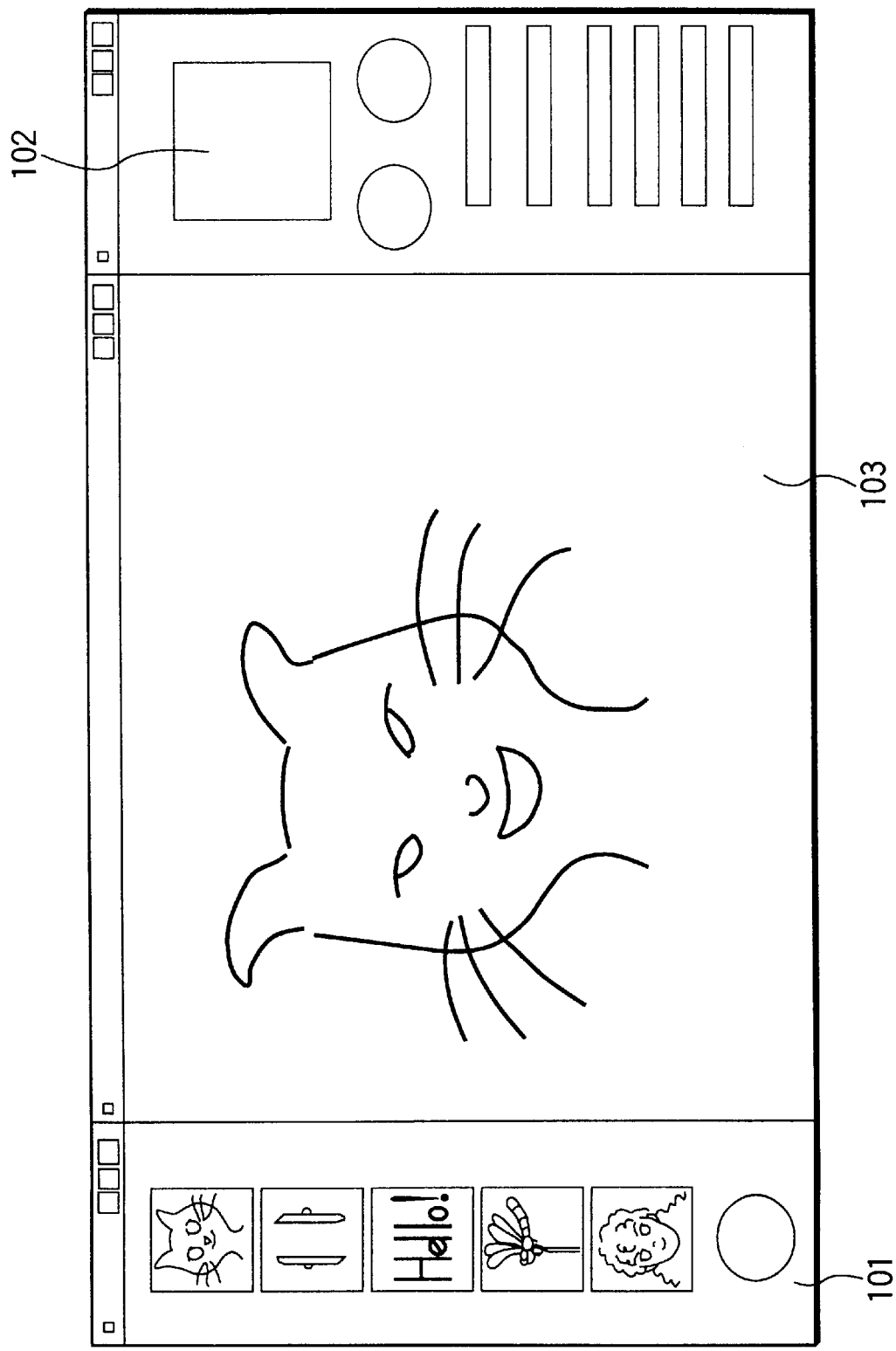
FIG. 20 is a diagram showing an example of application of an animation produced by generating an interpolating vector.

As a result, a first key-frame of animation of the cat is displayed on the window 103, as shown in FIG. 19. If the user performs a gesture in such a manner that the user passes the user's hand over the head of the cat, the recognizing portion 102 recognizes the gesture. Thus, reproduction of animation corresponding to the gesture is started. That is, animation that cat fawns on the user while mewing is reproduced. Also the movement of the cat and the sound speed are processed in such a manner that the reproducing time interval t is appropriately selected to correspond to the moving speed of the hand so that key-frames and interpolating frames are displayed. When the user performs a gesture that the user pats the head of the cat, the recognizing portion 102 recognizes the foregoing gesture so that reproduction of animation corresponding to the gesture is started.

Figure 21:
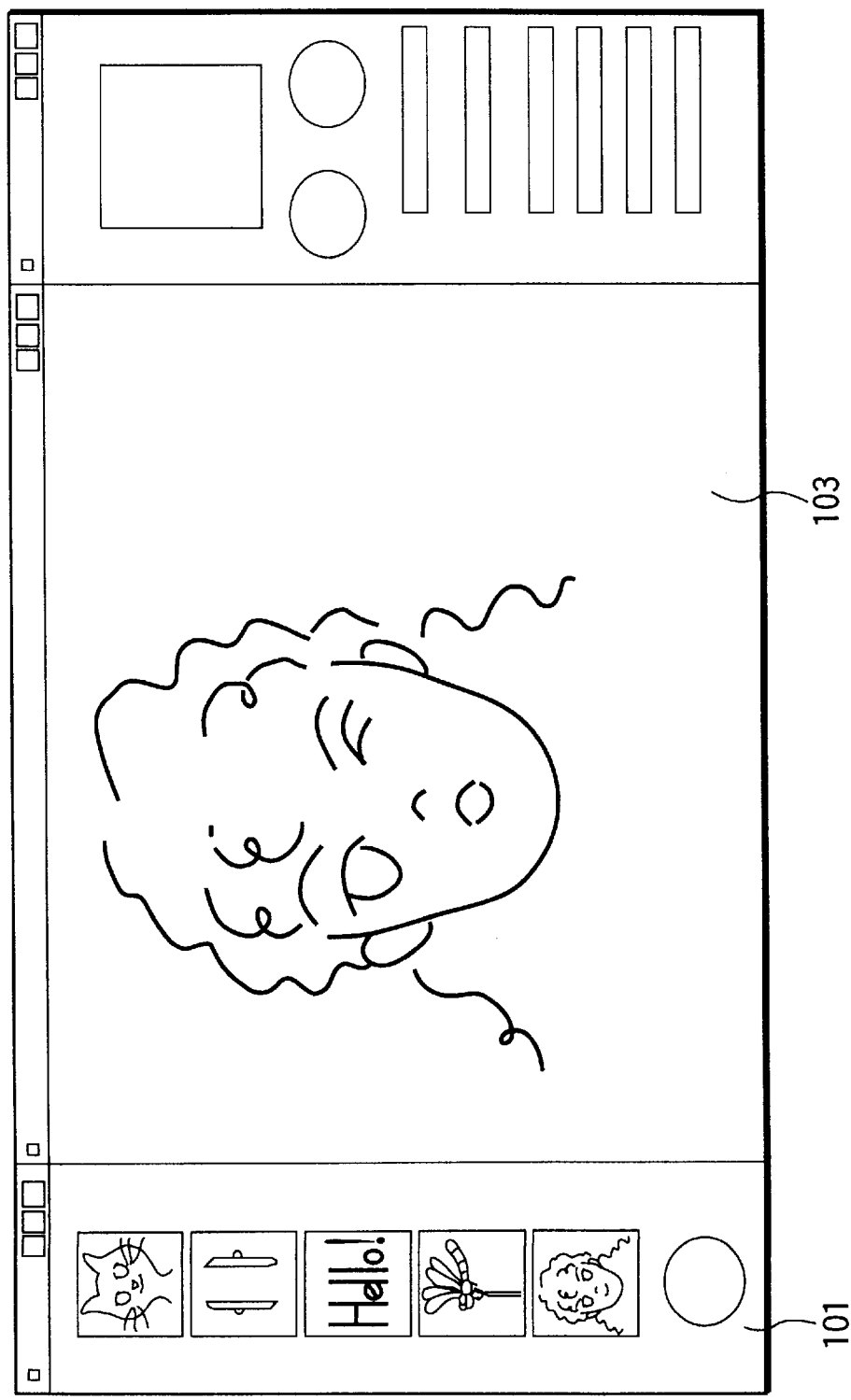
FIG. 21 is a diagram showing another example of an animation produced by generating an interpolating vector.
Figure 22:
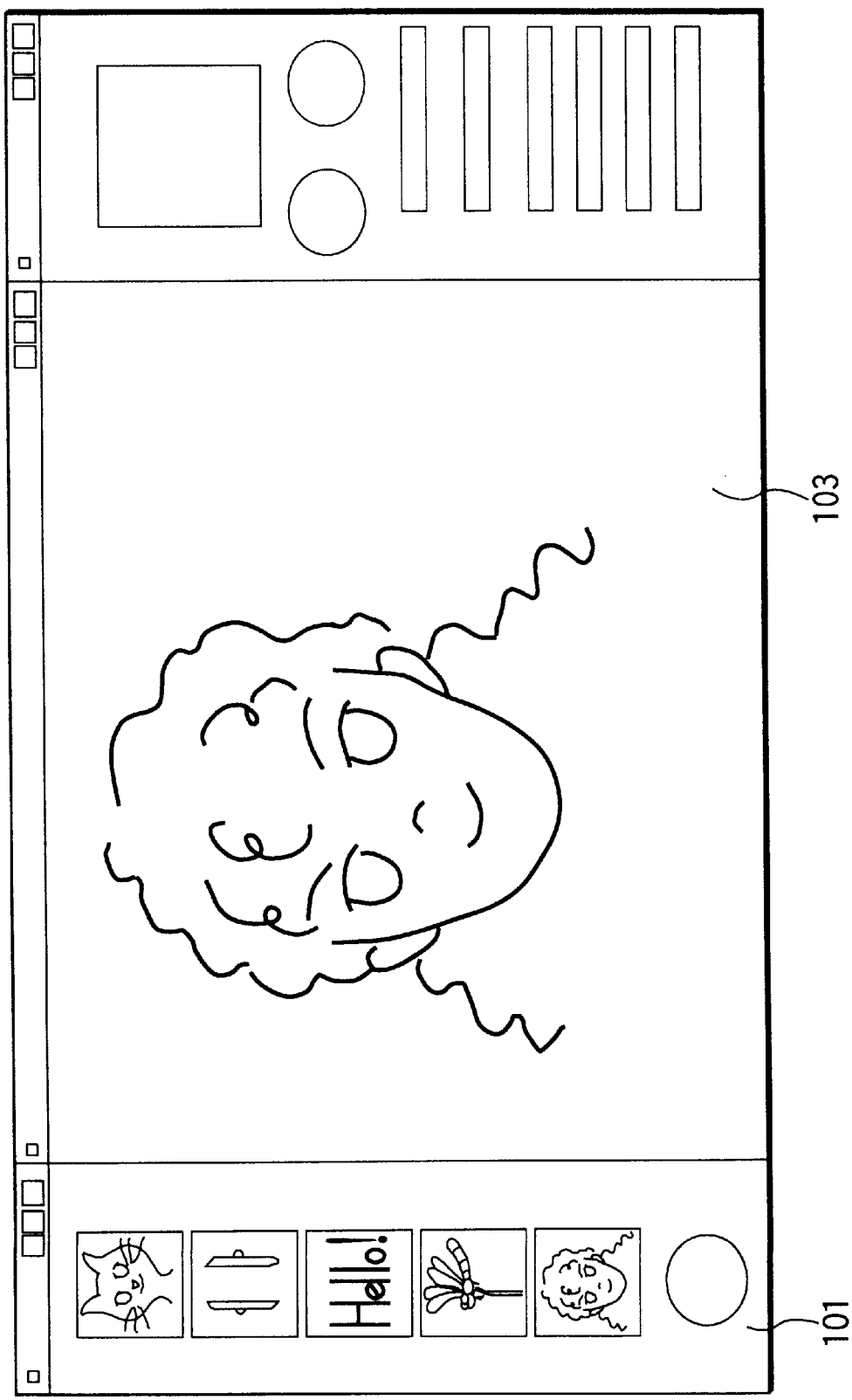
FIG. 22 is a diagram showing another example of an animation produced by generating an interpolating vector.

FIGS. 21 and 22 show another example of animation created by generating interpolating vectors.

As described above, the first embodiment is arranged in such a manner that when a plurality of line drawings indicating the changed shapes of the strokes have been input by a user, each of corresponding strokes between the plurality of the input line drawings is quantized into unit vectors each having a predetermined length. Moreover, interpolating vectors are obtained in accordance with the amount of change between the unit vectors between the plurality of the line drawings and the number of interpolating frames which have previously been instructed. Thus, interpolating frames between the plurality of the line drawings are generated. Thus, animation which moves sequentially as required by the user can easily be generated with a simple structure.

Second Embodiment

A process for producing animation in accordance with an original image having a general region will now be described.

Figure 23:
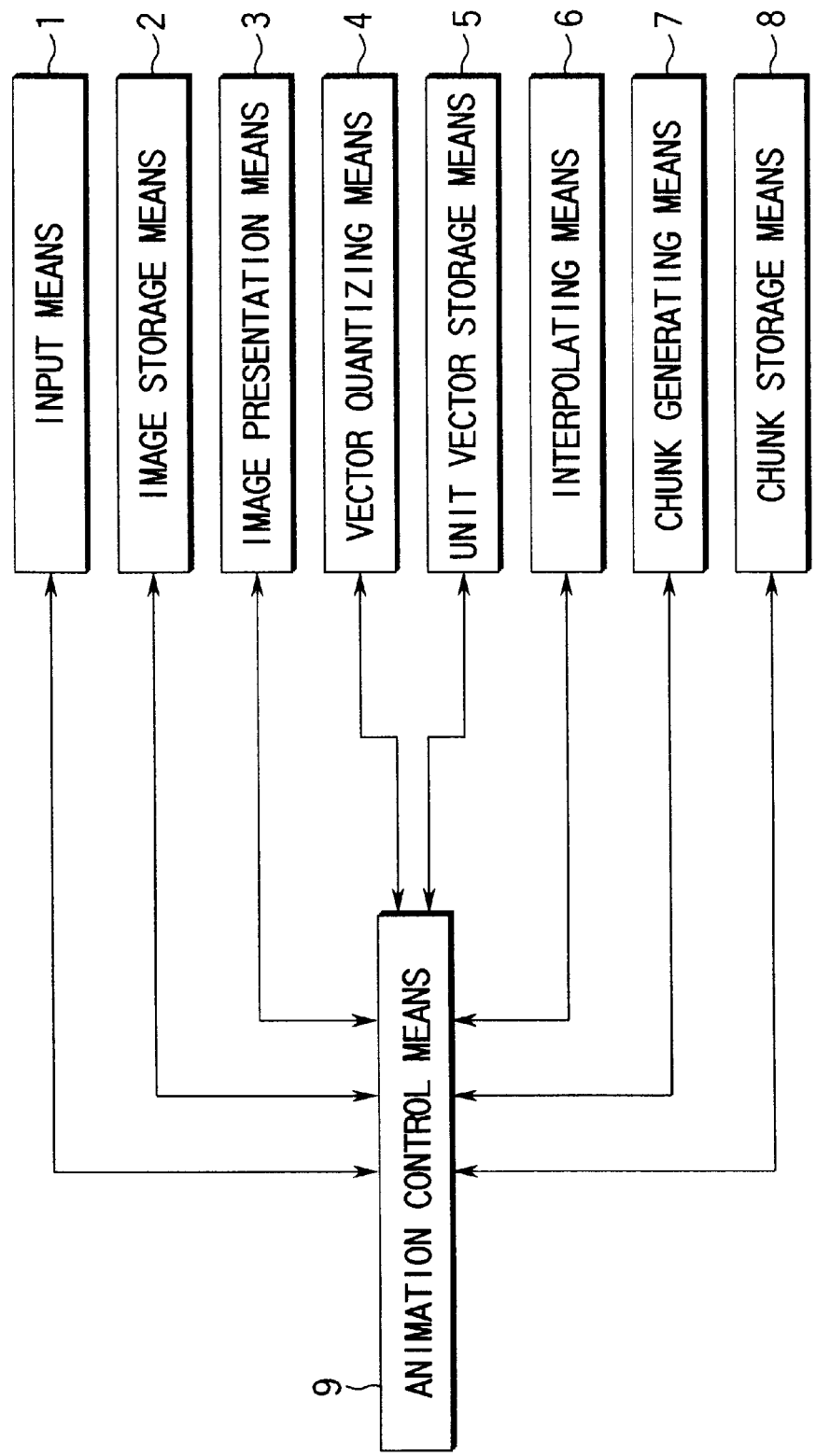
FIG. 23 is a diagram schematically showing an example of an animation producing apparatus according to a second embodiment of the present invention.

FIG. 23 is a diagram schematically showing an example of the structure of an animation producing apparatus according to a second embodiment of the present invention. As shown in FIG. 23, the animation producing apparatus comprises an image storage means 2 for storing image data serving as an original image (in a case where the original image is in the form of a sprite structure, a plurality of sprite image data is stored as a set); an image presentation means 3 for displaying, on a predetermined display unit, image data stored in the image storage means 2 and animation or the like generated in accordance with image data; an input means 1 for inputting a stroke to a portion of the image displayed by the image presentation means 3 and required to have movement; a vector quantizing means 4 for decomposing the stroke input through the input means 1 into unit vectors each having a predetermined length; a unit-vector storage means 5 for storing the generated unit vectors; an interpolating means 6 for generating an interpolating vector between the two strokes in accordance with the unit vectors of the two corresponding strokes and correcting (for example, decomposing and/or superimposing the unit vector to again-constitute the unit vector in order to make the number of unit vectors in the corresponding stroke between the plural images to be the same) the unit vectors if necessary at the time of generating the interpolating vectors; a chunk generating means 7 for fragmentarily cutting an image region (a chunk) from image data stored in the image storage means 2 in accordance with the length and direction of the generated unit vector; a chunk storage means 8 in which the generated chunk is stored; and an animation control means 9 for generating sequential animation by performing control to synchronize the above-mentioned means.

Hereinafter a skeletal stroke which is input into the original image by a user as a portion required to have movement and its changed shape are sometimes called a "skeleton".

The animation producing apparatus according to the second embodiment has the above-mentioned structure. When the animation producing apparatus is supplied with a skeletal skeleton of the original image and a skeleton indicating its changed shape from a user through the input means 1, the vector quantizing means 4 quantizes the skeltal skeleton and the skeleton indicating its changed shape into unit vectors each having a predetermined length. Then, the interpolating means 6 calculates interpolating vectors in accordance with the amount of change between corresponding unit vectors of the two skeletons and the number of interpolating frames which have been instructed. The chunk generating means 7 extracts an image region (a chunk) along each unit vector of the skeltal skeleton and having a predetermined size from the original image. The animation control means 9 moves each chunk in accordance with the corresponding unit vector and the interpolating vector to add each chunk to the original image. As a result, a plurality of image frames are generated so that animation is generated.

Terms which will be used hereinafter will now be described.

The term "key-frame" means an original image or an original image to which change in the movement has been input by a user through the input means 1.

The term "skeleton" has substantially the same concept as that of the stroke and means a skeltal portion of an image portion input by the user to a portion of the original image required to have change in the movement and a changed shape of the skeltal skeleton.

The term "interpolating frame" means an interpolating frame image between the key-frames, the number of the interpolating frames being previously instructed by the user as the number of interpolations.

The term "reproducing interval" is the interval between the interpolating frames in terms of time.

The manipulation of the animation producing apparatus shown in FIG. 23 will now be described with reference to FIGS. 24A and 24B.

Figure 24A:
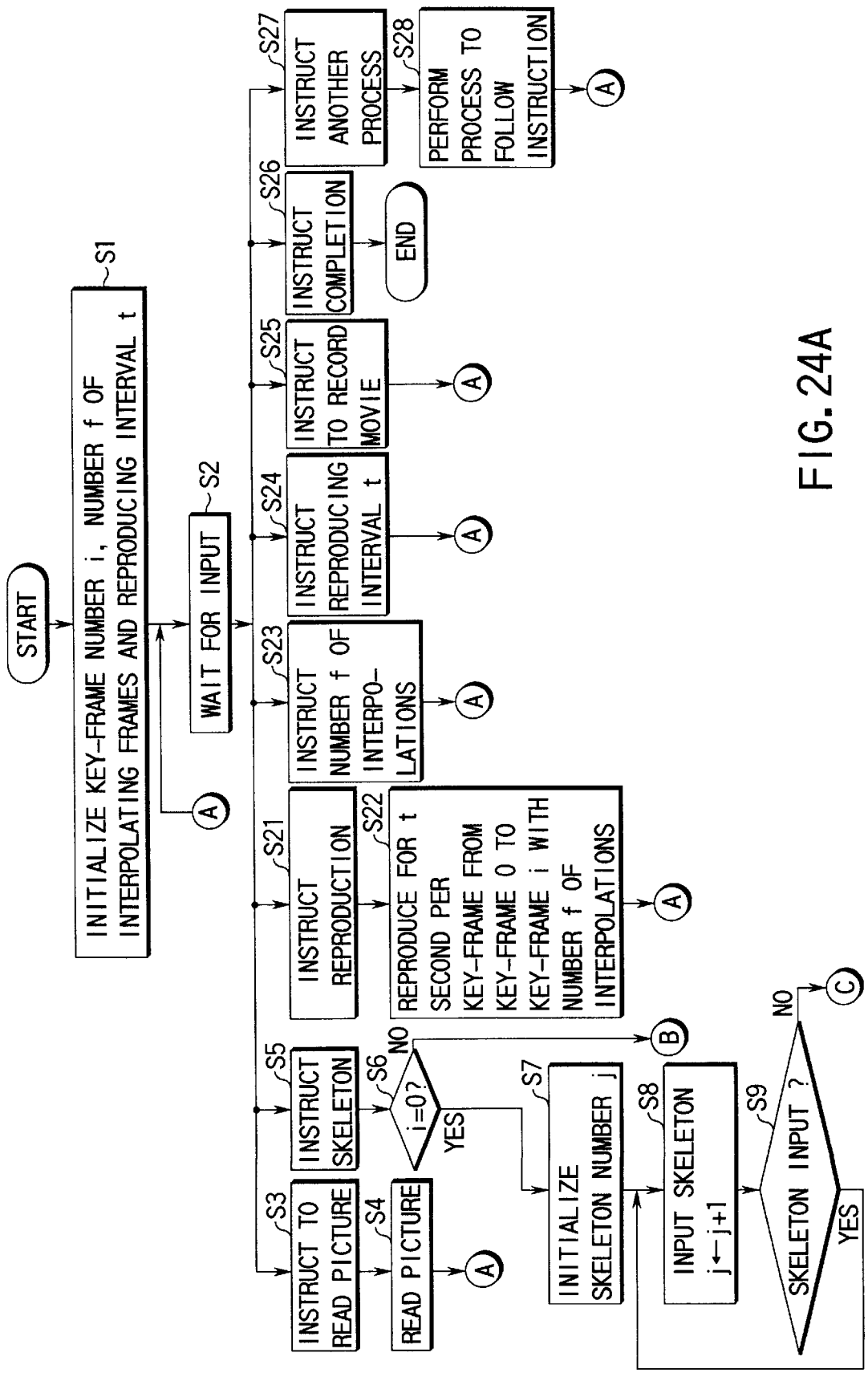
FIGS. 24A and 24B are flow charts showing an manipulation of the animation producing apparatus shown in FIG. 21.
Figure 24B:
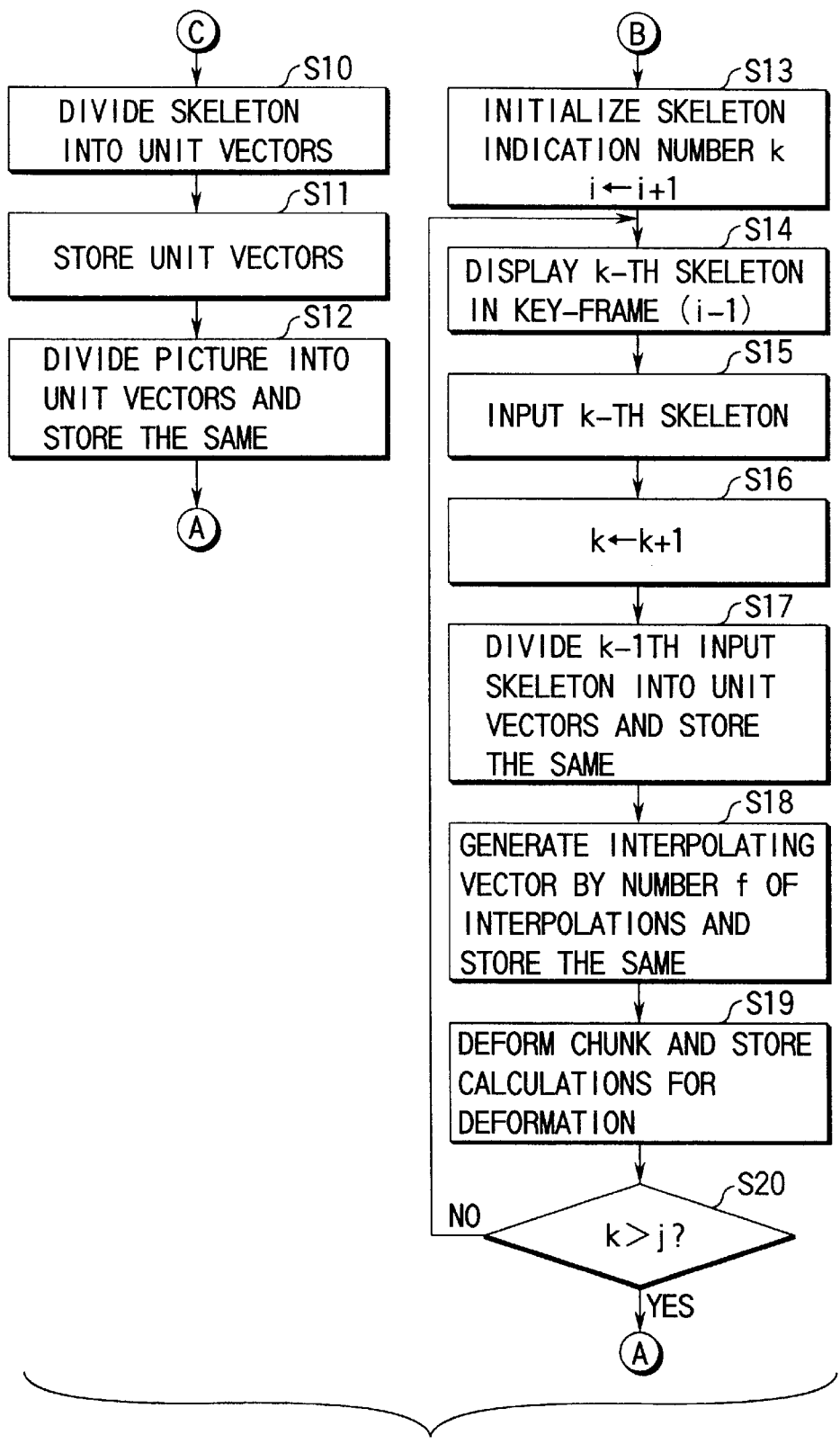

FIGS. 24A and 24B are flow charts of the overall manipulation of the animation producing apparatus shown in FIG. 23. The same elements as those shown in FIGS. 5A and 5B are given the same reference numerals.

The structure according to this embodiment is different from that shown in FIGS. 5A and 5B is that the use is permitted to instruct reading of an image serving as an original image in a state in which input is waited for in step S2 (step S3). In accordance with the instruction, required image data previously input from a scanner or an external unit and stored in the image storage means 2 is read so as to be displayed on a predetermined display unit through the image presentation means 3 (step S4). If the user instructs to input a skeleton (step S5), the user inputs skeltal skeleton for the portion of the image required to have movement by using the displayed image as the key-frame (steps S8 and S9).

Figure 25:
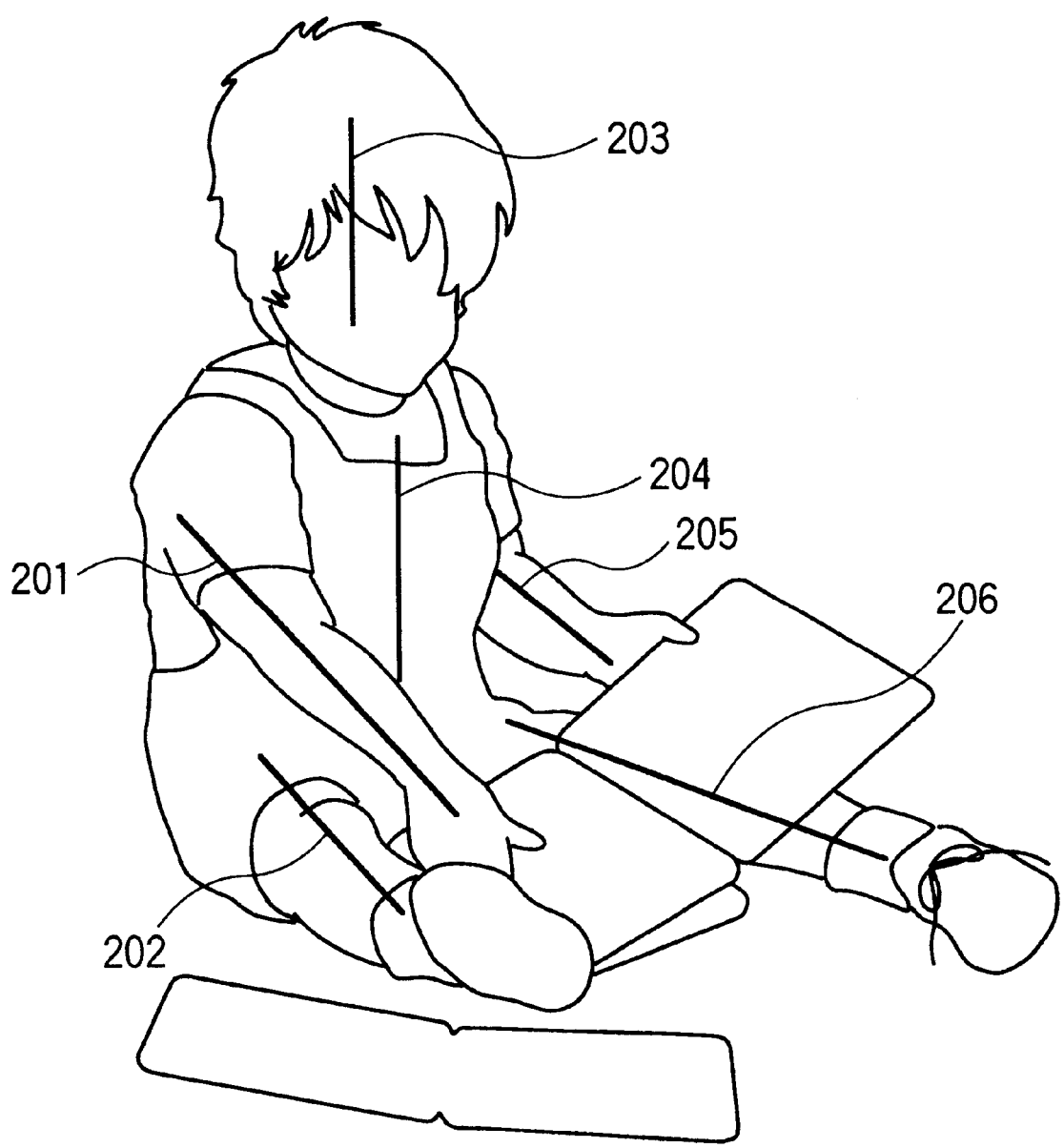
FIG. 25 is a diagram showing an specific example of a skeltal skeleton input to an original image.

Specifically, the skeltal skeleton are skeletons 201 to 206 as shown in FIG. 25.

The skeltal skeleton are quantized into unit vectors so as to be stored in the unit-vector storage means 5. The chunk generating means 7 extracts, from the key-frame, an image region (a chunk) along each Unit vector original the skeltal skeleton and having a predetermined size. The image region (the chunk) is stored in the chunk storage means 8 (steps S10 to S12).

A skeltal skeleton 201 drawn in the image region of the right arm of a children in the original image shown in FIG. 25 is taken as an example to specifically described the quantization of the skeleton and extraction of the chunk.

Figure 26A:
FIGS. 26A, 26B and 26C are diagrams showing quantization of a skeleton and a chunk corresponding to a unit vector.
Figure 26B:
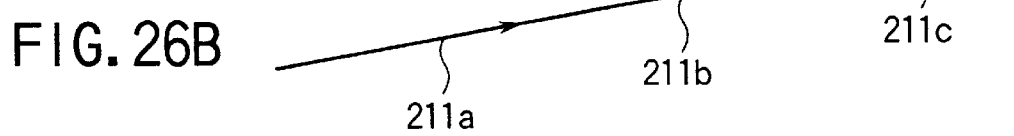

FIG. 26A shows the skeleton 201. FIG. 26B shows case in which the skeleton 201 has been quantized into unit vectors 211a to 211c each having a length of "1" similarly to the first embodiment.

Figure 26C:
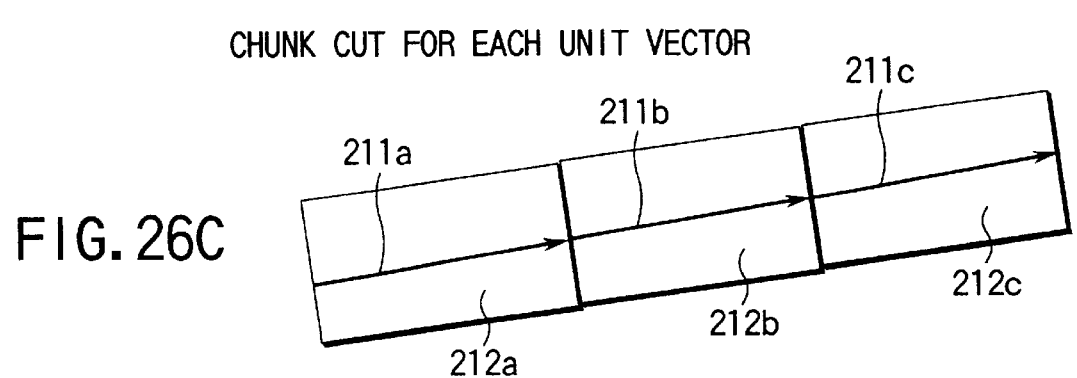

FIG. 26C shows an example of an image region (a chunk) along each of unit vectors 211a to 211c of the skeltal skeleton and having a predetermined size.

Extraction of a chunk from an original image and correspondence made between the extracted chunk and the unit vector will now be described with reference to FIG. 27.

Figure 27:
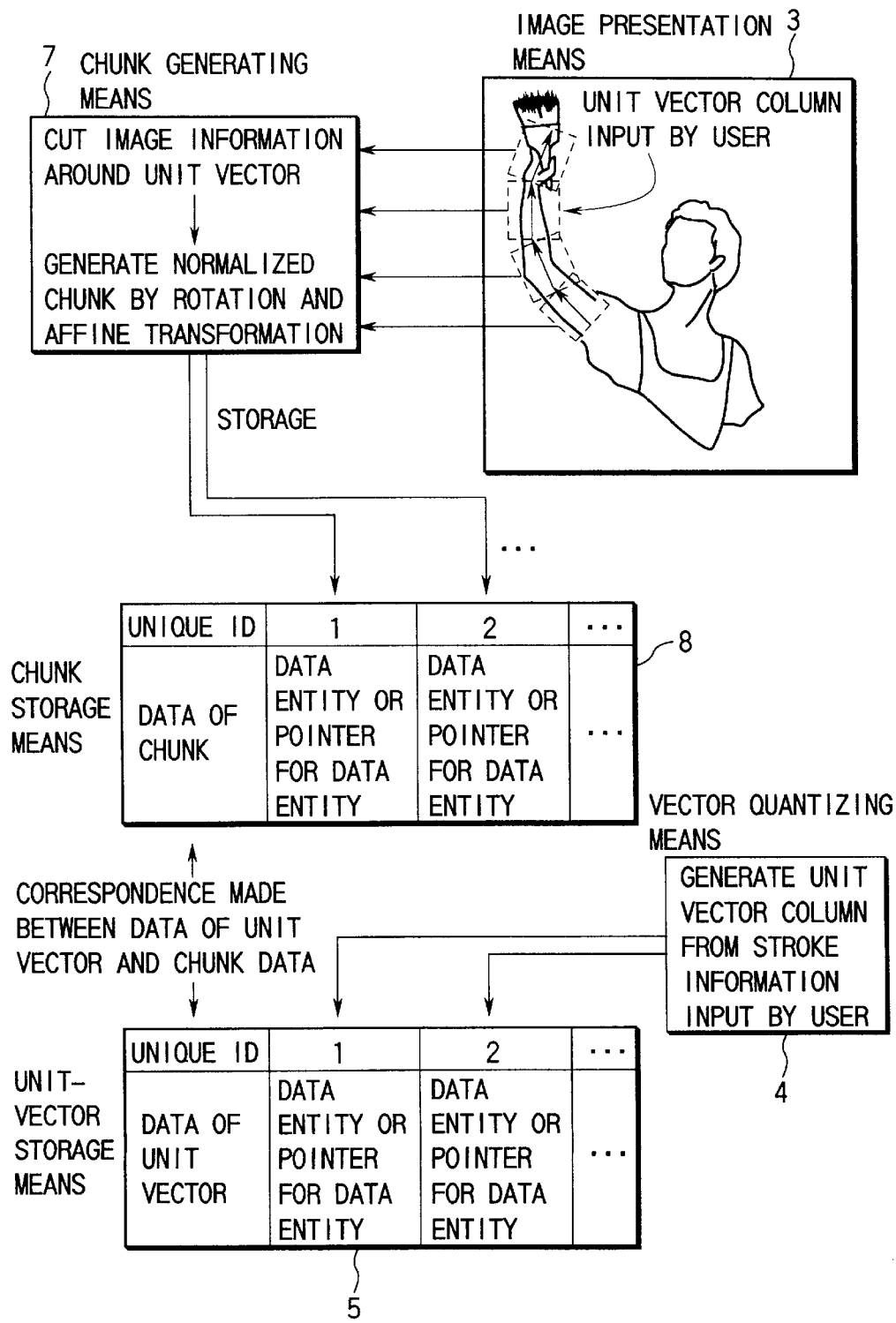
FIG. 27 is a diagram showing extraction of a chunk from an original image and correspondence made between the extracted chunk and a unit vector.

When a user has input a skeltal skeleton to a portion of the original image displayed by the image presentation means 3 and required to have movement as shown in FIG. 27, the vector quantizing means 4 quantizes the skeleton so that a unit vector column is generated. Data of the unit vector is as it is stored or a pointer for a storage region for data of each unit vector is stored.

The chunk generating means 7 cuts, from the original image, an image region adjacent to each unit vector of the skeltal skeleton, and then performs rotation (affine transformation) and normalization so as to generate the chunks. Each of the thus-generated chunk is given a unique ID. Image data of the chunk is as it is stored in the chunk storage means 8 or a pointer for the storage region for image data of the chunk is stored in the same in such a manner that the correspondence to the unique ID is made. Moreover, the unique ID given to each chunk is stored in the unit-vector storage means 5 in such a manner that correspondence to data of the unit vector corresponding to the chunk is made.

Note that the necessity of individually providing the unit-vector storage means 5 and the chunk storage means 8 may be eliminated. For example, a structure may be employed in which data of the unit vector and data of the chunk are stored in such a manner that they are made to correspond to one unique ID.

Each unit vector is, as shown in FIG. 29, stored in such a manner that correspondence to sequential skeleton numbers written by the user and the key-frame number of the original image is made.

After the skeltal skeletons have been input to the original image, the manipulation proceeds from step S6 to step S13 so that skeletons indicating the changed shape of the skeltal skeleton is input. Also the key-frame number of the image to which the skeleton has been input is as well as updated (in this case the key-frame number is "1").

Figure 30:
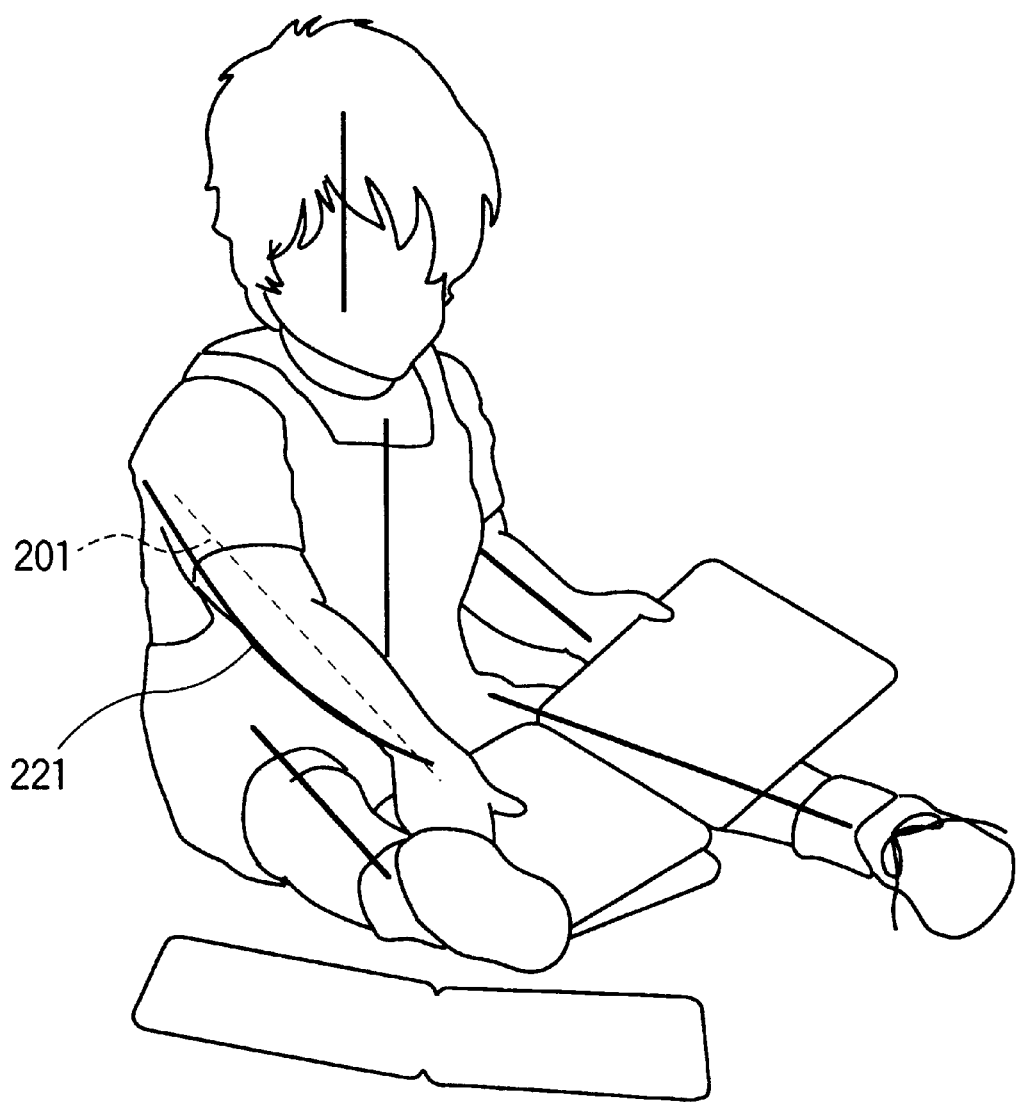
FIG. 30 is a diagram showing a specific example of a skeleton indicating a changed shape of a skeltal skeleton.

When the skeleton indicating the changed shape of the skeltal skeleton is input, a process similar to that according to the first embodiment is performed. That is, as shown in FIG. 30, the displayed first skeleton 201 is allowed to blink or the color of the same is changed to cause input of the skeleton of the changed shape corresponding to the skeleton 201 (the right arm portion of the children) first input (that is, in the sequential order of the skeleton numbers) in the key-frame having the key-frame number "0". When the user correspondingly inputs skeleton 221 indicating the changed shape of the skeleton 201, skeleton number is given to the newly input skeleton, and then the skeleton is quantized into unit vectors (steps S14 to S17).

The quantization of the skeleton and storage of the unit vectors are performed similarly to those according to the first embodiment and shown in FIGS. 10A, 10B and 11.

Then, an interpolating frame for interpolating the portion between the two input key-frames of the skeleton is generated from the two key-frames (steps S18 and S19). The foregoing process will now be described with reference to FIG. 31. In this case, the number of interpolations is f=1, that is, one interpolating frame is generated between the two key-frames.

Figure 31:
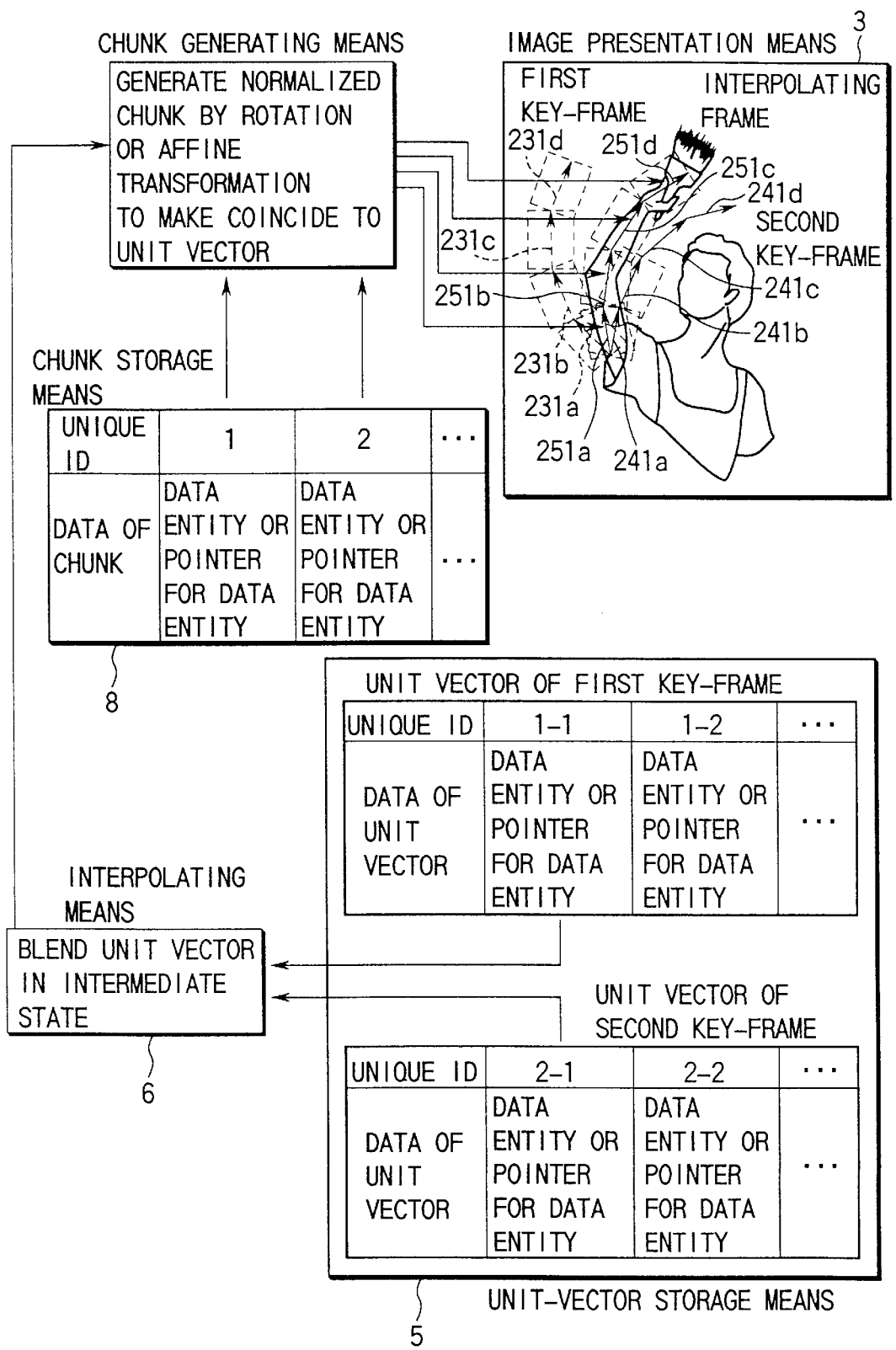
FIG. 31 is a diagram showing a process for generating an interpolating frame for interpolating a portion between two key-frames from the two key-frames to which a skeleton has been input.

As shown in FIG. 31, in accordance with data of unit vectors 231a to 231d obtained by quantizing skeletons on a key-frame (a first key-frame) having the key-frame number "0" stored in the unit-vector storage means 5 and data of unit vectors 241a to 241d obtained by quantizing skeletons on a key-frame (a second key-frame) having key-frame number "1", similarly stored in the unit-vector storage means 5 and corresponding to the skeletons in the first key-frame, the interpolating means 6 obtains interpolating vectors 251a to 251d between the unit vectors. The process for obtaining the interpolating vectors is similar to that described with reference to FIGS. 13A and 13B.

The chunk generating means 7 rotates (affine-transforms) the chunks corresponding to the unit vectors of the skeltal skeleton of the original image stored in the chunk storage means 8 in accordance with the interpolating vectors 251a to 251d corresponding to the unit vectors of the skeltal skeletons. Then, the chunk generating means 7 adds the moved chunks to the original image so that an interpolating frame between the first key-frame and the second key-frame is generated.

Figure 32A:
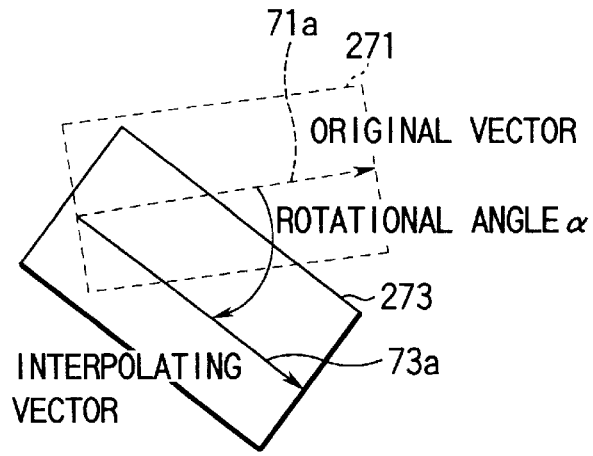
FIGS. 32A to 32C are directions showing movement of a chunk corresponding to a unit vector.
Figure 32B:
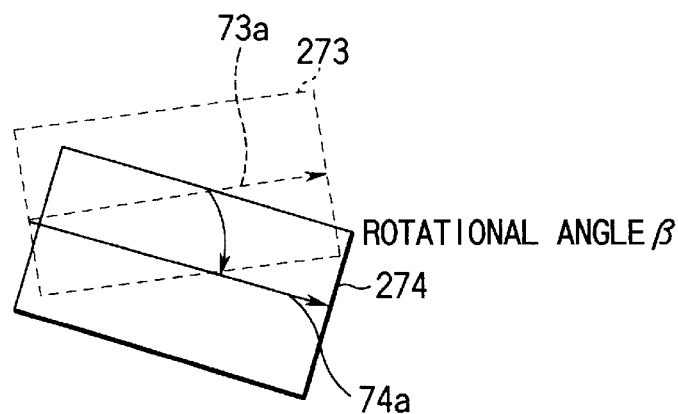
Figure 32C:
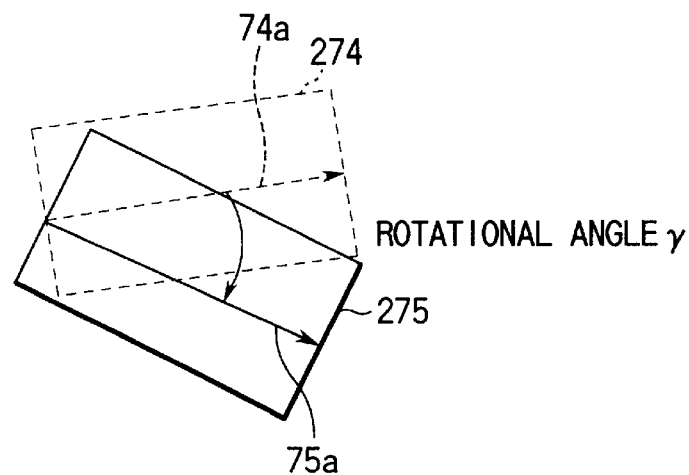

Referring to FIGS. 32A to 32C, movement of the chunks corresponding to the unit vectors will now be described. Elements shown in FIG. 32A to 32C which are the same as those shown in FIGS. 13A and 13B are given the same reference numerals. As shown in FIG. 32A, an assumption is made that a unit vector (an original vector) 71a of the skeltal skeleton in the original image and a corresponding interpolating vector 73a are different from each other by an angular degree of α. At this time, a chunk 271 corresponding to the original vector 71a is rotated (affine-rotated) and moved by the angular degree of α so as to be added to the original image. Thus, a first interpolating frame is generated.

As shown in FIG. 32B, an assumption is made that an interpolating vector 73a and an interpolating vector 74a are different from each other by an angular degree of β. At this time, a chunk 271 corresponding to the original vector 71a is rotated (affine-rotated) and moved by the angular degree of β so as to be added to the original image. Thus, a second interpolating frame is generated.

Then, similar processes are performed so that the chunk corresponding to the original vector is rotated and moved in accordance with the changed angle from the interpolating vector so as to be added to the original image. Thus, the interpolating frames are generated.

FIG. 33 shows another example of storage of unit vectors and chunks. FIG. 33 shows data of unit vectors and data of chunks are stored in such a manner that they are made to correspond to one another similarly to the structure as shown in FIG. 28. That is, the unit vectors (original vectors) of the skeltal skeleton in the original image data (address information to regions in which image data (a texture) of the chunk is stored) of the chunks corresponding to the original vectors are stored in such a manner that they are made to correspond to the key-frame numbers and skeleton numbers. Moreover, data of each unit vector indicating the changed shape from the skeltal skeleton is stored in such a manner that data is made to correspond to the original vector. In this case, corresponding unit vectors and pointers for the regions in which data of the chunks are stored are stored in each item of each skeleton in one key-frame in such a manner that correspondence is made.

As described above, the user is caused to input the skeletons of the changed shape from the skeltal skeleton input to the original image in the sequential order of the skeleton numbers. Thus, a process of, for example, the key-frame number "1" is completed (steps S13 to S20).

Then, the manipulation proceeds to step S6 so that the key-frame number is updated to input the skeleton of a further changed shape (step S13). Then, the above-mentioned steps S14 to S20 are repeated so that sequential animation composed of the key-frames and interpolating frames is generated. If necessary, a required original image is read from the image storage means 2 in steps S3 and S4 to use the original image as the key-frame similarly to the above-mentioned process (steps S5 to S20).

As described above, the second embodiment has the structure that a skeltal first stroke along an image portion of an original image input by a user and required to have movement and one or more second strokes indicating the changed shape of the first stroke are quantized into unit vectors each having a predetermined length. In accordance with the amount of change between the corresponding unit vectors of the first and second strokes obtained by the quantization, an interpolating vector for interpolating the area between the unit vectors is calculated. An image region adjacent to each unit vector of the first stroke extracted from the original image is moved in accordance with the unit vector of the corresponding second stroke and the above-mentioned interpolating vector so as to be added to the original image. Thus, a plurality of image frames are generated. As a result, animation which sequentially moves as required by a user can easily be generated with a simple manipulation.

Third Embodiment

Figure 34A:
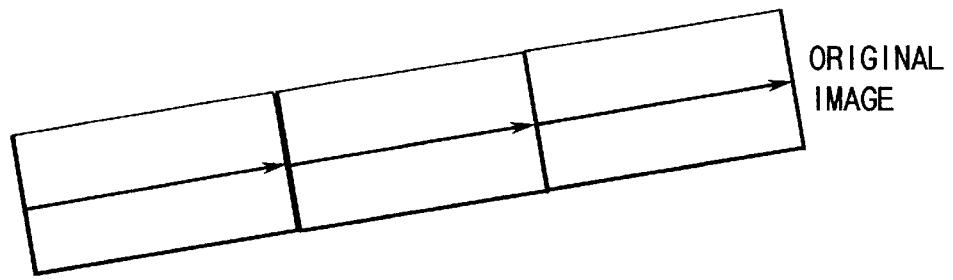
FIGS. 34A to 34D are diagrams showing a problem in a joint portion between adjacent chunks which arises when a chunk corresponding to an original vector is rotated and moved in accordance with the corresponding interpolating vector.
Figure 34B:
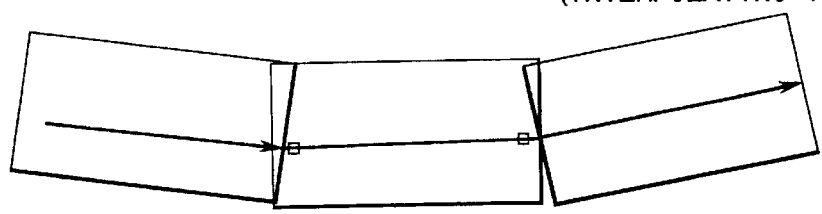
Figure 34C:
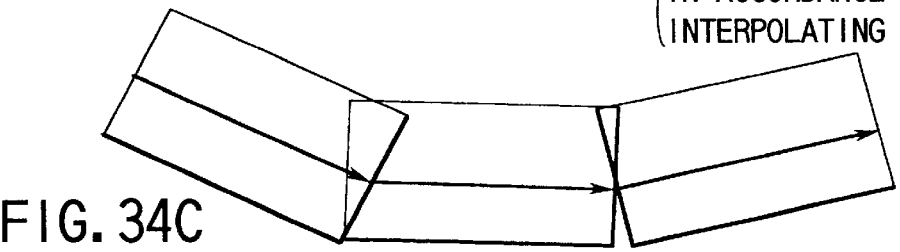
Figure 34D:
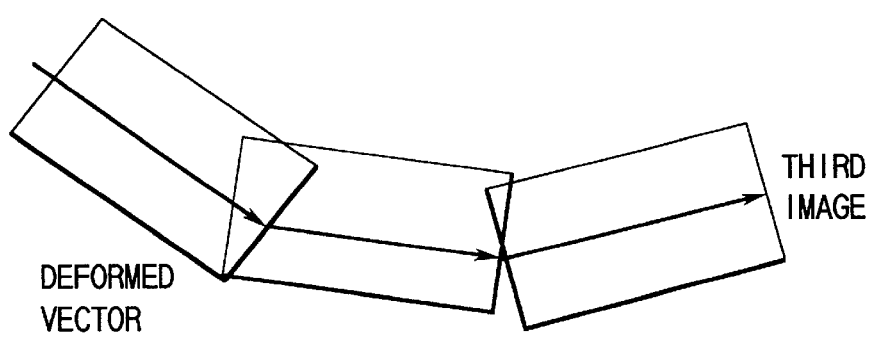

In the second embodiment, the process in which the chunk corresponding to the original vector is rotated and moved in accordance with the corresponding interpolating vector sometimes encounters a state shown in FIGS. 34A to 34D. If the amount of change of the skeleton indicating a changed shape of a skeltal skeleton drawn in the original image is large, there arises a problem after each chunk in the original image has moved in that a blank portion is generated in a joint portion between adjacent chunks, for example, as shown in FIG. 34D.

Accordingly, an animation producing apparatus according to a third embodiment further comprises a chunk correction means 10 for correcting joint between adjacent chunks after the chunk has been moved.

Figure 35:
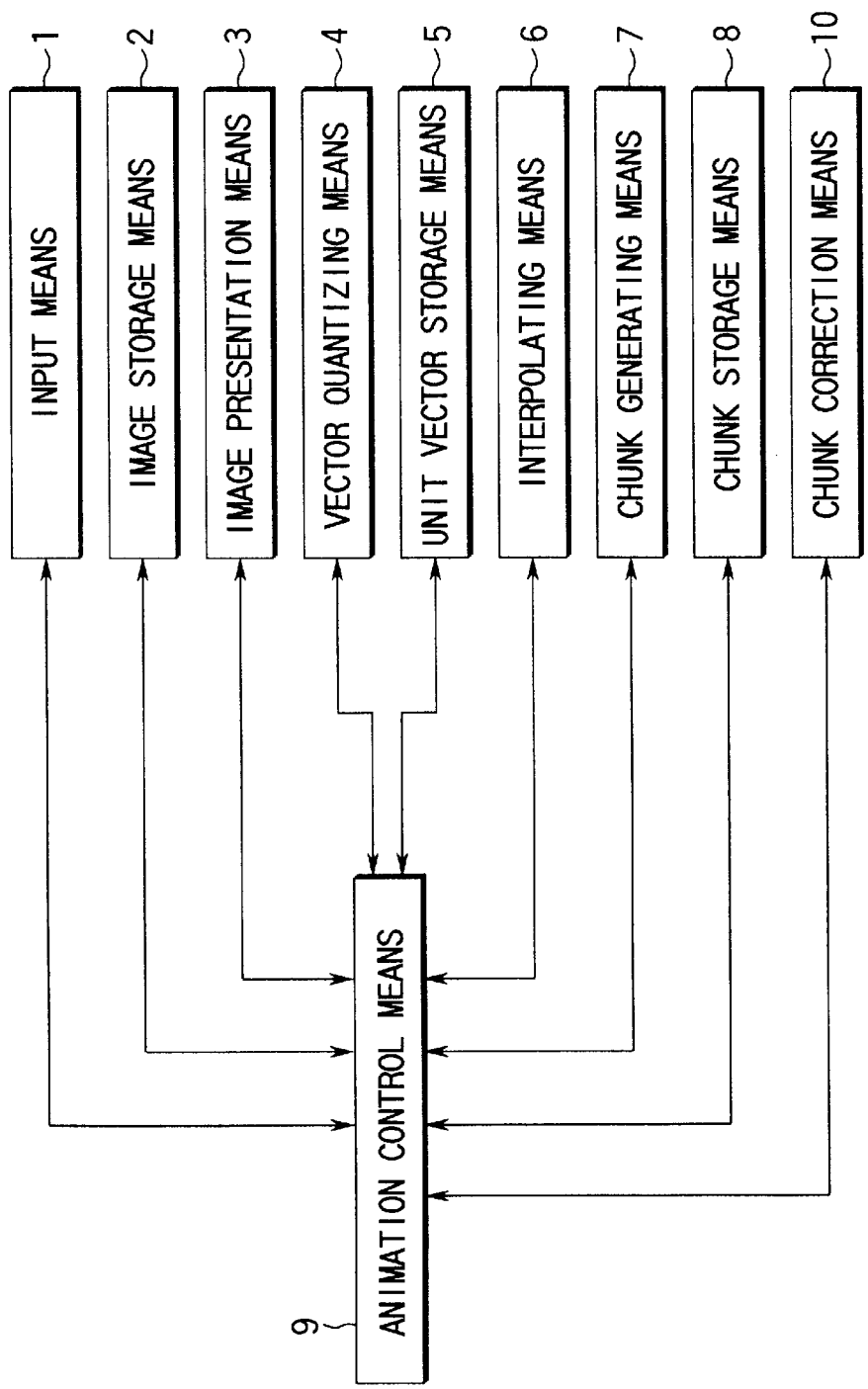
FIG. 35 is a diagram schematically showing an example of the structure of an animation producing apparatus according to a third embodiment of the present invention.

FIG. 35 is a diagram showing a schematic structure of the animation producing apparatus according to the third embodiment. The same elements as those shown in FIG. 23 are given the same reference numerals. The difference is that the chunk correction means 10 is added.

The chunk correction means 10 is arranged to calculate deformation of the original chunk in accordance with an interpolating vector when the chunk (the original chunk) of the original vector in the original image is moved. Data for use to calculate the deformation of the chunk is stored to correspond to the corresponding interpolating vector, for example, as shown in FIG. 36. Note that the address of a region in which data relating the calculation for deformation is stored is stored in the structure shown in FIG. 36.

The calculation for deformation of the chunk will now be described.

Figures 37, 38:
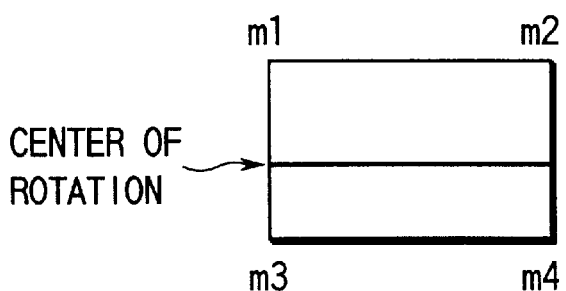
FIG. 37 is a diagram showing an example of storage of data relating to deformation calculation of a chunk in which a deformation calculation using a bias value is performed.
FIG. 38 is a diagram showing an example of a chunk which is subjected to deformation calculation using a bias value.

Assuming that four vertexes m1 to m4 of an original chunk as shown in FIG. 38 are deformed to m'1 to m'4. Each of the four vertexes m1 to m4 is rotated by the rotational angle (for example, α) described with reference to FIGS. 32A to 32c. Moreover, an appropriate bias (u, v) corresponding to the state of joining between the adjacent interpolating vectors is added so that m'1 to m'4 are calculated (refer to Equation (1)).

$$m'1 = m1\begin{pmatrix}\cos\alpha\\\sin\alpha\end{pmatrix}+\begin{pmatrix}u\\v\end{pmatrix} \quad (1)$$

$$m'2 = m2\begin{pmatrix}\cos\alpha\\\sin\alpha\end{pmatrix}+\begin{pmatrix}u\\v\end{pmatrix}$$

$$m'3 = m3\begin{pmatrix}\cos\alpha\\\sin\alpha\end{pmatrix}+\begin{pmatrix}u\\v\end{pmatrix}$$

$$m'4 = m4\begin{pmatrix}\cos\alpha\\\sin\alpha\end{pmatrix}+\begin{pmatrix}u\\v\end{pmatrix}$$

When data (the rotational angle and bias value) relating to the deformation calculation of the chunk is used between a plurality of interpolating frames, for example, as shown in FIG. 37, it is preferable that data is continuously stored with "continuation address". The addresses shown in FIG. 37 coincide with the addresses for the deformation calculation. Data relating to the deformation calculation of chunks are as well as made to correspond to unit vectors (including interpolating vectors), image data of the chunks, skeleton numbers and key-frame numbers.

Figure 39:
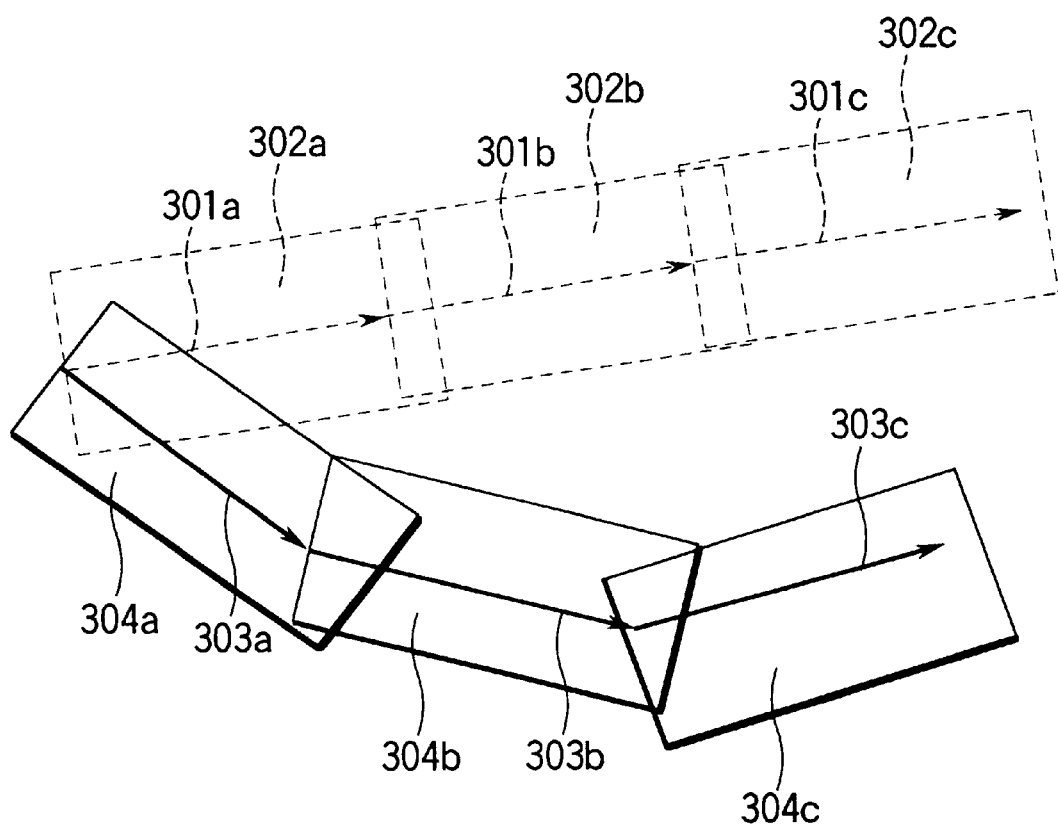
FIG. 39 is a diagram showing another example of calculations for deforming a chunk in which a chunk is generated which is formed by extending a chunk corresponding to each interpolating vector in a direction of a vector so as to overlap.

Another example of the deformation calculation is shown in FIG. 39. In this example, generation of a gap between adjacent chunks on the same interpolating frame after the chunk has been moved is prevented by extending the chunk corresponding to each interpolating vector in the direction of the vector so that overlapped chunks are generated.

Figure 40:
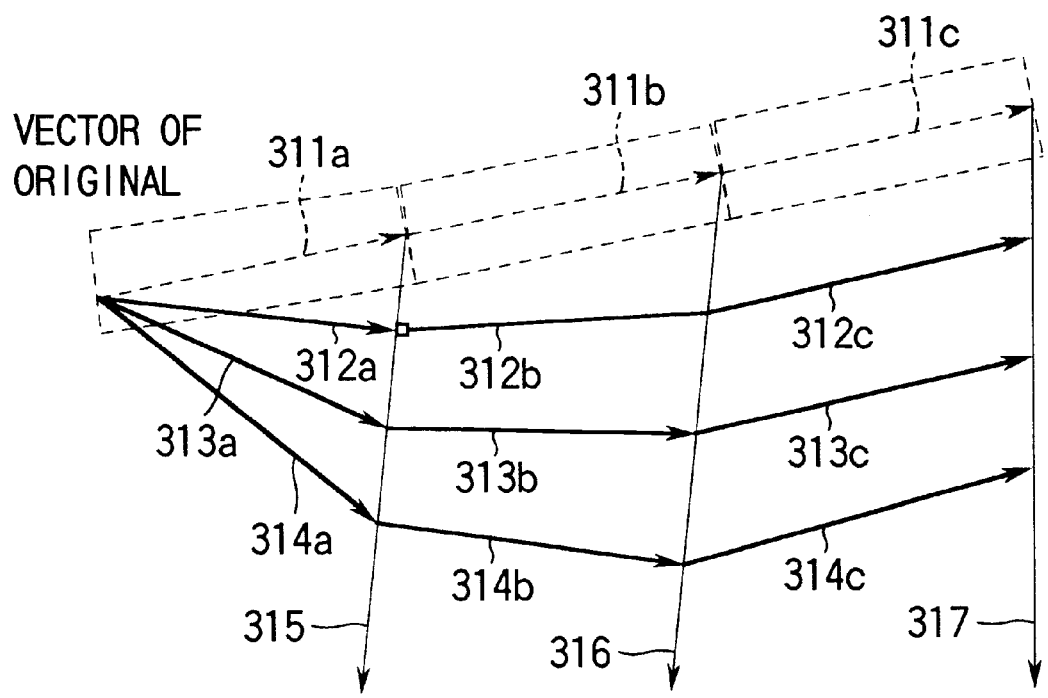
FIG. 40 is a diagram showing another example of calculations for deforming a chunk in which the chunk is deformed into a trapezoid to prevent a gap between adjacent chunks.
Figure 41:
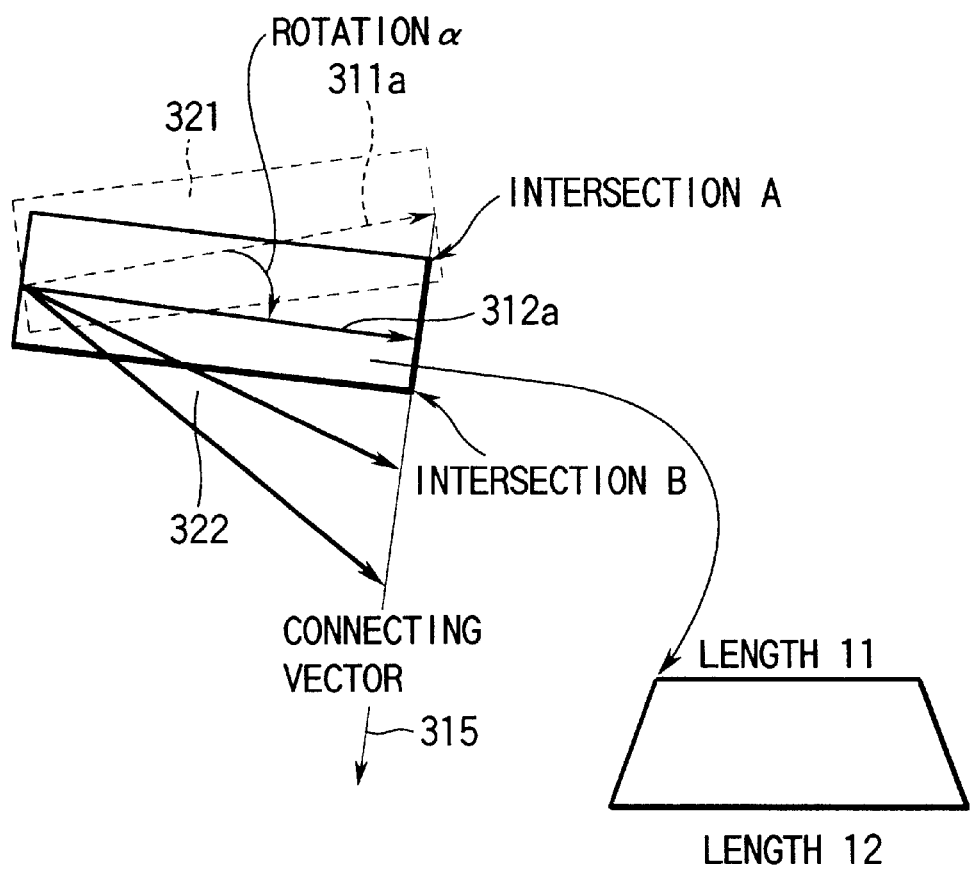
FIG. 41 is a diagram showing a process for deforming a chunk into a trapezoid to prevent a gap between adjacent chunks.

Another method is shown in FIG. 40 in which generation of a gap between adjacent chunks on the same interpolating frame after the chunk has been moved is prevented by deforming the chunk corresponding to the interpolating vector into a trapezoid.

A method of forming the chunk into the trapezoid will now be described.

As shown in FIG. 40, interpolating vectors between the unit vectors (original vectors) 311a to 311c of skeltal skeletons and unit vectors 314a to 314c of skeletons indicating the changed shapes are obtained. That is, a method similar to that according to the first embodiment described with reference to FIGS. 13A and 13B is employed so that corresponding unit vectors are connected to one another (by connection vectors 315, 316 and 317). Then, the distance is divided by (f+1) with respect to the number f (f=2 in this example) of interpolating frames so that interpolating points are obtained. The interpolating points are connected to one another so that interpolating vectors 312a to 312c and 313a to 313c are generated.

Description will be made in such a manner that a unit vector 311a of the skeltal skeleton and its chunk (an original chunk) 321 are noted. Assuming that the shift angle of the interpolating vector 312a corresponding to the unit vector 311a is α, the chunk 321 is rotated (affine-transformed) by a degree corresponding to the angle α. Then, intersections A and B of the upper and lower sides of the rotated chunk and the connection vector 315 are obtained (the chunk 322). In accordance with the intersections A and B, an assumption can be made that the shape of the chunk 322 is a trapezoid having upper and lower parallel sides having lengths "11", and "12" respectively. In accordance with the lengths, the original chunk 321 is deformed.

Figure 42A:
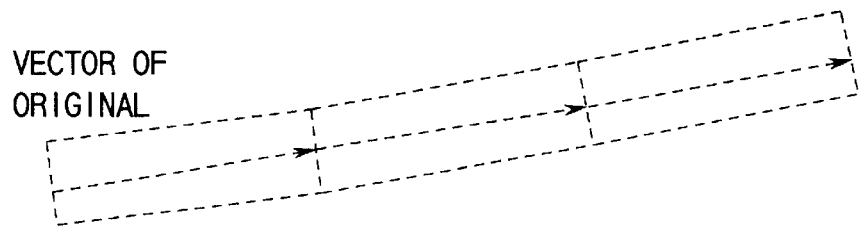
FIGS. 42A to 42D is a diagram showing an effect obtained when the chunk is deformed into a trapezoid.
Figure 42B:
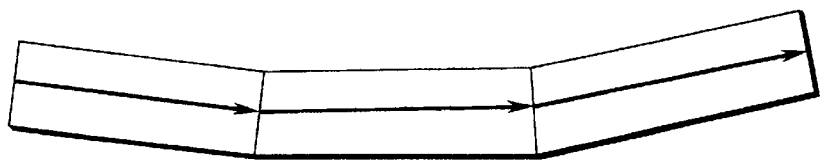
Figure 42C:
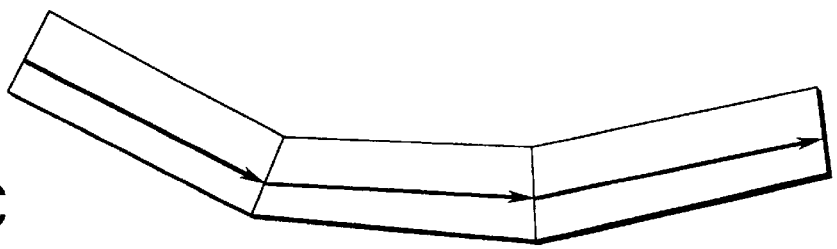
Figure 42D:
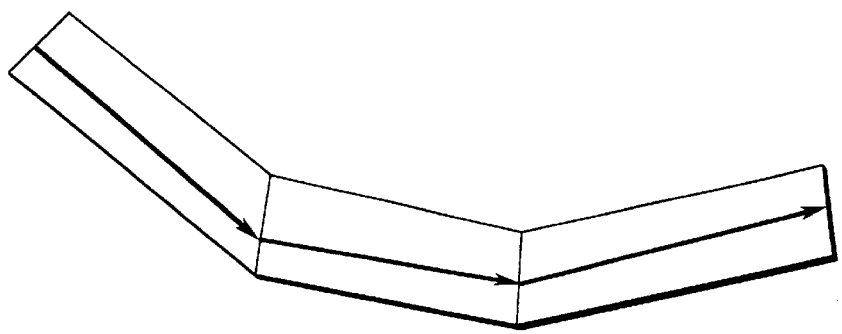

As a result, each chunk on the second to third image frames obtained by rotating and moving the original chunk as shown in FIG. 42A is deformed into the trapezoid. Thus, adjacent chunks on the same frame can satisfactorily be joined to each other, as shown in FIGS. 42B to 42D.

It is preferable that data (for example, coordinates of four points of the chunk realized as a result of the deformation) about the deformation calculation of the original chunk is continuously stored with the "continuous addresses" in a case where data above is used between a plurality of interpolating frames. Note that the addresses shown in FIG. 43 coincide with the addresses for the deformation calculation shown in FIG. 36. Data relating to the deformation calculation of the chunk are made to also correspond to the unit vectors (including interpolating vectors), image data of the chunks, skeleton numbers and key-frame numbers.

Figure 44:
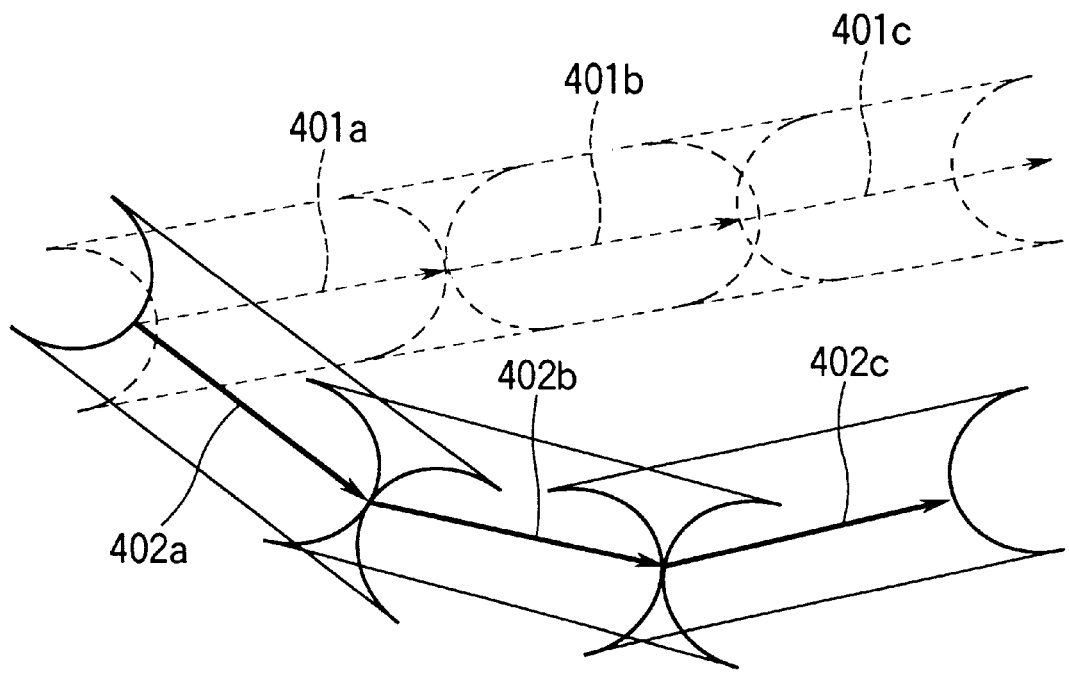
FIG. 44 is a specific example of the shape of a chunk having a joint portion with an adjacent chunk into a circular arc shape.

As for the original shape of the chunk, generation of gap between adjacent chunks can be prevented if the joint portion between the adjacent chunks is formed into a circular arc, as shown in FIG. 44.

Skeletons and unit vectors obtained by quantizing the skeletons do not correspond to one another depending on the lengths of the skeletons at the original position and the moved position input by the user. If the skeleton at the original position is somewhat shorter than the skeleton at the moved position, the number of unit vectors of the skeleton at the original position is smaller than the number of unit vectors of the skeleton at the moved position. In this case, one unit vector of the skeleton at the moved position corresponds to a plurality of unit vectors on the skeleton at the moved position. Therefore, correspondence between the unit vectors must be considered when the chunk is rotated and moved.

Figure 45:
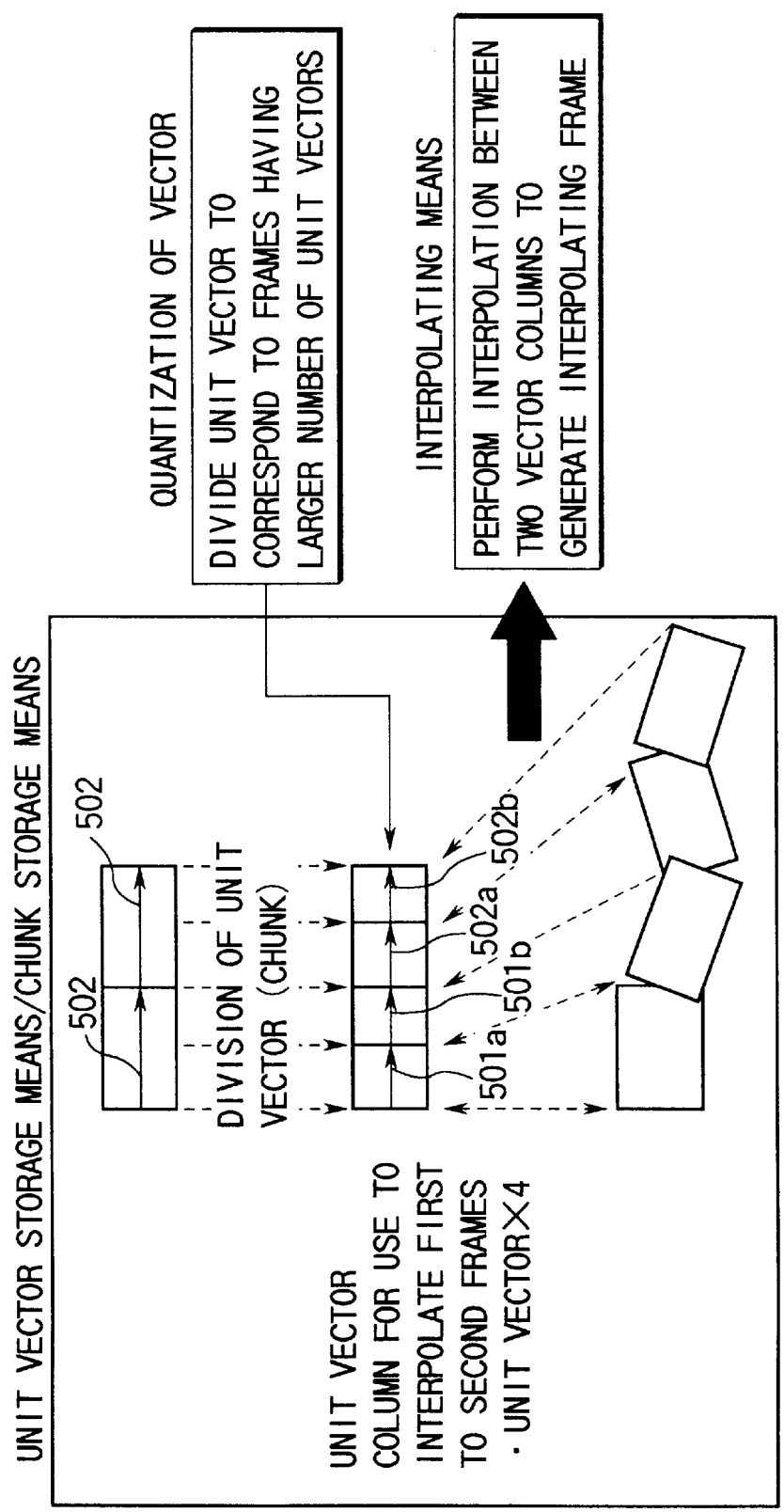
FIG. 45 is a direction showing division of a unit vector and that of a chunk which is performed when the division of the unit vector is performed.

In this case, as shown in FIG. 45, the vector quantizing means 4 searches the inside portion of the unit-vector storage means 5 and divides a unit vector to correspond to the frame having a larger number of unit vectors for one skeleton, as shown in FIG. 45. The number of unit vectors are, in skeleton units, compared between the first frame (the original image) and the second frame. If the number of unit vectors on the second frame for a certain skeleton is four and the number of unit vectors on the first frame is two (unit vectors 501 and 502)(refer to FIG. 46), each of the unit vectors of the first frame is divided into two. Thus, unit vectors 501a, 501b, 502a and 502b are generated so as to be stored in the unit-vector storage means 5 (see FIG. 46).

Figure 46:
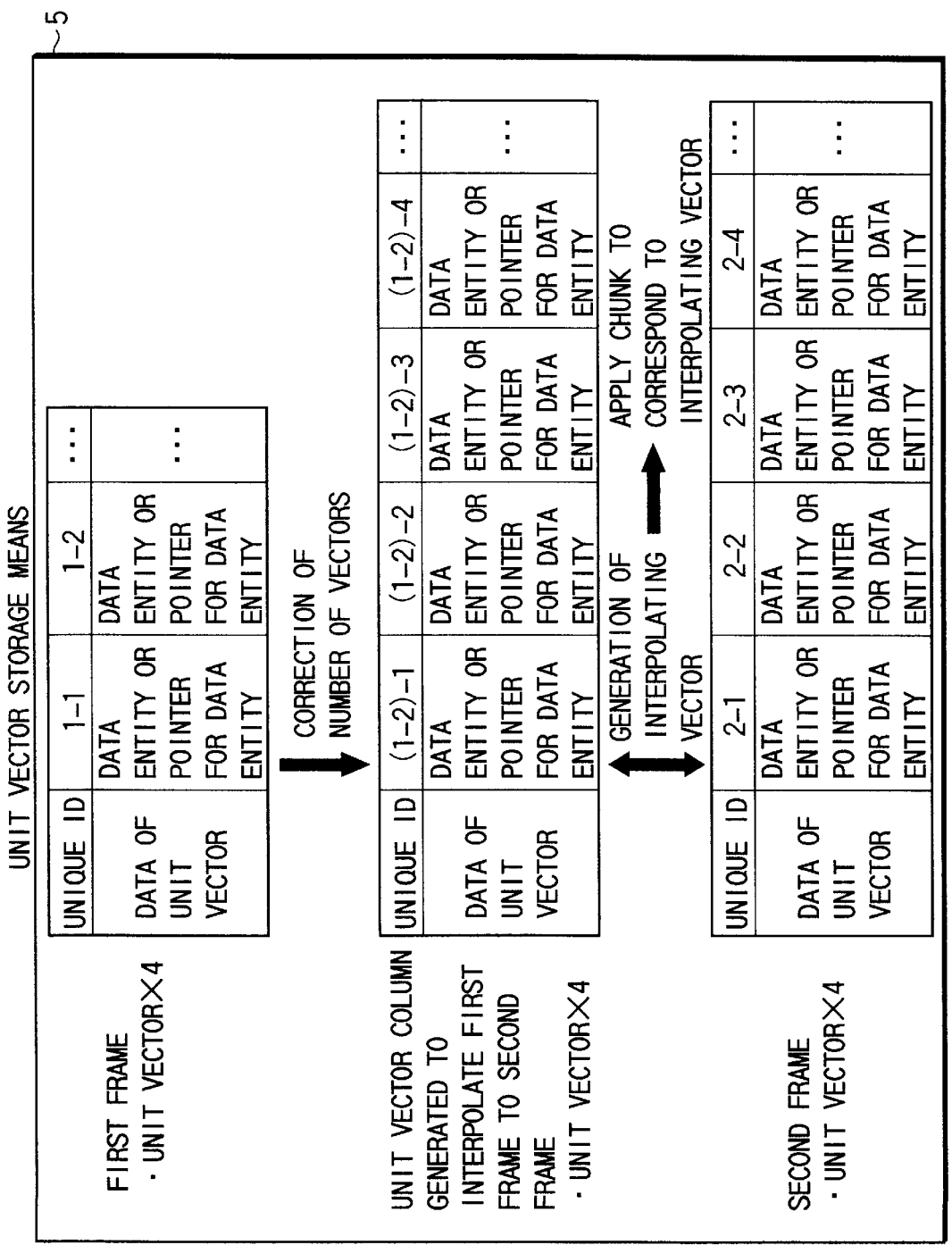
FIG. 46 is a diagram showing an example of storage of a unit vector which is performed when a unit vector is divided.

Moreover, corresponding chunks are divided so that chunks corresponding to the unit vectors 501a, 501b, 502a and 502b are generated. Thus, data of unit vector in four units in the second frame previously stored in the unit-vector storage means 5 and four unit vectors of the first frame obtained by the dividing manipulations are made to correspond to one another (see FIG. 46). The chunks divided between the unit vectors are rotated, moved and superimposed so that interpolating frames are generated. FIG. 46 schematically shows an example of storage in the unit-vector storage means 5 in the case where the unit vectors are divided.

If the skeleton at the original position is somewhat longer than the skeleton at the moved position, the number of unit vector of the skeleton at the original position is larger than the number of those of the skeleton at the moved position. In this case, one unit vector of the skeleton at the moved position corresponds to a plurality of unit vectors on the skeleton at the original position. Therefore, correspondence between the unit vectors must be considered when the chunk is rotated and moved.

Figure 47:
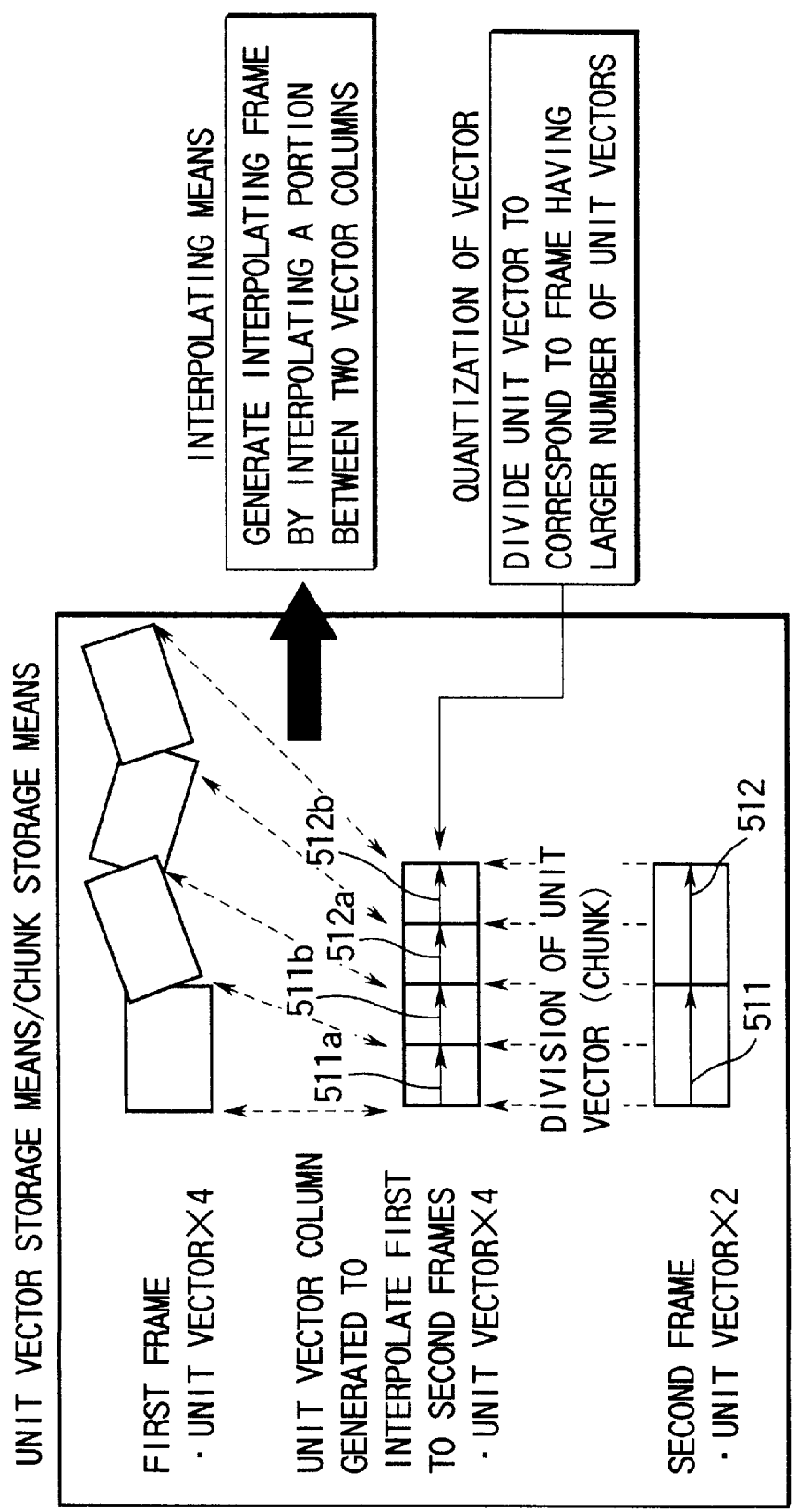
FIG. 47 is a diagram showing division of a unit vector.
Figure 48:
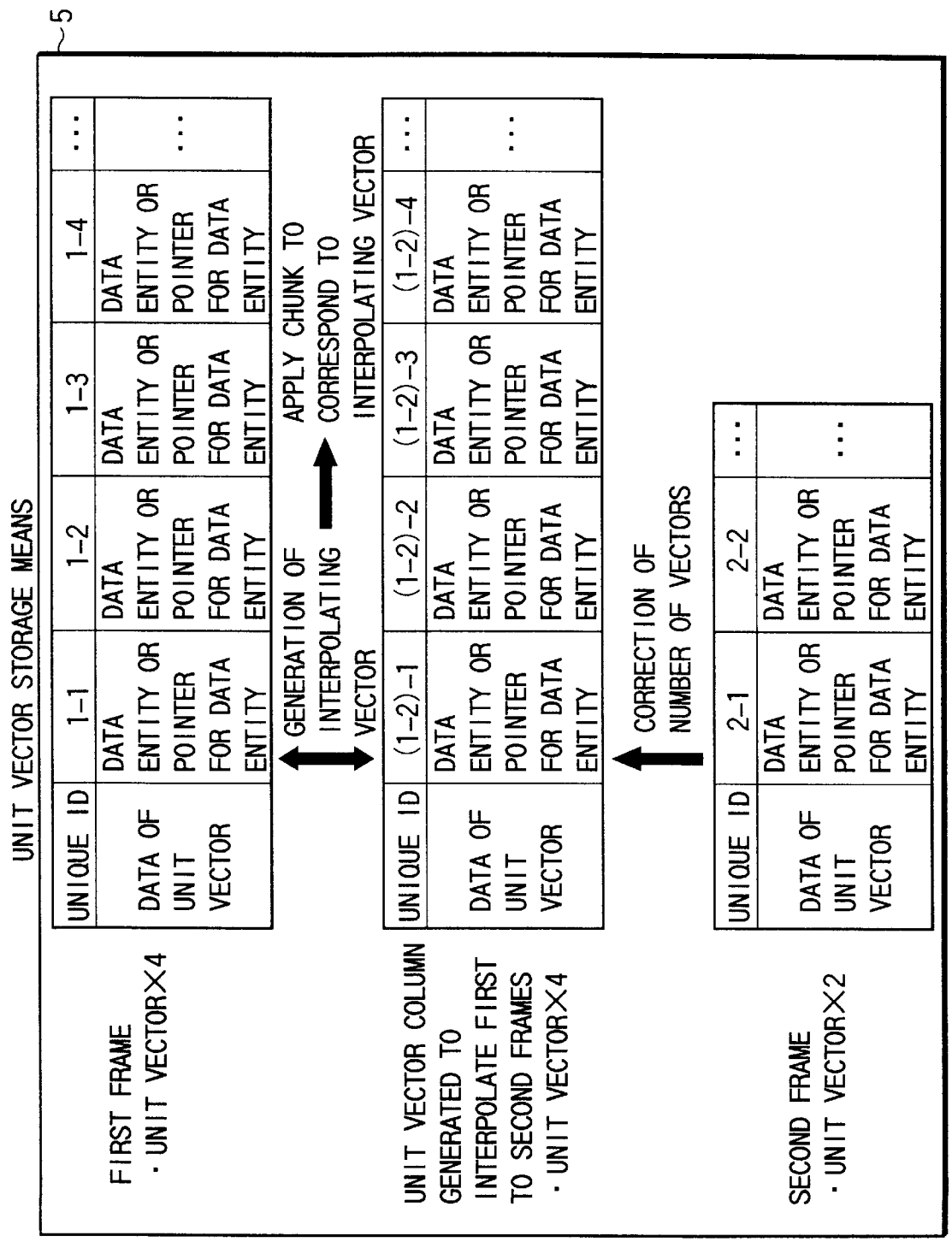
FIG. 48 is a diagram showing an example of storage of a unit vector which is performed when the unit vector is divided.

In this case, the vector quantizing means 4 searches the inside portion of the unit-vector storage means 5 and divides a unit vector to correspond to the frame having a larger number of unit vectors for one skeleton, as shown in FIG. 47. The number of unit vectors are, in skeleton units, compared between the first frame (the original image) and the second frame. If the number of unit vectors on the first frame for a certain skeleton is four and the number of unit vectors on the second frame is two (unit vectors 511 and 512)(refer to FIG. 48), each of the unit vectors of the second frame is divided into two. Thus, unit vectors 511a, 511b, 512a and 512b are generated so as to be stored in the unit-vector storage means 5 (see FIG. 48). Thus, data of unit vector in four units in the first frame previously stored in the unit-vector storage means 5 and four unit vectors of the second frame obtained by the dividing manipulations are made to correspond to one another (see FIG. 48). The chunks on the first frame are rotated, moved and superimposed between the unit vectors so that interpolating frames are generated. FIG. 48 schematically shows an example of storage in the unit-vector storage means 5 in the case where the unit vectors are divided.

A process which is performed by the chunk generating means 7 will now be described.

Figure 49:
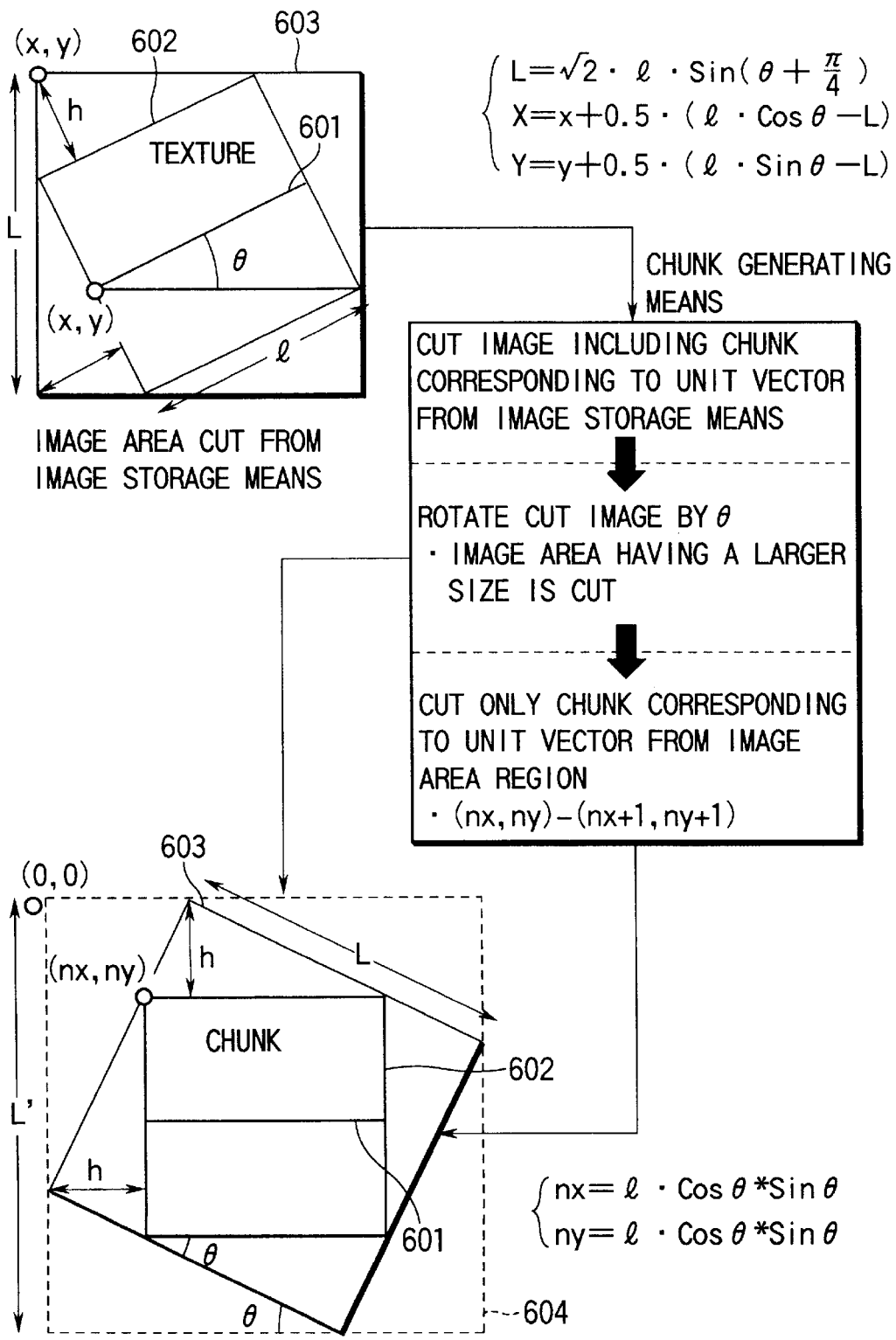
FIG. 49 is a diagram showing normalization of a chunk.

As shown in FIG. 49, the chunk generating means 7 cuts, from the original image stored in the image storage means 2, chunks corresponding to the unit vectors. Assuming that the length of the unit vector is l and the angle of the image made from the horizontal direction is θ, an image region 603 having a length L and including a square chunk which has a length of l along the unit vector 601 is cut. At this time, coordinates (X, Y) of a point (an upper left point) serving as a reference for the length L and the image region 603 is expressed by the following Equation (2):

$$\begin{cases} L = \sqrt{2} \cdot l \cdot \sin(\theta + \frac{\pi}{4}) \\ X = x + 0.5 \cdot (l \cdot \cos\theta - L) \\ Y = y + 0.5 \cdot (l \cdot \sin\theta - L) \end{cases} \quad (2)$$

Then, the image region 603 obtained by the cutting manipulation is rotated by angle θ so that an image region 604 of a larger size is generated.

Only a chunk 602 corresponding to the unit vector 601 is cut from the image 604. A reference point (the upper left vertex) of the chunk 601 which is cut from the image region 604 is expressed by the following Equation (3) when the upper left vertex of the image region 604 is made to be a reference point (0, 0):

$$\begin{cases} nx = l \cdot \cos\theta \sin\theta \\ ny = l \cdot \cos\theta \sin\theta \end{cases} \quad (3)$$

The chunk 602 cut from the image region 604 is superimposed to the moved position.

As described above, the chunk generating means 7 cuts a larger image region including the chunk when the chunk is cut from the original image. When the image region is rotated so as to be superimposed, a normalized chunk having a size (a square each side of which has a length of 1) corresponding to the unit vector is cut from a image region having a larger size, and then the cut chunk is superimposed on the original image.

A process for generating a background image for covering a blank portion in the original region for the chunk which is generated on a new image frame which is generated by the rotation and movement of the chunk will now be described.

Figure 50A:
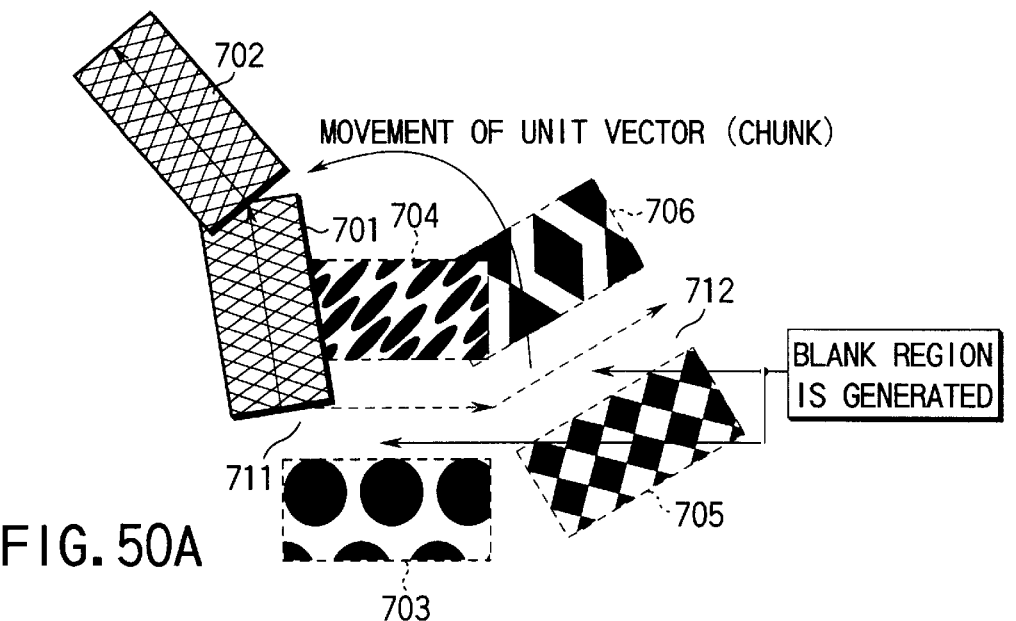
FIGS. 50A and 50B are diagrams showing a process to which a blank region is subjected which is generated at a position on a new image frame because of movement of a unit vector and a chunk corresponding to the unit vector.
Figure 50B:
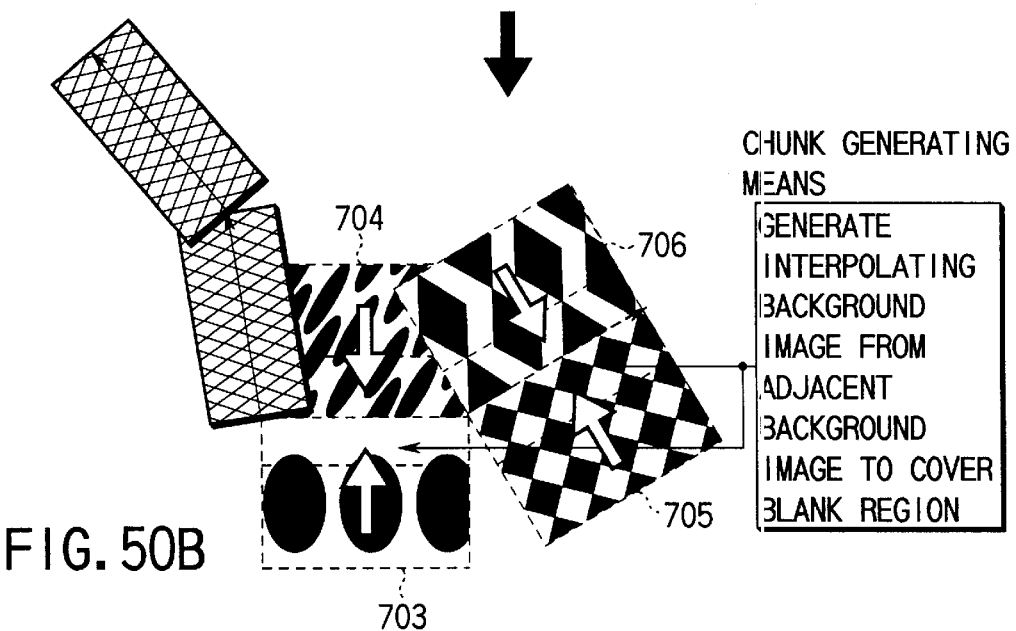

As shown in FIG. 50A, blank regions 711 and 712 are generated in the original position for chunks 701 and 702 on a new image frame generated by movements of unit vectors and corresponding chunks 701 and 702. To cover the blank regions the chunk generating means 7 generates interpolating images from background image regions 703 to 706 adjacent to the chunks which are moved (see FIG. 50B).

Figure 51A:
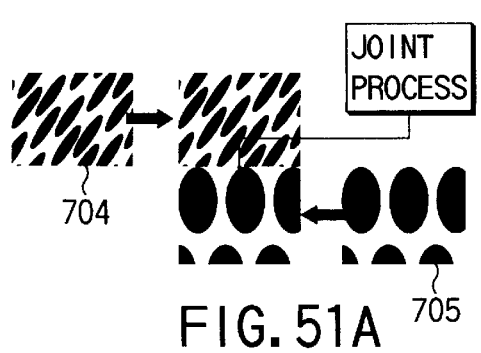
FIGS. 51A and 51B are diagrams showing generation of an image (blending of a background image region) for interpolating the blank portion shown in FIG. 49.
Figure 51B:
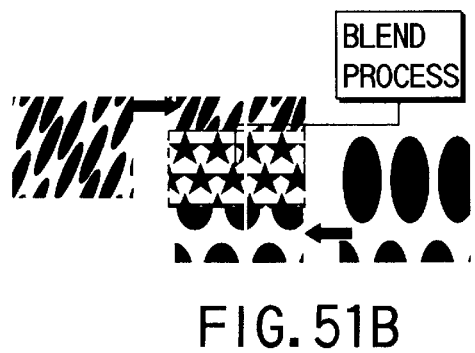

Specifically, background image regions 704 and 705 are blended to cover the blank region 711 as shown in, for example, FIGS. 51A and 51B. An obtained blended image can be placed in the blank region 711.

As described above, according to the third embodiment, an image region (a chunk) adjacent to each unit vector of a skeltal skeleton in an original image is deformed (into, for example, a trapezoid) to correspond to the shapes of the skeltal skeleton and the interpolating stroke so as to be superimposed on the original image. Thus, a blank portion generated in the joint portion between the adjacent chunks when the chunks are moved can be modified.

Moreover, corresponding unit vectors and interpolating vectors between the unit vectors of the skeltal skeleton in the original image and skeletons indicating the changed shape are divided to correspond to the shape of the skeleton. In accordance with the divided unit vectors and interpolating vectors, the chunk of each unit vector of the skeltal skeleton or the chunks divided to correspond to the divided unit vectors are moved so as to be superimposed on the original image. Thus, the image portion made to correspond to the strokes by the different in the stroke length can easily be expanded/contracted.

The chunk generating means 7 cuts a chunk from an original image in such a manner that an image region including the chunk and having a larger size is cut. When the cut image region is rotated and superimposed, a normalized chunk having a size (a square having sides each having a length of 1) corresponding to the unit vector is cut, and then superimposed on the original image. Moreover, blended images formed in accordance with the background image adjacent to the chunk is placed in the blank region at the original position for the chunk. As a result, only an instructed portion in the original image can be superimposed without any influence on an image in another portion. Therefore, animation which sequentially moves as required by a user can easily be generated by a simple manipulation.

Fourth Embodiment

Figure 52:
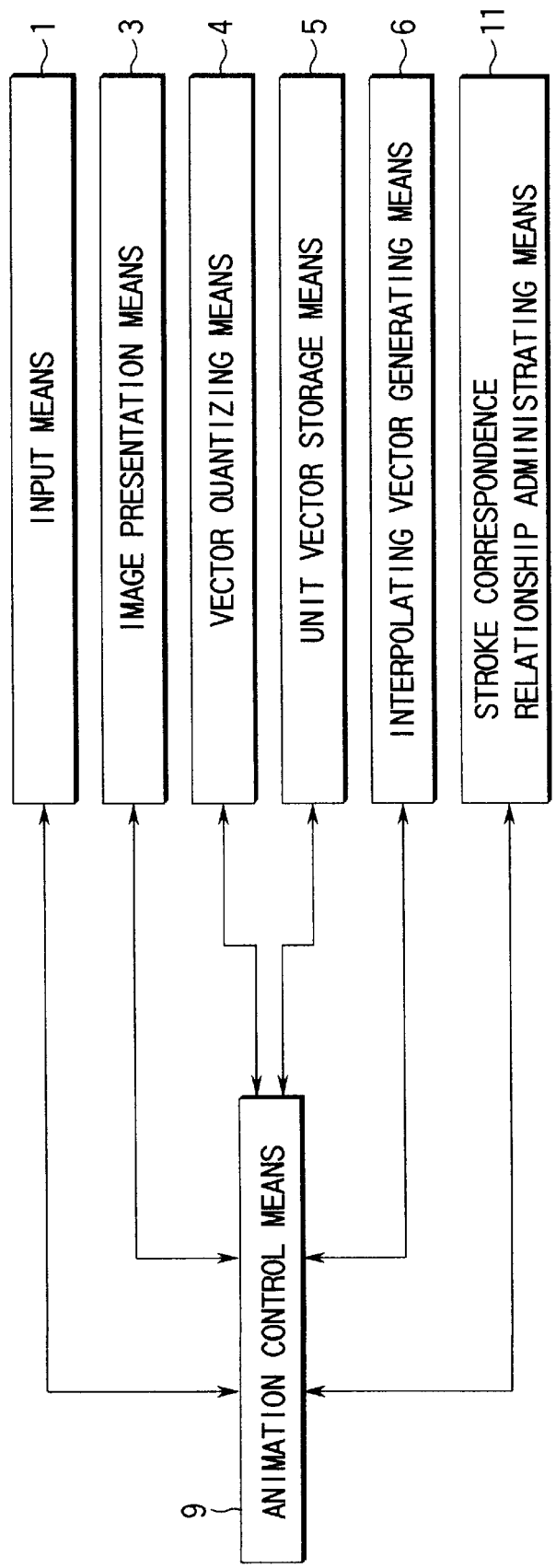
FIG. 52 is a diagram schematically showing an example of the structure of an animation producing apparatus according to a fourth embodiment of the present invention.

FIG. 52 is a diagram schematically showing an animation producing apparatus according to a fourth embodiment of the present invention. In FIG. 52, the same elements as those shown in FIG. 4 are given the same reference numerals and the same elements are omitted from description. This embodiment has a structure formed in such a manner that a stroke-correspondence administrating means 11 is added to the structure according to the embodiment shown in FIG. 4. The stroke-correspondence administrating means 11 determines the correspondence between strokes between two key-frames input through the input means 1 and the correspondence between unit vectors of the corresponding strokes.

Although the first to third embodiments have the structure that the number of strokes is the same between the key-frames, the number of strokes can be varied between the key-frames.

Figure 55:
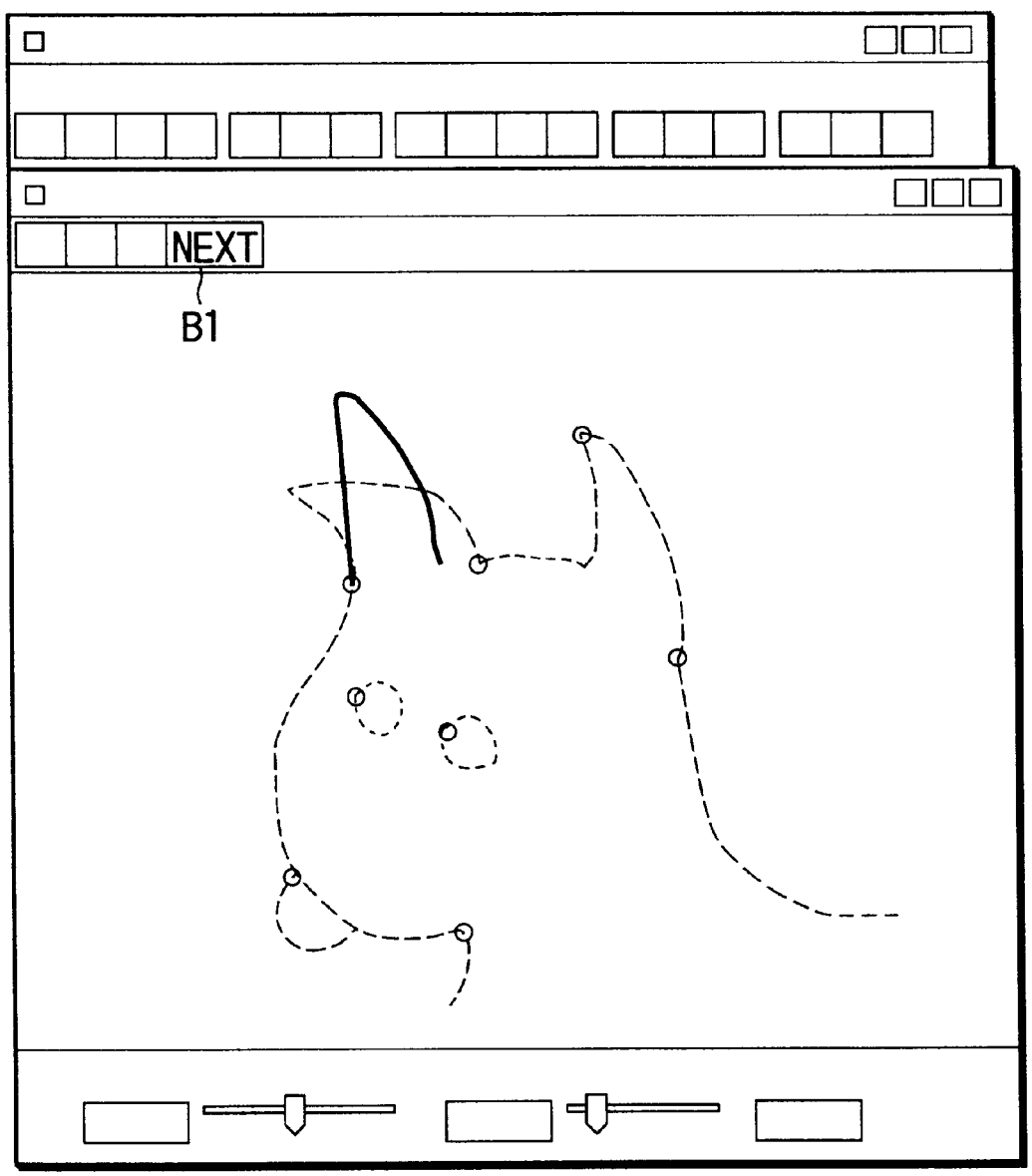
FIG. 55 is a diagram showing an example of display which is performed when a stroke indicating a changed shape of a stroke input through a user interface of the input means is input.

As described above with reference to FIGS. 5A and 5B, when stroke input of key-frames having key-frame numbers not smaller than i=0 (step S6), that is, when a stroke for deforming each stroke drawn on the key-frame number i=0, stroke indication number k is initialized (step S13). Then, a key-frame (in this case, a key-frame having a key-frame number, for example, "0") having a key-frame number (i−1) which is one key-frame before is displayed on a predetermined display unit. At this time, when a stroke on an i-th key-frame corresponding to the stroke having the stroke indication number k on an (i−1)th key-frame is input in such a manner that the stroke number given to each stroke drawn on the previous key-frame is made to be stroke indicating number k, it is preferable that the display color of the k-th stroke is changed or the k-th stroke is allowed to blink (FIG. 55 shows the k-th stroke with a thin solid line) as shown in FIG. 55. Thus, the user is able to easily draw the corresponding stroke thanks to the foregoing enhancement.

FIG. 55 shows a case in which the head of a dog is drawn in a key-frame having key-frame number "0". In the foregoing state, a user inputs one stroke on the key-frame having the key-frame number "1" corresponding to the stroke having the stroke number k in order to deform the left ear of having the stroke indication number k in the key-frame having the key-frame number "0". The input stroke is given stroke number j (step S15). After the stroke has been input, the process of the stroke having a next stroke indication number on the (i−1)-th key-frame is performed in such a manner that the user clicks a menu button B1 indicating "NEXT" disposed on the display frame shown in FIG. 55 by using a mouse or the like so as to select "NEXT" (step S16). Thus, the stroke indication number k is increased by one so that the stroke having a next stroke indication number on the (i−1)-th key-frame is caused to enhance and display the stroke of the top head portion of the dog, for example, as shown in FIG. 56 (step S17).

If a plurality of strokes on the i-th key-frame corresponding to the k-th stroke on the (i−1)-th key-frame exist, the menu button BI indicating "NEXT" is required to be selected after all of the plural strokes have been input (step S16).

Figure 56:
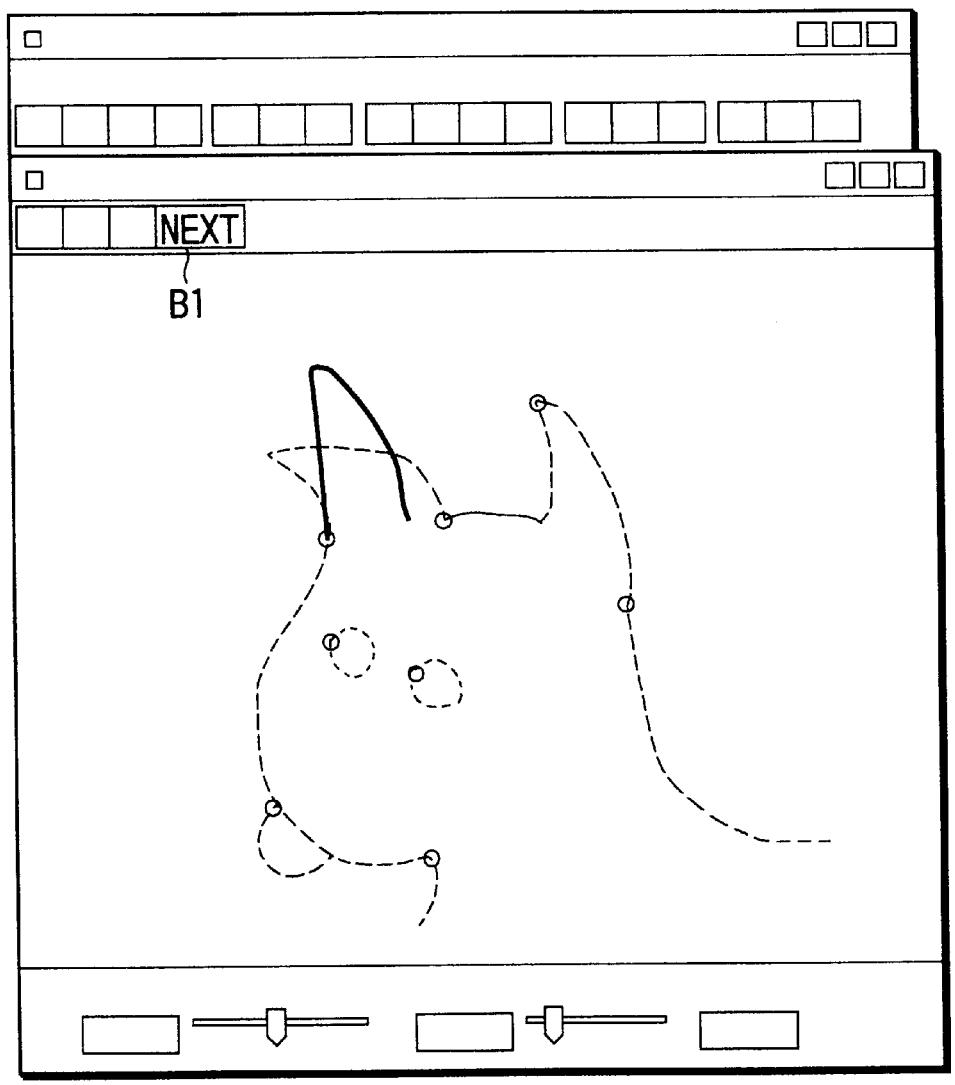
FIG. 56 is a diagram showing an example of display which is performed when a stroke indicating a changed shape of a stroke input through a user interface of the input means is input.

When a next stroke on the (i−1)-th key-frame is, in step S17, enhanced and displayed, for example, as shown in FIG. 56, the stroke of the i-th key-frame input to correspond to the stroke having the previous stroke number (that is, the (k−1)-th stroke) is divided into unit vectors by the image presentation means 3 so as to be stored in the unit-vector storage means 5 (step S18).

Figure 57:
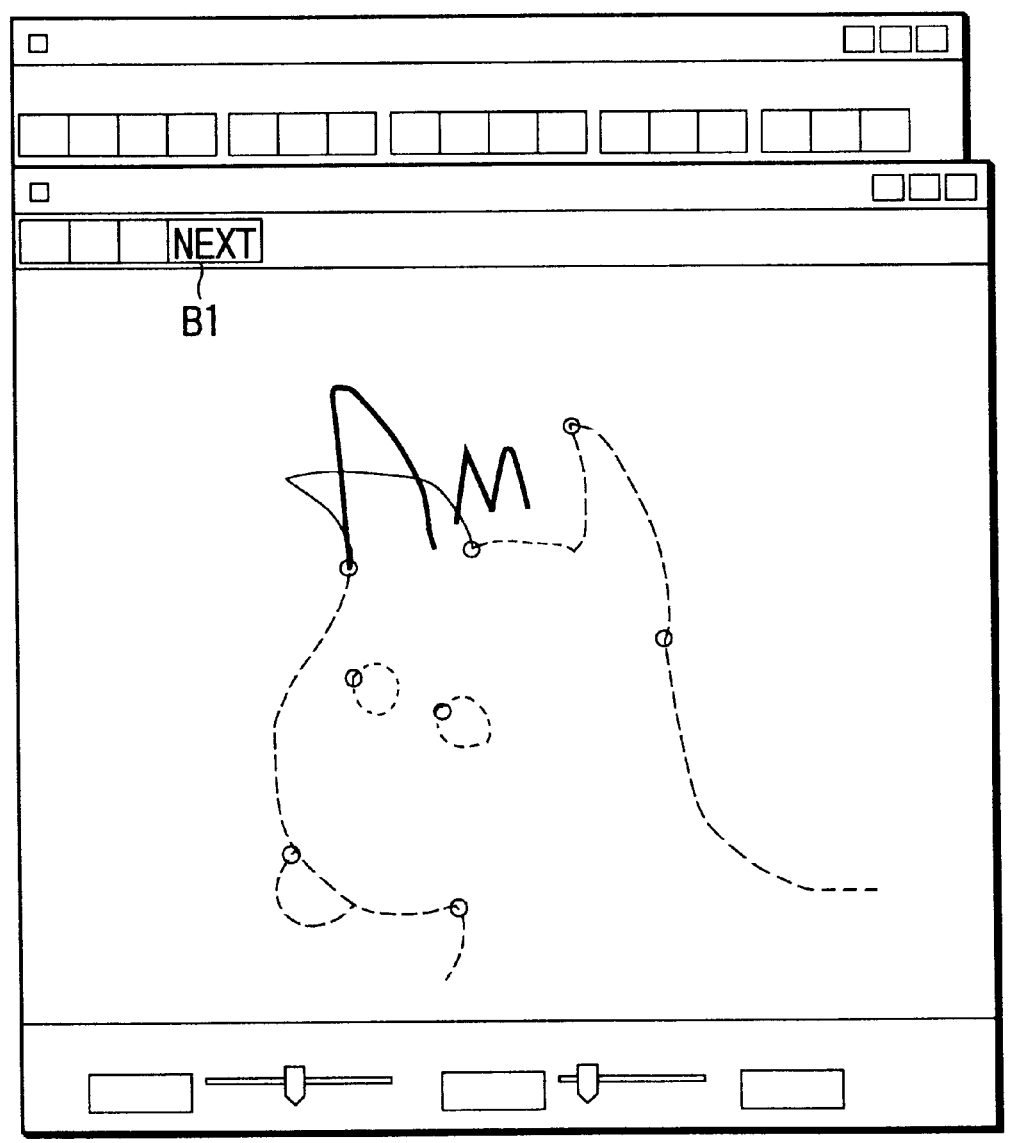
FIG. 57 is a diagram showing an example of the manipulation which is performed when a stroke indicating a changed shape of the stroke input through the user interface is input to correspond to the stroke.

The following process will be described in portion (A) in which the number of strokes in the i-th key-frame input to correspond to the stroke indication number k of the (i−1)-th key-frame is the same, that is, when the number of the k-th strokes on the key-frame having the key-frame number i=0 and the number of the strokes on the key-frame having the key-frame number of i=1 is one, as shown in FIG. 56. Then, portion (B) will be described in which the number of strokes of the i-th key-frame input to correspond to the stroke indication number k of the (i−1)-th key-frame is different, that is, the k-th stroke on the key-frame having the key-frame number of i=0 is one and the number of strokes on the key-frame corresponding to the foregoing stroke and having the key-frame number of i=1 is two, as shown in FIG. 57. Hereinafter, the stroke indication number k is a number before it is increased in step S17.

(A) In this case, the number of strokes in the i-th key-frame input to correspond to the k-th stroke in the (i−1)-th key-frame is the same.

Figure 53:
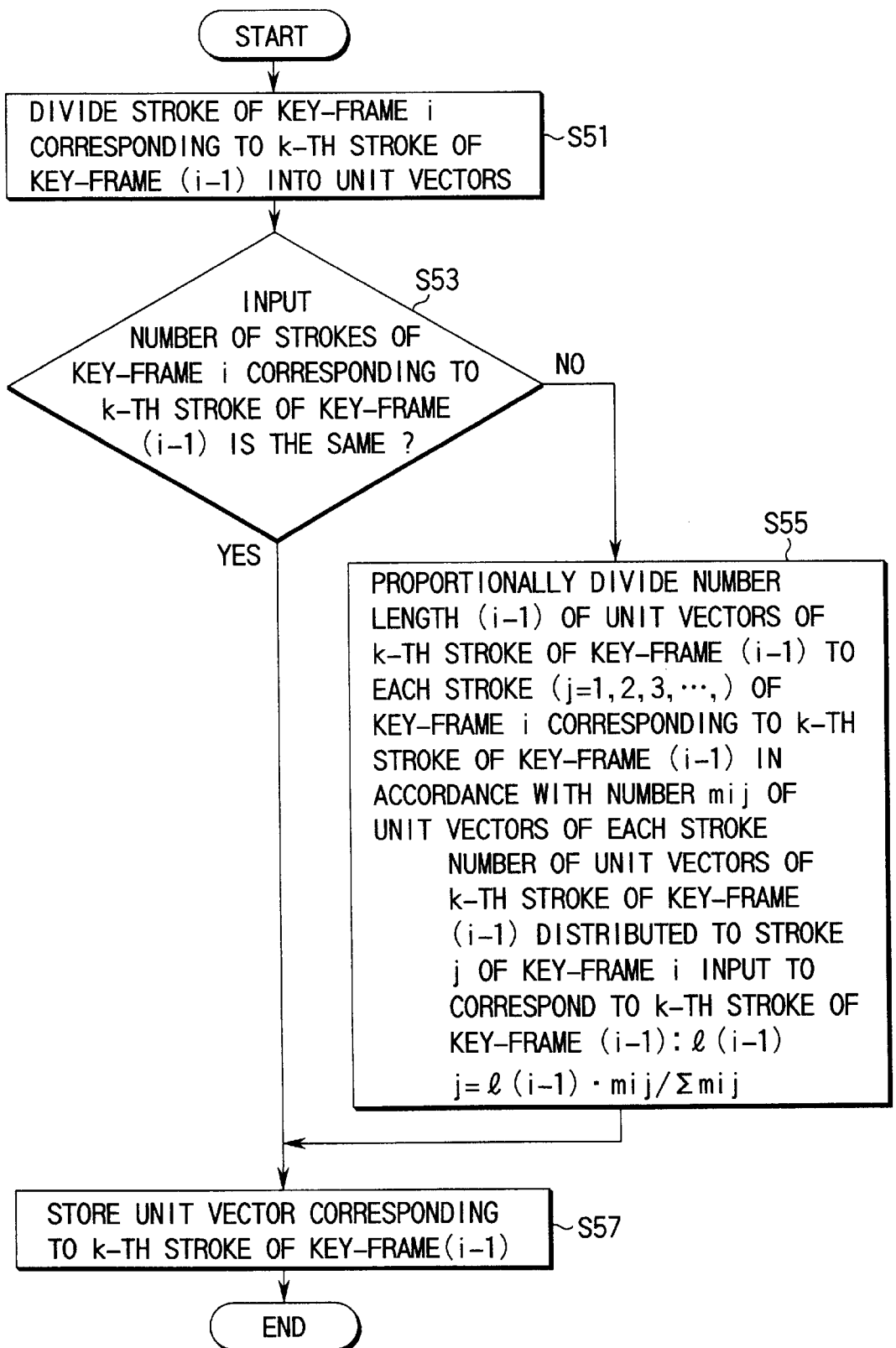
FIG. 53 is a flow chart of step S17 shown in FIG. 5B.

A process in step S18 shown in FIG. 5B will now be described with reference to a flow chart shown in FIG. 53.

The stroke in the i-th key-frame input to correspond to the stroke indication number k of the (i−1)-th key-frame is divided into unit vectors (step S51). If a stroke 52 drawn on the key-frame (a second key-frame) having the key-frame number "1" to correspond to the stroke 51 drawn on the key-frame (a first key-frame) having the key-frame number "0" exists as shown in, for example, FIG. 10A, the stroke 51 has been quantized into unit vectors 51a, 51b and 51c as shown in FIG. 10B (in this case, quantization has been performed in step S39). The stroke 52 is quantized into unit vectors 52a, 52b and 53c in step S49.

When the number of unit vectors are different between the two strokes, the length of the unit vector may be changed so that the stroke of either of the two key-frames is again quantized to correspond to the larger number of the unit vectors. Thus, the number of unit vectors are made to be the same between the two strokes. If the number of unit vectors in the stroke 52 is larger than that in the stroke 51 after the stroke 52 has been decomposed into unit vectors each having a predetermined length, the length of the unit vector may be shortened to again quantize the stroke 51 in order to make the number of the unit vectors of the stroke 51 to be the same as the larger number.

The stroke-correspondence administrating means 11 proceeds the manipulation to step S57 because the number of strokes of the i-th key-frame input to correspond to the stroke indication number k of the (i−1)-th key-frame is the same (step S53). Thus, the stroke-correspondence administrating means 11 makes correspondent the unit vectors of the two strokes between two key-frames, and then stores the unit vectors in the unit-vector storage means 5.

In accordance with the number f of interpolations input in step S23 shown in FIG. 5A, the interpolating means 6 generates an interpolating vector between key-frames having the key-frame numbers, for example, "0" and "1", the interpolating vector being stored (step S19).

As shown in FIG. 12, the unit-vector storage means 5 has data of unit vectors 61a to 61d obtained by quantizing strokes on the key-frame (the first key-frame) having the key-frame number "0" and data of unit vectors 62a to 62d obtained by quantizing strokes on the key-frame (the second key-frame) corresponding to the strokes on the first key-frame and having the key-frame number "1", in such a manner that data items are given unique identifiers (ID). The interpolating means 6 obtains interpolating vectors 63a to 63d between unit vectors of the corresponding stroke between two key-frames. An image frame in which the stroke composed of the interpolating vectors 63a to 63d is drawn is the interpolating frame between the first key-frame and the second key-frame.

The principle of the method of generating the interpolating vector has been described with reference to FIGS. 10A and 10B.

Referring back to FIG. 5B, all of stroke numbers j drawn on the key-frame having the key-frame number i=0 are subjected to the processes in steps S43 to S19 (step S21).

(B) In this case, the number of strokes in the i-th key-frame input to correspond to the stroke indication number k of the (i−1)-th key-frame is different.

The process in step S18 shown in FIG. 5B will now be described with reference to a flow chart shown in FIG. 53.

Figure 58:
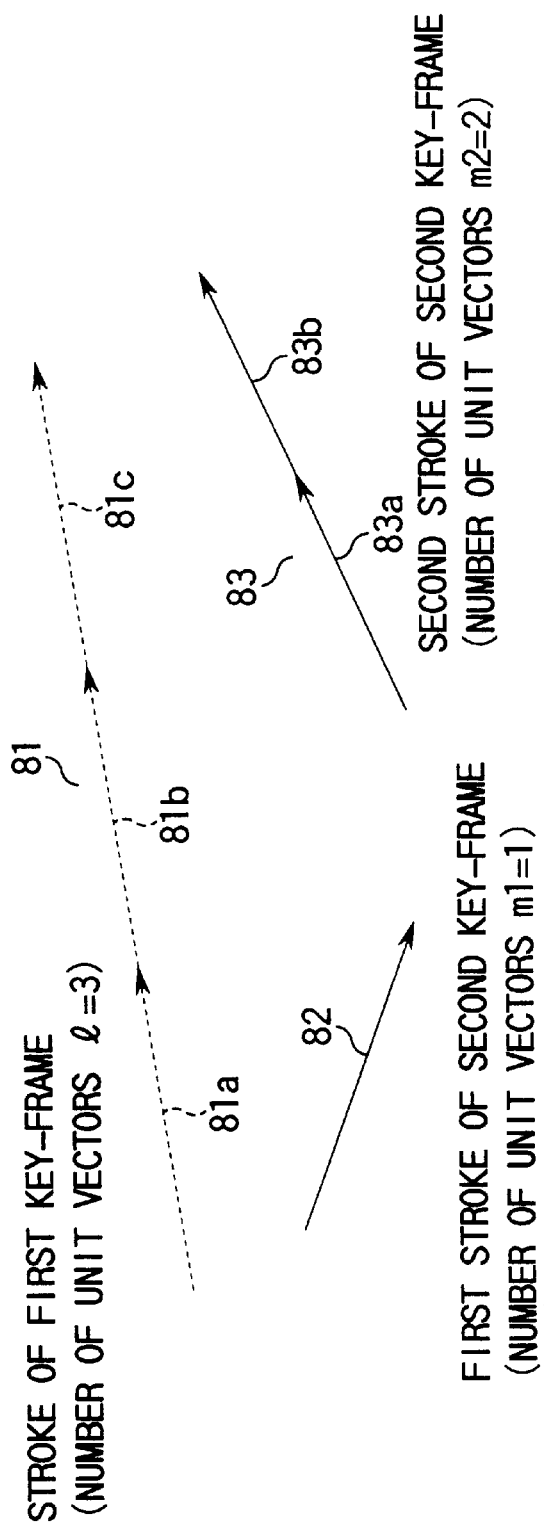
FIG. 58 is a diagram showing quantization of a stroke in a case where the number of corresponding strokes is different.

The stroke in the i-th key-frame input to correspond to the stroke indication number k of the (i−1)-th key-frame is divided into unit vectors (step S51). If strokes 82 and 83 drawn by a user exist on a key-frame (a second key-frame) having key-frame number "1" to correspond to the stroke 81 drawn on the key-frame (a first key-frame) having key-frame number "0" and having stroke indication number k, as shown in, for example, FIG. 58, the stroke 81 has been quantized into unit vectors 81a, 81b, 81c (in this case, the stroke 81 has been quantized in step S10). On the other hand, the stroke 82 is quantized into a unit vector 82 in step S18. The stroke 83 is quantized into unit vectors 83a and 83b. In FIG. 58, the number l of the unit vectors of the stroke 81 in the first key-frame is "3", the numbers m1 and m2 of unit vectors of the stroke 82 of the second key-frame corresponding to the stroke 81 and the second stroke 83 are "1" and "2", respectively.

Since the number of stroke of the i-th key-frame input to correspond to the stroke of the stroke indication number k of the (i−1)-th key-frame is different (step S53), the stroke-correspondence administrating means 11 proceeds the manipulation to step S55. Thus, the stroke-correspondence administrating means 11 distributes unit vectors of the k-th stroke in the (i−1)-th key-frame to the k-th key-frame so as to determine the correspondence between the k-th stroke in the (i−1)-th key-frame and the stroke in the i-th key-frame.

An assumption is made that the number of unit vectors of the k-th stroke in the (i−1)-th key-frame is l (i−1) and the number of unit vectors in each stroke (identified with stroke number j) in the i-th key-frame corresponding to the k-th stroke in the (i−1)-th key-frame is mij. The j-th stroke in the i-th key-frame is supplied with proportionally distributed unit vectors of the k-th stroke in the (i−1)-th key-frame corresponding to the number of unit vectors in the j-th stroke. That is, the number i(i−1)j in the k-th stroke in the (i−1)-th key-frame which is distributed to the j-th stroke in the i-th key-frame is expressed by Equation (4):

$$l(i-1)_j = l(i-1) \cdot mij / \sum_j mij \qquad (4)$$

In an example case shown in FIG. 58, the number l (1) of unit vectors of the stroke 81 in the first key-frame is "3", the number m21 of the unit vectors in the stroke 82 in the second key-frame is "1" and the number $m_{22}$ of the unit vectors in the stroke 83 in the second key-frame is "2". Therefore, the number $f(1)_1$ of the unit vectors of the stroke 81 in the first key-frame allotted to the stroke 82 is "1". Moreover, the number $l(1)_2$ of the unit vectors of the stroke 81 in the first key-frame allotted to the stroke 83 is "2".

If the number l(1) of the unit vectors of the stroke 81 in the first key-frame is different from the total number of unit vectors of the first and second strokes 82 and 83 in the second key-frame, that is, $m_{21}+m_{22}$, the strokes of either of the key-frames may again be quantized to correspond to the larger value to make f(1) and $m_{21}+m_{22}$ to be the same between the two key-frames. When the first and second strokes 82 and 83 are decomposed into unit vectors each having a predetermined length and the total number of the unit vectors of the first and second strokes 82 and 83 is larger than the number of unit vector of the stroke 81, the stroke 81 may again be quantized in order to make the number of the unit vectors of the stroke 81 to be the same as the larger number.

Then, the manipulation proceeds to step S57 so that unit vectors of the corresponding strokes between the two key-frames are stored in the unit-vector storage means 5 in such a manner that the correspondence is made.

In accordance with the number f of interpolations input in step S23 shown in FIG. 5A, the interpolating means 6 generates an interpolating vector between the key-frames having key-frame numbers, for example, "0" and "1" to store the interpolating vector (step S19).

Figure 59:
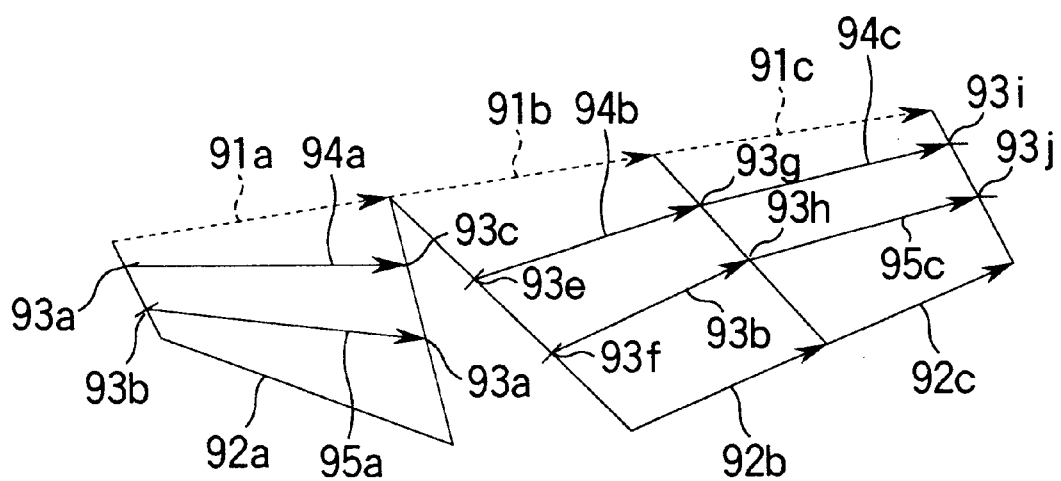
FIG. 59 is a diagram showing independent interpolation for generating an interpolating vector in such a manner that a pair of corresponding unit vectors are made to be independent.

The principle for generating the interpolating vector will now be described with reference to FIG. 59. FIG. 59 shows a case in which the number of the interpolations is f=2, that is, the number of interpolating frames is two. The method of generating the interpolating vector shown in FIG. 59 is an independent interpolation in which unit vectors of a pair of corresponding unit vectors are independently used to generate interpolating vectors.

When interpolating vectors between unit vectors 91a to 91c obtained by quantizing strokes on the first key-frame and a unit vector 92a of the first stroke on the corresponding second key-frame and unit vectors 92b and 92c of the second stroke are obtained as shown in FIG. 59, start points and end points of the corresponding pair of the unit vectors are connected to one another. Then, equal division with (f+1) is performed with respect to the number f (which is f=2 in this case) of the frames for interpolating the unit vectors so that interpolating points are obtained. Interpolating points 92a to 93b and 93c and 93d are obtained for the pair of the unit vectors 91a and 92a. Interpolating points 93e and 93f and 93g and 93h are obtained for the pair of the unit vectors 91b and 92b. Interpolating points 93e and 93f and 93i and 93j are obtained for the pair of the unit vectors 91c and 92c. As shown in FIG. 59, the interpolating points are connected to one another so that interpolating vectors 94a to 94c and 95a to 95c are generated. That is, an interpolating vector 94a is generated from the pair of the unit vectors 91a and 92a by connecting the interpolating points 93a and 93c to each other. Moreover, an interpolating vector 95a is generated by connecting the interpolating points 93b and 93d to each other. An interpolating vector 94b is generated from the pair of the unit vectors 91b and 92b by connecting the interpolating points 93e and 93g to each other. Moreover, an interpolating vector 95b is generated by connecting the interpolating points 93f and 93h to each other. An interpolating vector 94c is generated from the pair of the unit vectors 91c and 92c by connecting the interpolating points 93g and 93i to each other. Moreover, an interpolating vector 95c is generated by connecting the interpolating points 93h and 93j to each other.

FIGS. 60A and 60B show an example of unit vectors between the corresponding strokes stored in the unit-vector storage means 5. FIGS. 60A and 60B show a case in which an individual table is prepared for each key-frame so that the correspondence between corresponding unit vectors are stored and administrated in each table in unit vector units.

As shown in FIG. 60A, the table of the first key-frame is arranged to store data of the unit vector, or a pointer for a storage region in which the unit vector is stored. Moreover, a unique ID identifiers of a unit vector on a second key-frame corresponding to the unit vector or a pointer for a storage region, in which data of the unit vector is stored, is stored to correspond to the unique ID (identifier) given to the unit vector of one or more strokes drawn on the key-frame. As shown in FIG. 60B, also the table of the second key-frame is arranged to store data of the unit vector, or a pointer for a storage region in which the unit vector is stored. Moreover, a unique ID identifiers of a unit vector on a third key-frame corresponding to the unit vector or a pointer for a storage region, in which data of the unit vector is stored, is stored to correspond to the unique ID (identifier) given to the unit vector of one or more strokes drawn on the second key-frame.

FIGS. 61A and 61B shows another example of storage of the unit vector between corresponding strokes in the vector quantizing means 4. FIGS. 61A and 61B show a case in which an individual table is prepared for each key-frame to store and administrate the correspondence between unit vectors on the corresponding key-frames in each table and in unit vector group. As an example of grouping the unit vectors, grouping is performed for each of corresponding strokes of each key-frame. Since a unit vector 91a on the first key-frame and the unit vector 92a of the first stroke on the second key-frame correspond to each other in an example case shown in FIG. 59, they belong to the same group. Since unit vectors 91b and 91c on the first key-frame and unit vectors 92b and 92c of the second stroke on the second key-frame correspond to one another, they belong to the same group.

As shown in FIG. 61A, for example, the table of the first key-frame is arranged to store data of the unit vector or a pointer for a storage region, in which the unit vector is stored. Moreover, information (an identifier for the group or a pointer for a storage region in which data of the corresponding unit vector belonging to the group) for linking to the group to which the unit vector belongs is stored to correspond to unique ID (identifier) given to each unit vector of one or more strokes drawn on the key-frame. As shown in FIG. 61B, the table of the second key-frame is arranged to store data of the unit vector or a pointer for a storage region in which the unit vector is stored and information (an identifier for the group or a pointer for a storage region in which data of the corresponding unit vector belonging to the group) for linking to the group to which the unit vector belongs) to correspond to the unique ID (identifier) given to each unit vector of one or more strokes drawn on the key-frame. In the examples shown in FIGS. 61A and 61B, unit vectors of the first key-frame given unit ID "1-1" and "1-2" and unit vectors of the second key-frame given unique ID "2-1", "2-2" and "2-3" belong to "Group 1". Therefore, unit vectors of the second key-frame given unique ID "2-1", "2-2" and "2-3" correspond to the unit vectors of the first key-frame given unique ID "1-1" and "1-2".

Referring back to FIG. 5B, all stroke numbers j drawn on the key-frame having the key-frame number i=0 are subjected to the processes in steps S14, S15, S16, S17, S18 and S19 (step S21).

Another method of generating an interpolating vector adapted to the interpolating vector generating means and arranged to be performed in step S19 shown in FIG. 5B will now be described. The independent interpolation (the first interpolating method) for generating the interpolating vector for each of a pair of corresponding unit vectors has been described with reference to FIG. 59. In this example, combinations of corresponding unit vectors in a predetermined number f of interpolating frames are changed to correspond to the number of unit vectors included in the strokes so as to generate interpolating vectors. Interpolating vectors for the interpolating frames for use in the latter process are generated by the independent interpolation (a second interpolating method).

Figure 54:
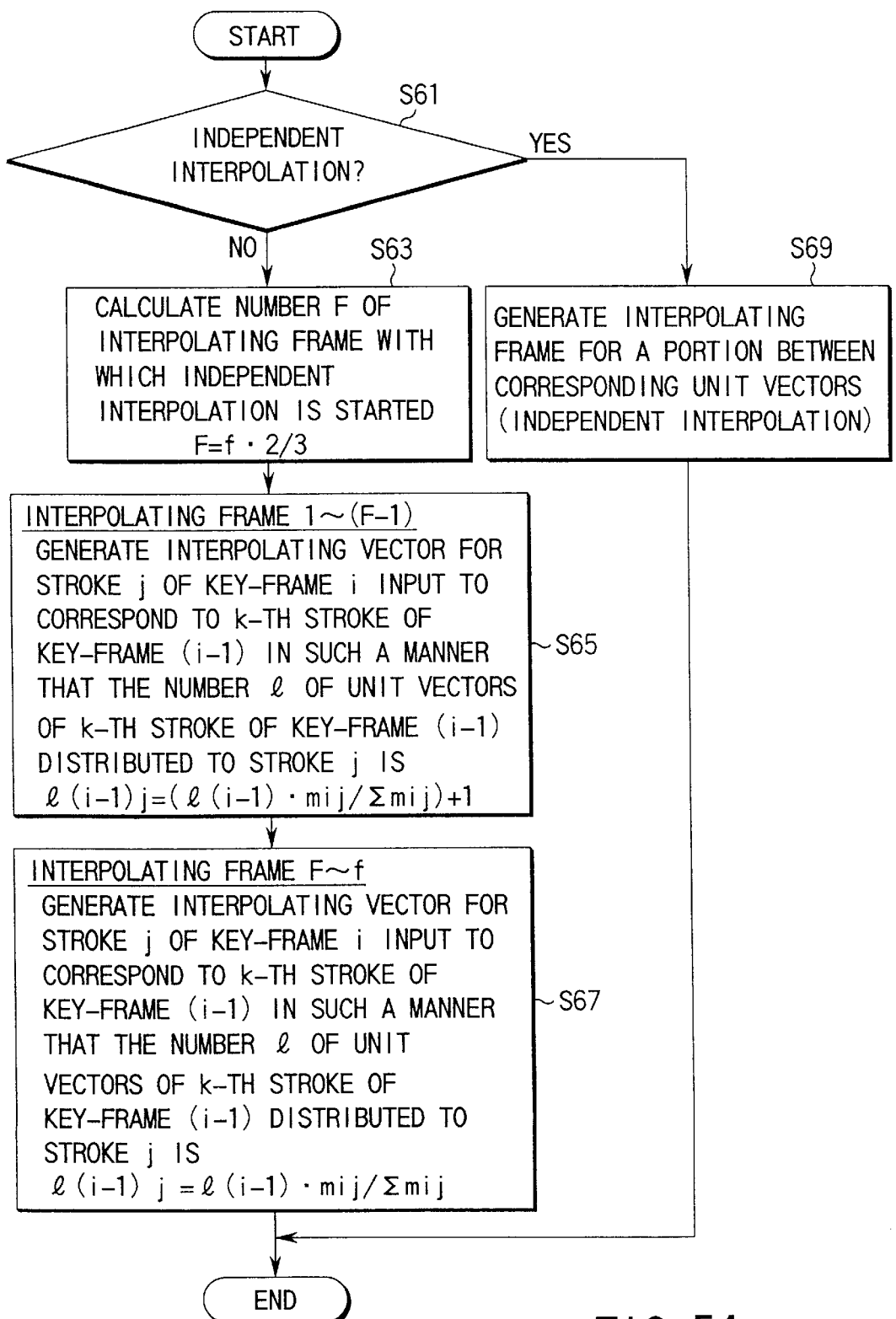
FIG. 54 is a flow chart showing step S18 shown in FIG. 5B.

A flow chart shown in FIG. 54 shows a detailed process in step S19 shown in FIG. 5B. Either of the first interpolating method or the second interpolating method can be selected in accordance with an instruction from a user or a previous determination. When the independent interpolation, which is the first interpolating method, has been instructed or set (step S61), the manipulation proceeds to step S69 so that the independent interpolation is performed as described with reference to FIG. 59. If the second interpolating method has been instructed or set (step S61), the manipulation proceeds to step S63 so that number F of the interpolating frame of the number f of interpolations with which the independent interpolation is started is determined. The number F can be obtained by, for example, F=f·⅔. Then, the manipulation proceeds to step S65 so that the combination of unit vectors having the corresponding relationship of the first to (F−1)-th interpolating frames is changed to correspond to the number of unit vectors included in the strokes. Thus, the interpolating vectors are generated. The principle of the generation will briefly be described. The number l(i−1)$_j$' of the k-th stroke in the (i−1)-th key-frame which is distributed to the j-th stroke in the i-th key-frame input to correspond to the k-th stroke in the (i−1)-th key-frame can be expressed by Equation (5):

$$l(i-1)_j = \left\{ l(i-1) \cdot mij \Big/ \sum_j mij + 1 \right\}$$  (5)

That is, unit vectors of the k-th stroke in the (i−1)-th key-frame are distributed by the number l(i−1)$_j$' in place of the number t(i−1)$_j$ to the j-th stroke of the i-th key-frame. The correspondence between the unit vectors included in the j-th stroke in the i-th key-frame and the unit vectors distributed to the j-th stroke is used to generate the interpolating vectors.

Figure 62:
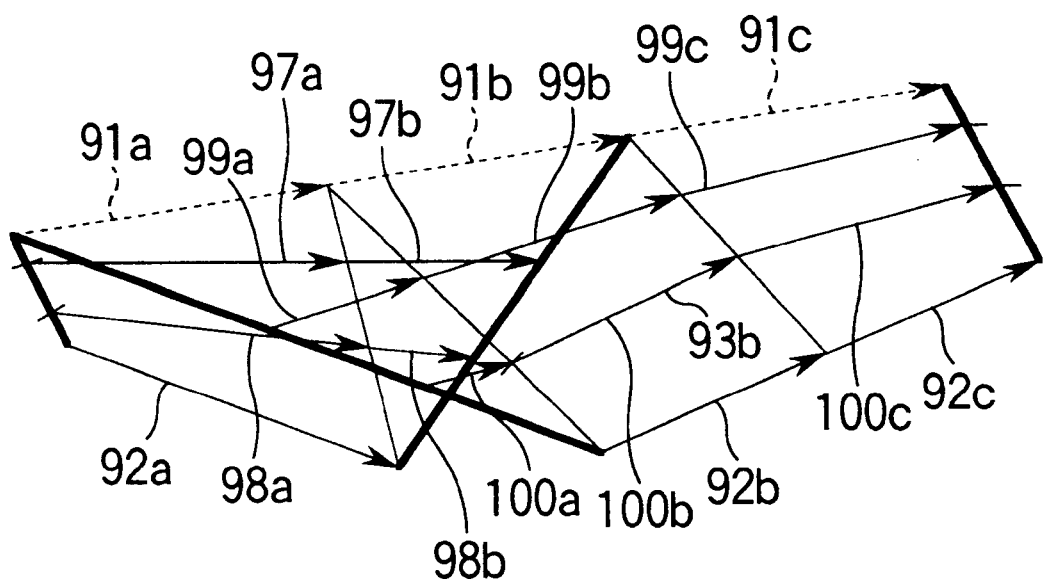
FIG. 62 is a diagram showing a method of generating an interpolating vector in such a manner that the combination of corresponding unit vectors is changed to correspond to the number of unit vectors included in the stroke.

Referring to FIG. 62, the method of generating the interpolating vectors by changing the combinations of the corresponding unit vectors to correspond to the number of unit vectors included in the stroke will now be described. In this case, two interpolating frames are generated. As shown in FIG. 62, interpolating vectors between unit vectors 91a to 91c obtained by quantizing the strokes on the first key-frame, a unit vector 92a of the first stroke on the corresponding second key-frame and unit vectors 92b and 92c of the second stroke are obtained. At this time, the number of unit vectors of the first key-frame allotted to the first stroke of the second key-frame is "2" because of Equation (5) which are unit vectors 91a and 91b. The number of unit vectors of the first key-frame allotted to the second stroke of the second key-frame is "3" because of Equation (5) which are unit vectors 91a, 91b and 91c. Therefore, in the corresponding relationship between the unit vectors, start points and end points of the corresponding unit vectors are connected to one another similar to the method shown in FIG. 59. The connected region is equally divided by the number corresponding to the number of frames to be interpolated, that is, by three in this case. In accordance with the correspondence between the unit vectors 91a, 91b and 92a, interpolating vectors 97a, 97b, 98a and 98b are generated. In accordance with the correspondence between the unit vectors 91b, 91c, 92b and 92c, interpolating vectors 99a to 99c and 100a to 100c are generated.

Then, the manipulation proceeds to step S67 so that interpolating vectors for the F-th to f-th interpolating frames are generated by the independent interpolation shown in FIG. 59. At this time, unit vectors of the k-th stroke in the (i−1)-th key-frame are distributed by the number l(i−1)$_j$ to the j-th stroke of the i-th key-frame so that interpolating vectors are generated in accordance with the correspondence between the unit vectors included in the j-th stroke in the i-th key-frame and the unit vectors distributed to the j-th stroke.

Fifth Embodiment

A process for producing animation in accordance with an original image having a general region will now be described.

Figure 63:
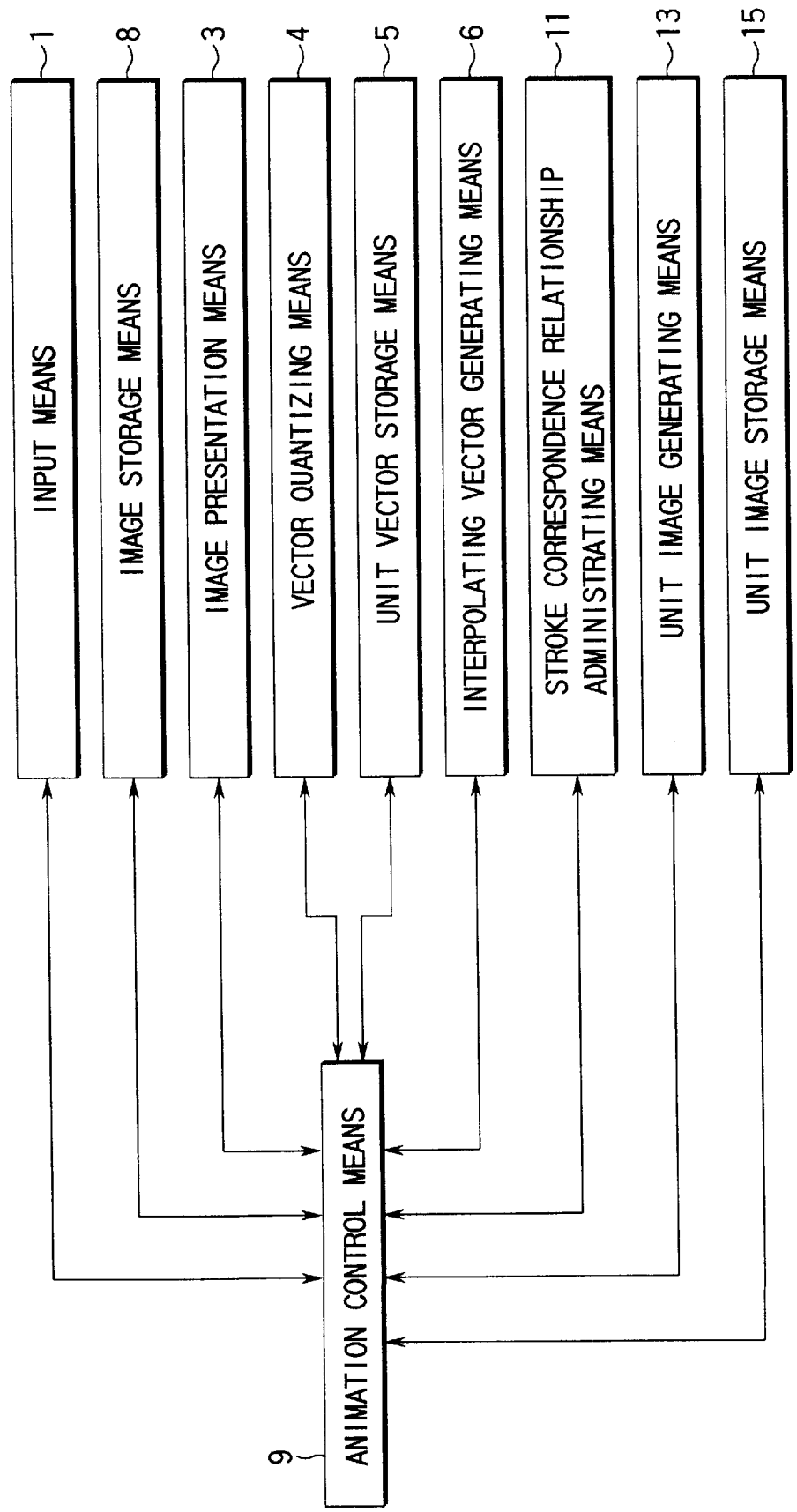
FIG. 63 is a diagram showing an example of the structure of an animation producing apparatus according to a fifth embodiment of the present invention.

FIG. 63 is a diagram schematically showing an example of the structure of an animation producing apparatus according to a fifth embodiment of the present invention. Elements which are shown in FIG. 63 and which are the same as those shown in FIG. 52 are given the same reference numerals. As shown in FIG. 63, the animation producing apparatus comprises an image storage means 8 for storing image data serving as an original image (in a case where the original image is in the form of a sprite structure, a plurality of sprite image data is stored as a set); an image presentation means 3 for displaying, on a predetermined display unit, image data stored in the image storage means 8 and animation or the like generated in accordance with image data; an input means 1 for inputting a stroke to a portion of the image displayed by the image presentation means 3 and required to have movement; a vector quantizing means 4 for decomposing the stroke input through the input means 1 into unit vectors each having a predetermined length; a unit-vector storage means 5 for storing the generated unit vectors; an interpolating vector generating means 6 for generating an interpolating vector between the two strokes in accordance with unit vectors of the corresponding two strokes; a stroke-correspondence administrating means 11 for determining the correspondence between the strokes input through the input means 1 and the correspondence between the unit vectors of the corresponding strokes; a unit-image generating means 13 for cutting a fractional image region to generate a unit image in accordance with the length and direction of the generated unit vector; a unit-image storage means 15 for storing the generated unit images: and an animation control means 9 for generating sequential animation by performing control to synchronize the above-mentioned means.

The animation producing apparatus according to the fifth embodiment has the above-mentioned structure. When the animation producing apparatus is supplied with a skeltal stroke of the original image and a stroke indicating its changed shape with respect to the original image stored in the image storage means 8, the stroke-correspondence administrating means 11 determines the correspondence between the strokes. The vector quantizing means 4 quantizes the skeltal strokes and strokes indicating the changed shape into unit vectors each having a predetermined length. In accordance with the number of unit vectors of each of the corresponding strokes, the stroke-correspondence administrating means 11 determines the correspondence between the unit vectors between the corresponding strokes. The interpolating means 6 generates interpolating vectors in accordance with the amount of change between the corresponding unit vectors of the corresponding stroke s and a predetermined number of interpolating frames. The unit-image generating means 13 extracts, from the original image, an image region (a unit image) having a predetermined size along each unit vector of the skeltal stroke. The animation control means 9 moves each unit image in accordance with the corresponding unit vector and the interpolating vector so as to be superimposed on the original image so that a plurality of image frames are generated. Thus, animation is generated. Since the manipulation which is performed by the animation producing apparatus shown in FIG. 63 is similar to that described with reference to FIGS. 24A, 24B and 25, the manipulation is omitted from description.

A flow chart of the overall manipulation of the animation producing apparatus shown in FIG. 63 is shown in FIGS. 24A and 24B.

Since extraction of the unit image from the original image and making correspondence between the extracted unit images and the unit vectors are similar to those described with reference to FIG. 27, they are omitted from description.

Since the movement of the unit image corresponding to the unit vector is similar to that described with reference to FIGS. 32A to 32C, the movement is omitted from description.

The user is caused to input the stroke of the changed shape with respect to the skeltal stroke input to the original image. Then, for example, a process for key-frame number "1", is ended (steps S13 to S21).

Then, the manipulation proceeds to step S6 so that the key-frame number is updated to input the stroke of the further changed shape (step S13). Then, above-mentioned steps S14 to S21 are repeated so that sequential animation composed of the key-frames and their interpolating frames is generated. If necessary, a required original image may be read from the image storage means 8 in steps S3 and S4 to use it as the key-frame similarly to the above-mentioned processes (steps S5, S6 and S13 to S21).

When presentation of the generated animation is performed, the interpolating vectors are read from the unit-vector storage means 5 and the corresponding unit images are read from the unit-image storage means 15. Then, they are drawn by the image presentation means 3 so as to be displayed on the predetermined display unit.

As described in the fourth embodiment, the corresponding strokes and corresponding unit vectors do not always correspond to one another. That is, the numbers of corresponding unit vectors between the corresponding strokes are not the same. When the stroke at the original position of the unit image is somewhat shorter than the stroke at the moved position, the number of unit vectors of the stroke at the original position is smaller than the number of strokes at the moved position. In this case, one unit vector of the stroke at the original position corresponds to a plurality of unit vectors on the stroke at the moved position. Thus, correspondence must be considered when a unit image is rotated and moved.

Figure 64:
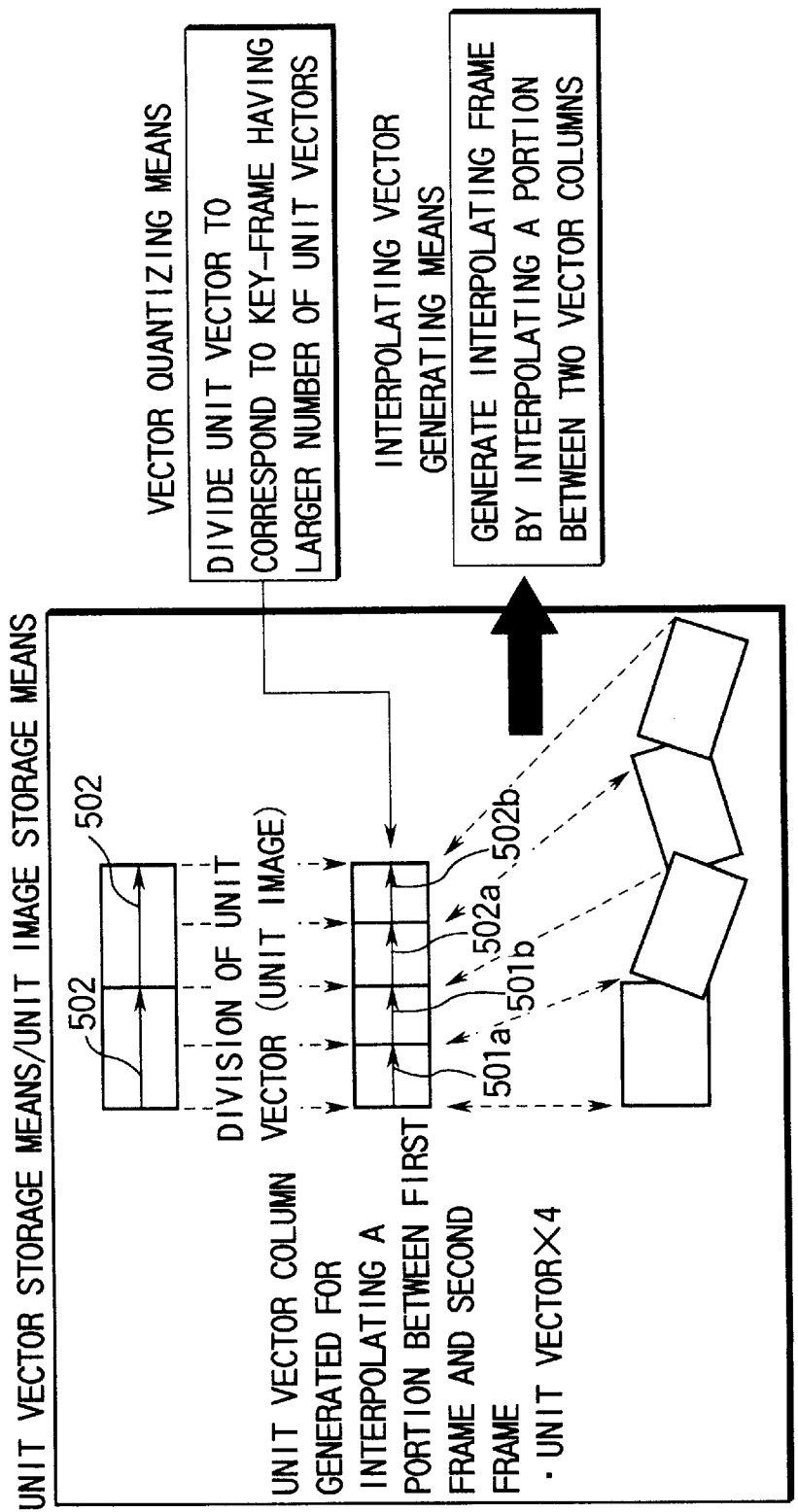
FIG. 64 is a diagram showing division of a unit vector and that of a unit image which is performed when the unit vector is divided.

In this case, the vector quantizing means 4 searches the inside portion of the unit-vector storage means 5 and divides a unit vector to correspond to the frame having a larger number of unit vectors for one stroke, as shown in FIG. 64. The number of unit vectors are, in stroke units, compared between the first frame (the original image) and the second frame.

Figure 65:
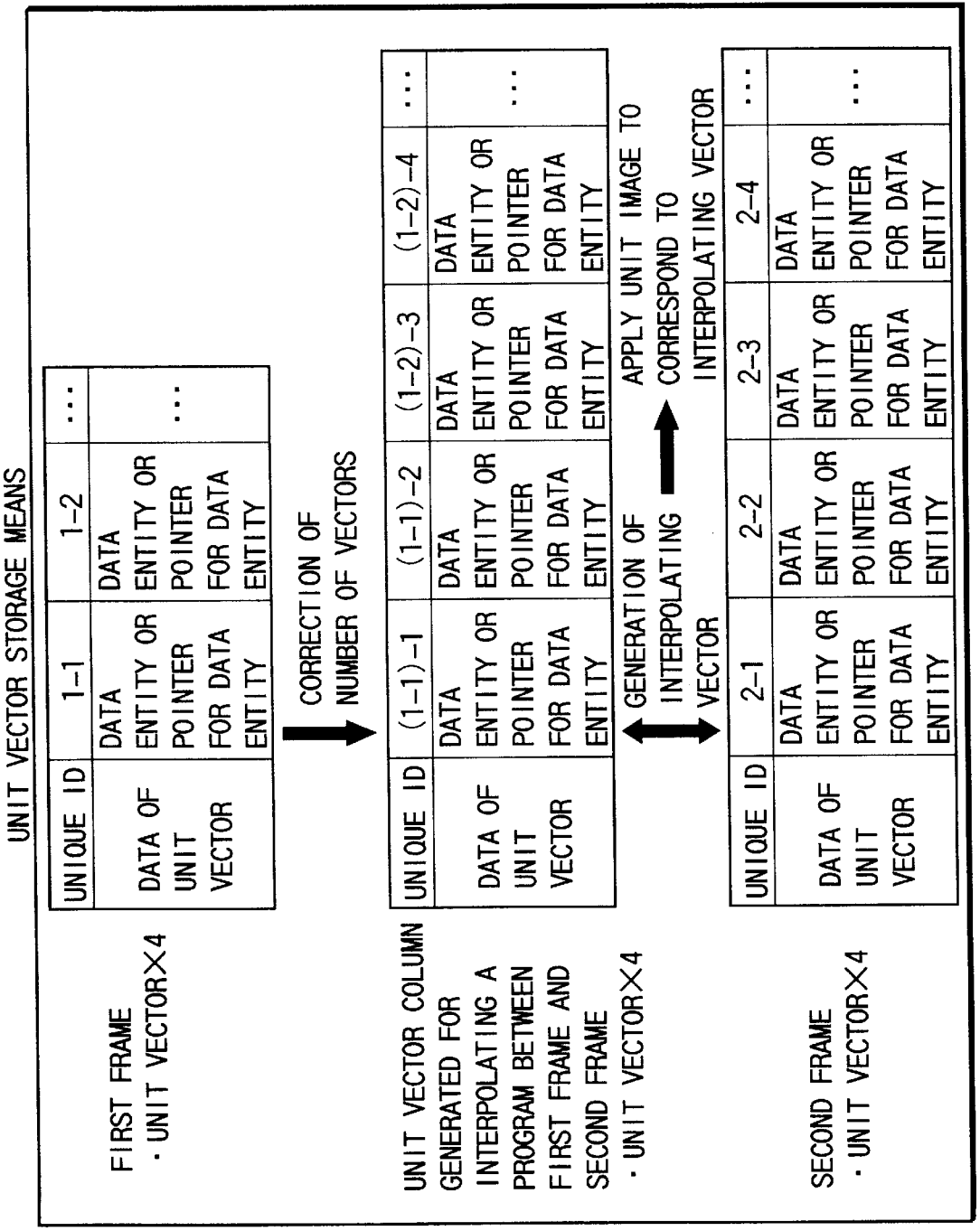
FIG. 65 is a diagram showing an example of storage of a unit vector which is performed when the unit vector is divided.

If the number of unit vectors on the second frame for a certain stroke is four and the number of unit vectors on the first frame is two (unit vectors 501 and 502)(refer to FIG. 65), each of the unit vectors of the first frame is divided into two. Thus, unit vectors 501a, 501b, 502a and 502b are generated so as to be stored in the unit-vector storage means 5 (see FIG. 65). Moreover, corresponding unit images are divided so that unit images corresponding to the unit vectors 501a, 501b, 502a and 502b are generated. Thus, data of four unit vectors in the second frame previously stored in the unit-vector storage means 5 and four unit vectors of the first frame obtained by the dividing manipulations are made to correspond to one another (see FIG. 65). The chunk divided between the unit vectors is rotated, moved and superimposed so that interpolating frames are generated. FIG. 65 schematically shows an example of storage in the unit-vector storage means 5 in the case where the unit vectors are divided.

If the stroke at the original position is somewhat longer than the stroke at the moved position, the number of unit vector of the stroke at the original position is larger than the number of those of the stroke at the moved position. In this case, one unit vector of the stroke at the moved position corresponds to a plurality of unit vectors on the stroke at the original position. Therefore, correspondence between the unit vectors must be considered when the unit image is rotated and moved.

Figure 66:
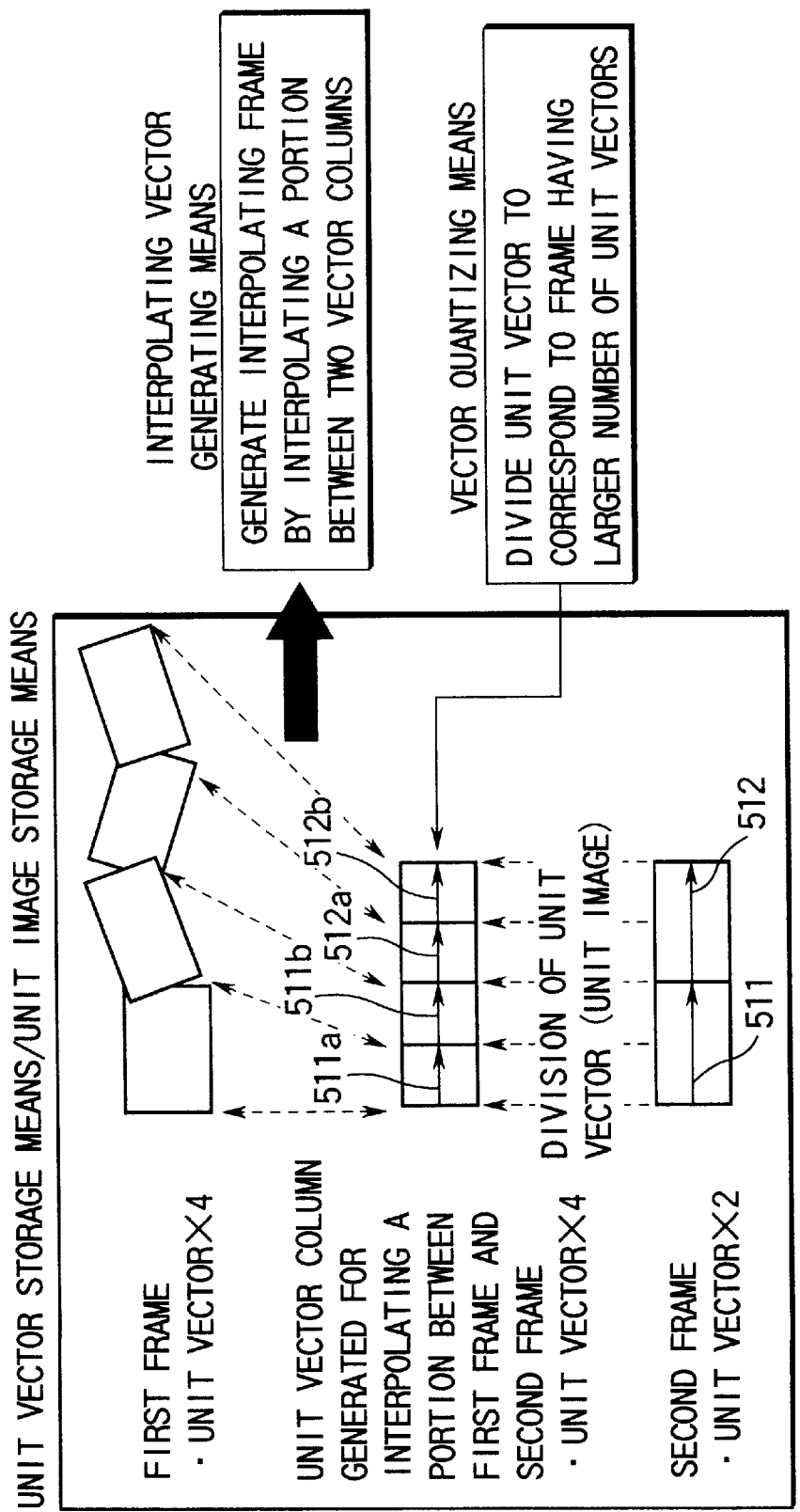
FIG. 66 is a diagram showing division of the unit vector.
Figure 67:
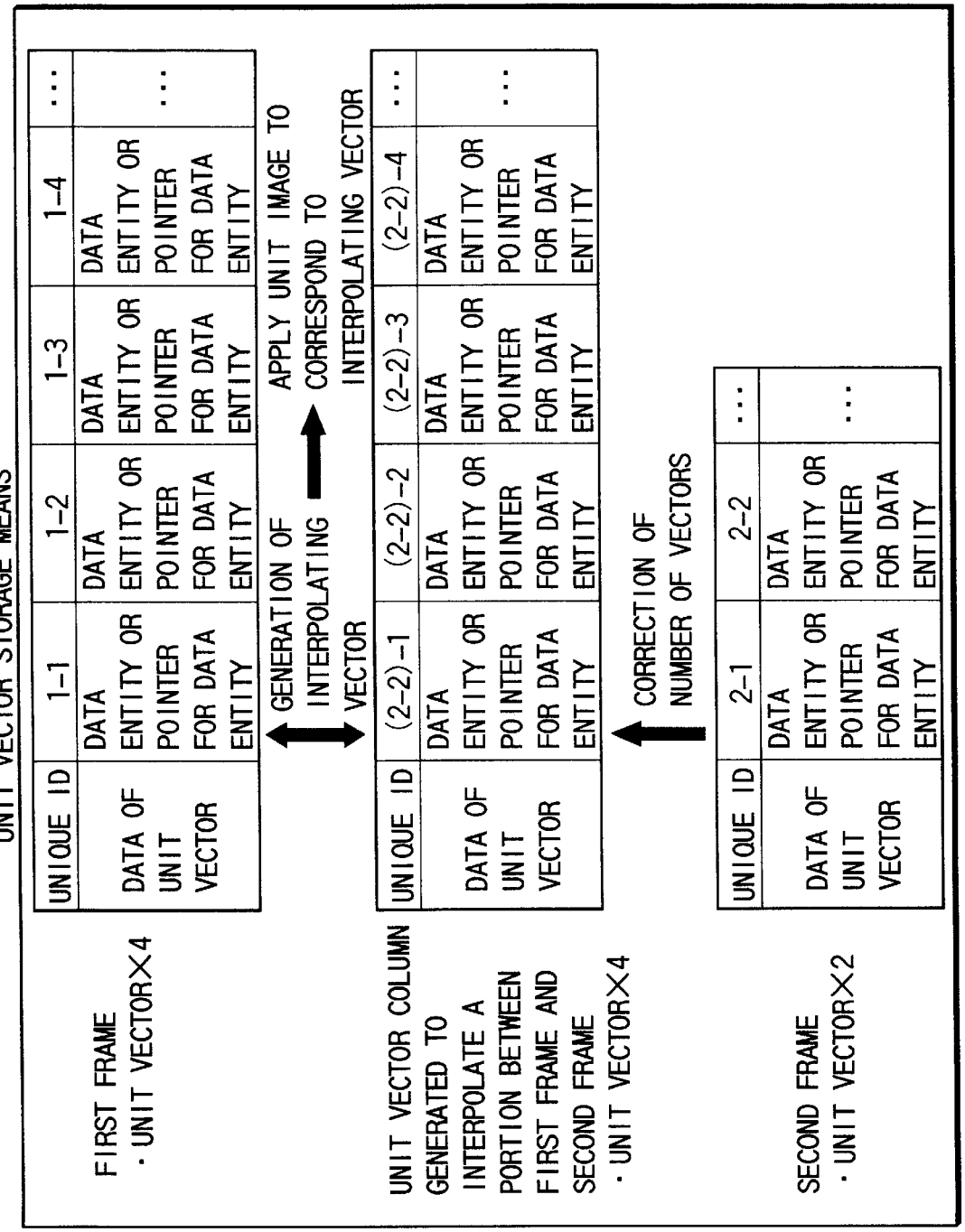
FIG. 67 is a diagram showing an example of storage of a unit vector which is performed when the unit vector is divided.

In this case, the vector quantizing means 4 searches the inside portion of the unit-vector storage means 5 and divides a unit vector to correspond to the frame having a larger number of unit vectors for one stroke, as shown in FIG. 66. The number of unit vectors are, in stroke units, compared between the first frame (the original image) and the second frame. If the number of unit vectors on the first frame for a certain stroke is four and the number of unit vectors on the second frame is two (unit vectors 511 and 512)(refer to FIG. 67), each of the unit vectors of the second frame is divided into two. Thus, unit vectors 511a, 511b, 512a and 512b are generated so as to be stored in the unit-vector storage means 5 (see FIG. 67). Thus, data of unit vector in four units in the first frame previously stored in the unit-vector storage means 5 and four unit vectors of the second frame obtained by the dividing manipulations are made to correspond to one another (see FIG. 67). The four unit images on the first frame are rotated, moved and superimposed between the unit vectors so that interpolating frames are generated. FIG. 67 schematically shows an example of storage in the unit-vector storage means 5 in the case where the unit vectors are divided.

A process which is performed by the unit-image generating means 13 will now be described.

Figure 68:
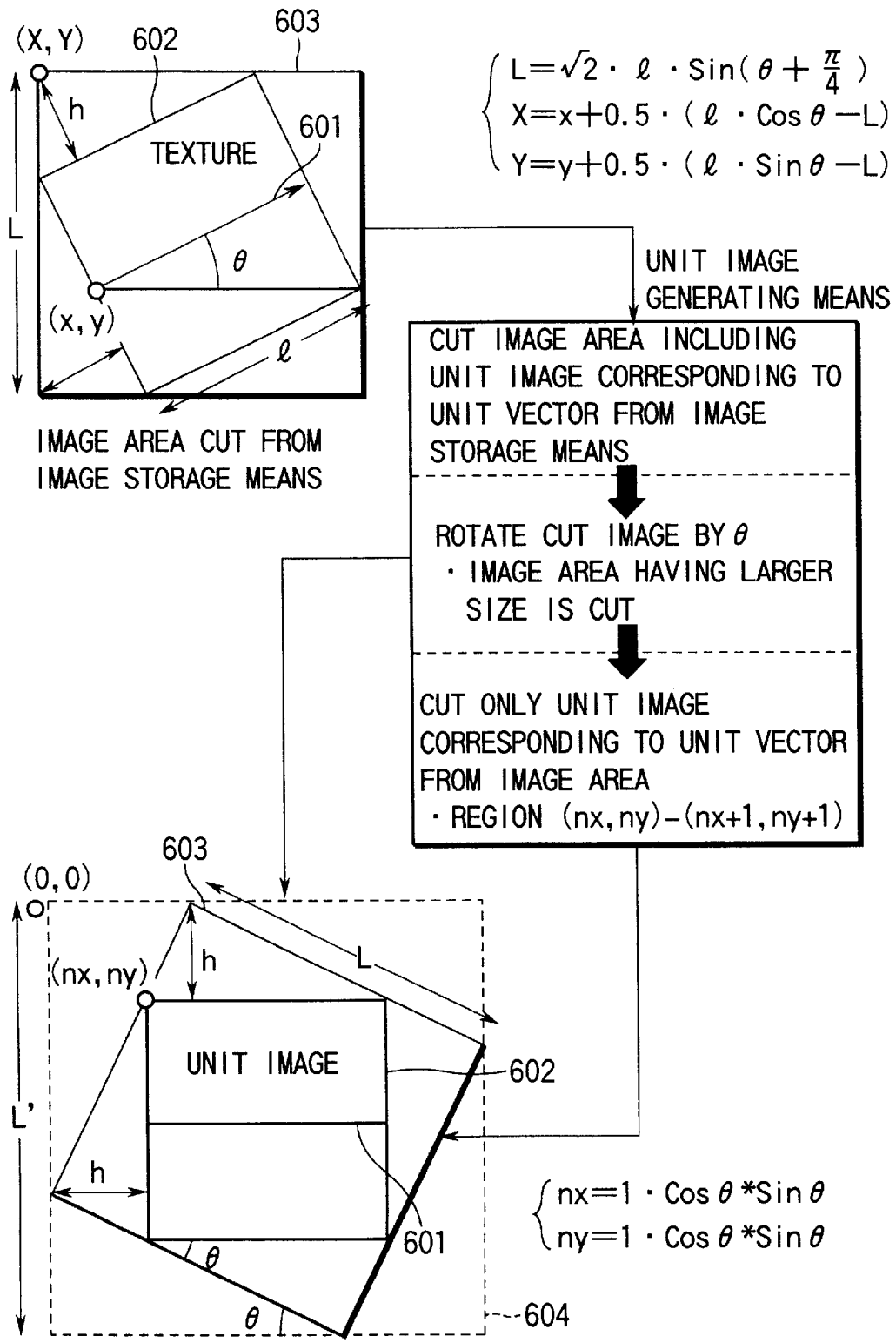
FIG. 68 is a diagram showing normalization of a unit image.

As shown in FIG. 68, the unit-image generating means 13 cuts, from the original image stored in the image storage means 8, a unit image corresponding to the unit vector. Assuming that the length of the unit vector is l and the angle of the image made from the horizontal direction is $\theta$, an image region 603 having a length L and including a square unit image which has a length of l along the unit vector 601 is cut. At this time, coordinates (X, Y) of a point (an upper left point) serving as a reference for the length L and the image region 603 is expressed by the above-mentioned Equation (2).

The cut image region 603 is rotated by an angular degree of $\theta$ so that an image region 604 having a larger size is generated.

Then, only a unit image 602 corresponding to the unit vector 601 is cut from the image region 604. The reference point (the upper left vertex (nx, ny)) of the unit image 601 which is cut from the image region 604 is expressed by the above-mentioned Equation (3) when the upper left vertex of the image region 604 is made to be (0, 0).

The unit image 602 cut from the image region 604 is superimposed on the image at the moved position.

As described above, the unit-image generating means 13 cuts a unit image from an original image in such a manner that a larger image region including the unit image is cut. Moreover, a unit image corresponding to the unit vector and having a normalized size (a square having sides 1) is cut from the above-mentioned larger image region so as to be stored in the unit-image storage means 15.

Sixth Embodiment

In the fifth embodiment, a process which is performed when the shape of the cut unit image has a square shape has been described. In the sixth embodiment, a process will be described which is performed when the cut unit image is not formed into a square or a rectangle and which is arranged to form and normalize the unit image into a square or a rectangle.

Hitherto, cutting and drawing of an image adjacent to a stroke have been limited to a block in units of rectangles. Drawing of an image has been limited to rotation, enlargement and contraction and deformation to a trapezoid of a cut rectangular block. Therefore, an animation image which can be generated has some limits. That is, the image region cut from a portion adjacent to the stroke is not always rectangle. In the above-mentioned case, an image region to be cut must be divided into a multiplicity of rectangles having different sizes. There arises a problem in this case in that a great quantity of data must be processed. Even if the image region is divided into rectangles and cut the same, the region cannot completely be covered when the image region is superimposed on the interpolating frame. Thus, there arises a problem in that an error cannot be prevented. Therefore, it is preferable that the image region to be cut has a shape along the stroke.

Figure 69:
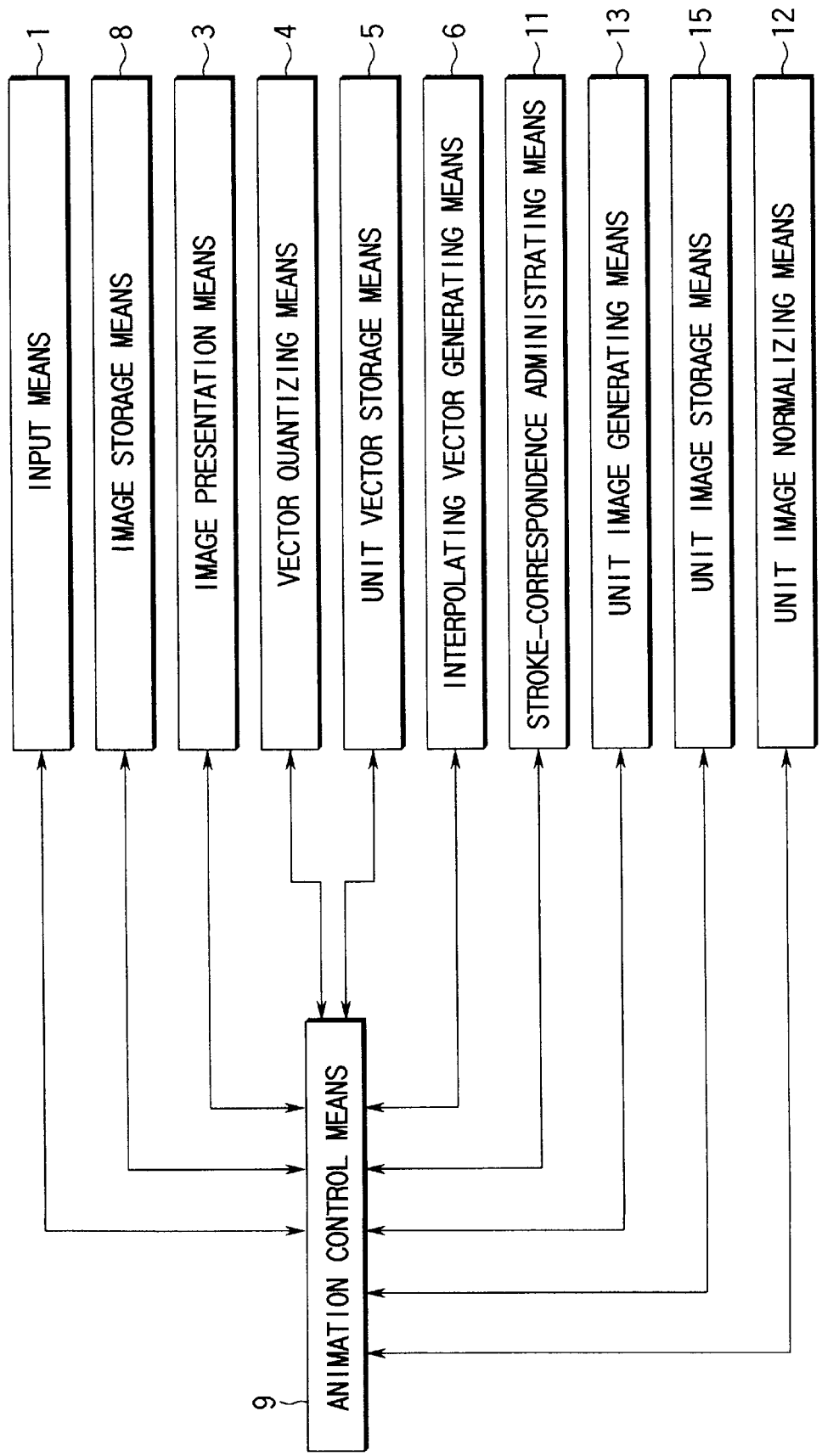
FIG. 69 is a diagram schematically showing an example of the structure of an animation producing apparatus according to a sixth embodiment of the present invention.

FIG. 69 is a diagram showing an example of the structure of an animation producing apparatus according to a sixth embodiment of the present invention. As shown in FIG. 69, the animation producing apparatus comprises an image storage means 8 for storing image data serving as an original image (in a case where the original image is in the form of a sprite structure, a plurality of sprite image data is stored as a set); an image presentation means 3 for displaying, on a predetermined display unit, image data stored in the image storage means 8 and animation or the like generated in accordance with image data; an input means 1 for inputting a stroke to a portion of the image displayed by the image presentation means 3 and required to have movement; a vector quantizing means 4 for decomposing the stroke input through the input means 1 into unit vectors each having a predetermined length; a unit-vector storage means 5 for storing the generated unit vectors; an interpolating vector generating means 6 for generating an interpolating vector between the two strokes in accordance with unit vectors of the corresponding two strokes; a stroke-correspondence administrating means 11 for determining the correspondence between the strokes input through the input means 1 and the correspondence between the unit vectors of the corresponding strokes; a unit-image generating means 13 for cutting a fractional image region to generate a unit image in accordance with the length and direction of the generated unit vector; a unit-image storage means 15 for storing the generated unit images: a unit-image normalizing means 12 for shaping a unit image into a regular shape, such as a square if the unit image generated by the unit-image generating means 13 is not a regular shape such as a square and a rectangle; and an animation control means 9 for generating sequential animation by performing control to synchronize the above-mentioned means. Note that the same elements as those shown in FIGS. 52 and 63 are given the same reference numerals.

A portion different from the fifth embodiment will now be described. When a unit image is generated by the unit-image generating means 13, it is sometimes preferable that the unit image in the form of a quadrangle except for a square and a rectangle is cut because of the relationship with the adjacent unit image in a case where the image region is, for example, a bent elbow as shown in FIG. 68. Irregular shape unit images except for the predetermined shape, such as the square and rectangle, require a complicated process when the unit image is stored in the unit-image storage means 15 comprising a memory such as a RAM. Therefore, the unit-image normalizing means 12 shapes a unit image which is not a square or a rectangle into a regular shape such as a square or a rectangle when the unit image is stored in the unit-image storage means 15 (normalization of a unit image). Then, the normalized unit image is stored in the unit-image storage means 15. When presentation of the generated animation is performed, the image presentation means 3 reads interpolating vectors from the unit-vector storage means 5 and reads unit images corresponding to the interpolating vectors from the unit-image storage means 15. If the read unit images are normalized unit images, the image presentation means 3 restores the shape to the original shape, and then performs drawing and displays the drawn image on the predetermined display unit.

Figure 70:
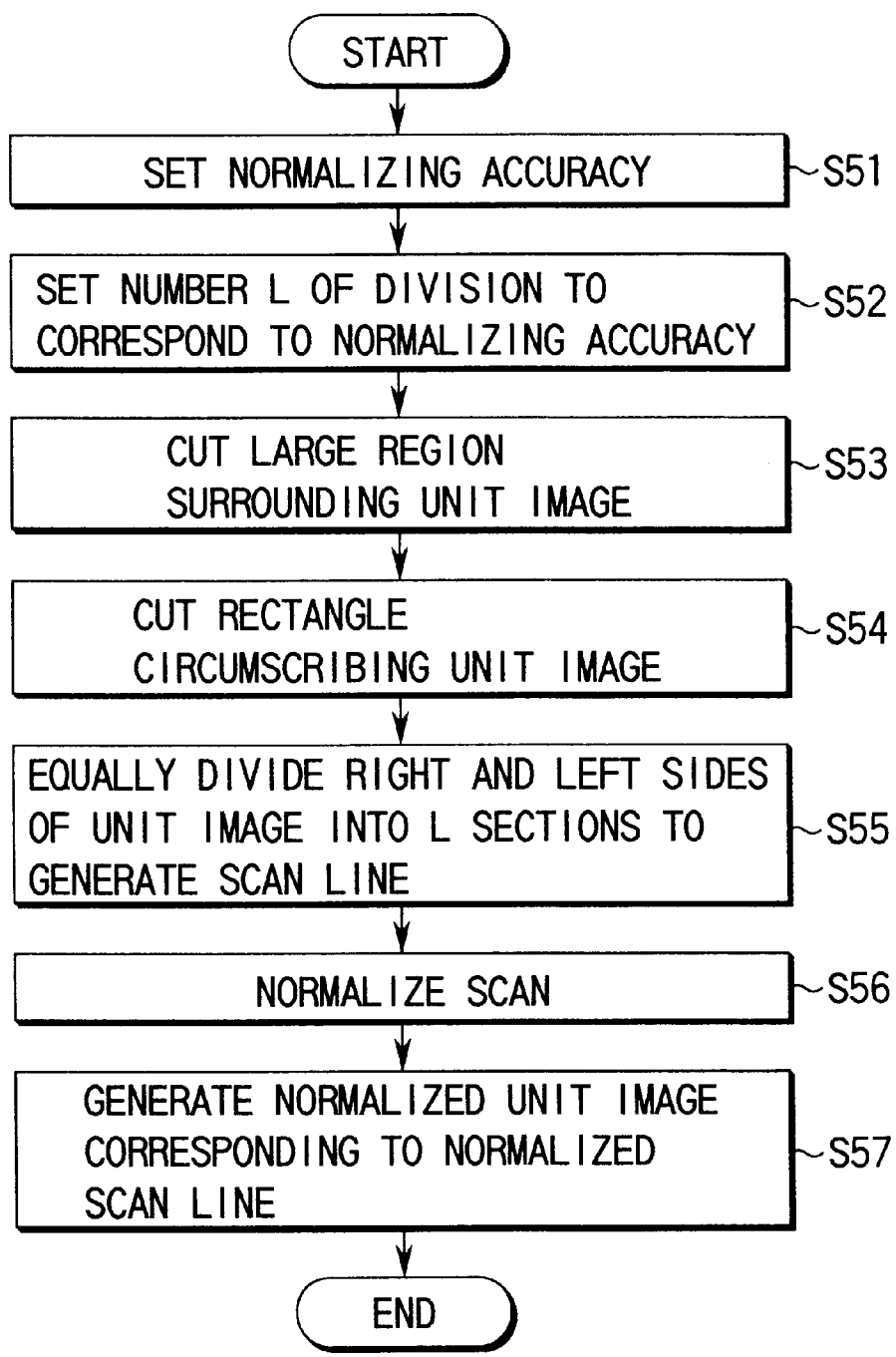
FIG. 70 is a flow chart of the manipulations of a unit image generating means and a unit image normalizing means.

Referring to a flow chart shown in FIG. 70, the manipulations of the unit-image generating means 13 and the unit-image normalizing means 12 will now be described. The "normalization" is an manipulation for vertically and horizontally expanding a unit image into a square or a rectangle. A normalized unit image exhibiting excellent preserbility (excellent accuracy in the normalization) of image data can be obtained in proportion to the fineness of extending lines of the original unit image.

Initially, an accuracy is set with which a quadrangular unit image except for a square or a rectangle is normalized is set. The accuracy may be instructed by, for example, a user (step S51). The number L of extension lines corresponding to the accuracy in the instructed normalization is set (step S52).

Then, as shown in FIG. 71A, the unit-image generating means 13 cut, from an original image stored in the image storage means 8, a region 702 surrounding a unit image (a quadrangle surround by points P1, P2, P3 and P4) 701 corresponding to unit vectors (step S53). As shown in FIG. 71B, a rectangular region 703 circumscribing the unit image is cut (step S54). As shown in FIG. 71C, the right and left sides of the unit image 701 are equally divided into L sections, and corresponding divided points on the right and left sides are connected to one another so that scan lines 704*a* to 704*e* are generated. Moreover, the upper and lower sides of the unit image 701 are equally divided with a predetermined number of divisions, for example, "2", corresponding to a normalization accuracy which has been instructed. Then, the divided points of the upper and lower sides are connected to one another so that a scan line 704*f* is generated (step S55). As shown in FIG. 71C, the generated scan lines 704*a* to 704*f* are rotated and/or moved to suit the circumscribing rectangle 703 so that the scan lines are normalized (step S56). As shown in FIG. 71D, image data adjacent to the scan lines are rotated and/or moved to correspond to the normalized scan lines so that a normalized unit image is generated (step S57). The process may be performed by, for example, a method called "Bilinear Warping". The method has been disclosed in Modern Image Processing: Warping, Morphing, and Classical Techniques (Academic Press, pp. 102 to 108).

A process for normalizing scan lines which is performed in step S57 shown in FIG. 70 will now be described with reference to FIGS. 72A to 72C.

Figure 72A:
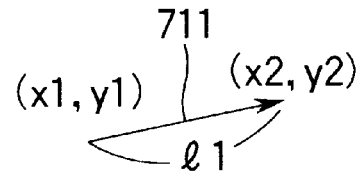
FIGS. 72A to 72C are diagrams showing a normalizing process along a scan line of a unit image which is performed when the unit image is normalized.
Figure 72B:
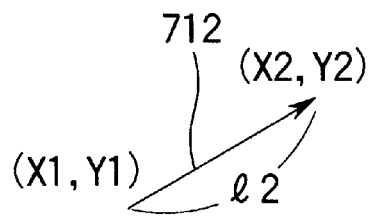
Figure 72C:
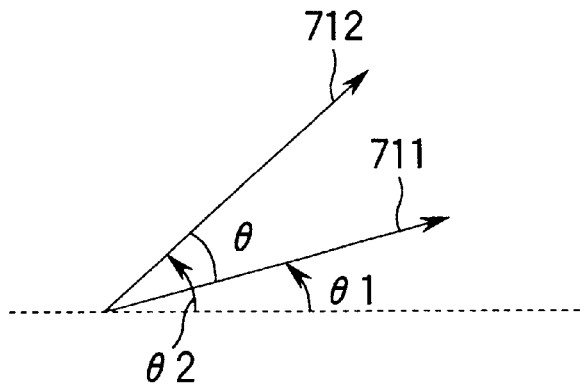

An assumption is made that the coordinates of start and end points of a scan line 711 before it is normalized are (x1, y1) and (x2, y2), respectively, as as shown in FIG. 72A. Another assumption is made that the coordinates of start and end pints of the normalized scan line 712 are (X1, Y1) and (X2, Y2), respectively, as shown in FIG. 72B. At this time, the ratio r of the length of the normalized scan line 712 with respect to the length l of the scan line 711 before normalization and the angle of the two scan lines, that is, the rotational angle θ can be obtained from Equation (6). Thus, interpolation of the image along the scan line can be performed by using r and θ.

$$l = |(x2,y2)-(x1,y1)|$$

$$r = |(x2, Y2)-(x1, Y1)|/l$$

$$\theta = \theta 2 - \theta 1$$

$$= \cos^{-1}\{(x2-x1)/lr\} - \cos^{-1}\{x2-x1)/l\} \quad (6)$$

The method of normalizing a unit image shown in FIGS. 71A to 71D is arranged to normalize a quadrangular unit image. A method of normalizing a triangular unit image, that is, a method of normalizing a triangular unit image into a regular triangle, such as a right angled triangle, right angled and isosceles triangle, will now be described with reference to FIGS. 73A to 73D.

Figure 73A:
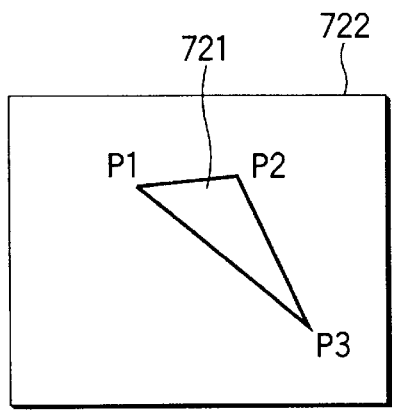
FIGS. 73A to 73D are diagrams showing a method of normalizing a unit image having an irregular shape into a right angle triangle.
Figure 73B:
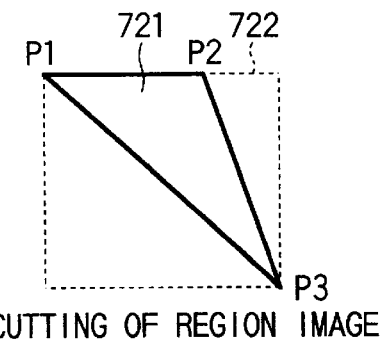
Figure 73C:
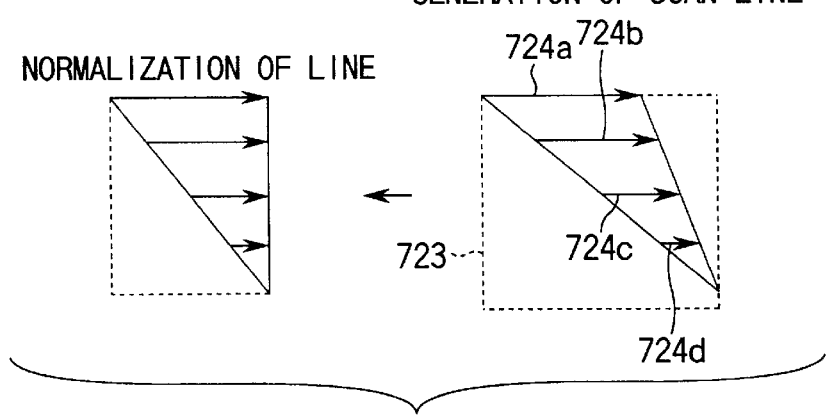
Figure 73D:
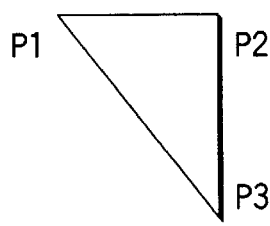

As shown in FIG. 73A, the unit-image generating means 13 cuts, from an original image stored in the image storage means 8, a region 722 surrounding a unit image (a triangle surround by points P1, P2 and P3) 721 corresponding to a unit vector (step S53). Then, a rectangular region 723 circumscribing the unit image 721 is cut from the above-mentioned cut region, as shown in FIG. 73B (step S54). As shown in FIG. 73C, the right and left sides of the unit image 721 are equally divided into L sections. Then, the corresponding divided points on the right and left sides are connected to one another so that scan lines 724a to 724d are generated (step S55). Then, as shown in FIG. 73C, the generated scan lines 724a to 724d are moved to fit a right angle of the circumscribing rectangle 723 so that the scan lines are normalized (step S56). As shown in FIG. 73D, image data adjacent to the scan lines is rotated and/or moved to correspond to the normalized scan lines so that a normalized unit image is generated (step S57). The process may be performed by, for example, a method called "Bilinear Warping". The method has been disclosed in Modern Image Processing: Warping, Morphing, and Classical Techniques (Academic Press, pp. 102 to 108). The process for normalizing the scan lines is performed similarly to the method shown in FIGS. 72A to 72C.

Modification of Sixth Embodiment

FIGS. 74 to 78 show a modification of the sixth embodiment. The sixth embodiment is arranged in such a manner that a unit image is restored to the original image and then superimposed. If the stroke is deformed, the vertexes are not always disposed clockwise. This modification enables deformation, drawing and superimposition to be performed if the vertexes are not disposed clockwise.

Figure 74:
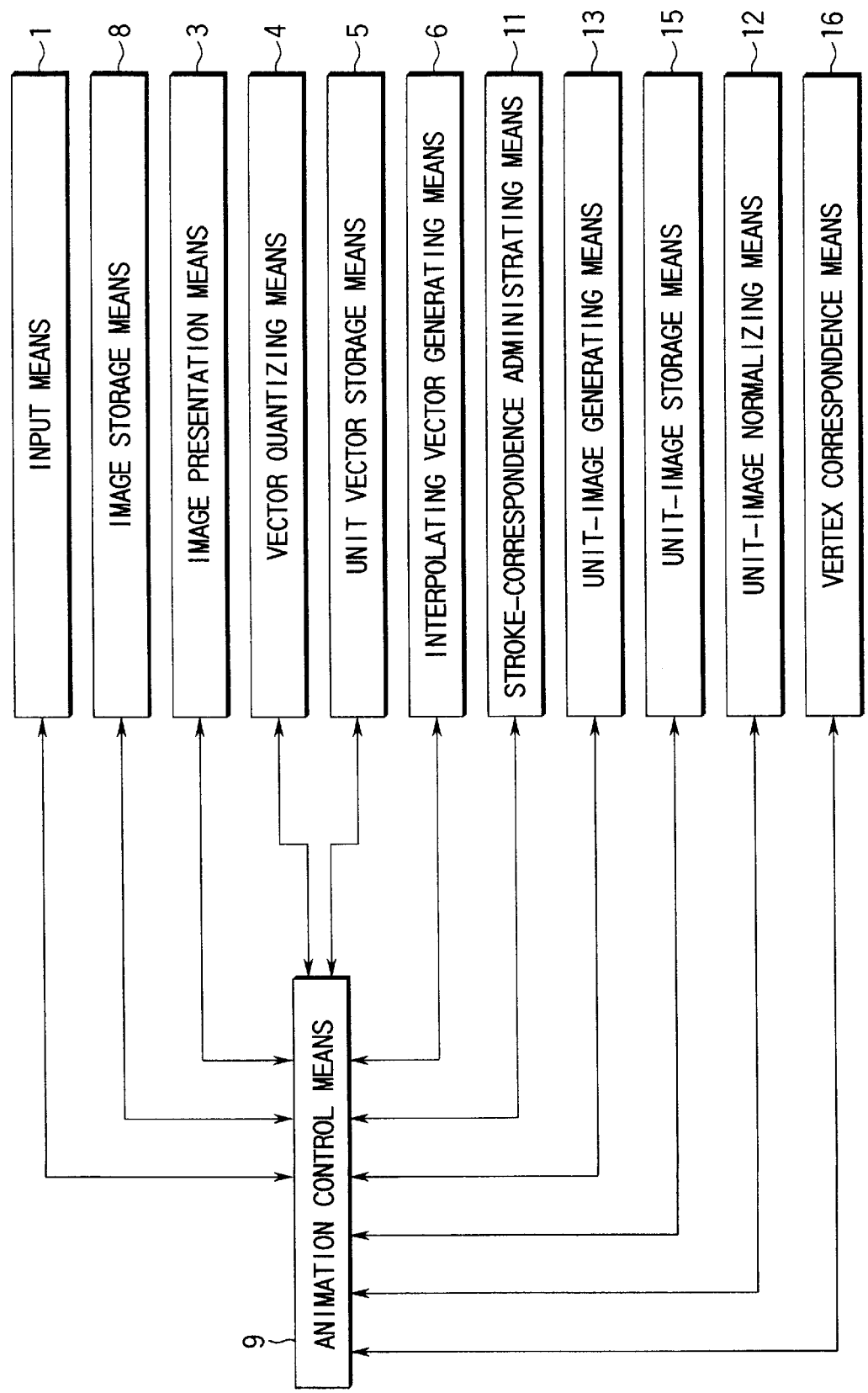
FIG. 74 is a block diagram showing an example of an animation producing apparatus according to a modification of the sixth embodiment.

FIG. 74 is a diagram schematically showing an example of the structure of an animation producing apparatus according to the modification of the sixth embodiment. As shown in FIG. 74, the animation producing apparatus according to this modification comprises an image storage means 8 for storing image data serving as an original image (in a case where the original image is in the form of a sprite structure, a plurality of sprite image data is stored as a set); an image presentation means 3 for displaying, on a predetermined display unit, image data stored in the image storage means 8 and animation or the like generated in accordance with image data; an input means 1 for inputting a stroke to a portion of the image displayed by the image presentation means 3 and required to have movement; a vector quantizing means 4 for decomposing the stroke input through the input means 1 into unit vectors each having a predetermined length; a unit-vector storage means 5 for storing the generated unit vectors; an interpolating vector generating means 6 for generating an interpolating vector between the two strokes in accordance with unit vectors of the corresponding two strokes; a stroke-correspondence administrating means 11 for determining the correspondence between the strokes input through the input means 1 and the correspondence between the unit vectors of the corresponding strokes; a unit-image generating means 13 for cutting a fractional image region to generate a unit image in accordance with the length and direction of the generated unit vector; a unit-image storage means 15 for storing the generated unit images: a unit-image normalizing means 12 for shaping a unit image in the form of a quadrangle except for a square or a rectangle into a predetermined regular shape; a vertex-adaptation means 16 for enabling a normalized chunk to be deformed, drawn and superimposed if the vertexes are not disposed clockwise; and an animation control means 9 for generating sequential animation by performing control to synchronize the above-mentioned means. Note that the same elements as those shown in FIGS. 52, 63 and 69 are given the same reference numerals. Hereinafter description will be made about different portions.

Figure 75A:
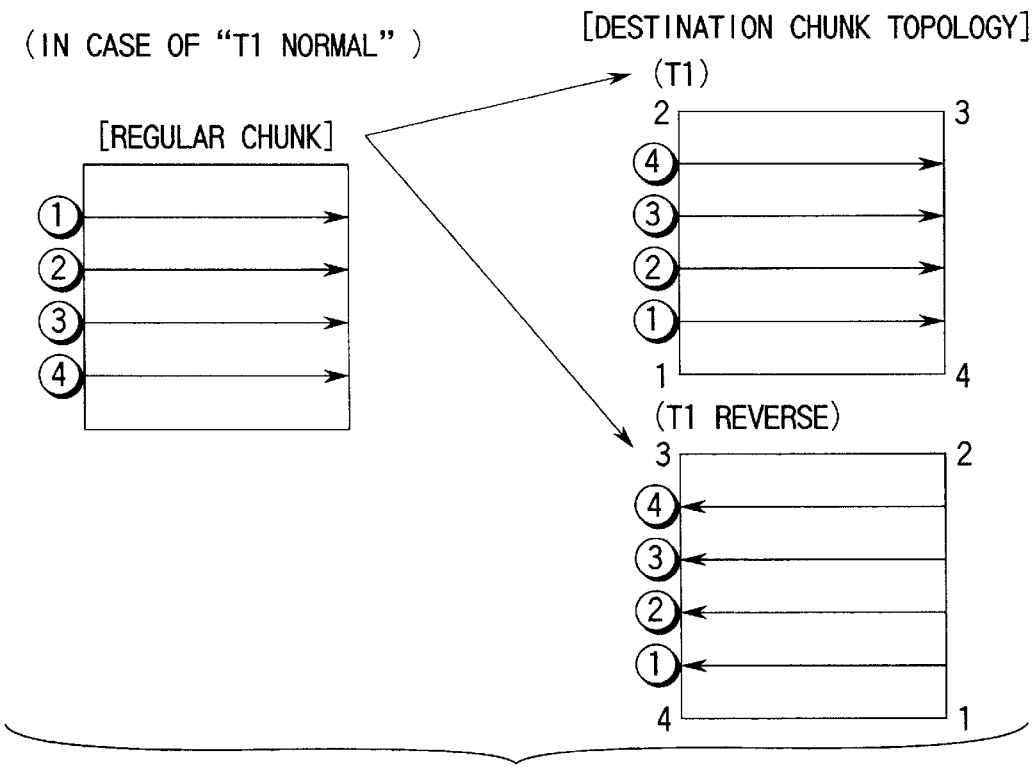
FIGS. 75A to 78 are diagrams showing four drawing cases for explaining a method capable of performing deformation and drawing if vertexes are not positioned clockwise.
Figure 75B:
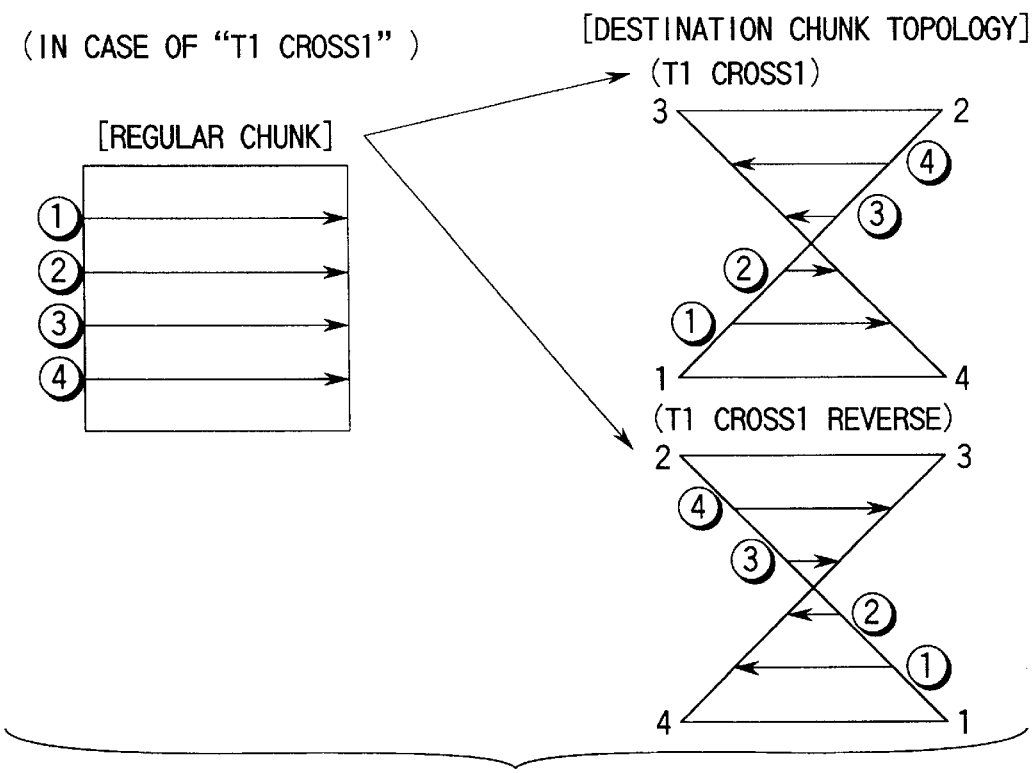
Figure 78:
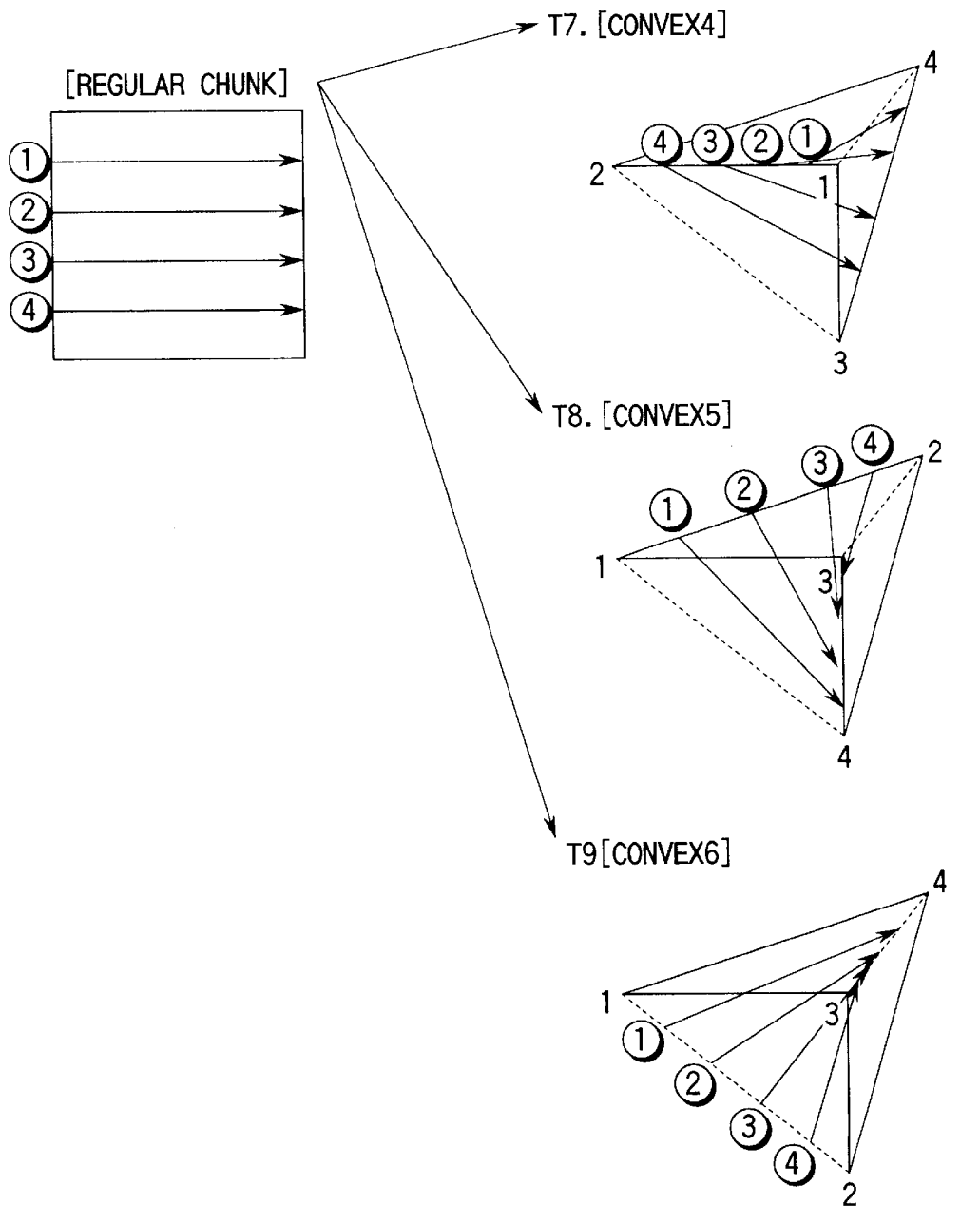

When a normalized chunk (a regular chunk) is deformed and drawn, the vertexes are not always disposed clockwise. FIGS. 75A, 75B and 78 show a method which enables a chunk to be deformed and drawn even if the vertexes are not disposed clockwise.

FIGS. 75A and 75B show four drawing cases. The correspondence between a case (T1) in which vertexes are disposed clockwise and a case (T1 reverse) which is a reverse case of T1 is shown. Moreover, the correspondence between a case (T1 Cross 1) in which the upper and lower sides have a twisted relationship and a case (T1 Cross 1 Reverse) is shown. Selection of correspondence is shown in such a manner that four scan lines are taken as an example.

Figure 76:
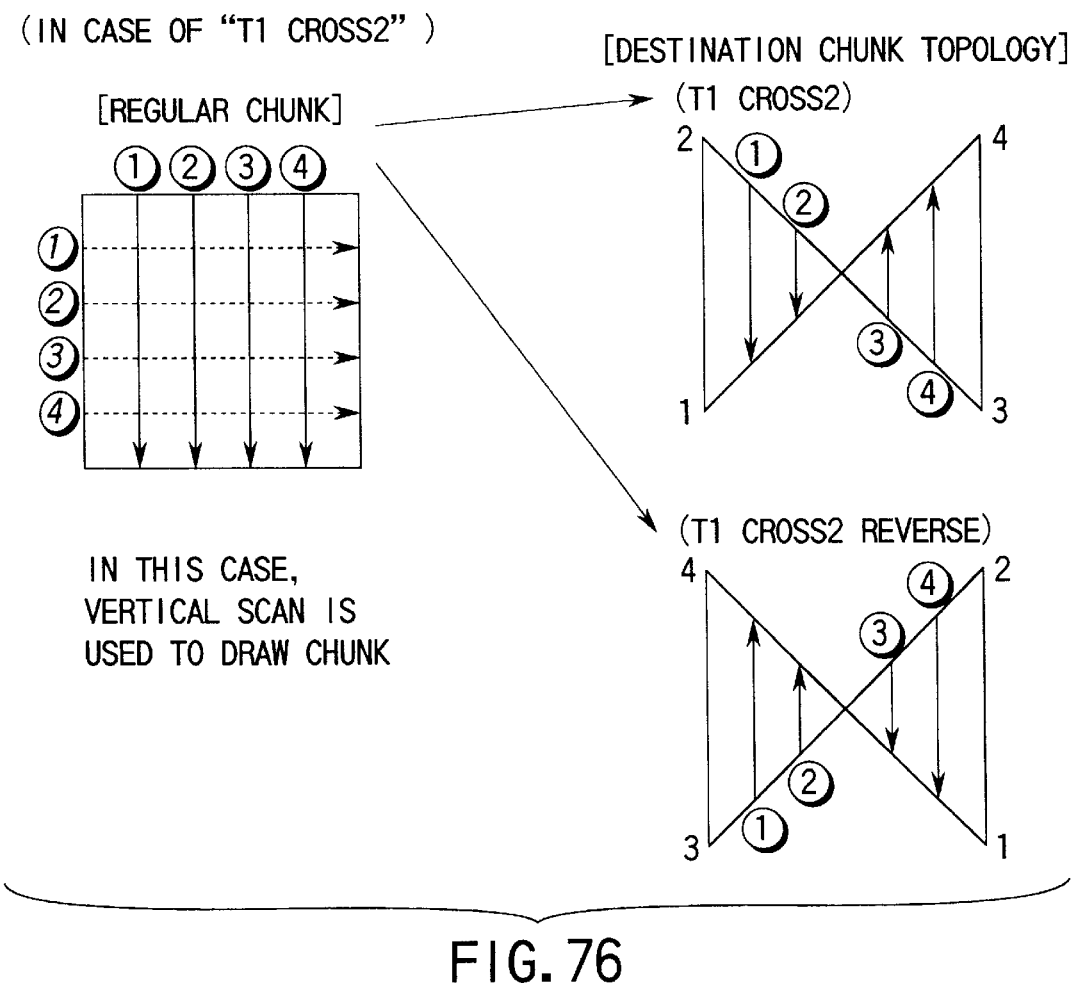

FIG. 76 shows the correspondence between a case (T1 Cross 2) in which the right and left sides have a twisted relationship and a case (T1 Cross 2 Reverse) which is a reversed case of the case (T1 Cross 2). In this case, deformation is performed in accordance with scan lines in the vertical direction in place of the horizontal scan lines.

Figure 77:
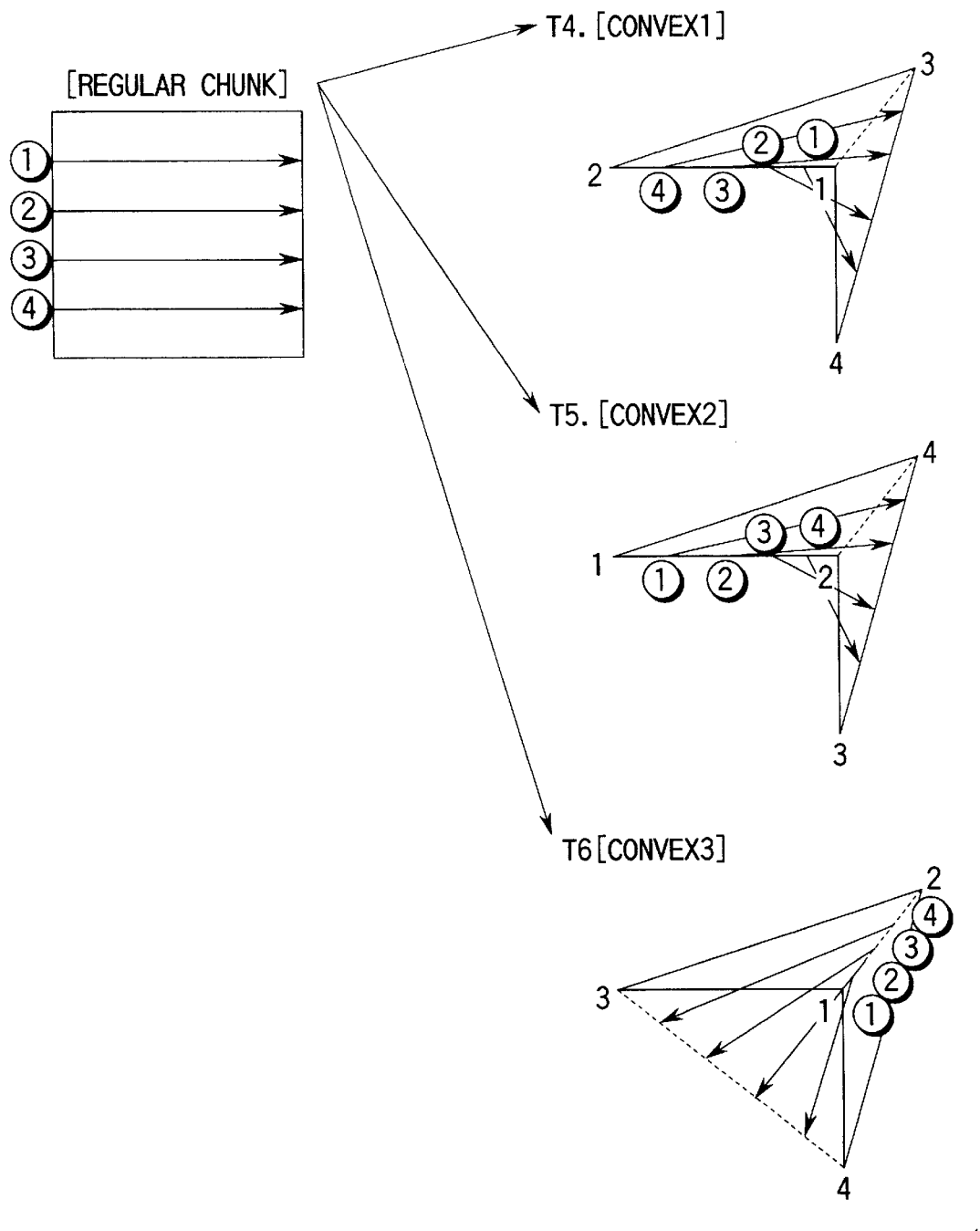

FIG. 77 shows correspondence of scan lines to a case (convex 1) in which the overall shape is twisted relative to side 1-3, a case (convex 2) in which the overall shape is twisted relative to side 2-4 and a case (convex) in which the overall shape is twisted relative to side 1-2. FIG. 78 shows correspondence of scan lines to a case (convex 4) in which the overall shape is twisted relative to side 1-4, a case (convex 5) in which the overall shape is twisted relative to side 3-2 and a case (convex 6) in which the overall shape is twisted relative to side 3-4.

Since the correspondences of the scan lines as shown in FIGS. 75A to 77 are made, adaptation to deformation in which the chunks are reversed can be performed.

Chunk must be drawn in all topological form of specified chunk vertex with a scan rule which maintains only a scan-line image information between regular chunk image and destination chunk image. Examples of scan rule of creating chunks and drawing chunks are shown in FIGS. 81A to 84. It is important to enable mapping on any chunk vertex topological pattern anyway.

Seventh Embodiment

Figure 79:
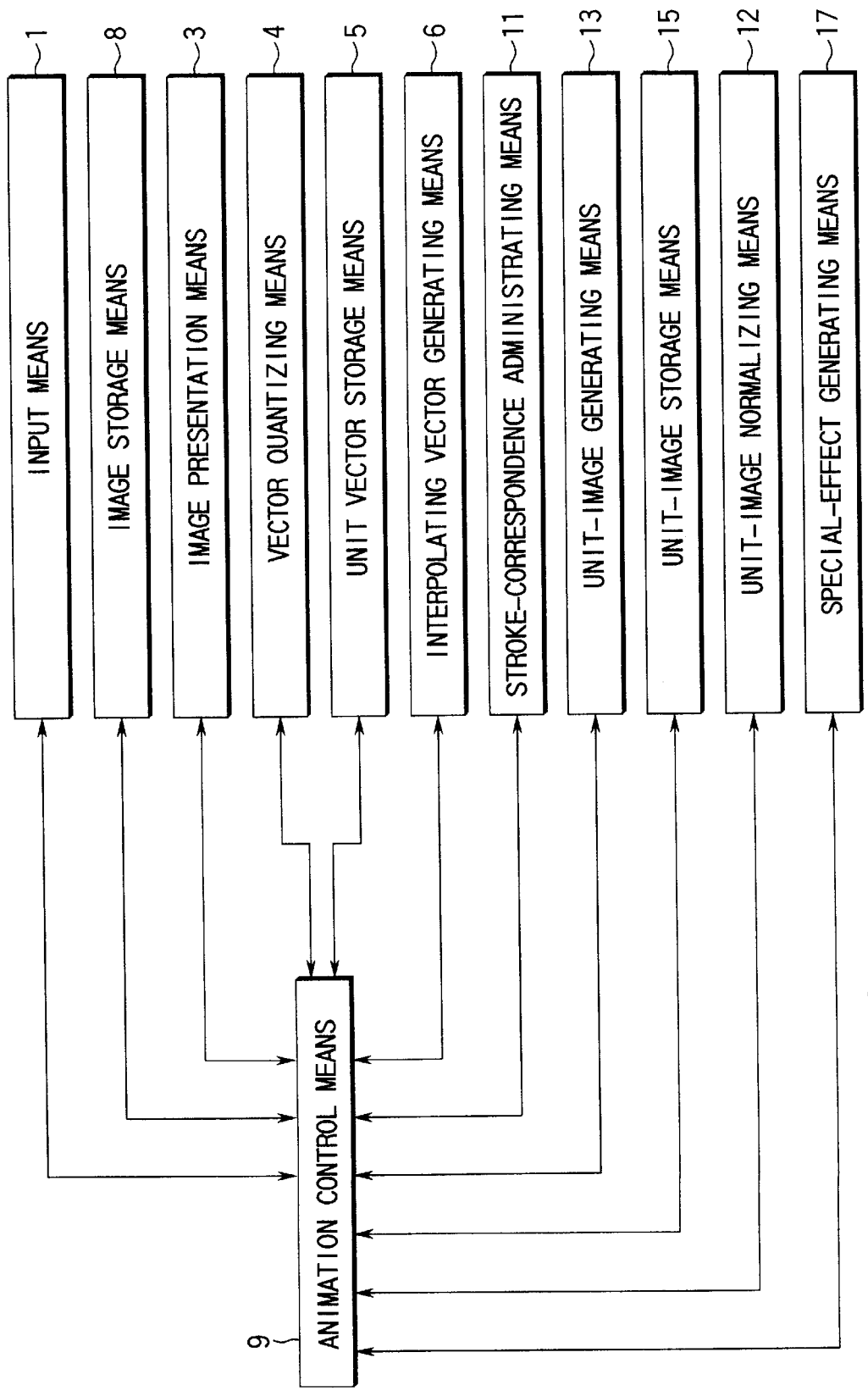
FIG. 79 is a diagram schematically showing an example of the structure of an animation producing apparatus according to a seventh embodiment of the present invention.

FIG. 79 is a diagram schematically showing an example of the structure of an animation producing apparatus according to a seventh embodiment of the present invention. As shown in FIG. 79, the animation producing apparatus according to this embodiment comprises an image storage means 8 for storing image data serving as an original image (in a case where the original image is in the form of a sprite structure, a plurality of sprite image data is stored as a set); an image presentation means 2 for displaying, on a predetermined display unit, image data stored in the image storage means 8 and animation or the like generated in accordance with image data; an input means 1 for inputting a stroke to a portion of the image displayed by the image presentation means 2 and required to have movement; a vector quantizing means 4 for decomposing the stroke input through the input means 1 into unit vectors each having a predetermined length; a unit-vector storage means 5 for storing the generated unit vectors; an interpolating vector generating means 6 for generating an interpolating vector between the two strokes in accordance with unit vectors of the corresponding two strokes; a stroke-correspondence administrating means 11 for determining the correspondence between the strokes input through the input means 1 and the correspondence between the unit vectors of the corresponding strokes; a unit-image generating means 13 for cutting a fractional image region to generate a unit image in accordance with the length and direction of the generated unit vector; a unit-image storage means 15 for storing the generated unit images: a unit-image normalizing means 12 for shaping a unit image in the form of a quadrangle except for a square or a rectangle into a predetermined regular shape; a special effect generating means 17 for performing a special effect, such as color inversion, color fading and color conversion from right to left of the screen or from left to right or in a radial direction; and an animation control means 9 for generating sequential animation by performing control to synchronize the above-mentioned means so as to generate sequential animation. Note that the same elements as those shown in FIGS. 52, 63 and 69 are given the same reference numerals. Hereinafter description will be made about different portions.

The special effect generating means 17 performs a predetermined calculation process for realizing a special effect instructed from, for example, a user. Thus, the correspondence of a position into which the special effect is inserted to a unit image in the generated animation is calculated. Data for calculating the special effect is stored in such a manner that data is made to correspond to the calculated unit image so that data is inserted into a position in the animation instructed by a user.

Figure 80:
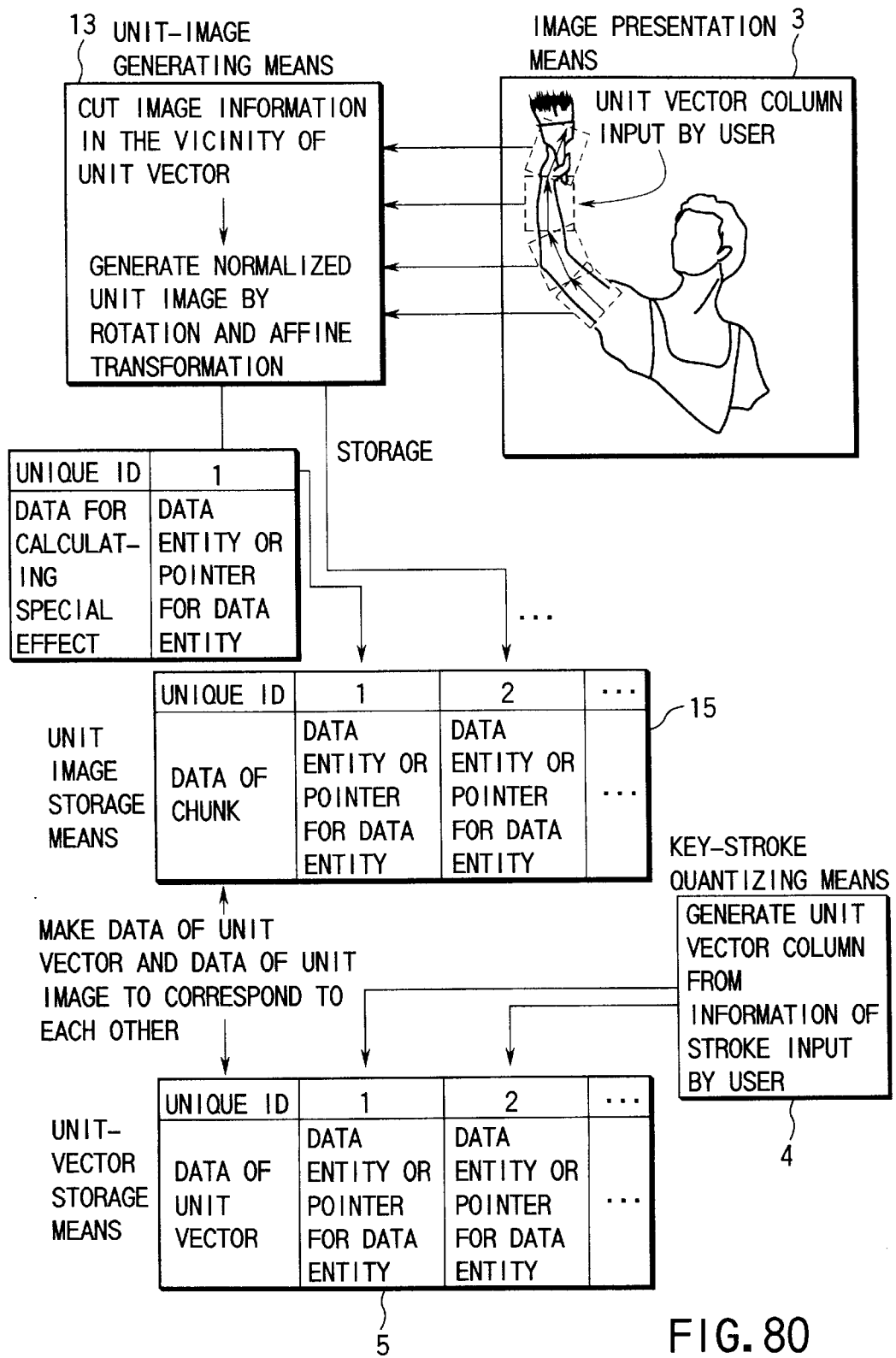
FIG. 80 is a schematic view showing correspondence made between a unit image extracted from an original image and calculation data for a special effect.

FIG. 80 schematically shows the correspondence made between the unit image extracted from an original image and data for calculating a special effect. A unit image generated by the unit-image generating means 13 is given a unique ID. Image data of the unit image or a pointer for a region in which image data of the unit image is stored is stored in the unit-image storage means 15 in such a manner that correspondence to the unique ID is made. The unique ID given to each unit image is stored in the unit vector storage means 4 in such a manner that the correspondence to data of the unit vector corresponding to the unit image is made. At this time, data for calculating the special effect or the pointer for the region in which data for calculating the special effect is given the unique ID of the unit image of the frame corresponding to the position in the generated animation instructed by the user. The pointer having the unique ID is stored in, for example, unit-image storage means 15.

The unit-vector storage means 5 and the unit-image storage means 15 are permitted not to individually be provided and they are formed into the table in the same storage region to store data of the unit vector and data of the unit image in such a manner that they are made to correspond to one unique ID. In this case, a field is required to be provided in the same table to write data for calculating the special effect.

When presentation of the animation into which the special effect has been inserted is performed, the image presentation means 2 reads the interpolating vector from the unit-vector storage means 5 and reads a unit image corresponding to the interpolating vector and data for calculating the special effect from the unit-image storage means 15. Then, the image presentation means 2 subjects the read unit image to the special effect in accordance with data for calculation, and then draws an image so as to be displayed on the predetermined display unit.

When the special effect is inserted into the animation, a portion in one frame is subjected to the special effect (that is, each unit image is subjected to the special effect) or the overall frame is subjected to the special effect. If the overall portion of one frame is subjected to the special effect when the unit image and data for calculating the special effect are made to correspond to each other as shown in FIG. 81, a code, for example "REPEAT" may be made to correspond to each unit image so as to be stored in place of making data for calculating the special effect to correspond to each of all unit images in the frame before storage. When the overall portion of one frame is subjected to the same special effect in a time sequential manner, the manipulation speed, for example, "v1" may be made to correspond to each unit image together with the code "REPEAT" when storage is performed. When the unit image and data for calculating the special effect are made to correspond to each other so as to be stored and each unit image is subject to a different special effect as shown in FIG. 82, correspondence to data for calculating the special effect which is different for each unit image or a pointer to a storage region for data for the calculations is made when storage is performed.

FIGS. 81 and 82 show a state in which the unit-vector storage means 5 and the unit-image storage means 15 are not individually provided and they are formed into a table in the same storage region so as to store data of unit vectors, data of unit images and data for calculating the special effect while they are made to correspond to one unique ID.

A specific example of insertion of a special effect into animation will now be described. When, for example, presentation of the generated animation has been performed by the image presentation means 3, the special effect may be inserted in such a manner that a user uses a mouse or the like to instruct a position in the presented animation at which the special effect is inserted. At this time, a menu window for selecting a special effect from a plurality of effects may be displayed through the image presentation means 2, as shown in FIG. 83.

Figures 83, 84:
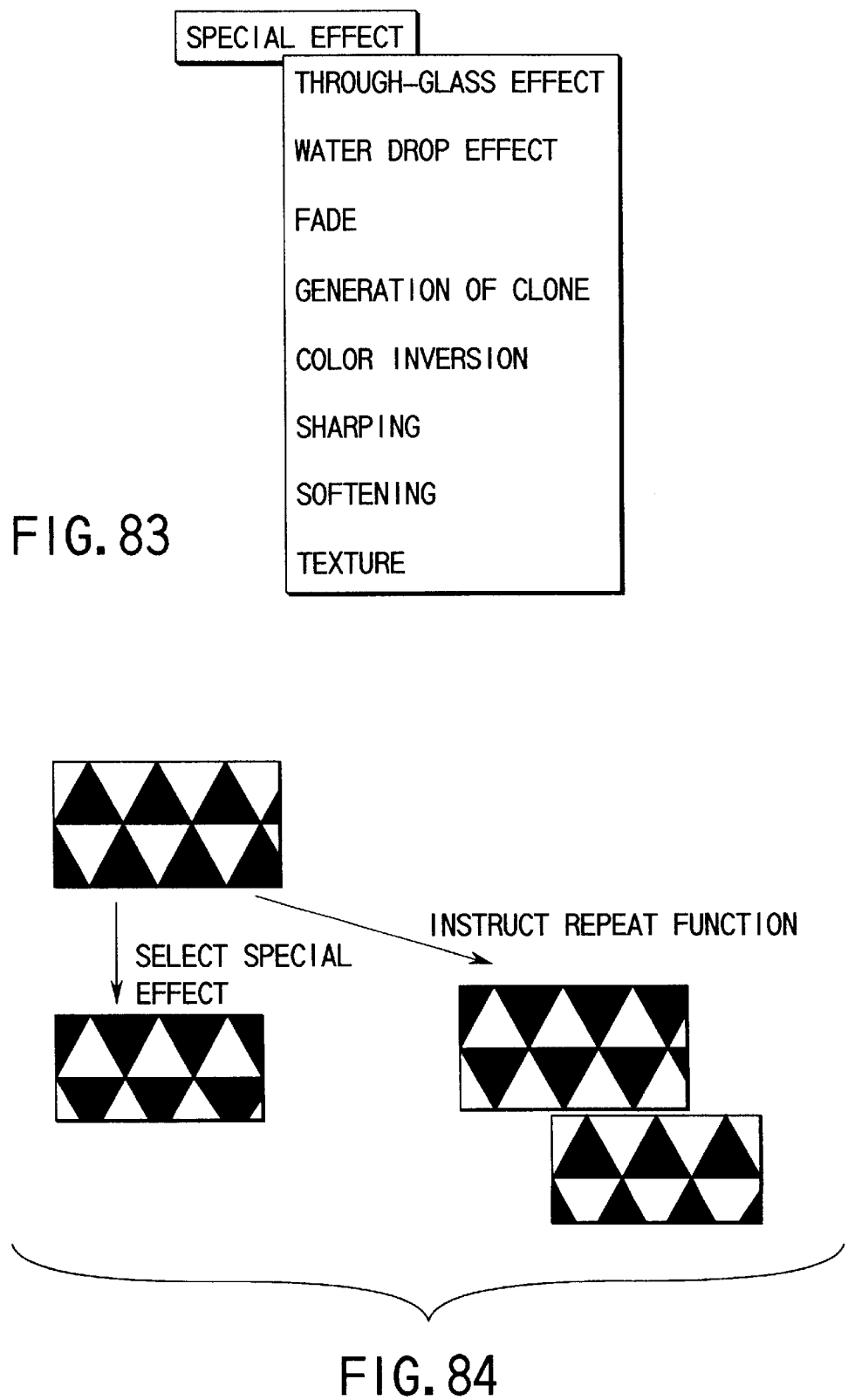
FIG. 83 is a diagram showing an example of display of a menu window with which the type of the special effect is selected.
FIG. 84 is a diagram showing an example of an animation into which a special effect has been inserted.

FIG. 84 shows an example of animation into which a special effect has been inserted when "COLOR INVERSION" is selected from the menu window, and repetition of "COLOR INVERSION" is instructed.

Eighth Embodiment

The methods of producing animation according to the fourth to seventh embodiments may be formed into a program which can be executed by a computer and stored in a recording medium, such as a floppy disk, a hard disk, a CD-ROM or a semiconductor memory, so as to be distributed.

Figure 85:
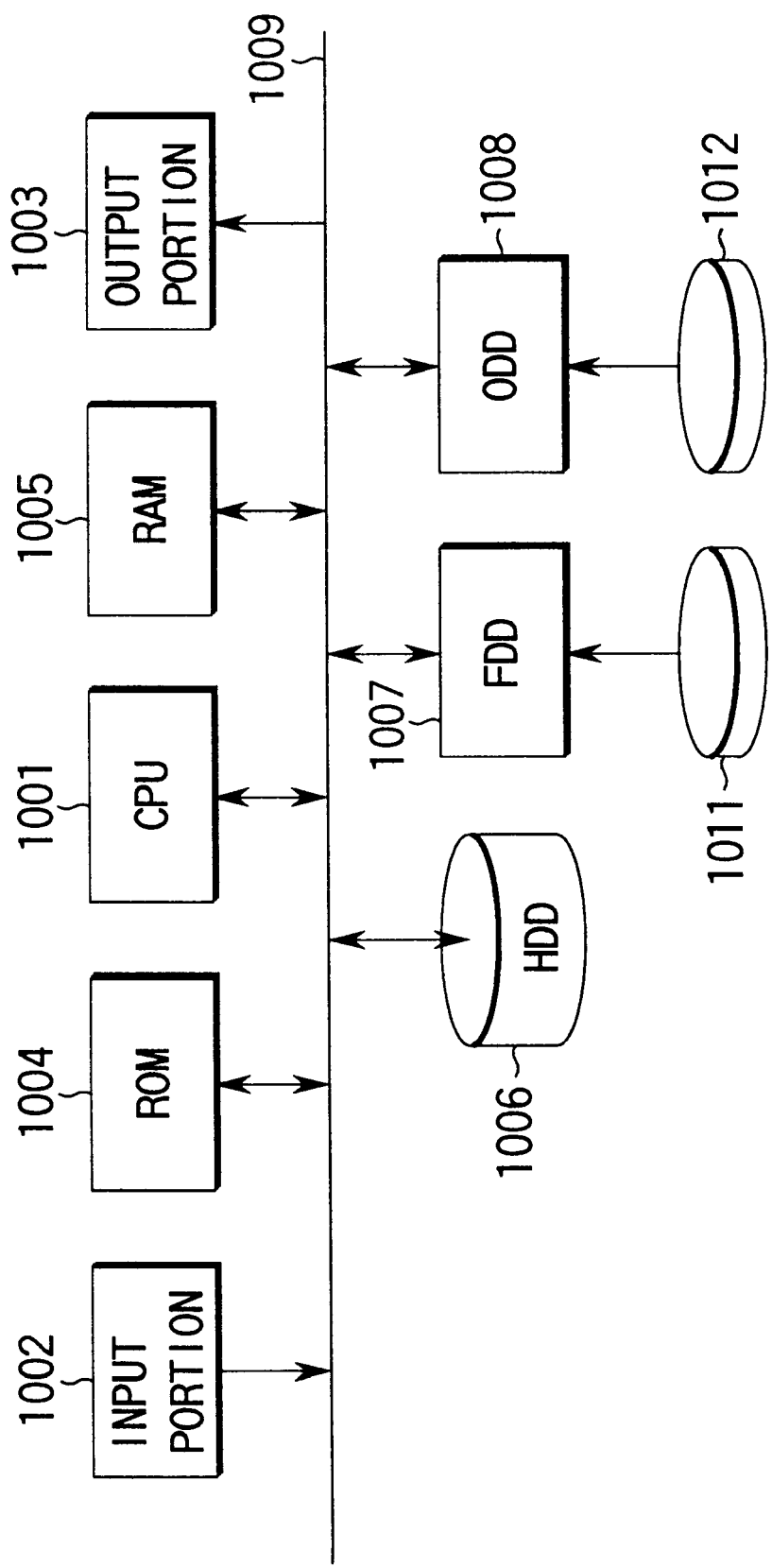
FIG. 85 is a diagram showing an example of the structure of a computer system for executing a program for producing the animation according to the present invention.

FIG. 85 shows the structure of a computer system for performing the animation producing method according to the present invention. The computer system comprises, for example, a personal computer having a CPU 1001 for performing calculations, an input portion 1002 such as a keyboard, a pointing device or a mouse, an output portion 1003 such as a display and a loud-speaker unit, ROM 1004 and RAM 1005 serving as main storage portions, a hard disk drive 1006 serving as an external storage unit, a floppy disk drive 1007 and an optical disk unit 1008 which are connected to one another by a bus 1009.

A program for executing the animation producing method according to the foregoing embodiments and image data are stored in any one of the recording mediums such as the hard disk drive 1006, the floppy disk drive 1007 and the optical disk unit 1008. In accordance with the program, image data, such as the stroke and instruction of a special effect, read from the recording medium is subjected to an animation processing process in the CPU 1001. Generated animation is transmitted from the output portion 1003. As a result, the animation processing manipulation according to the present invention can be performed by using a usual personal computer.

Ninth Embodiment

A ninth embodiment of the present invention will now be described. Although the interpolation is performed linearly in the first to eighth embodiments, this embodiment is arranged in such a manner that information for limiting the changed shape of the stroke is input and a interpolating stroke is generated in accordance with input information. The same elements as those shown in FIG. 63 are given the same reference numerals.

Figure 86:
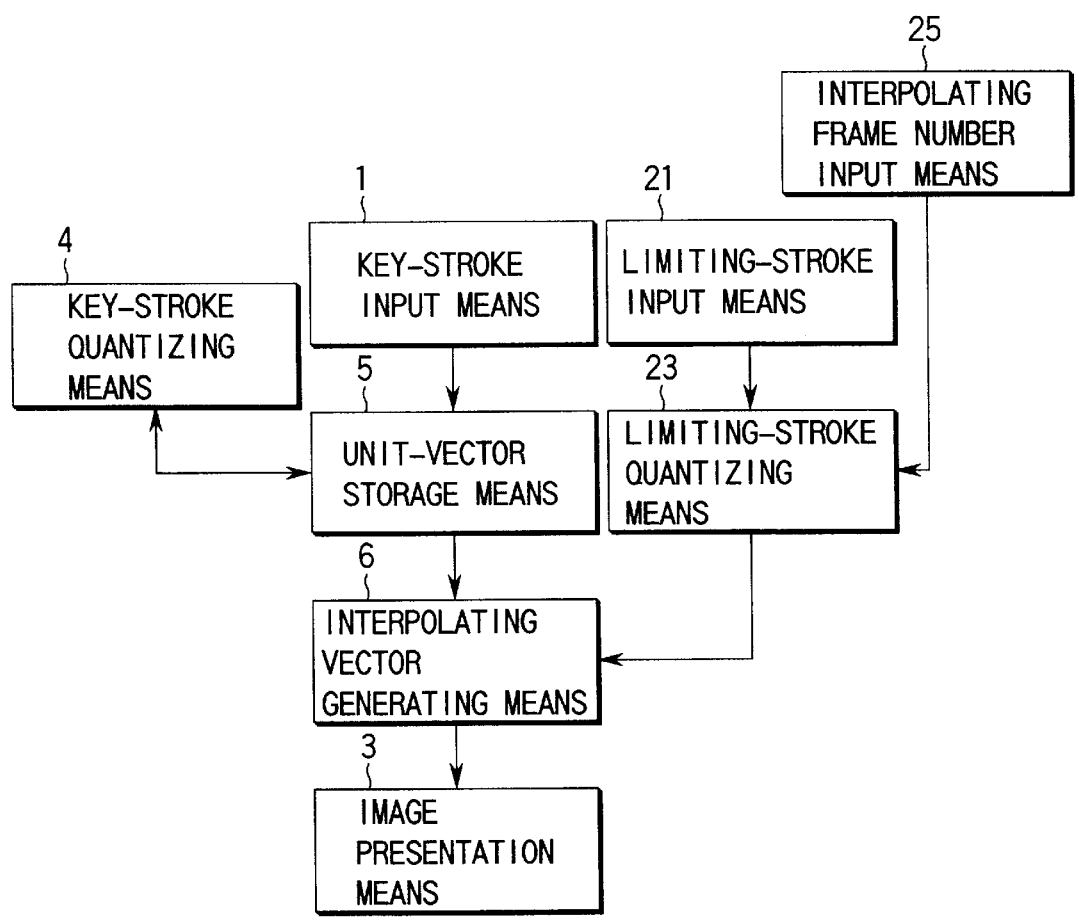
FIG. 86 is a diagram schematically showing an example of the structure of an animation producing apparatus according to a ninth embodiment of the present invention.

FIG. 86 is a diagram schematically showing an example of the structure of an animation producing apparatus according to a ninth embodiment of the present invention. As shown in FIG. 86, the animation producing apparatus according to this embodiment comprises a key-stroke input means 1 for inputting strokes or the like which must be registered to the key-frame; a key-stroke quantizing means 4 for decomposing (quantizing) the stroke into unit vectors each having an arbitrary length; a unit-vector storage means 5 for storing the unit vectors; a limiting-stroke input means 21 for inputting limiting strokes for limiting deformation of interpolating strokes which are generated for interpolating the key strokes input by the key-stroke input means 1 between key-frames; an interpolating frame number input means 25 for inputting the number of interpolating frames for interpolating between key-frames; a limiting-stroke quantizing means 23 for decomposing (quantizing) the limiting stroke into unit vectors, the number of which is the same as the number of the interpolating frames; an interpolating vector generating means 6 for generating interpolating vectors for interpolating between key-frames in accordance with the unit vector of the key strokes and the unit vectors of the limiting strokes; and an image presentation means 3 for displaying the generated animation or the like on a predetermined display unit.

The manipulation of the animation producing apparatus shown in FIG. 86 will now be described with reference to FIGS. 87A to 87D.

FIGS. 87A to 87D are flow charts showing the overall manipulation of the animation producing apparatus shown in FIG. 86.

Initially, the key-frame number i (i=0 to n), the number f of interpolating frames and the reproducing interval t are initialized (step S1) so that a state for waiting for input is realized (step S2). At this time, the user is able to instruct reading of an image (step S3), input of key strokes (step S4), input of limiting strokes (step S5), reproduction of animation (step S6), number f of interpolating frames through the interpolating frame number input means 5 (step S7), completion (step S8) and another process (step S9).

Figure 87A:
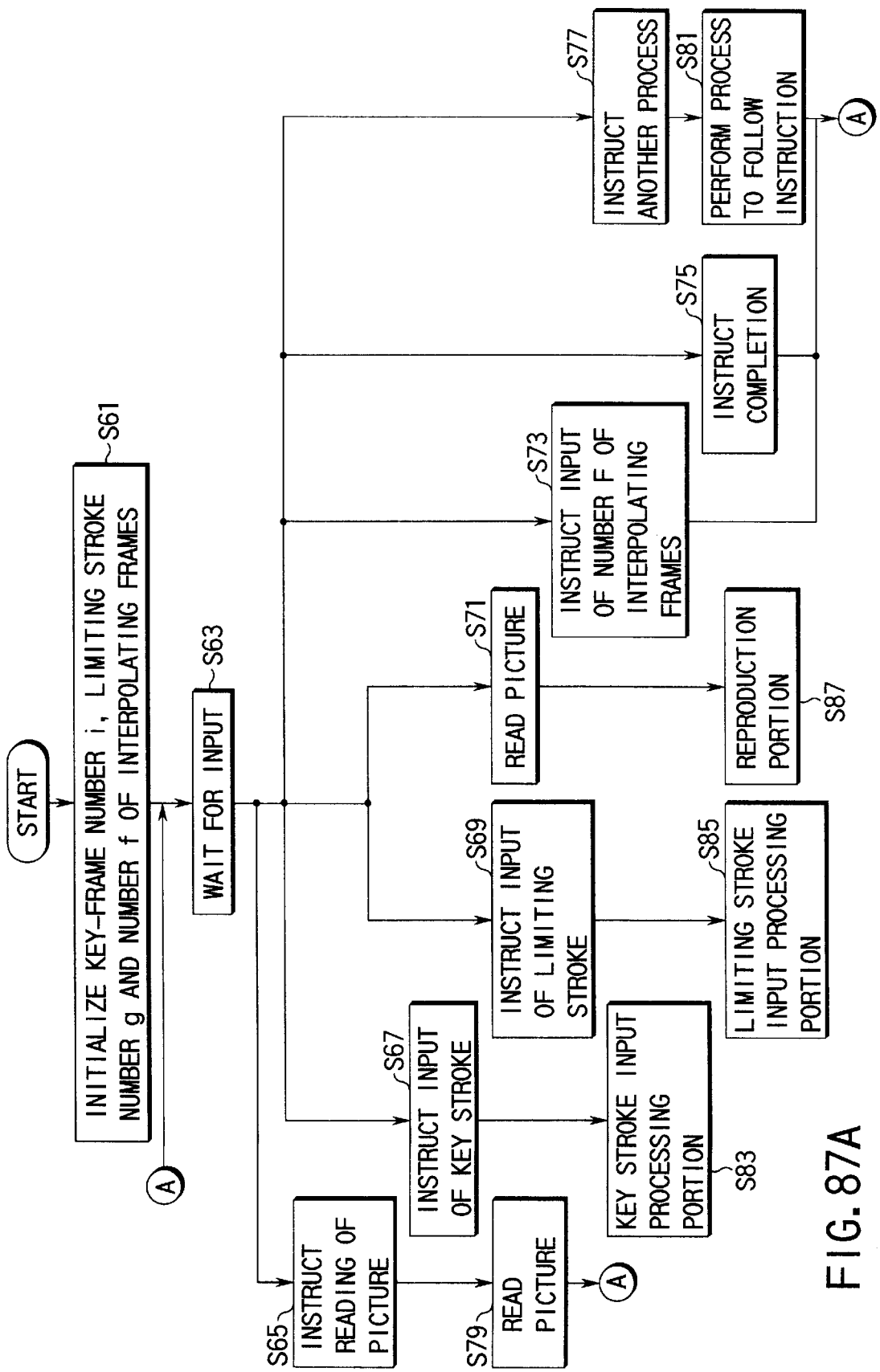
Figure 87B:
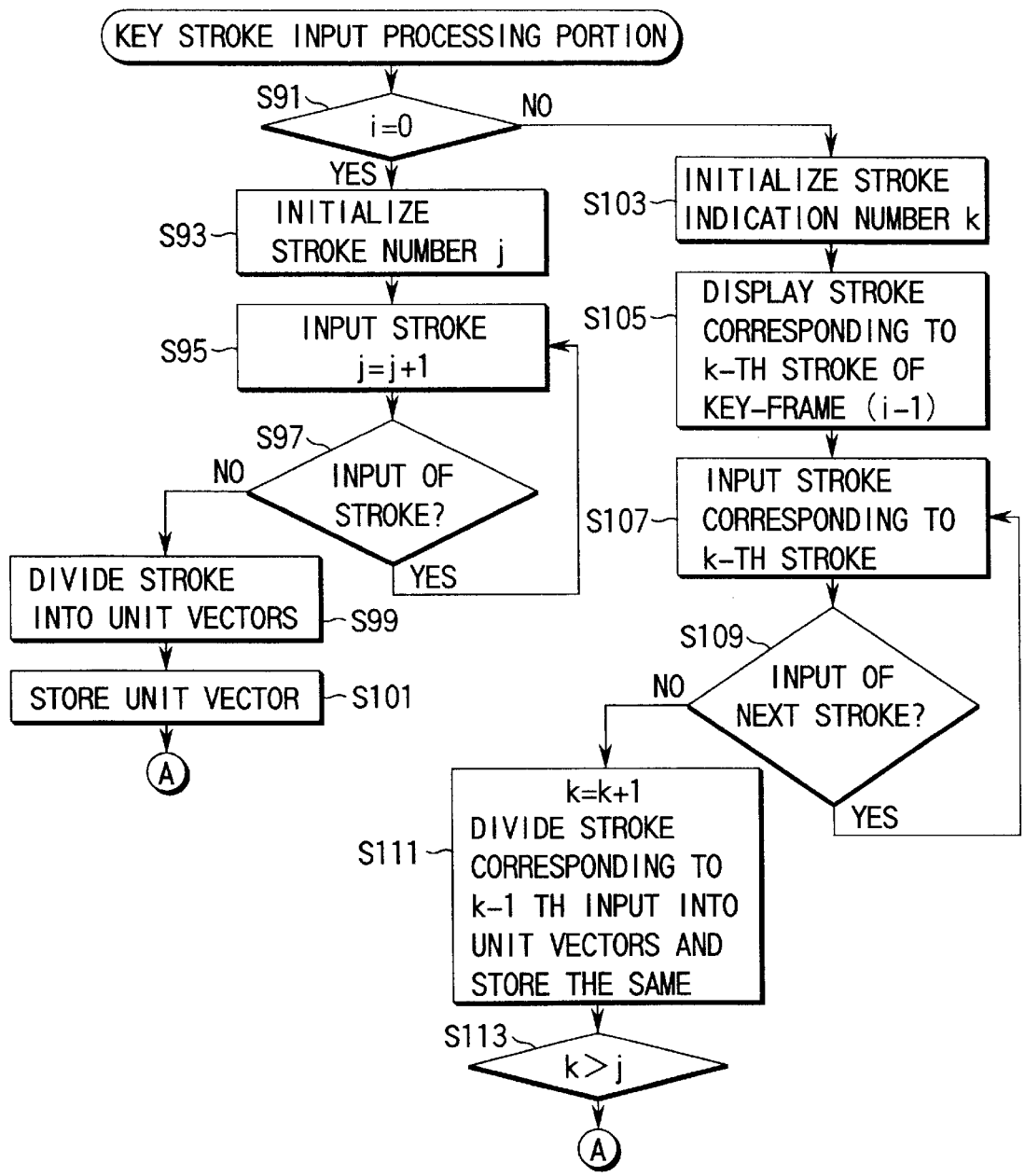

An manipulation will now be described with reference to a flow chart shown in FIG. 87B, which is performed when a user instructs input of key strokes (step S4).

If an instruction is made to the i=0 th key-frame (step S91), the stroke number j which is input to the key-frame is initialized (step S93). The stroke number is an identifier for identifying a plurality strokes input by the user.

The user uses a mouse or a tablet through a user interface of the key-stroke input means 1 to draw strokes (curves) serving as skeleton in a portion on a prepared bitmap image in which animation is required so as to sequentially input required strokes. Whenever input is performed, each stroke is given stroke number (steps S95 to S97).

After key strokes for one key-frame have been input (step S97), each of input key strokes is decomposed (quantized) into unit vectors each having a predetermined length by the key-stroke quantizing means 4 (step S99). When, for example, a key stroke 21 registered to the key-frame (a first key-frame) having key-frame number i=0 is quantized by the key-stroke quantizing means 4 as shown in FIG. 10A, unit vectors 23a to 23c are generated, as shown in FIG. 10B.

The unit vectors of the key strokes generated by the key-stroke quantizing means 4 are stored in the unit-vector storage means 5 (step S101). In the unit-vector storage means 5, there are stored a sequence, the elements of which are key-frame numbers (i) which are identifiers for the key-frames, stroke numbers (j) which are identifiers of the strokes input to the key-frames and identifiers (Vjhi, h=1, 2, 3, . . . ,) of the unit vectors of the strokes, as shown in, for example, FIG. 11. The identifiers for the unit vectors are given numbers h (=1, 2, 3, . . . ,) starting from a point at which drawing of the strokes is started.

When input of strokes for key-frames following the key-frame number i=0 is performed (step S91), that is, when key strokes for deforming each key stroke registered to the key-frame number i=0 are input, the stroke indication number k is initialized. Moreover, the key-frame number i is increased by one so that input of key stroke of the key-frame (a second key-frame) having the key-frame number i=1 is waited for (step S103). Then, a key-frame (in this case, a key-frame (a first key-frame) having key-frame number i=0) having key-frame number (i−1) which is one key-frame number before is displayed on the predetermined display unit. At this time, the stroke number given to each stroke drawn in the first key-frame is made to be stroke indication number k. When the key strokes on the second key-frame corresponding to the key strokes having the stroke indication number k on the first key-frame are input, the display color of the k-th key stroke is changed or the k-th key stroke is allowed to blink to cause a user to input the stroke of the second key-frame corresponding to the k-th key stroke of the first key-frame (step S105). Thus, the user input a key stroke 52 of the second key-frame corresponding to the key stroke 51 of the first key-frame (step S107), as shown in, for example, FIG. 10A. At this time, a plurality of key stroke of the second key-frame corresponding to the k-th key stroke of the first key-frame may exist. When the user has instructed the second key-frame completion of input of the key strokes corresponding to the k-th key stroke of the first key-frame (step S109), the key stroke having the indicating number k+1 on the first key-frame is enhanced and displayed. Thus, the user is caused to input the key stroke of the second key-frame corresponding to the k+1 th key stroke of the first key-frame. Moreover, the key stroke of the second key-frame input to correspond to the key stroke of the previous key stroke (that is, the k-th stroke) is divided into unit vectors by the key-stroke quantizing means 4 (see FIG. 10B) so as to be stored in the unit-vector storage means 5 (step S111).

As for the unit vectors of the key strokes of the second key-frame corresponding to the key strokes of the first key-frame, a jump destination address "p1" is added to the trailing end of the sequence of the unit vector of the key stroke having the number j=1 in the first key-frame as shown in FIG. 11. Thus, a sequence in the form having elements which are the address "p1", the key-frame number (i=1), the stroke number (j=1) and unit vector identifier (Vjhi, h=1, 2, 3, . . . ,) is stored.

All of the key stroke drawn on the first key-frame are subjected to the processes in steps S105 to S111 (step S113).

Figure 87C:
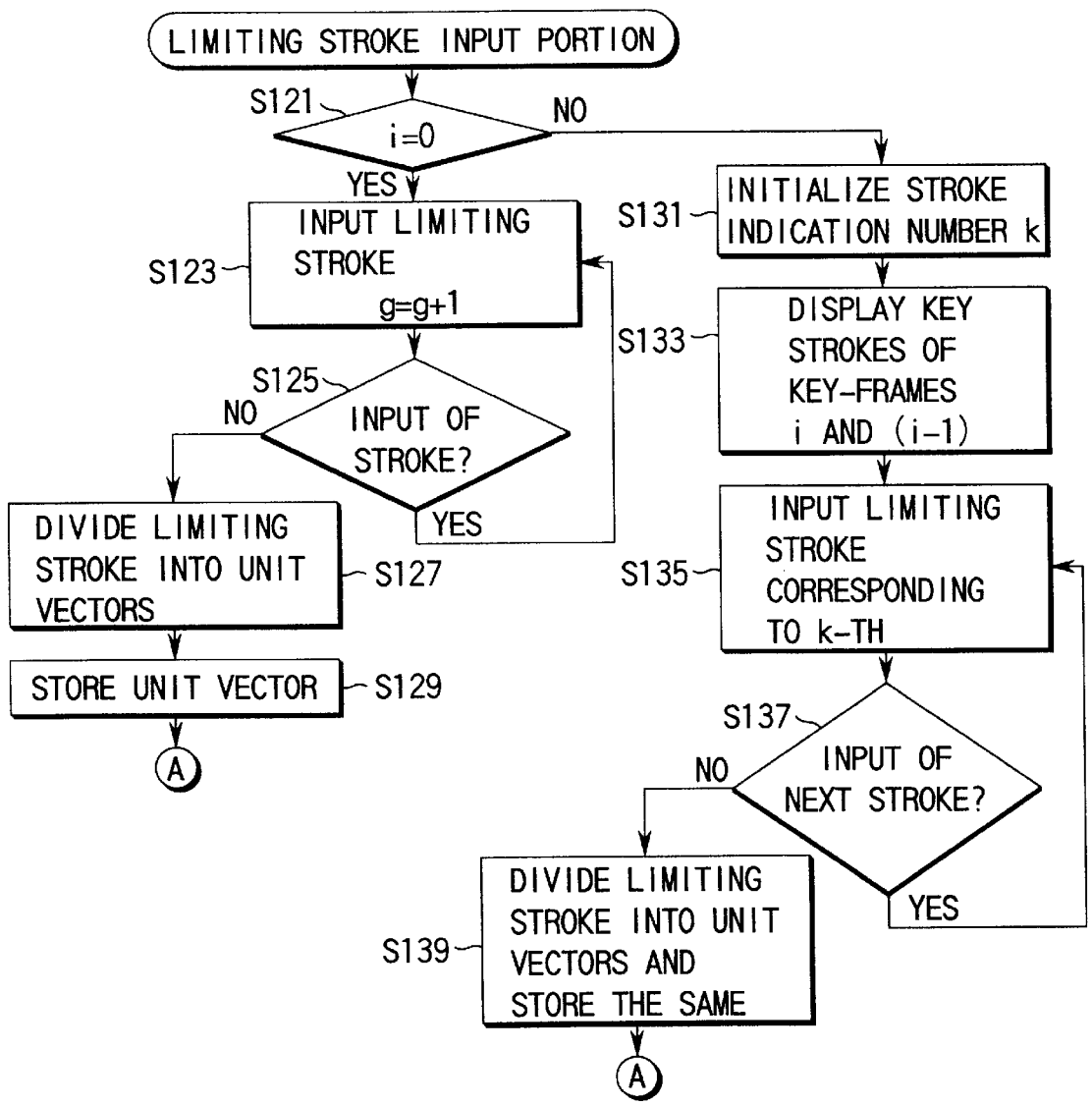

A process which is performed when the user has instructed input of the limiting stroke (step S69) will now be described with reference to a flow chart shown in FIG. 87C.

The limiting-stroke input means 21 is used to input limiting strokes when the key stroke input by using the key-stroke input means 1 is deformed. The strokes are input by drawing strokes on a bitmap image along a route along which the end points of the key strokes are required to drawn.

If only one key-frame exists, a key stroke indicating input of the limiting stroke (I=0) and registered to the first key-frame is displayed on the predetermined display unit so that input of the limiting stroke is waited for (step S121). Whenever the limiting stroke is input, limiting stroke number g is given to each limiting stroke (steps S123 to S125). Thus, g is increased by one so that next key strokes are sequentially enhanced and displayed to cause input of the limiting stroke. When completion of input of the limiting stroke for all of the key strokes has been instructed, the limiting-stroke quantizing means 23 quantizes each limiting stroke into unit vectors, the number of which is the same as the number f of the interpolating frames instructed through the interpolating frame number input means 25 and stores the unit vectors of the limiting strokes (steps S127 to S129).

If a plurality of key-frames exist, input of the limiting stroke is indicated (step S121). The stroke indication number k is initialized (step S131). Then, a key stroke of the present key-frame having the first correspondence relationship with the previous key-frame is displayed on the predetermined display unit. Then, input of the limiting stroke to the displayed key stroke having the above-mentioned correspondence relationship is waited for (step S133). When the user has input the limiting stroke to the key stroke having the first correspondence relationship, k is increased by one. Thus, key strokes having next correspondence relationship are sequentially enhanced and displayed to cause input of the limiting stroke to the foregoing key stroke (steps S135 to S137). When input of the limiting strokes to the key strokes having all correspondence relationships has been instructed, the limiting-stroke quantizing means 23 quantizes each limiting stroke into unit vectors, the number of which is the same as the number f of interpolating frames instructed through the interpolating frame number input means 25 so that the unit vectors of the limiting strokes are stored (step S139).

Figure 87D:
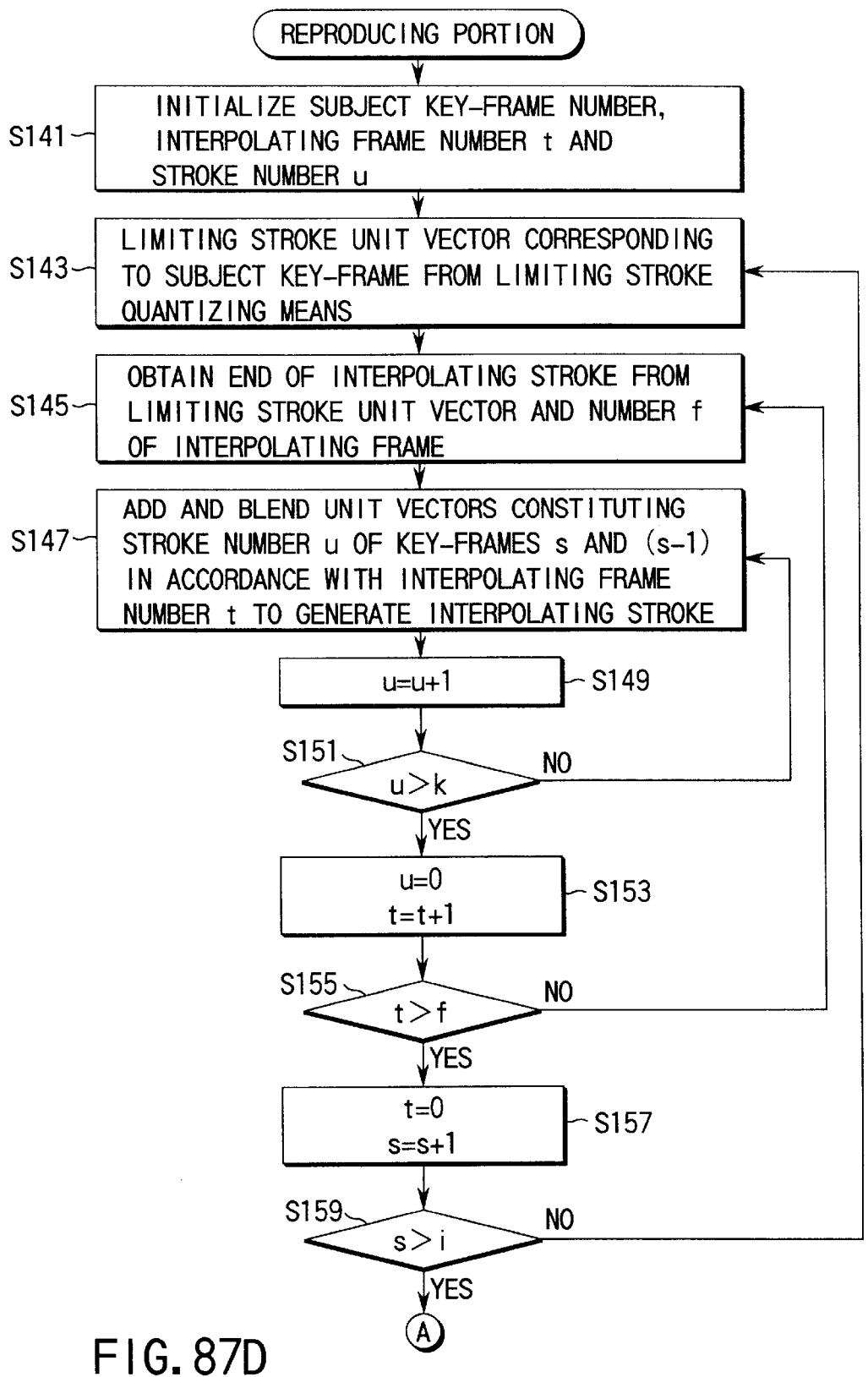

A process which is performed when the user has instructed to reproduce the animation (step S71), that is, generation of the interpolating frames will now be described with reference to a flow chart shown in FIG. 87D.

Number s of the key-frame for use to generate the interpolating frame, number t of the interpolating frame of the subject which must be generated and number user of the key stroke of the subject which must be processed are initialized (step S141). Similarly to the foregoing example, unit vectors of the key stroke having the correspondence relationship and registered to the first and second key-frames are taken out from the unit-vector storage means 5 in the ascending order of the key stroke number so that interpolating vector strokes are sequentially generated (step S143).

A process of the interpolating vector generating means 6 for generating interpolating vectors in a case where the limiting stroke is defined to be locus of ends of key strokes which passes during the animation process from the first key-frame to the second key-frame will now be described with reference to FIGS. 88A to 88C and 89.

An assumption as shown in FIG. 88A is made that a key stroke (a first key stroke) 31 of the first key-frame and a key stroke (a second key stroke) 32 of the second key-frame corresponding to the first key-frame exist and limiting strokes for use to generate interpolating strokes for the key strokes 31 and 32 are indicated with limiting strokes 33 and 34 which connect the ends points to each other.

At this time, the limiting stroke unit vectors generated by the interpolating vector generating means 6 are sequentially connected from the ends of the first and second key strokes so that the position of the end of the interpolating stroke is defined (step S145). When the number f of the interpolating frames input through the interpolating frame number input means 25 is "2" as shown in FIG. 88B, the distance between the ends of the limiting strokes 33 and 34 are divided into f+1=3 sections so that the limiting strokes are quantized. End points of the first interpolating stroke of the two interpolating strokes are points 35a and 36a which interior-divide the limiting strokes 33 and 34 from the end point of the first key stroke 31 at 1:2. End points of the second interpolating stroke are points 35b and 36b which interior-divide the limiting strokes 33 and 34 from the end point of the first key stroke 31 at 2:1. Then, the start and end points of the first key stroke 31 are connected to each other so that a base line 37 of the first key stroke is formed. The ends points 35a and 36a of the first interpolating stroke are connected to each other so that a base line of the first interpolating stroke is formed. Moreover, end points 35b and 36b of the second interpolating stroke are connected to each other so that a base line of the second interpolating stroke is formed. The start and end points of the second key stroke 32 are connected to each other so that a base line of the second key stroke is formed.

Figure 89:
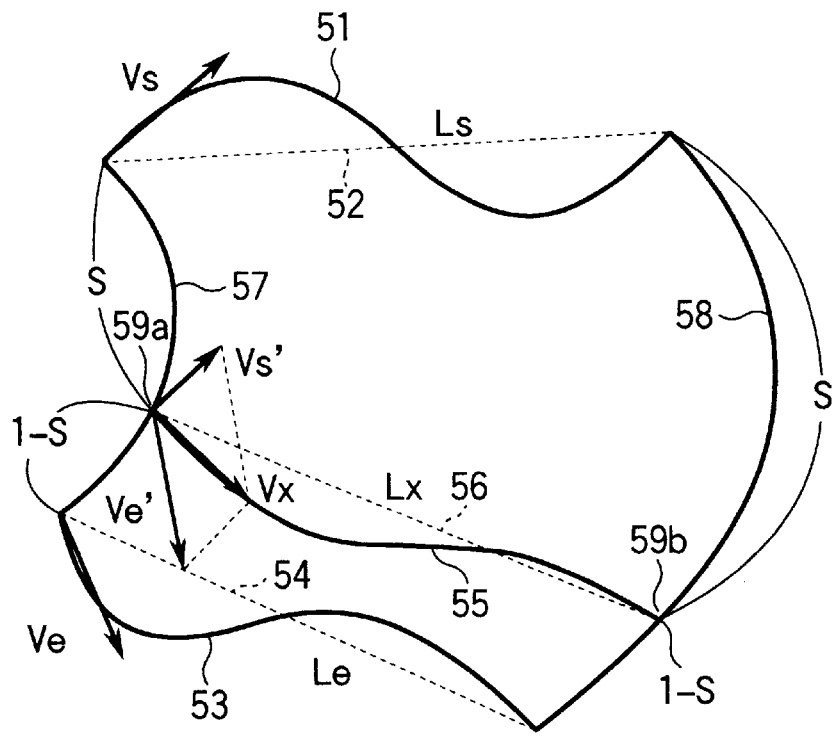
FIG. 89 is a diagram showing a method of generating an interpolating vector by blending unit vectors.

Then, unit vectors constituting the key stroke (the first key stroke) of the first key-frame obtained by the key-stroke quantizing means 4 and the key stroke (the second key stroke) of the second key-frame corresponding to the first key-frame are combined. The combination of unit vectors are performed at a ratio corresponding to the position of the interpolating frame which is the subject in consideration of the first key stroke, the second key stroke and the length of the base line connecting the ends of the interpolating strokes. Thus, a interpolating vector is obtained. A specific example is shown in FIG. 89. An assumption is made that unit vector Vs of the first key stroke 51 and unit vector Ve of the second key stroke 53 corresponding to the first key stroke 51 exist. A process which is performed to generate the second interpolating stroke 55 when the instructed number of the interpolating frames is "2" will now be described. Initially, the distance between ends of the limiting strokes 57 and 58 are divided into f+1=3 sections so that end pints 59a and 59b of the second interpolating stroke are obtained. Then, the base line 52 of the first key stroke, the base line 54 of the second key stroke and the base line 56 of the second interpolating stroke are obtained. At this time, the ratio S corresponding to the position of the second interpolating stroke is S=2/3.

Initially, the unit vector Vs of the first key stroke, the length Ls of the base line 52 of the first key stroke, length Lx of the base line 56 of the second interpolating stroke and the ratio S are used so that unit vector Vs' is obtained in accordance with Equation (7):

$$Vs'=(1-S)\cdot(Lx/Ls)\cdot Vs \quad (7)$$

Then, the unit vector Ve of the second key stroke, the length Le of the base line 54 of the second k, the length Lx of the base line 56 of the second interpolating stroke and the ratio S are used so that unit vector Ve' is obtained in accordance with Equation (8):

$$Ve'=S\cdot(Lx/Le)\cdot Ve \quad (8)$$

The unit vector Vx of the second interpolating stroke 55 can be obtained by combining the unit vectors Vs' and Ve', that is, in accordance with Equation (9):

$$Vx=Vs'+Ve' \quad (9)$$

If the number of unit vectors constituting the first key stroke and the number of unit vectors constituting the second key stroke are not the same, the key-stroke quantizing means 4 again divides the key stroke to make the numbers of the unit vectors to be the same. Then, information of the unit vector stored in the unit-vector storage means 5 is updated.

Figure 90:
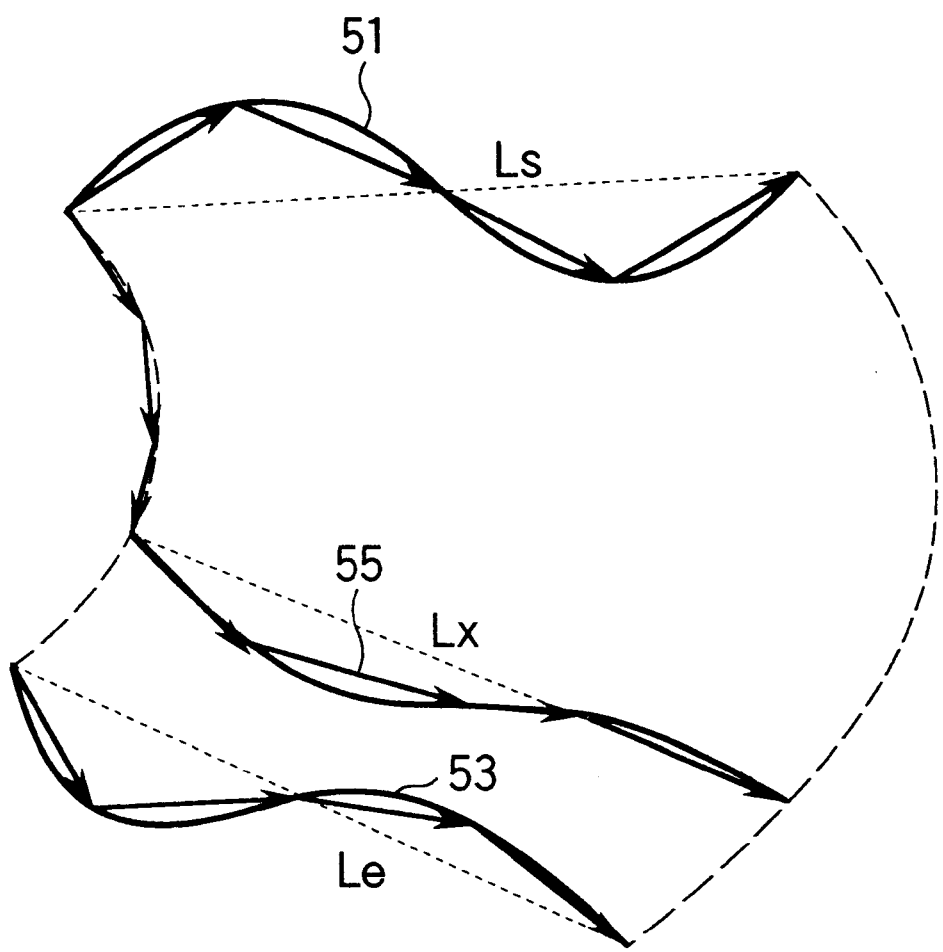
FIG. 90 is a diagram showing a method of generating an interpolating stroke from the generated interpolating vector.

The unit vector Vx of the second interpolating stroke which can be obtained by the method shown in FIG. 89 are combined in the ascending order of the identifiers of the unit vectors from the position of the end point of the interpolating stroke so that the interpolating stroke 55 is generated (see FIG. 90).

The interpolating strokes generated between the key strokes having all correspondence relationships of the first and second key-frames are displayed by the image presentation means 3. The display is repeated by the number f of the interpolating frames. Moreover, the foregoing manipulation is repeated between all of the key-frames (between the second (i=1) and third (i=2) key-frames and between third (i=2) and fourth (i=3) key-frames) so that animation is generated (steps S147 to S157).

In the above-mentioned embodiment, the limiting stroke is used to regulate the positions of the two end points of the interpolating stroke which must be generated. The limiting stroke is not limited to this. The limiting stroke may be used to regulate the position of the central position of the interpolating stroke. In this case, when generation with the base line of the interpolating stroke shown in FIGS. 88A to 88C is performed, the equally-dividing points are required to be obtained in accordance with the number f of the interpolating frame connecting the two end points of the corresponding two key strokes of the first and second key-frames. Moreover, the base line of each interpolating stroke is required to be obtained in accordance with the position of the limiting stroke for regulating the central position of the interpolating stroke.

As described above, according to the ninth embodiment, a limiting stroke (specifically which limits the positions of the two end points of the interpolating stroke which is generated) for limiting the changed shape of the stroke when the one or more key strokes are interpolated between a plurality of key-frame images is arranged to be input. Thus, an interpolating stroke is generated in accordance with the interpolating position, the limiting stroke and the key stroke when the stroke is interpolated between the plurality of the key-frame images. Thus, the interpolating stroke between the input key strokes is generated in accordance with the limiting stroke for limiting the positions of the two end points of the interpolating stroke. Therefore, animation capable of moving naturally can easily be generated while maintaining the overall shape of the key stroke and adjacent portions.

Tenth Embodiment

Figure 91:
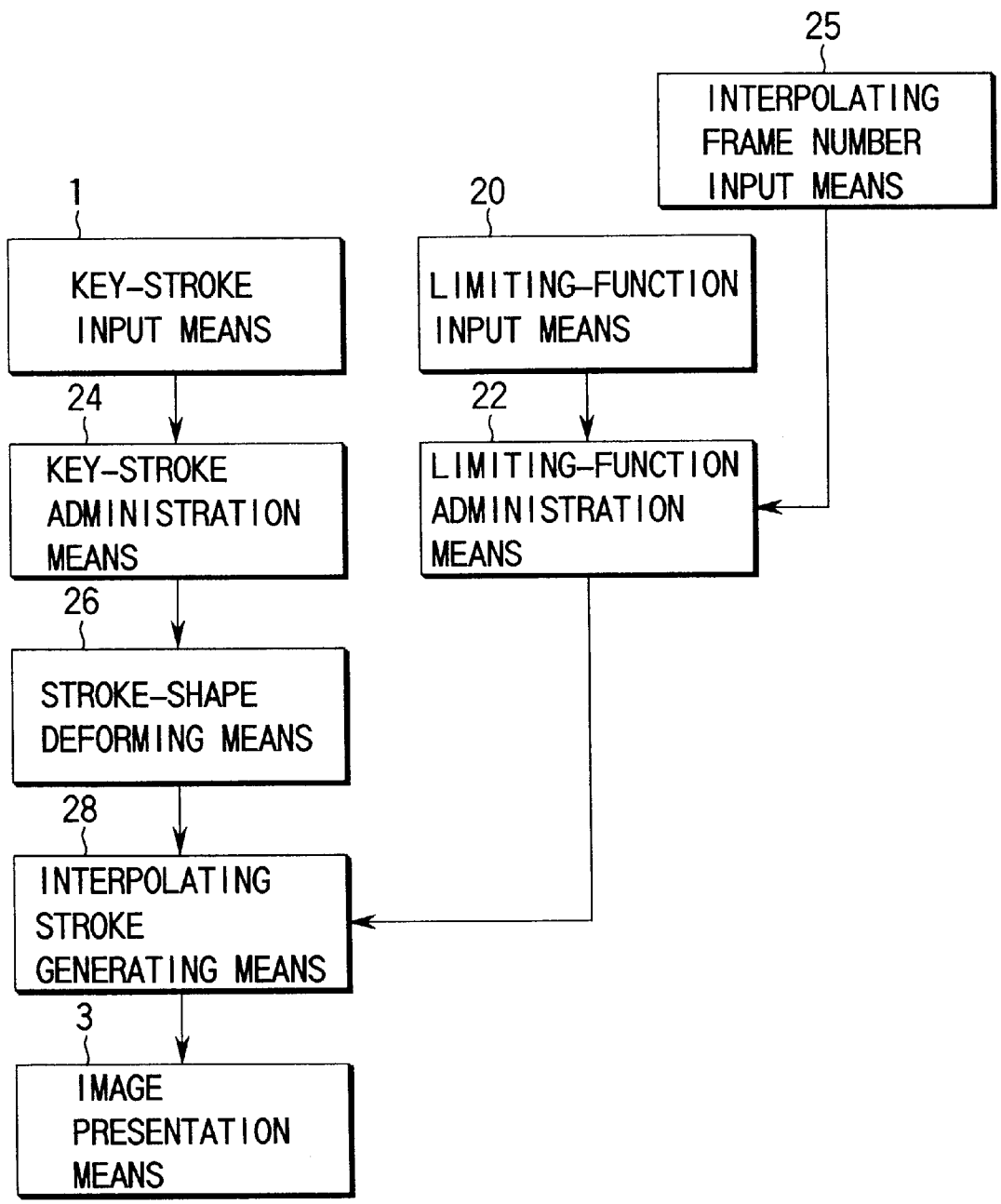
FIG. 91 is a diagram schematically showing an example of the structure of an animation producing apparatus according to a tenth embodiment of the present invention.

FIG. 91 is a diagram schematically showing the structure of an animation producing apparatus according to a tenth embodiment of the present invention. The same elements as those shown in FIG. 86 are given the same reference numerals and only different portions will now be described. The animation producing apparatus shown in FIG. 91 comprises a key-stroke input means 1, a key-stroke administration means 24, a stroke-shape deforming means 26, an interpolating frame number input means 25, a limiting-function input means 20, a limiting-function administration means 22, an interpolating stroke generating means 28 and an image presentation means 3.

Figure 92A:
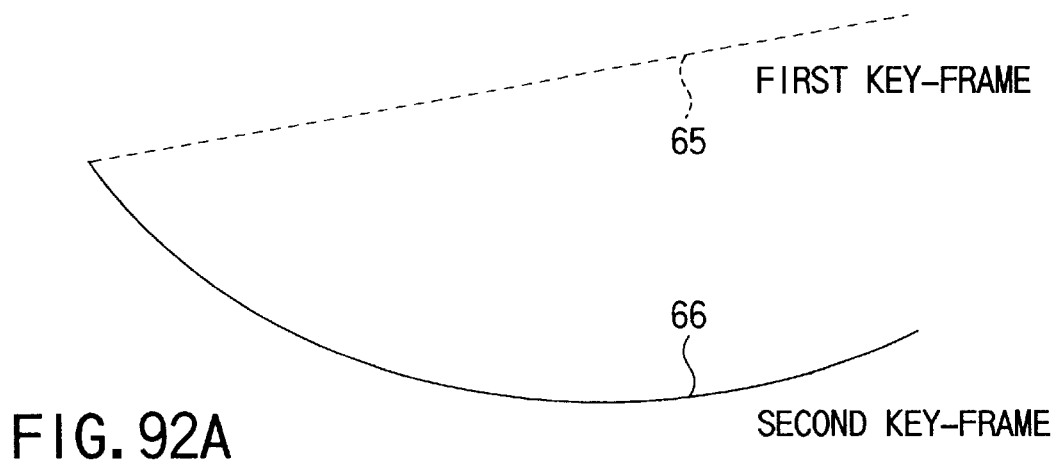
FIGS. 92A and 92B are diagrams showing a process of approximation of a key stroke with a predetermined parameter curve.
Figure 92B:
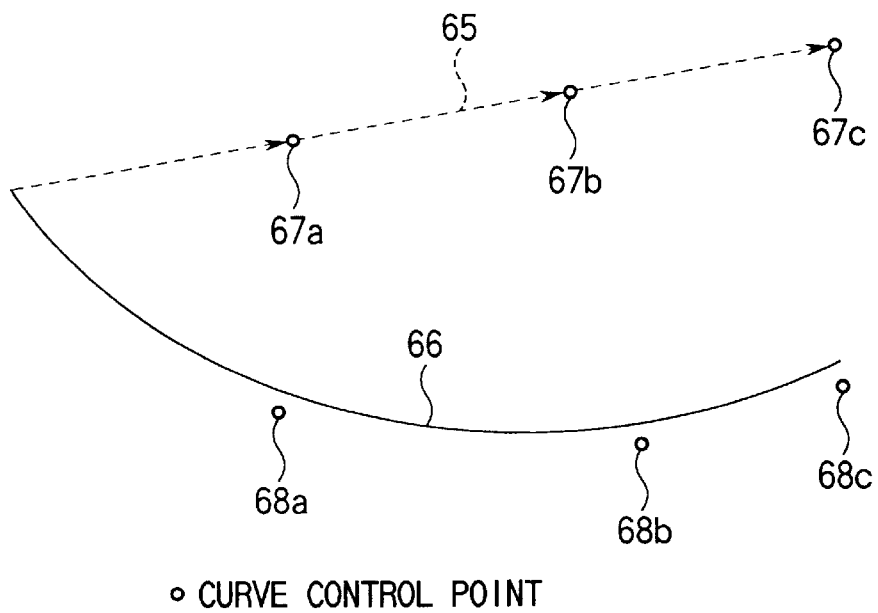

The key-stroke input means 1 is used to input a plurality of key strokes which must be registered to the key-frame of animation. A mouse, a tablet or the like is used to draw a stroke (a curve) serving as a skeleton in a portion on the prepared bitmap image in which animation is required so that key strokes are input. An assumption is made that a key stroke 65 has been registered to the first key-frame and a key stroke 66 has correspondingly been registered to the second key-frame, as shown in FIG. 92A. Key strokes 65 and 66 input by the key-stroke input means 1 are, as shown in FIG. 92B, approximated by a parameter curve, such as a Bezier curve or a B-spline curve. Information of control points (control points 67a, 67b and 67c for the key stroke 61 and those 68a, 68b and 68c for the key stroke 66) are, together with the identifiers for the strokes, registered to the key-stroke administration means 24. As described above, the input key strokes are assumed to be a set of points obtained by making approximation by the foregoing parameter curve so as to be administrated. Thus, calculations of the deformation, superimposition and control function to be described later can easily be performed.

In the key-stroke administration means 24, there are stored a sequence, the elements of which are key-frame numbers (i) which are identifiers for the key-frames, stroke numbers (j) which are identifiers of the strokes input to the key-frames and identifiers (Vjhi, h=1, 2, 3, . . . ,) of the control point vectors of the strokes, as shown in, for example, FIG. 93. The identifiers for the control point vectors are given numbers h (=1, 2, 3, . . . ,) starting from a point at which drawing of the strokes is started.

When the key stroke of the second key-frame corresponding to the key stroke of the first key-frame has been input, a jump destination address, for example, "p1" is added to the trailing end of the sequence of the control point vectors of the key stroke having the key stroke number j=1 of the first key-frame, as shown in FIG. 93. Thus, a sequence having elements which are address "p1", the key-frame number (i=1), the stroke number (j=1) and control point vector identifiers (Vjhi, h=1, 2, 3, . . . ,) is stored.

The limiting-function input means 20 is used to input a limiting function for limiting deformation of the interpolating stroke which is generated for interpolating the key stroke input from the key-stroke input means 1 between the key-frames. The limiting function is described in a ID parameter corresponding to the position t of the interpolating frame and the stroke position s. The limiting function includes a Bezier curve and a B-spline curve. A selected approximation curve is instructed from the unit-image generating means 13. Thus, a limiting function of a required approximation curve can be obtained which corresponds to the control points of each key stroke having parameters which are the position t of the interpolating frame and the stroke position s corresponding to the number of the interpolating frames input from the interpolating frame number input means 25. The limiting function may be used when the movement of the stroke is attempted to have speed.

As shown in FIG. 94, in the limiting-function administration means 22, there are stored a sequence, the elements of which are, for each key-frame, key-frame number (i) which is an identifier for the key-frame, stroke number (j) which is an identifier of the stroke input to the key-frame and a pointer (Fjhi (s, t), h=1, 2, 3, . . . ,) for the material substance of the limiting function in accordance with the position s of the stroke and the position t of the interpolating frame.

When another limiting function is required because of input of a key stroke of the second key-frame corresponding to the key stroke of the first key-frame, jump destination address, for example, "p1" is added to the trailing end of the sequence of the pointer to the limiting function of the key stroke having the key stroke number j=1 of the first key-frame. Thus, a sequence, the elements of which are address "p1", the key-frame number (i=1), the stroke number (j=1) and the pointer (Fjhi (s, t), h=1, 2, 3, . . . ,) to the limiting function is stored.

As for the limiting function which is input by the limiting-function input means 20, the limiting stroke is, as described in the first embodiment, input, and then it is approximated by a parameter curve, such as the Bezier curve or the B-spline curve, and then a limiting function in accordance with the control points is registered to the limiting-function administration means 22.

The stroke-shape deforming means 26 deforms the shape of the key stroke in accordance with the position of the interpolating frame. The interpolating stroke generating means 28 generates an interpolating stroke from the deformed key stroke. Then, the limiting function stored in the limiting-function administration means 22 is applied to the generated interpolating stroke as shown in FIG. 94 so as to generate an interpolating stroke.

A process for generating the interpolating stroke will now be described with reference to FIGS. 95A to 96B. Description will be made about an example in which a key stroke 111 of the first key-frame and a key stroke 113 of the second key-frame corresponding to the key stroke 111 exist. Moreover, the number f of interpolating frames is two and animation composed of four frames including the first key-frame and the second key-frame is generated. In this case, an interpolating stroke for the second frame of the four frames, that is, the frame position t=2 is generated.

Initially, the line segments obtained by connecting end points 115*a* and 115*b* of the key stroke 111 and the end points 117*a* and 117*b* of the key stroke 113 to one another have the number f of interpolating frames input from the interpolating frame number input means 25 is two. Therefore, each distance between ends of the key strokes 111 and 113 is divided into f+1=3 sections. Points 119*a* and 119*b* which interior-divide the distances from end points 115*a* and 115*b* of the key stroke 111 at 1:2 are end points of the interpolating stroke (the first interpolating stroke) at the frame position t=2. The end point of the second interpolating stroke at the frame position t=3 is a point which interior-divides the distance from end points 115*a* and 115*b* of the key stroke 111 at 2:1. The start and end points of the first key stroke 111 are connected to each other so that a base line 121 of the first key stroke is formed. End points 119*a* and 119*a* of the first interpolating stroke are connected to each other so that a base line 123 of the first interpolating stroke is formed. Start and end points of the second key stroke 113 are connected to each other so that a base line 125 of the second key stroke is formed.

Figure 95A:
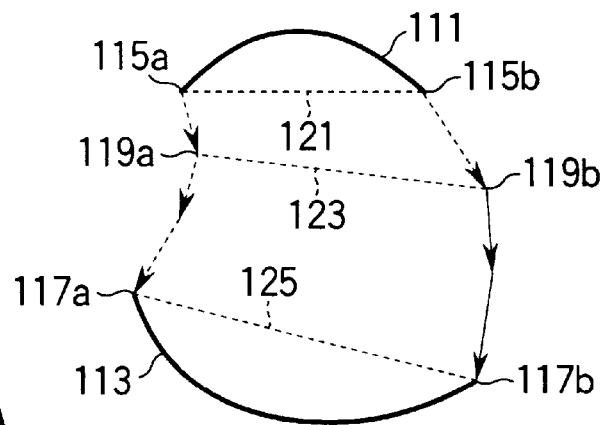
Figure 95B:
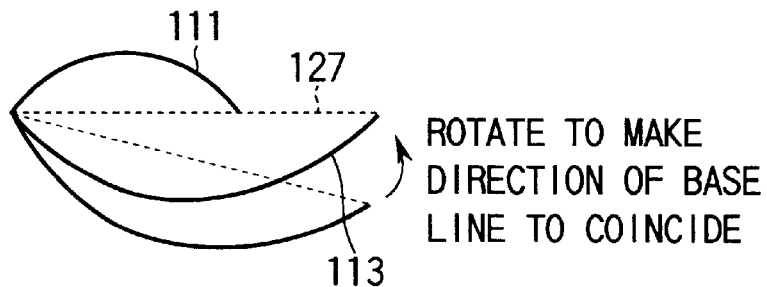
Figure 96A:
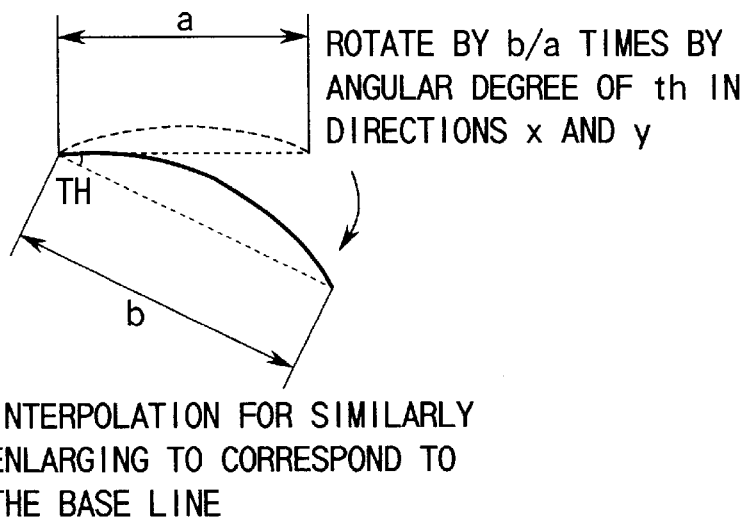
FIGS. 96A and 96B are diagrams showing a method of deforming the key stroke.

As shown in FIG. 95B, the stroke-shape deforming means 26 subjects the first key stroke 111 and the second key stroke 113 to a rotation process in such a manner that the base line 121 of the first key stroke and the base line 125 of the second key stroke coincide with the base line 123 of the first interpolating stroke. To make the distance between ends of the key strokes 111 and 113 to be the same as the distance between ends 119*a* and 119*b* of the interpolating stroke, the key strokes 111 and 113 are subjected to an enlargement process, a contraction process and the like. The method may be either of the following methods:

(1) An assumption is made as shown in FIG. 96A that the length of the base line 123 of the interpolating stroke is a and the length of the base line of the key stroke is b. A method is employed in which the key stroke is multiplied by b/a in the direction (direction x) of the base line of the interpolating stroke and a direction (direction y) perpendicular to the base line direction to correspond to the length of the base line of the interpolating stroke so as to perform approximate enlarging/contracting deformation.

Figure 96B:
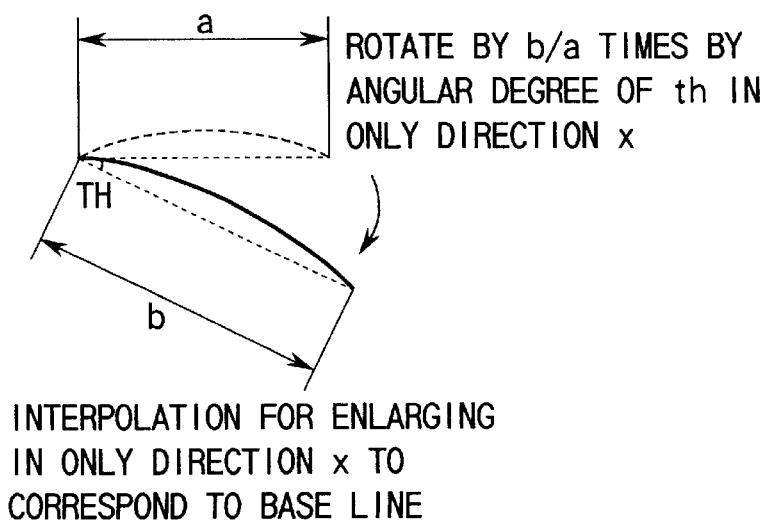

(2) A method arranged as shown in FIG. 96B in which the key stroke is multiplied with b/a in only the direction of the base line (the direction x) of the interpolating stroke to correspond to the length of the base line of the interpolating stroke so as to perform enlarging/contracting deformation.

The interpolating stroke generating means 28 adds the amplitude value of each of the key stroke of the first key-frame and the key stroke of the second key-frame after the deformation has been performed in a direction along the base line 123 of the interpolating stroke at a ratio corresponding to the frame position t=2 of the interpolating frame. Thus, the interpolating stroke is generated. That is, as shown in FIG. 95C, the amplitude values are required to be added at a ratio that the key stroke of the first key-frame is "2" and the key stroke of the second key-frame is "1". Then, the position t (=2) of the interpolating frame which must be processed at present is given to the limiting function registered to the limiting-function administration means 22. The limiting function is applied to the above-mentioned obtained interpolating stroke so that a deformed interpolating stroke is generated.

Display of the interpolating strokes generated between the key strokes having all of correspondence relationships of the first and second key-frames on the image presentation means 3 is repeated by the number f of the interpolating frames. Moreover, display between all of the key-frames (between second (i=1) and third (i=2) key-frames, between third (i=2) and fourth (i=3) key-frames, . . . ,) is repeated so that animation is generated.

Figure 97:
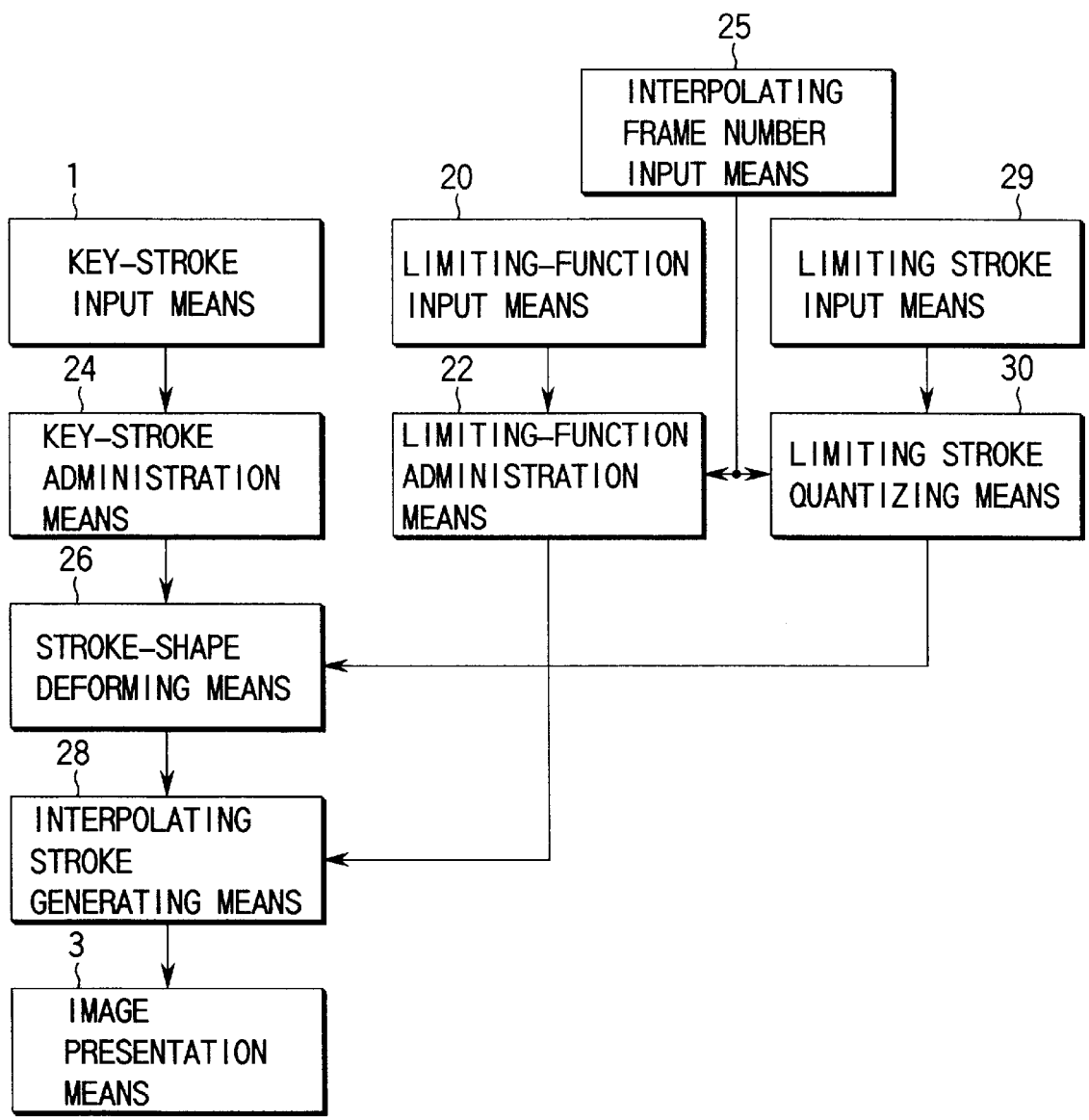
FIG. 97 is a diagram showing an example of the structure of an animation producing apparatus for generating an interpolating stroke in accordance with a limiting stroke and a limiting function.
Figure 98A:
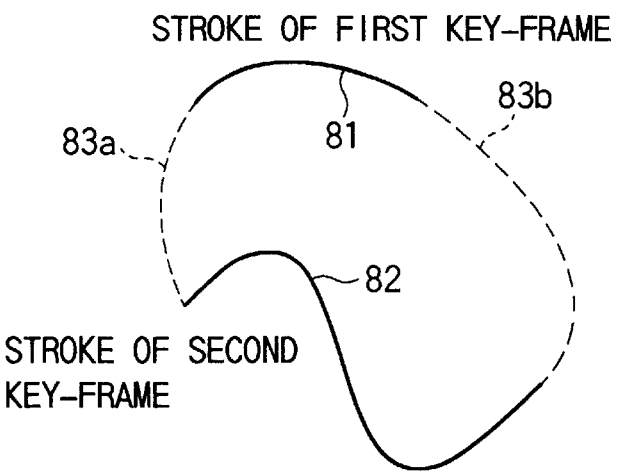
FIGS. 98A to 98C are diagrams specifically showing a process for generating an interpolating stroke in accordance with the limiting stroke and the limiting function.

As shown in FIG. 97, the stroke input means 29 and a limiting stroke quantizing means 30 according to the ninth embodiment may be added to the structure shown in FIG. 91 to constitute the animation producing apparatus. In this case, as shown in FIG. 98A, limiting strokes 83a and 83b indicating limits when the key stroke 81 is deformed between the first key-frame and the second key-frame are input from the limiting stroke input means 29 along a route to which the end point of the key stroke 81 is required to be disposed. Then, the limiting stroke quantizing means 30 quantizes the limiting stroke similar to the method described with reference to FIGS. 88A to 88C so that ends and the base line of the interpolating stroke are obtained. That is, the limiting stroke is used to obtain the base line of the interpolating stroke. Then, the stroke-shape deforming means 26 deforms the shapes of the stroke 81 of the first key-frame and the key stroke 82 of the second key-frame. Then, the interpolating stroke generating means 28 adds the amplitude values of the key stroke of the first key-frame and that of the key stroke of the second key-frame after the deformation has been performed along the base line of the interpolating stroke at the ratio corresponding to the frame position t of the interpolating frame so that an interpolating stroke is generated.

Figure 98B:
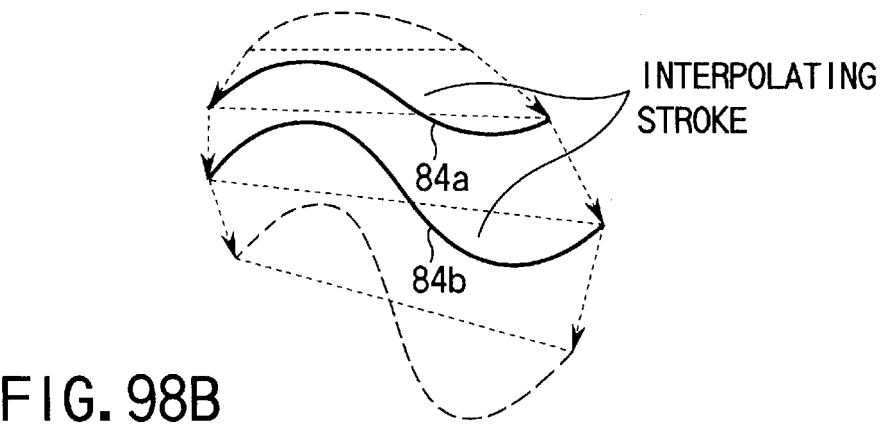

FIG. 98B shows a process in which the key strokes 81 and 82 are similarly enlarged/contracted in the direction of the base line of the interpolating stroke and a direction perpendicular to the direction of the base line to correspond to the length of the base line of the interpolating stroke. Moreover, the deformed key strokes are superimposed so that interpolating strokes 84a and 84b are generated.

Figure 98C:
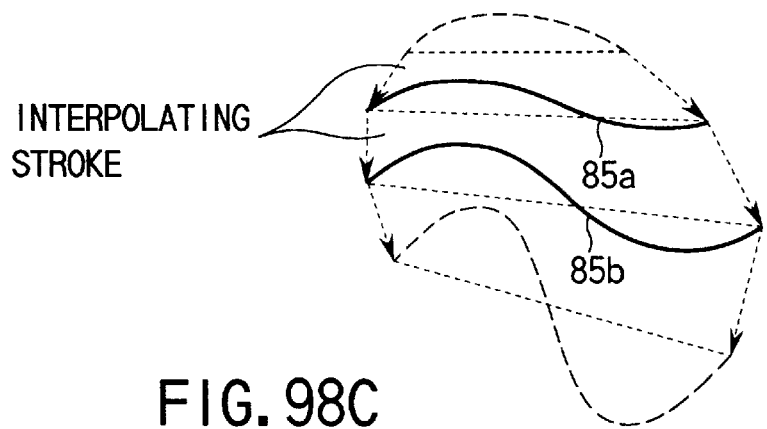

FIG. 98C shows a process in which the key strokes 81 and 82 are enlarged/contracted in only the direction of the base line of the interpolating stroke to correspond to the length of the base line of the interpolating stroke. The deformed key strokes are superimposed so that interpolating strokes 85a and 85b are generated.

Another example of the method of applying the limiting function will now be described with reference to FIG. 99.

Figure 99:
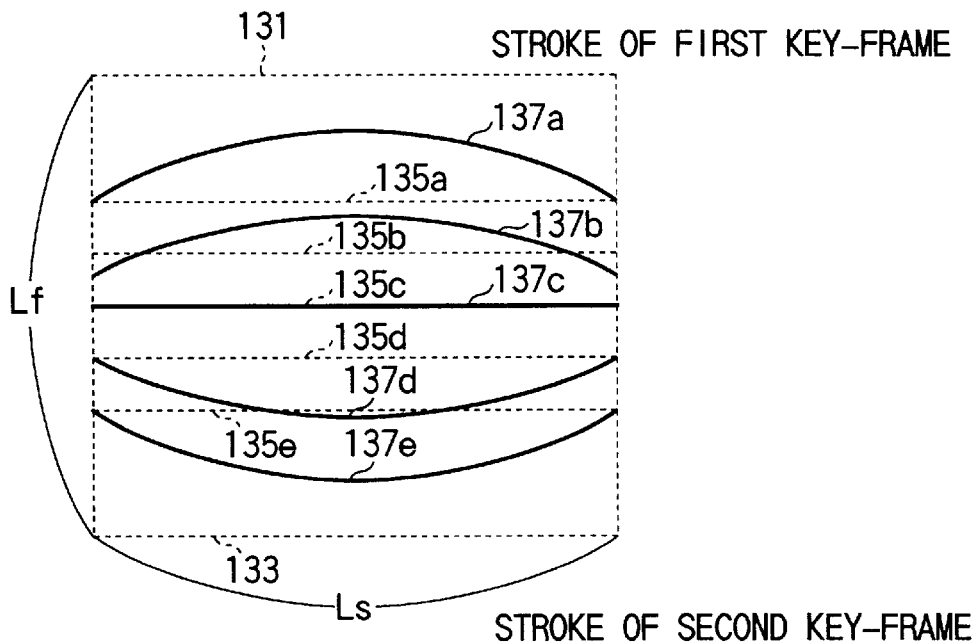
FIG. 99 is a diagram showing an example of a process for generating an interpolating stroke by using a limiting function.

In the case shown in FIG. 99, the key stroke 131 of the first key-frame and the key stroke 133 of the second key-frame are in parallel with each other and have the same length. Therefore, the generated interpolating stroke is in parallel with both of the key strokes 131 and 133 and has the same length (reference interpolating strokes 135a,135b, 135c, 135d and 135e). At this time, limiting function F (s, t) on the basis of sin function having parameters which are the position t (indicating the sequential number of the interpolating frame among all of the generated interpolating frames) of the interpolating frame and the distance s from the position of either of the end points of the interpolating stroke is defined by, for example, the following Equation (10):

$$F(s, t)=(Lf/2) \sin (2(f-t)\pi)\cdot\sin ((Ls-s)\pi) \qquad (10)$$

wherein
    f: number of interpolating frames
    Lf: distance between key stroke of first key frame and that of the second key-frame
    Ls: length of key-frame The limiting function obtained from Equation (10) is instructed from the limiting-function input means 20 so as to be added to the obtained reference interpolating strokes 135a to 135e so that the reference interpolating strokes are deformed and thus the interpolating strokes 137a to 137e are generated.

As for the effect of addition, a similar deformation effect can be obtained when a limiting function is applied to a control point (a curve control parameter) expressing the shape of a key stroke stored in the key-stroke administration means 24. As a result of the above-mentioned deformation, animation having an effect as if an image is observed through a fish-eye lens.

When display of the generated interpolating stroke on the image presentation means by the total number of interpolating frames, animation is generated.

Eleventh Embodiment

Figure 100:
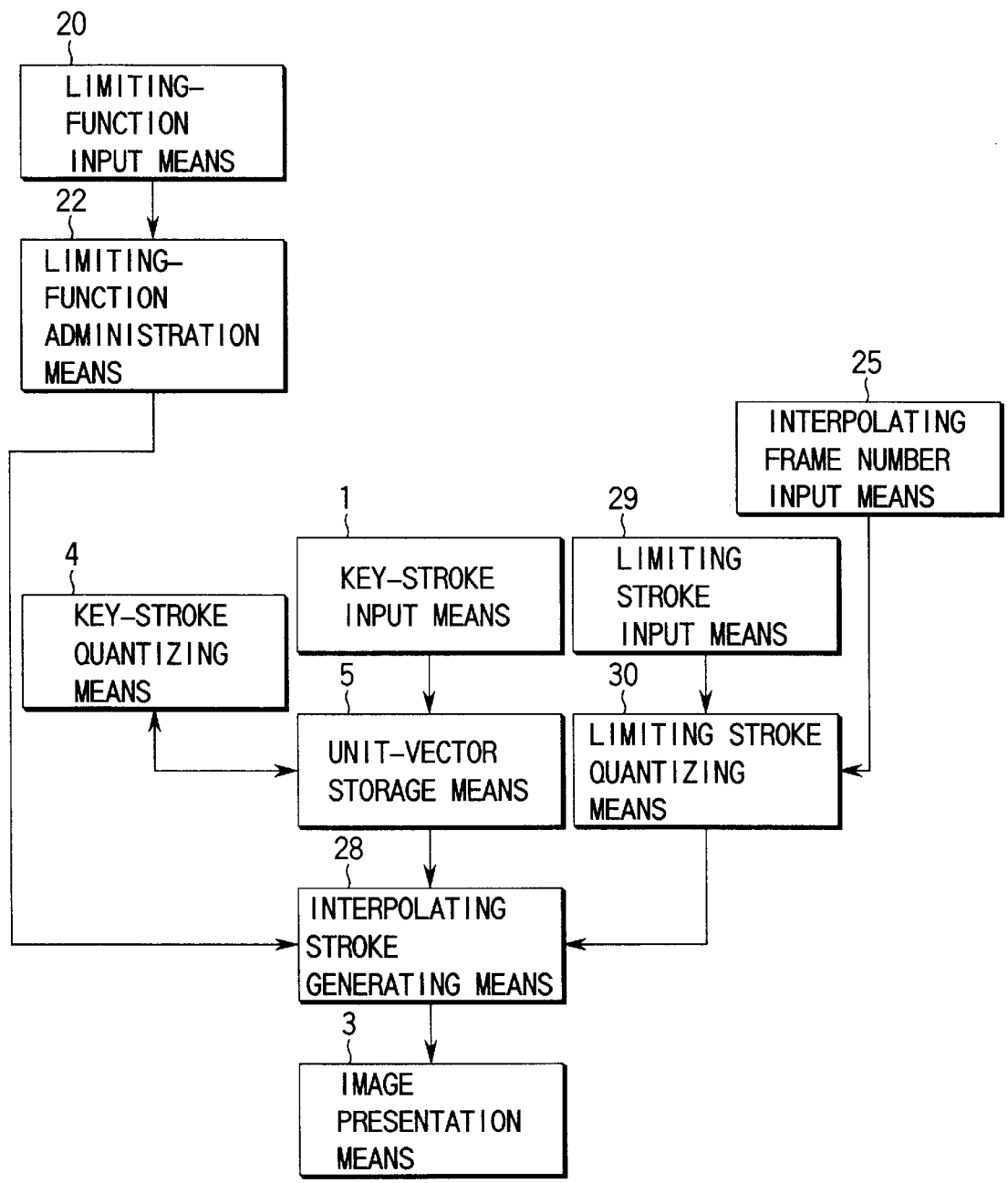
FIG. 100 is a diagram schematically showing an animation producing apparatus according to an eleventh embodiment of the present invention, in which a modification of the animation producing apparatus according to the tenth embodiment is shown.

FIG. 100 is a diagram showing an example of the structure of an animation producing apparatus according to an eleventh embodiment of the present invention. The same elements as those shown in FIG. 86 are given the same reference numerals and description will be made about different portions. The animation producing apparatus shown in FIG. 100 has, in addition to the elements of the animation producing apparatus shown in FIG. 86, the limiting-function input means 20 and the limiting-function administration means 22 according to the tenth embodiment. When the interpolating stroke generating means 28 generates an interpolating stroke which constitutes the interpolating stroke, a limiting function corresponding to the number of division of the unit vectors of the key stroke is applied to the generated interpolating vector. Then, deformation is performed, and then they are combined so that an interpolating stroke is generated.

As described above, according to the tenth and eleventh embodiments, when a limiting function for limiting the changed shape of a stroke for use to interpolate one or more key strokes input to a key-frame between a plurality of key-frame images, an interpolating stroke is generated in accordance with the interpolating position, the limiting function and the key stroke for use to interpolate the stroke between the plural key-frame images. Thus, the generated interpolating stroke is deformed by using a limiting function. As a result, animation having 3D visual effect including convex and irregularity can easily be generated.

Twelfth Embodiment

A process for producing animation in accordance with an original image having a general region.

Figure 101:
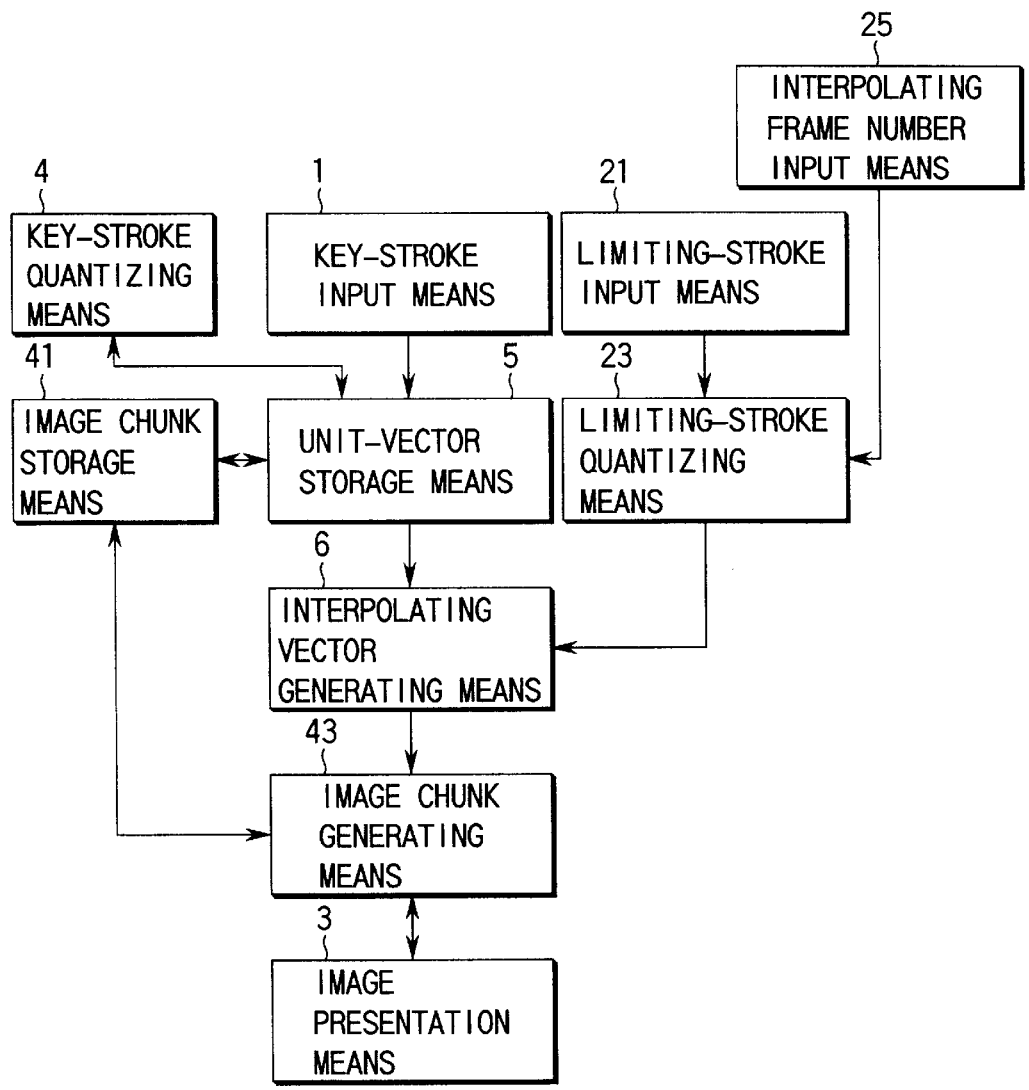
FIG. 101 is a diagram schematically showing an example of the structure of an animation producing apparatus according to a twelfth embodiment of the present invention.

FIG. 101 is a diagram showing an example of the structure of an animation producing apparatus according to a twelfth embodiment of the present invention. The same elements as those shown in FIG. 86 are given the same reference numerals and only different portions will now be described. That is, an image chunk storage means 41 and an image chunk generating means 43 are added to the animation producing apparatus shown in FIG. 86.

The key-stroke input means 1 permits a plurality of key strokes, which must be registered to the key-frame of animation, to be input. A mouse or a tablet is used to draw a stroke (a curve) serving as the skeleton in a portion on a prepared bitmap image in which animation is required.

Figure 102:
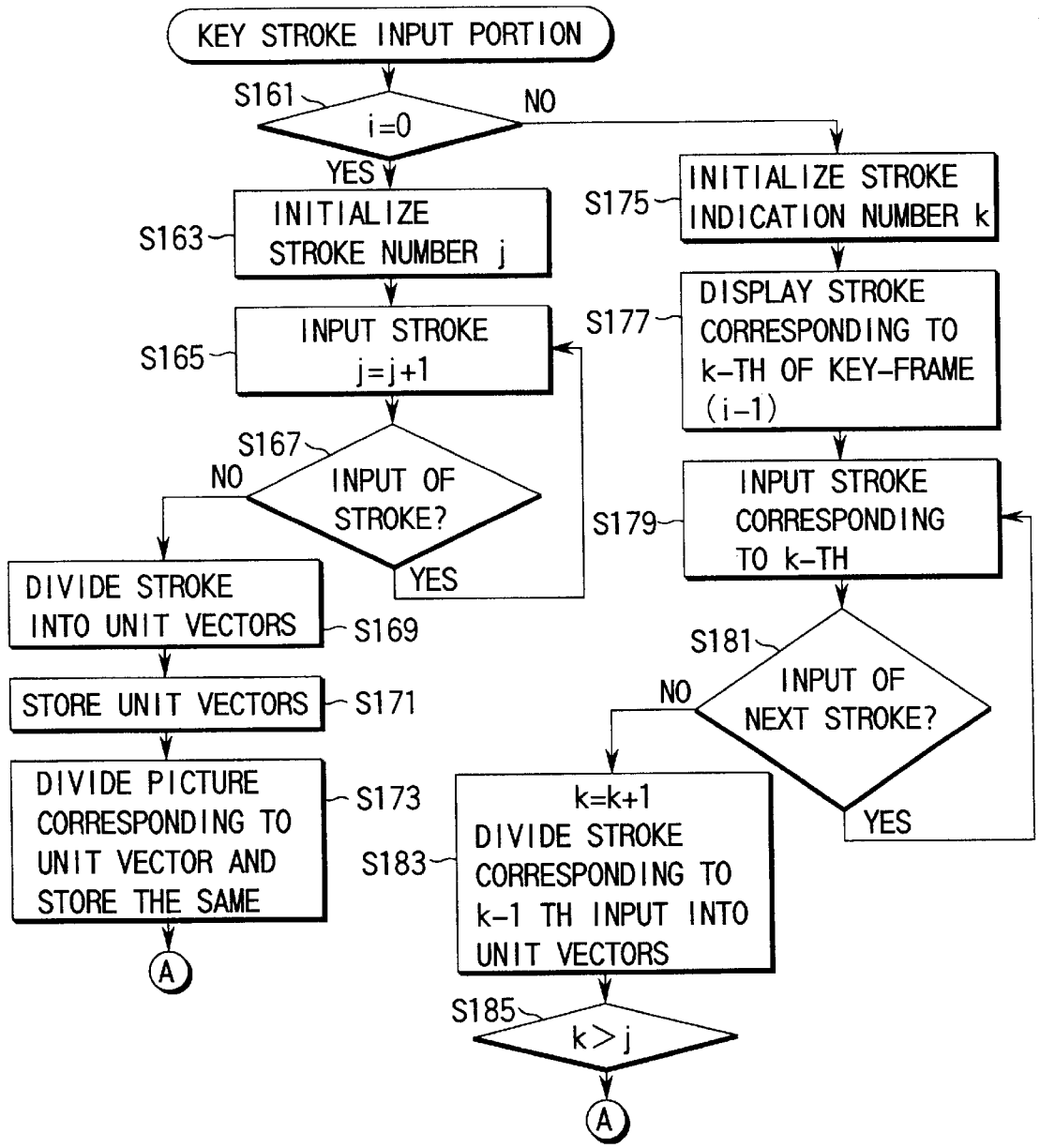
FIG. 102 is a flow chart of a process for inputting a key stroke in the animation producing apparatus according to the twelfth embodiment.

A plurality of key strokes input through the key-stroke input means 1 are, by the key-stroke quantizing means 4, decomposed into unit vectors each having a predetermined length so as to be registered to a unit vector storage means. Simultaneously, an image adjacent to the unit vector is cut so as to be registered to the image chunk storage means 41 as an image chunk in step S173 shown in FIG. 102.

The stroke is extracted and the image chunk is extracted as described with reference to FIGS. 26A to 26C and 27.

An interpolating frame for interpolating two key-frames to which the key stroke has been input is generated as described with reference to FIG. 31.

Thirteenth Embodiment

Figure 103:
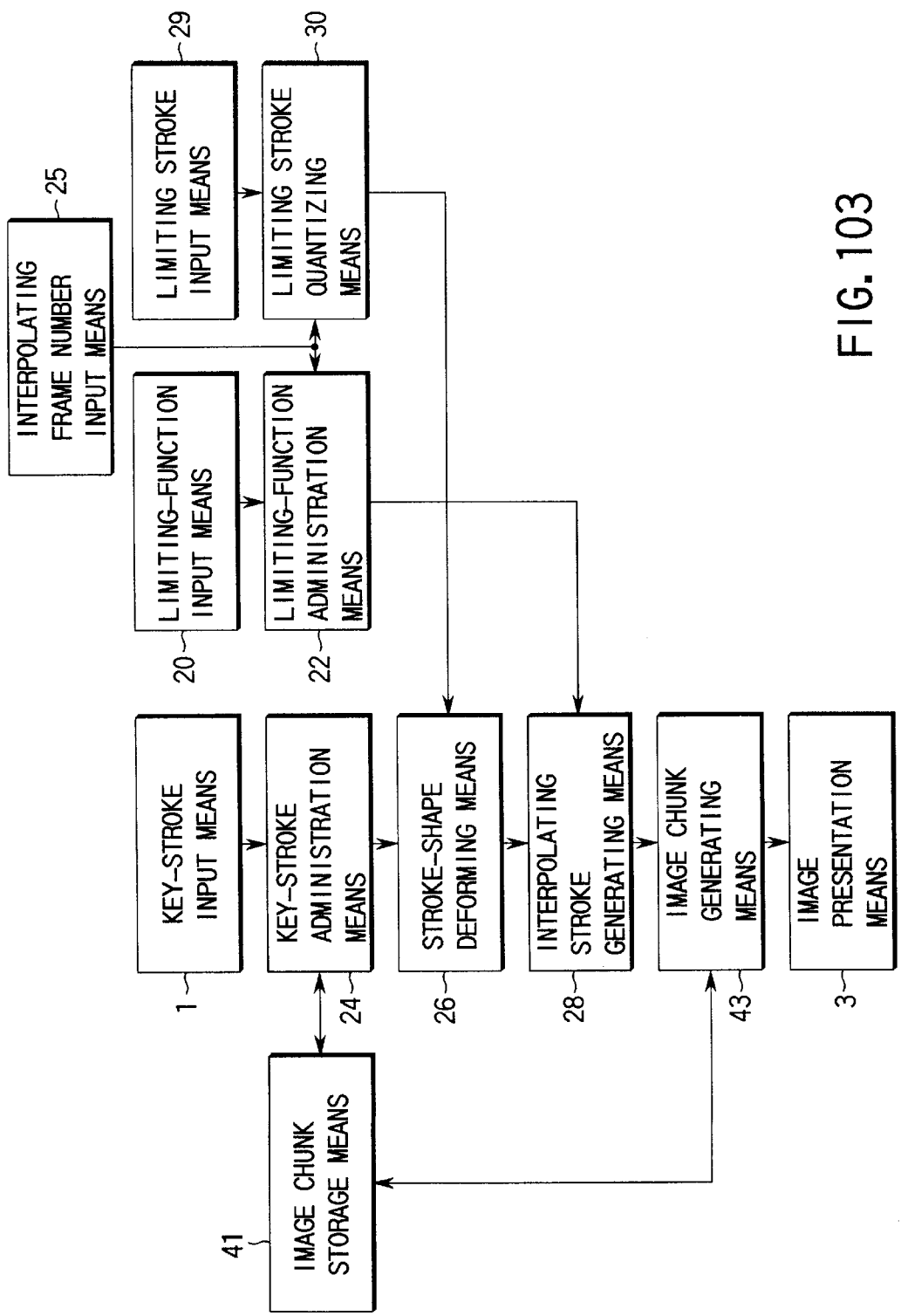
FIG. 103 is a diagram showing an example of the structure of an animation producing apparatus according to a thirteenth embodiment of the present invention, in which a modification of the structure of the animation producing apparatus according to the twelfth embodiment is shown.

As shown in FIG. 103, the image chunk generating means 43 and the image chunk storage means 41 according to the twelfth embodiment may be added to the structure shown in FIG. 97 to constitute an animation producing apparatus. When an image region adjacent to the key stroke is cut as an image chunk, the image chunk is made to correspond to the key stroke registered to the key-stroke administration means 24 so as to be registered to the image chunk storage means 41. When the shape of the stroke is changed by the stroke-shape deforming means 26 or when the interpolating stroke is generated by the interpolating stroke generating means 28, the image chunk generating means 43 reads the corresponding image chunk from the image chunk storage means 41. Then, the image chunk generating means 43 moves and/or deforms to combine it with the key-frame image so as to generate an interpolating frame.

The image chunk generating means 43 and the image chunk storage means 41 according to the twelfth embodiment may be added to the structure shown in FIG. 100 to constitute an animation producing apparatus. Another combination may be permitted.

Figures 105A, 105B:
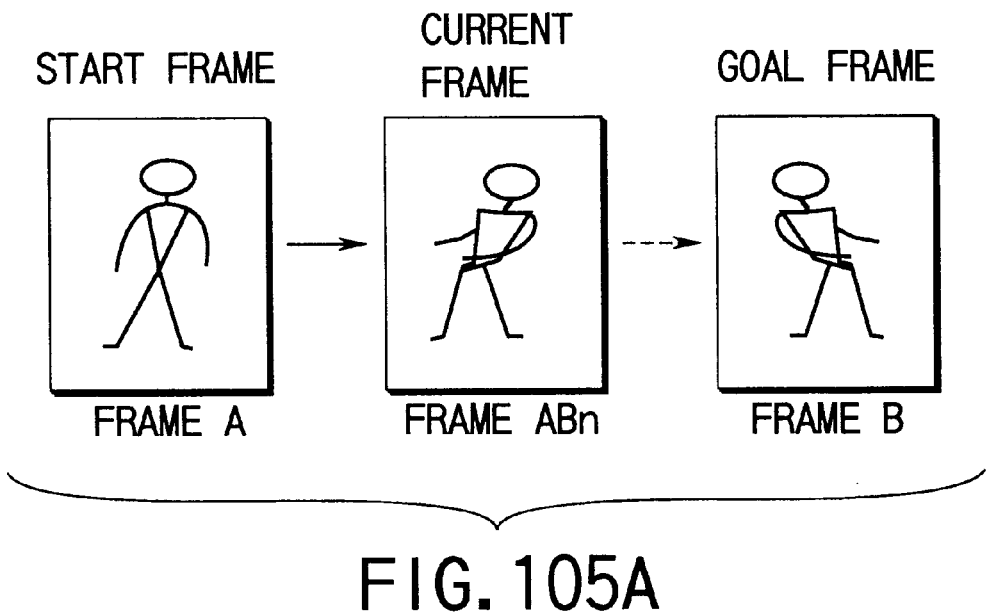
FIGS. 105A and 105B are diagrams showing a process for generating a usual animation flow in a case where branching is not instructed.

The twelfth and thirteenth embodiments are constituted as described above. When a limiting stroke and/or a limiting function for limiting the changed shape of the stroke is input when one or more key strokes input to the key-frame is interpolated between a plurality key-frames, an interpolating stroke is generated in accordance with the interpolating position, the limiting stroke and/or limiting function and the key stroke for interpolating the stroke between a plurality of key-frame images. The image adjacent to the key stroke is moved and/or deformed in accordance with the position and shape of the generated interpolating stroke so as to combine it with the key-frame. Thus, an interpolating frame image for interpolating two key-frames is generated. Thus, the interpolating stroke between the input key strokes is generated in accordance with the limiting stroke for animation flow will now be described. FIG. 105A shows an example of animation which is generated. FIG. 105B shows an example of storage in a current data cache 151. Two key-frames previously stored in the key-frame storage portion 141 are used as start and goal frames, respectively. Sequential animation is reproduced while interpolating frames are generated. Initially, the key-frame setting portion 149 reads, from the key-frame storage portion 141, key-frame FrameA serving as the start frame and key-frame FrameB serving as the goal frame. As shown in FIG. 105B, the read key-frames are set to the current data cache 151. At this time, real data of key-frames FrameA and FrameB may be stored in the current data cache 151 or information except for the real data, such as the storage addresses in the key-frame storage portion 141 may be stored.

The number of interpolating frames to be generated between the start frame and the goal frame is usually previously set. Change in the required number of the interpolating frames may be permitted for the user through the input portion 147. Since one second of a usual movie is composed of 30 frames, a default value of the number of the interpolating frames is made to be 30−1=29 in this embodiment. The interpolating-frame generating portion 143 sequentially generates 29 interpolating frames at intervals of 1/30 second between the key-frames FrameA and FrameB. generated by the interpolating-frame generating portion 143 and the key-frame on a display unit provided previously, an input portion 147 through which an external input, such as an instruction to perform branching, from the user and a key-frame setting portion 149 for setting start and goal frames in accordance with the instruction from the user received through the input portion 147.

When key-frames stored in the key-frame storage portion 141 are set to the key-frame setting portion 149 in such a manner that one of the key-frames is set as a start frame and another one is set as a goal frame, the interpolating-frame generating portion 143 interpolates an area between the strokes in the images of the start frame and the goal frame by, for example, a morphing technique. Thus, a plurality of interpolating frames are generated. That is, a control point is provided for each of bitmap images which serves as two key-frames in order to indicate the positional relationship between the two bitmap images. Moreover, an interpolating frame can be generated at the interior-dividing point determined on a straight line connecting the corresponding control points by changing the control points.

Referring to FIGS. 105A and 105B, a process for generating a usual (when no instruction to perform branching is made through the input portion 147) limiting the positions of the two end points. As a result, animation capable of moving naturally can easily be generated while the overall shape adjacent to the key strokes is maintained. Moreover, the generated interpolating stroke is deformed by using the limiting function so that animation having 3D visual effect, such as convex and irregularity, is generated easily. An image to be mapped to the interpolating stroke is subjected to a shading process in accordance with the angular velocity of the unit vector for forming the interpolating stroke. Thus, speedy animation producing apparatus having an image effect similar to the motion blurring can easily be generated.

Fourteenth Embodiment

Figure 104:
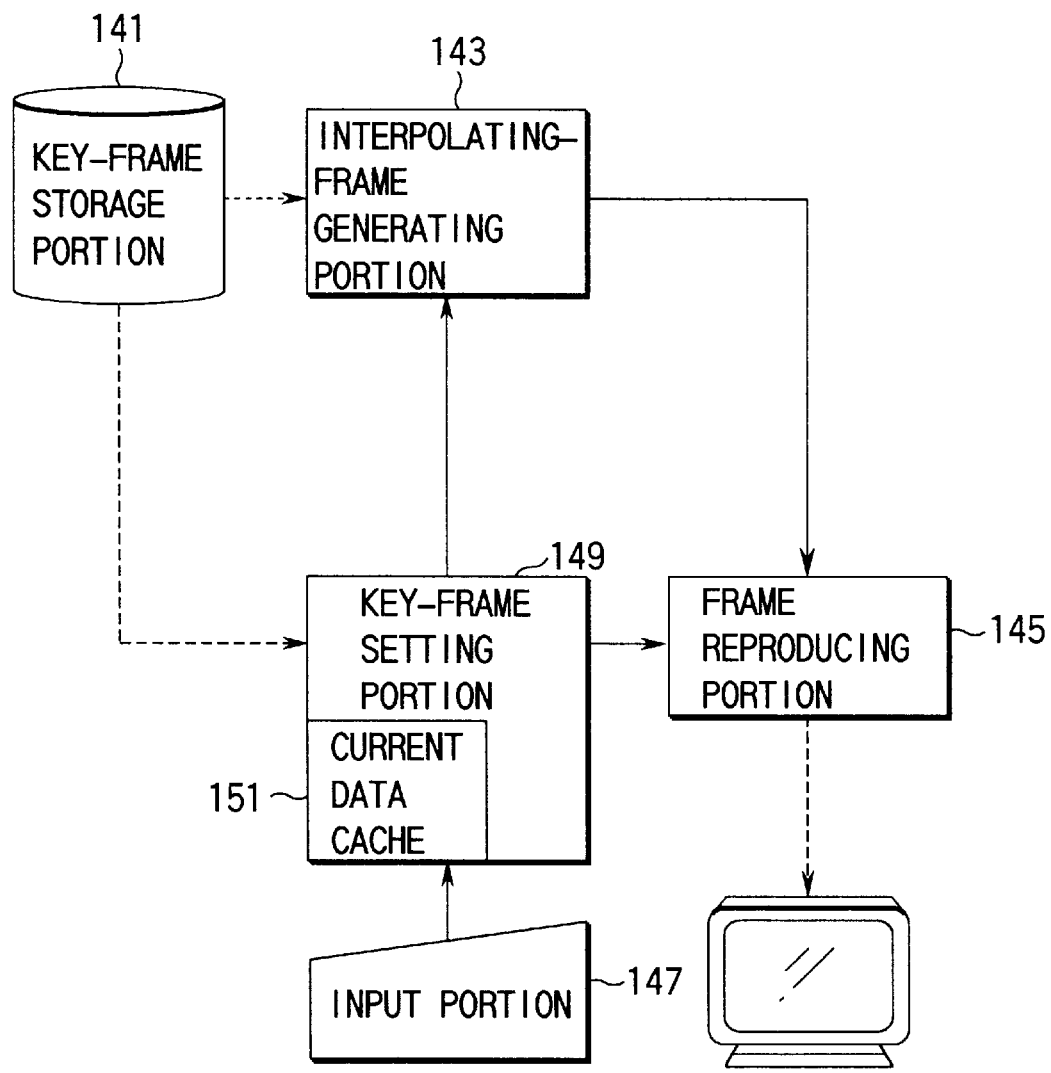
FIG. 104 is a diagram schematically showing the overall structure of an animation producing apparatus according to a fourteenth embodiment of the present invention.

FIG. 104 is a diagram showing an example of the overall structure of an animation producing apparatus according to a fourteenth embodiment of the present invention.

Referring to FIG. 104, the animation producing apparatus according to this embodiment has a key-frame storage portion 141 in which a length of key-frame images previously produced by a user and composed of at least one stroke; an interpolating-frame generating portion 143 for generating an interpolating frame between start and goal frames which have been previously be set by the user, a frame reproducing portion 145 for sequentially reproducing frames The sequential order of the frame which is being generated by the interpolating-frame generating portion 143 is indicated by a value of a morphing step. Since the morphing step is "n" in the case shown in FIG. 105B, the interpolating frame which is being generated by the interpolating-frame generating portion 143 is indicated as interpolating frame (current frame which is an interpolating frame which is being generated at present) FrameABn, as shown in FIG. 105A.

Figures 106A, 106B:
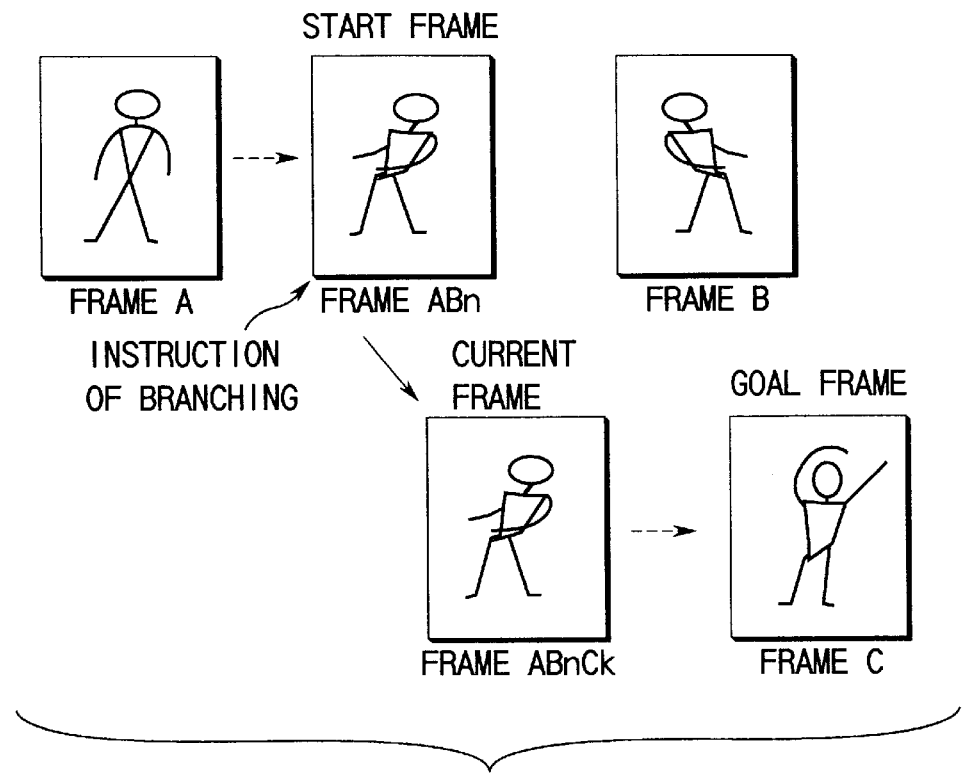
FIGS. 106A and 106B are diagrams showing a process of branching the animation flow when branching is instructed.

Referring to FIGS. 106A and 106B, a branching process of the animation flow which is performed when an instruction to perform branching has been made through the input portion 147 will now be described.

When an instruction to perform branching is made from the user through the input portion 147 during the generation or reproduction of the current frame FrameABn shown in FIG. 105A, candidate key-frames for the goal frame previously stored in the key-frame storage portion 141 are displayed, as shown in FIG. 107. When the user selects one key-frame by using the input device, such as a mouse provided for the input portion 147, the key-frame setting portion 149 rewrites data in the current data cache 151 in such a manner that FrameABn which is the reproduced frame at this time is made to be the start frame and the selected key-frame (for example, key-frame FrameC) is made to be a new goal frame. As a result, the contents of the current data cache 151 shown in FIG. 105B are changed as shown in FIG. 105B. Since the interpolating frame FrameABn is the n-th interpolating frame, the number of interpolations to the new goal frame FrameC is "29-n". The interpolating-frame generating portion 143 and the frame reproducing portion 145 sequentially generate/reproduce interpolating frames for interpolating the area between new start and goal frames set to the current data cache 151. That is, the animation flow is branched. As shown in FIG. 106B, the k-th interpolating frame on the branched flow counted from the start frame FrameABn is made to be FrameABnCk by the interpolating frame 143. Note that the branching process may be performed recursively.

Figure 108:
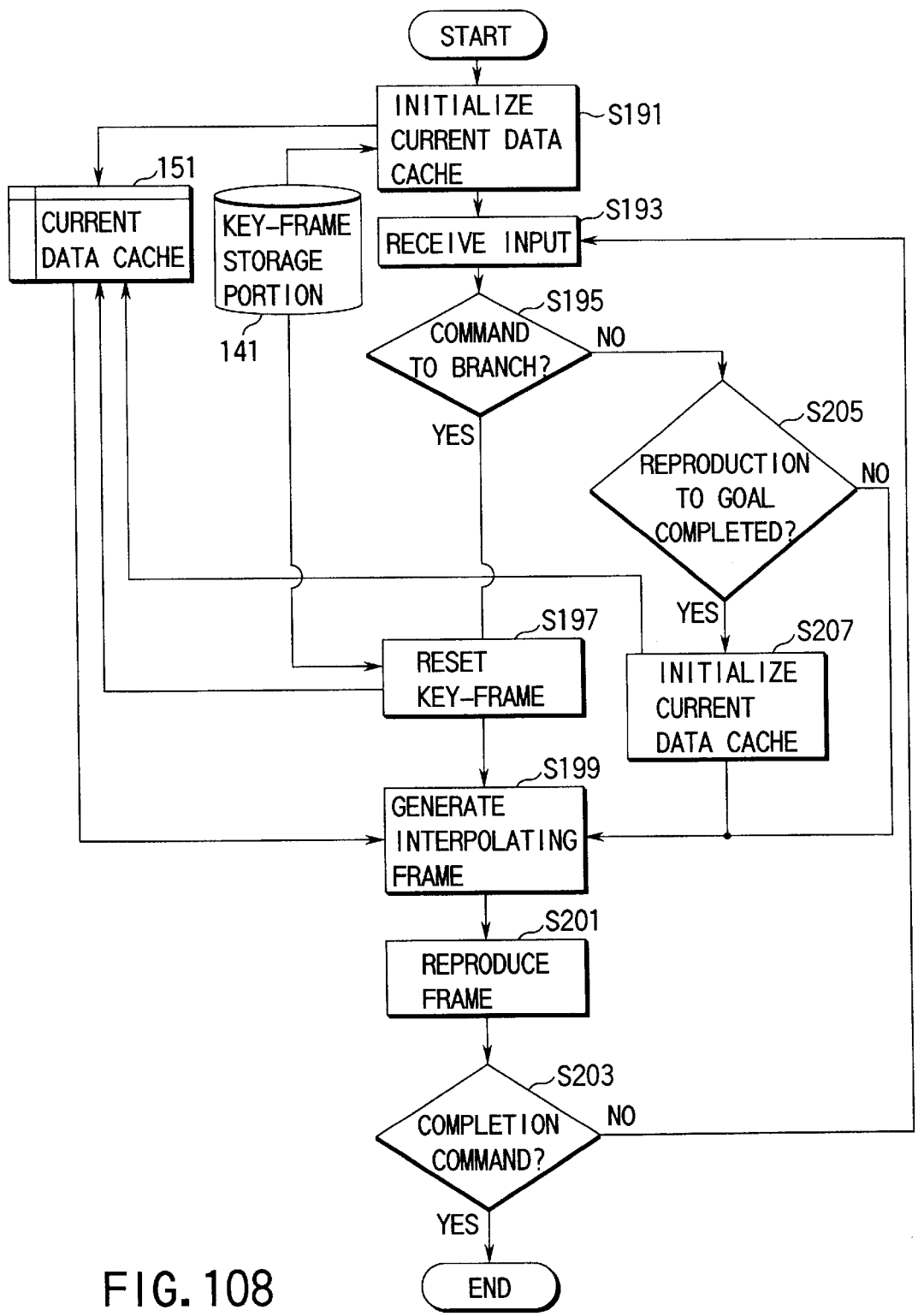
FIG. 108 is a flow chart of the manipulation which is performed by the animation producing apparatus shown in FIG. 104.

Referring to a flow chart shown in FIG. 108, the overall manipulation of the animation producing apparatus shown in FIG. 104 will now be described.

Start and goal frames for generating sequential animation instructed from a user through, for example, the input portion 147 are read from the key-frame storage portion 141 so as to be set to the current data cache 151. At this time, also the morphing step is initialized to "0" (step S191).

Figure 109:
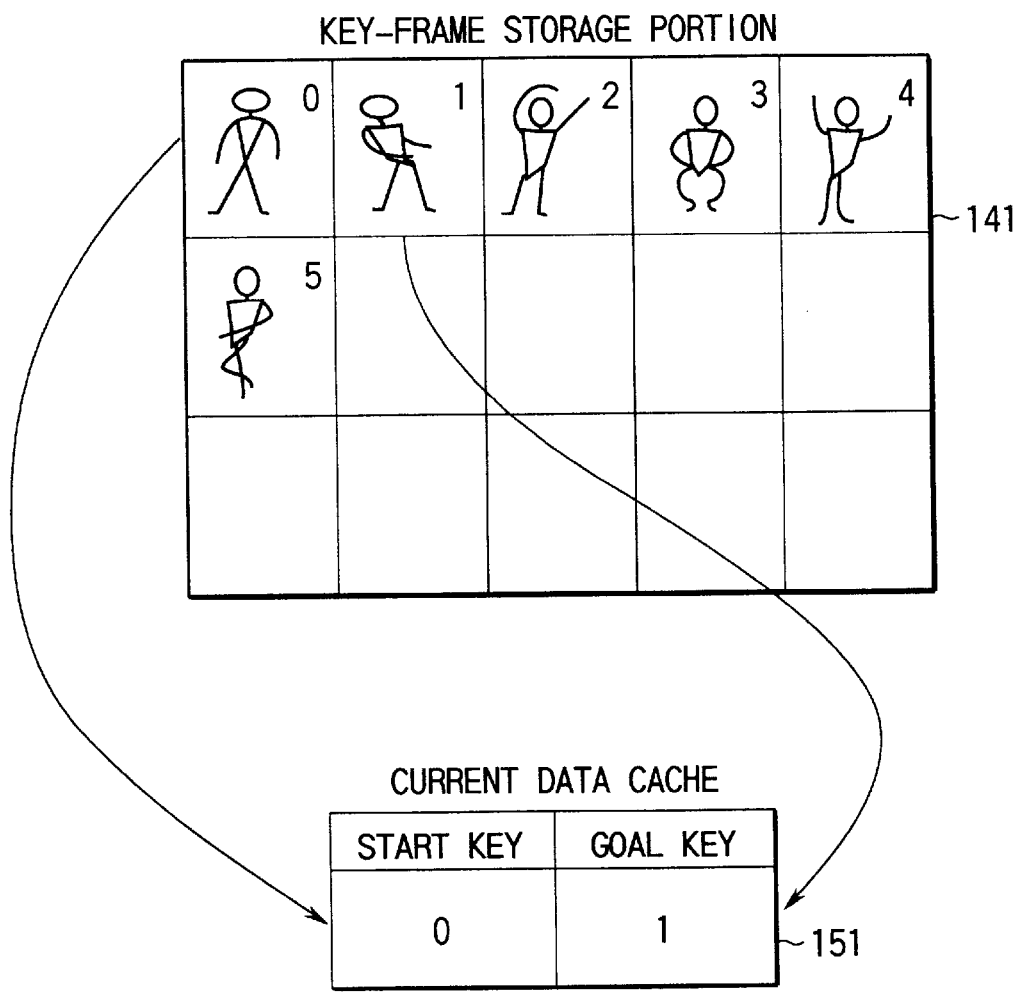
FIG. 109 is a diagram showing an example of storage of a key-frame in a key-frame storage portion.

A plurality of key-frames are stored in the key-frame storage portion 141, as shown in FIG. 109. Moreover, data of a pointer for data in the key-frame storage portion 141 or copied data of real data is stored in the current data cache 151.

Then, input of an instruction (external input) from the user is received (step S193). If an instruction to perform branching is input (step S195), the instructed start and goal frames are again set to the current data cache 151 as described above (step S197). Also the morphing step is initialized to "0". Moreover, an interpolating frame between the new start and goal frames is generated (step S199). Then, the portion from the start frame to the goal frame is reproduced by the frame reproducing portion 145 (step S201). During the reproducing process, the number of the morphing steps is increased. Whether or not a completion command has been issued from the user through the input portion 147 is determined. If the command is not issued, the manipulation returns to step S193 so that the following manipulations are continued.

If no instruction to perform branching is issued in step S195, whether or not generation and reproduction of the interpolating frames to the goal frame set previously have been completed, that is, whether or not the morphing steps have reached the predetermined number of the interpolating frames is determined (step S205). If the generation and reproduction have been completed, start and goal frames for staring the animation are read from the key-frame storage portion 141 similar to step S191 so as to be set to the current data cache 151. At this time, also the morphing step is initialized to "0". Then, the interpolating frame is generated (step S197), and the reproduced (step S201). If reproduction is not completed in step S205, a next interpolating frame is generated (step S199), and then reproduced (step S201).

As described above, according to the fourteenth embodiment, first and second instructed key-frames among key-frames stored in the key-frame storage portion 141 are made to be start and goal frames. A plurality of interpolating frames for interpolating the portion between the start and goal frames are generated so that a first animation flow from the start frame to the goal frame is generated. When at least one interpolating frame among the plural interpolating frames in the first animation flow and the third key-frame stored in the key-frame storage portion 141 have been instructed and thus instruction to perform branching from the first animation flow has been made, a plurality of interpolating frames for interpolating between the instructed interpolating frame in the first animation flow and the third key-frame are generated. Thus, a second animation flow branched from the instructed interpolating frame is generated. Thus, the user generates frame data of plural patterns by a method for generating a key-frame and animation. The generated key-frame is previously stored in the key-frame storage portion 141, and then the initial start and goal frames are set. Thus, the user is able to smoothly change (branch) the animation flow at required timing while reproducing the animation. That is, a variety of movements can easily be generated in addition to a predetermined movement.

Although the current data cache 151 according to the fourteenth embodiment is provided for the key-frame setting portion 149, as shown in FIG. 104, the structure is not limited to this.

Instruction data and the like which is input through the input portion 147 may be data, such as a result of rhythm analysis of music data or file data, which is not directly input, as well as data directly input through an input device, such as the keyboard, mouse, camera, microphone, data glove and MIDI device.

Fifteenth Embodiment

Figure 110:
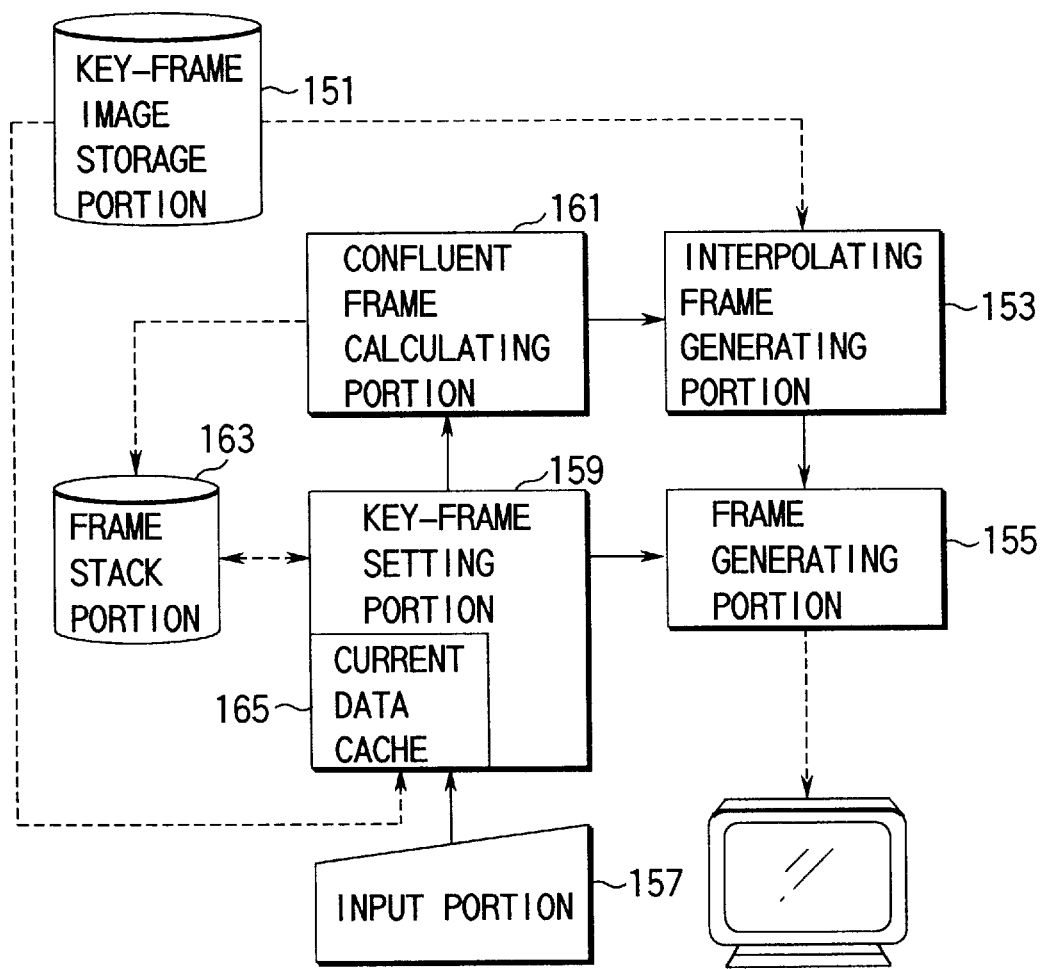
FIG. 110 is a diagram schematically showing an example of the overall structure of an animation producing apparatus according to a fifteenth embodiment of the present invention.

FIG. 110 is a diagram showing an example of the overall structure of an animation producing apparatus according to a fifteenth embodiment of the present invention.

Referring to FIG. 110, the animation producing apparatus according to this embodiment has a key-frame storage portion 151 in which a plurality of key-frame images constituted b at least one stroke previously generated by a user. Moreover, the apparatus has an interpolating frame generating portion 153 for generating an interpolating frame between the start frame and the goal frame set by, for example, the user by, for example, morphing; a frame reproducing portion 155 for sequentially reproducing frames and key-frames generated by the interpolating frame generating portion 153; an input portion 157 for receiving an external input, such as an instruction to perform branching issued from the user; a key-frame setting portion 159 for setting start and goal frames in accordance with the instruction received by the input portion 157 and issued from the user; a confluent frame calculating portion 161 for calculating a frame for use when the animation flow chart branched in accordance with an instruction to perform branching received by the input portion 157 and issued from the user is again joined to the instructed animation flow; and a frame stack 163 in which the confluent frame calculated by the confluent frame calculating portion 161 and the goal frame of the joined animation flow are temporarily stored.

A plurality of key-frames are stored in the key-frame storage portion 151, as shown in FIG. 109. A data of a pointer for data in the key-frame storage portion 151 or copied data of real data is stored in the current data cache 165.

Referring to FIGS. 111A to 111C, a process for generating a usual (when no instruction to perform branching is made through the input portion 157) animation flow will now be described. FIG. 111A shows an example of animation which is generated. FIG. 111B shows an example of storage in a current data cache 165. FIG. 111C shows an example of storage in the frame stack 163. The manipulations are similar to those shown in FIGS. 105A and 105B. The frame stack 163 does not relate to the manipulations.

Two key-frames previously stored in the key-frame storage portion 151 are used as start and goal frames, respectively. Sequential animation is reproduced while interpolating frames are generated. Initially, the key-frame setting portion 159 reads, from the key-frame storage portion 151, key-frame FrameA serving as the start frame and key-frame FrameB serving as the goal frame. As shown in FIG. 111B, the read key-frames are set to the current data cache 165. At this time, real data of key-frames FrameA and FrameB may be stored in the current data cache 165 or information except for the real data, such as the storage addresses in the key-frame storage portion 151 may be stored.

The number of interpolating frames to be generated between the start frame and the goal frame is usually previously set. Change in the required number of the interpolating frames may be permitted for the user through the input portion 157. Since one second of a usual movie is composed of 30 frames, a default value of the number of the interpolating frames is made to be 30−1=29 in this embodiment. The interpolating-frame generating portion 153 sequentially generates 29 interpolating frames at intervals of $\frac{1}{30}$ second between the key-frames FrameA and FrameB.

The sequential order of the frame which is being generated by the interpolating-frame generating portion 153 is indicated by a value of a morphing step. Since the morphing step is "n" in the case shown in FIG. 111B, the interpolating frame which is being generated by the interpolating-frame generating portion 153 is indicated as interpolating frame (current frame which is an interpolating frame which is being generated at present) FrameABn, as shown in FIG. 111A.

Referring to FIGS. 112A and 112C, branching and confluent processes of the animation flow which are performed when an instruction to perform branching has been made through the input portion 157 will now be described.

FIG. 112A shows a process which is performed when instruction to perform branching is input from a user through the input portion 157 during generation/reproduction of the current frame FrameABn as shown in FIG. 111A. Thus, branching to the animation flow of the key-frame FrameC is performed, and then the manipulation is returned to the animation flow of the key-frame FrameB through the confluent frame.

The manipulation which is performed when branching from the current frame FrameABn to the key-frame FrameC is performed will now be described.

FrameABn which is a reproduction frame when the instruction to perform branching has been issued is set in the current data cache 165 as a start frame and key-frame FrameC instructed when the instruction to perform branching has been issued is set in the current data cache 165 as a new goal frame, as shown in FIG. 112B. As shown in FIG. 112C, the key-frame FrameB of the former goal frame is stored in the frame stack 163. As shown in FIG. 112C, also confluent frame FrameABn+M to the original animation flow calculated by the confluent frame calculating portion 161 is stored in the frame stack 163 while it is superimposed in the form of, for example, FILO (First In Last Out). Thus, the animation is branched.

Note that the branching process may be performed recursively.

A method of determining a confluent frame which is employed by the confluent frame calculating portion 161 will now be described. The confluent frame calculating portion 161 is arranged to calculate the frame number of the confluent frame in the overall animation flow including real data of the confluent frame and the branched flow.

Figure 113:
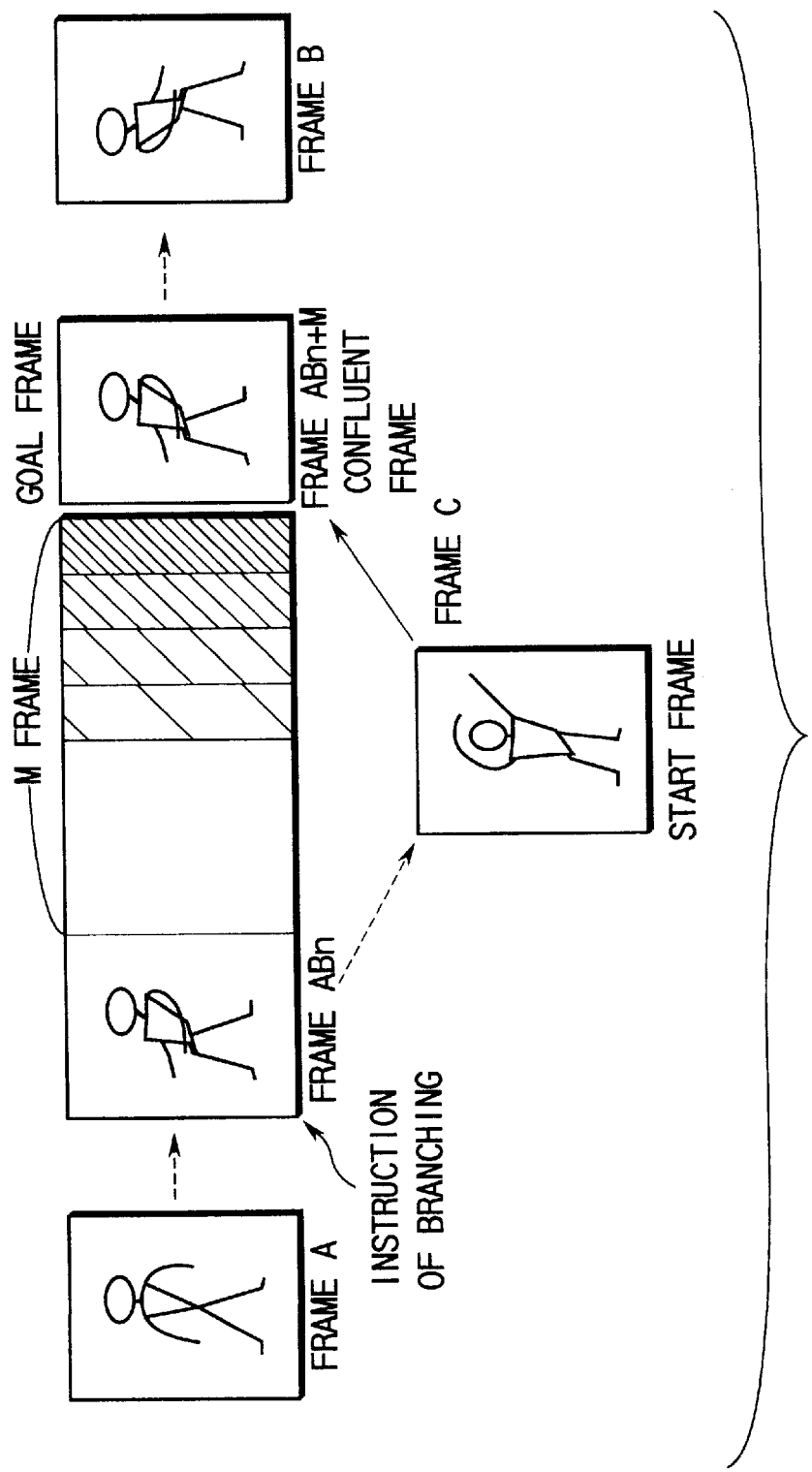
FIG. 113 is a diagram showing a method of determining read data of a confluent frame.

Initially, real data of the confluent frame is determined. As shown in FIG. 113, real data of an M-th interpolating frame, M being the instructed number of the frames on the animation flow from the start frame (FrameABn in the case shown in FIGS. 112A to 112C) to the key-frame FrameB is determined as real data of the confluent frame. That is, real data of interpolating frame FrameABn+M which is generated at M-th (M is a number which is set not to exceed the number of interpolating frames which has been set on the animation flow from the key-frame FrameA to the key-frame FrameB) morphing manipulation is determined as real data.

Figure 114:
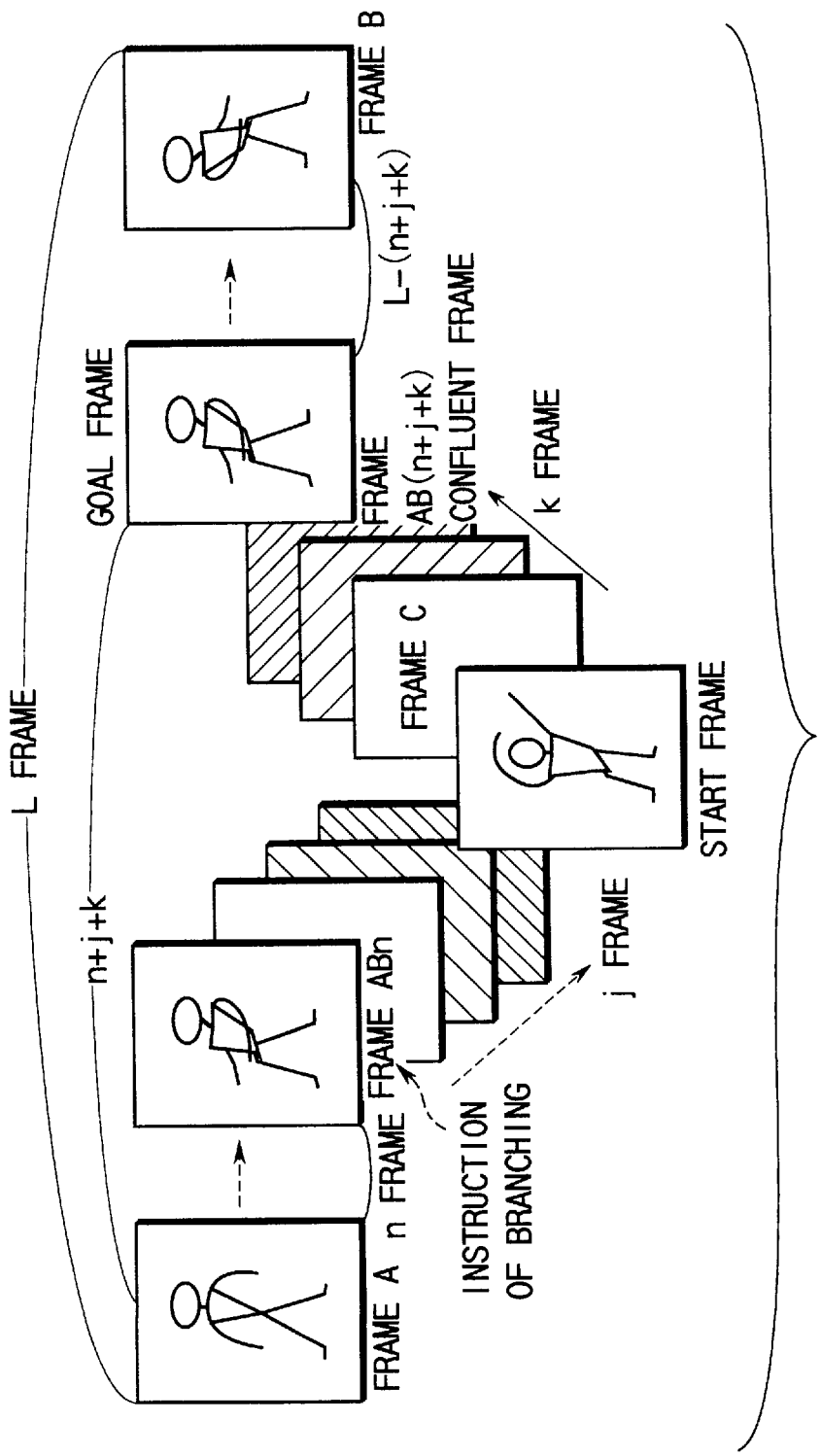
FIG. 114 is a diagram showing a method of determining the frame number of the confluent frame.

Then, the frame number of the confluent frame in the overall animation flow including the branched flow is determined. That is, the frame number of the confluent frame is determined to be the same as the number L (for example, 30 frames per second) of the overall frames on the animation flow from the start frame FrameA to the goal frame FrameB in a case the instruction to perform branching is not issued, as shown in FIG. 114. Since the number of the frames from the frame FrameA to the frame FrameABn is n, the confluent frame is determined to be an (n+j+K)th frame counted from the frame FrameA assuming that the number of the frames on the branched flow from the frame FrameABn to the frame FrameC is j, the number of the frames from the frame FrameC to the confluent frame is k and the number of the frames from the confluent frame to the frame FrameB is L−(n+j+k). In the case shown in FIG. 114, the confluent frame is expressed as FrameAB (n+j+k). Note values of j and k are appropriate integers which satisfy n+j+k=L.

Figure 115A:
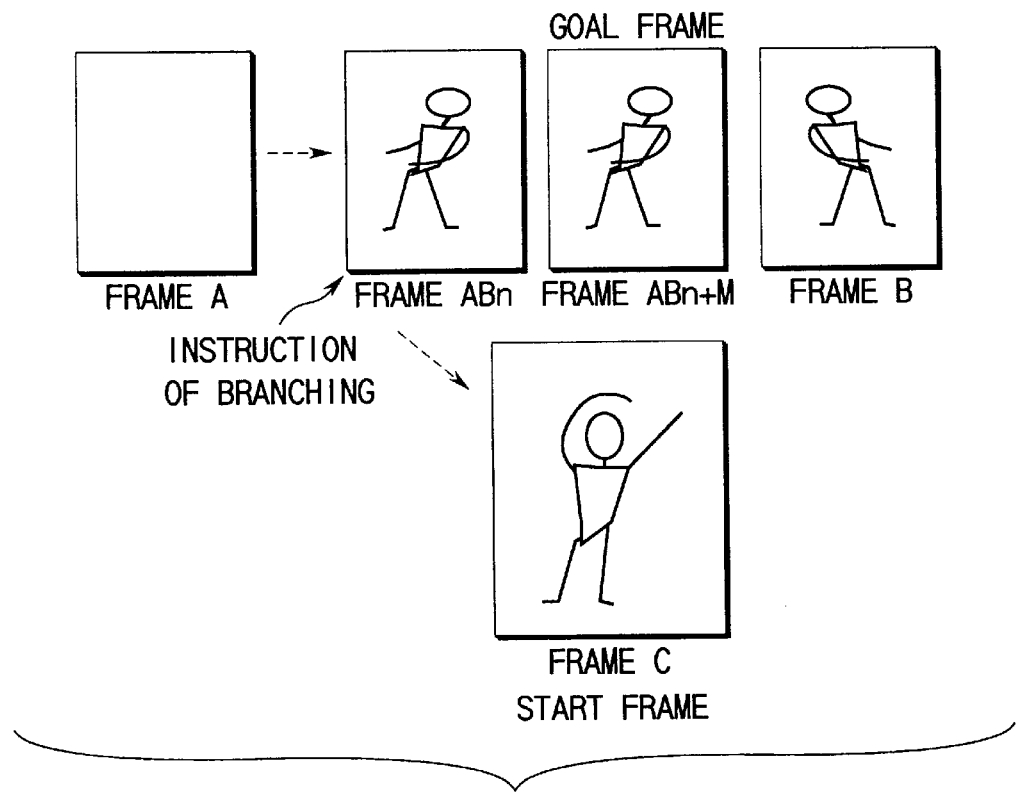
FIGS. 115A and 115B are diagrams showing a process for branching and joining an animation flow when branching is instructed, in which a process is shown in which an animation flow is joined which has a goal frame set newly when branching is performed is made to be a start frame and a confluent frame in the original animation flow is made to be a goal frame.
Figure 115B:
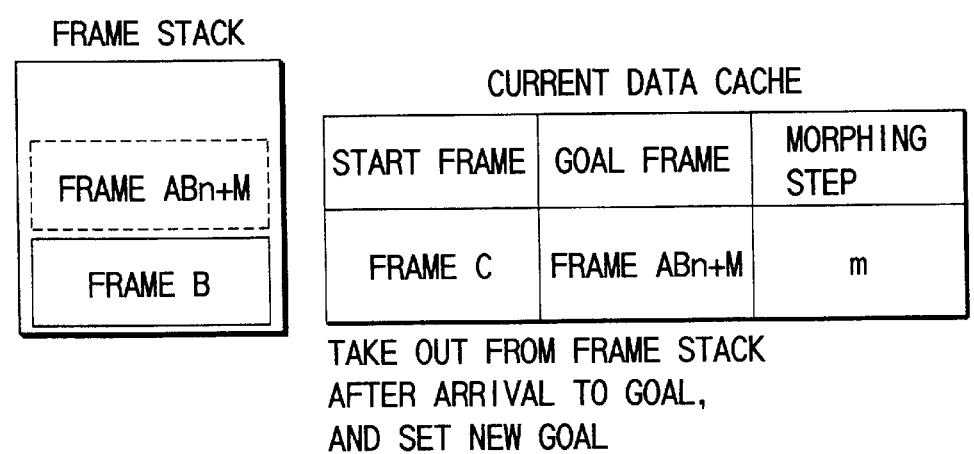

A process for again joining to the original animation flow through the confluent frame from the key-frame FrameC, which is the goal frame after the animation flow shown in FIGS. 112A to 112C has been performed will now be described. After reproduction to the goal frame FrameC in the branched flow has been completed, a latest data item (that is, confluent frame FrameABn+M) is extracted from the frame stack 163 by using the frame FrameC as a new start frame as shown in FIG. 115B so as to be set to the current data cache 165 as a new goal frame. Then, generation and reproduction of an interpolating frame from the start frame FrameC to the goal frame FrameABn+M are started. After the foregoing processes have been completed, FrameABn+M is made to be a new start frame and a latest data (that is, FrameB) is taken out of the frame stack 163 to the current data cache 165 so as to be made a new goal frame. Then, generation of reproduction of the interpolating frames in the foregoing region are performed. Thus, joining of the branched animation flow to the original animation flow is performed.

Figure 116:
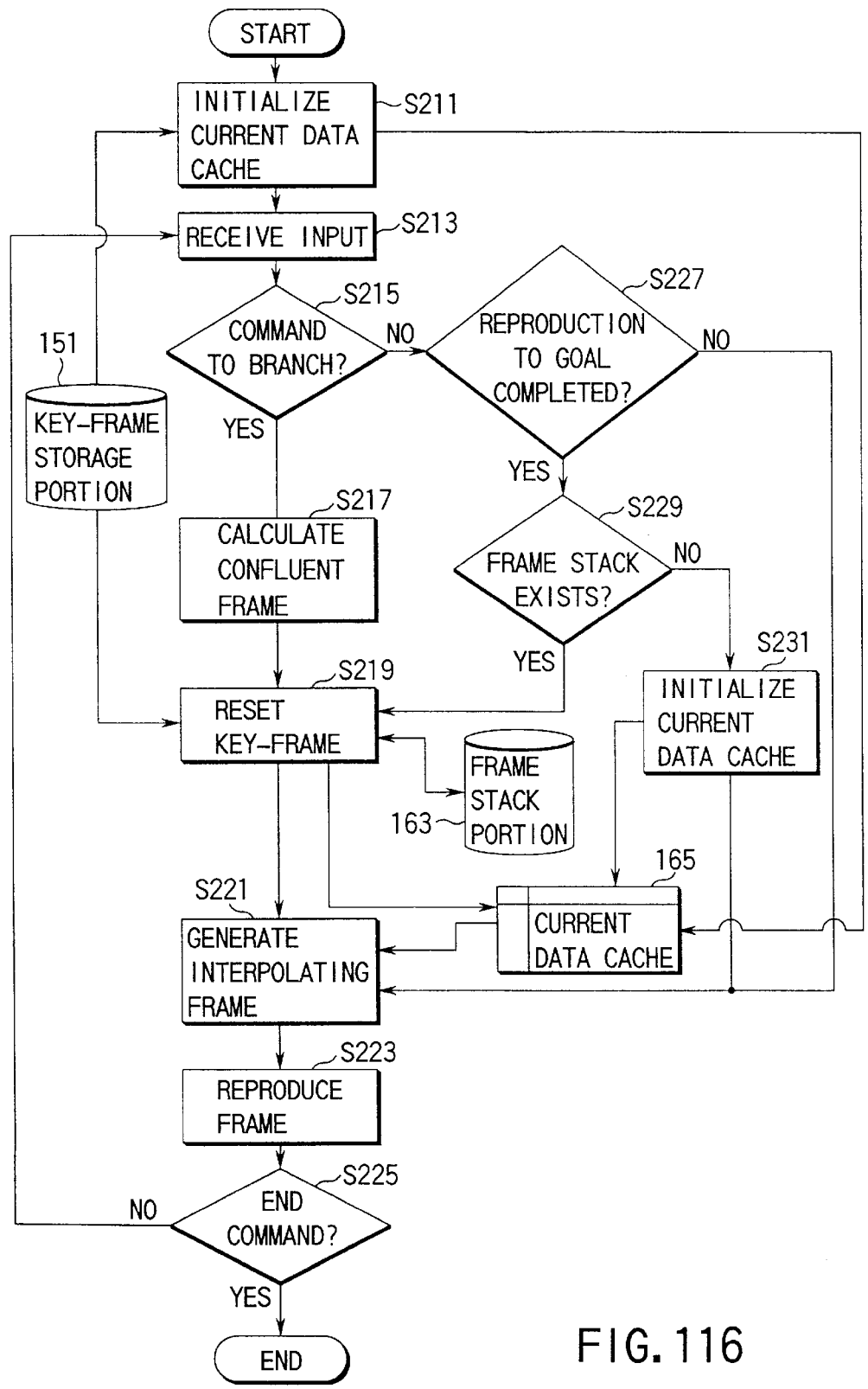
FIG. 116 is a flow chart of the manipulation which is performed by the animation producing apparatus shown in FIG. 110.

Referring to a flow chart shown in FIG. 116, the overall manipulation of the animation producing apparatus shown in FIG. 110 will now be described.

For example, start and goal frames for generating sequential animation instructed by the user through, for example, the input portion 157 are read from the key-frame storage portion 151 so as to be set to the current data cache 165. At this time, also the morphing step is initialized to "0" (step S211).

Then, an input instruction (an external input) from the user is received (step S213). If an instruction to perform branching is input (step S215), a confluent frame (specifically, read data of the frame image and the frame number as described above with reference to FIGS. 113 and 114) to be joined to the original animation flow after branching has been performed in a case where the instructed key-frame in the key-frame storage portion 151 is the goal frame is calculated (step S217). Then, the current frame when the instruction to perform branching has been issued is again set to the current data cache 165 as the start frame. Moreover, the key-frame instructed with the instruction to perform branching is, as the goal frame, again set to the current data cache 165. Then, the former goal frame is stored in the frame stack 163. Also the confluent frame calculated in step S217 is stored in the frame stack 163 (step S219). Then, an interpolating frame between the start and goal frames is generated by the confluent frame calculating portion 161 (step S221). Then, the portion from the start frame to the goal frame is reproduced by the frame reproducing portion 155 (step S223). During this, the number of the morphing steps is increased. Whether or not an instruction to complete the process has been issued from the user through the input portion 157 is determined (step S225). If the instruction has not been issued, the manipulation is returned to step S213 so that the following manipulations are continued.

If the instruction to perform branching is not input in step S215, whether or not the reproduction to the goal frame has been completed, that is, whether or not the morphing step has reached the predetermined number of the interpolating frames is determined (step S227). If the reproduction has not been completed, the morphing step is as it is increased. Then, a next interpolating frame is generated (step S221), and then reproduced (step S223). If the reproduction has been completed, whether or not data exists in the frame stack 163 is determined (step S229). If data exists, one data item among data items stacked in the frame stack 163 which is the newest data item is extracted. Then, new start and goal frames are set to the current data cache 165. Also the morphing step is initialized to "0" (step S219). If no data exists in the frame stack 163, start and goal frames for starting animation are read from the key-frame storage portion 151, similarly to step S211 so as to be set to the current data cache 165. Also the morphing step is initialized to "0". Then, interpolating frames during the foregoing process are generated (step S221), and then reproduced (step S223).

As described above, according to the fifteenth embodiment, instructed first and second key-frames among the key-frames stored in the key-frame storage portion 151 are used as start and goal frames. A plurality of interpolating frames for interpolating between the start and goal frames are generated. Thus, a first animation flow from the start frame to the goal frame is generated. At least one interpolating frame among the plurality of the interpolating frames in the first animation flow and the third key-frame stored in the key-frame storage portion 151 are instructed. When branching from the first animation flow has been instructed, a plurality of interpolating frames for interpolating the portion between the instructed interpolating frame in the first animation flow and the third key-frame are generated. Thus, a second animation flow branched from the instructed interpolating frame is generated. When branching from the first animation flow has been instructed, one interpolating frame is selected from the plural interpolating frames in the first animation flow. Then, a plurality of interpolating frames for interpolating the portion between the third key-frame and the selected interpolating frame are generated so that a third animation flow which is joined from the second animation flow to the first animation flow is generated. At this time, the number of interpolating frames for interpolating a portion from the instructed interpolating frame in the first animation flow to the third key-frame and the number of interpolating frames for interpolating the third key-frame and the selected interpolating frame in the first animation flow are calculated in accordance with the predetermined number of interpolating frames between the first key-frame and the second key-frame. Thus, the user is able to employ the procedure for making a key-frame and the animation to generate frame data in a plurality of patterns. The generated key-frame is previously stored in the key-frame storage portion 151 and the initial start and goal frames are set. Thus, the user is smoothly switch the key-frame at required timing while the animation is reproduced. The confluent frame which is again joined to the previous goal frame is used so that animation one branched is joined to the original animation flow. Therefore, animation which is changed to follow an instruction (for example, rhythm) from the user can arbitrarily be generated.

Although the fifteenth embodiment is arranged in such a manner that the current data cache 165 is provided for the key-frame setting portion 159 as shown in FIG. 110, the structure is not limited to the foregoing structure.

Instruction data and the like which is input through the input portion 157 may be data, such as a result of rhythm analysis of music data or file data, which is not directly input, as well as data directly input through an input device, such as the keyboard, mouse, camera, microphone, data glove and MIDI device.

Sixteenth Embodiment

Figure 117:
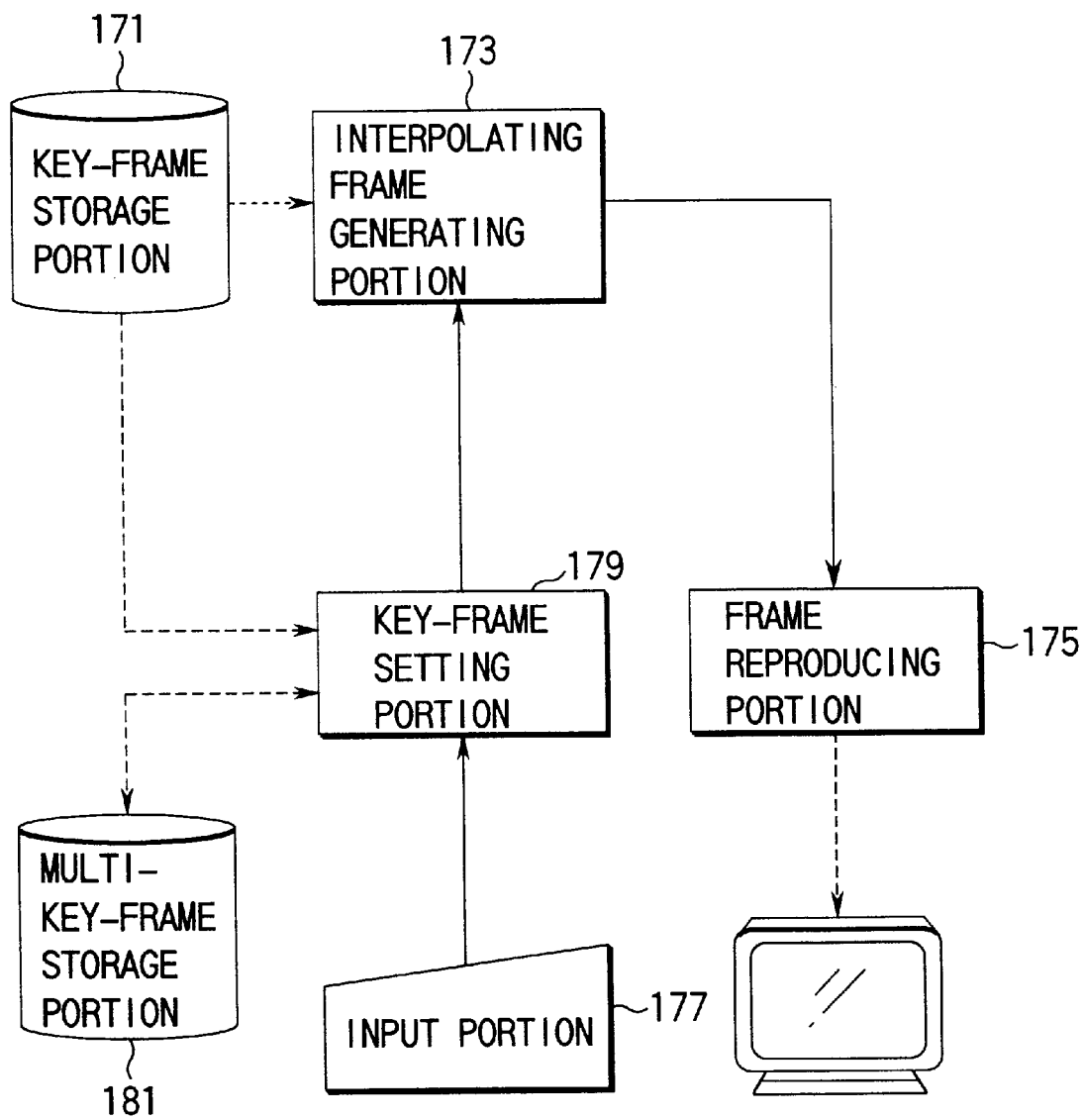
FIG. 117 is a diagram schematically showing an example of the overall structure of an animation producing apparatus according to a sixteenth embodiment of the present invention.

FIG. 117 is a diagram showing an example of the overall structure of an animation producing apparatus according to a sixteenth embodiment of the present invention.

Referring to FIG. 117, the animation producing apparatus according to this embodiment has a key-frame storage means 171 in which a plurality of key-frame images each of which is composed of at least one stroke previously generated by a user are stored; an interpolating frame generating portion 173 for generating an interpolating frame between the start and goal frames set by, for example, the user by morphing; a frame reproducing portion 175 for sequentially reproducing the frames generated by the interpolating frame generating portion 173 and the key-frames on a predetermined display unit; an input portion 177 for receiving an external input, such as an instruction of additional insertion of a flow, from the user; a key-frame setting portion 179 for setting start and goal frames in accordance with an instruction issued from the user; and a multi-key-frame storage portion 181 in which set data of starts and goal of a plurality of animation flows is stored.

As shown in FIG. 109, a plurality of key-frames are stored in the key-frame storage means 171. Point data for data in the key-frame storage means 171 or copy data of real data is stored in the multi-key-frame storage portion 181.

Figure 118:
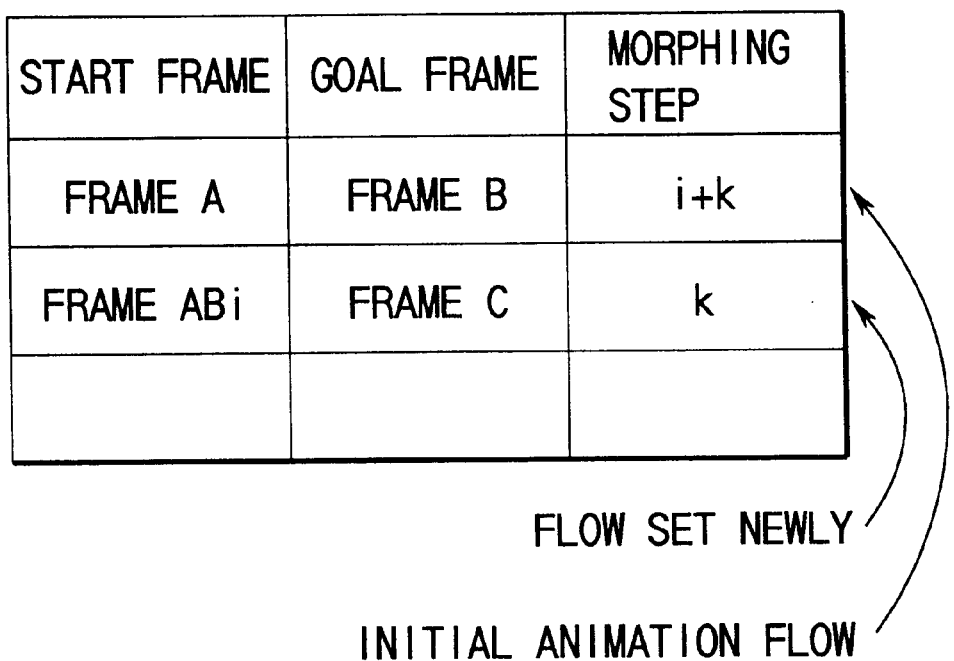
FIG. 118 is a diagram showing an example of storage of a start frame, a goal frame and a morphing step for generating an animation flow in a multi key-frame storage portion.

As shown in FIG. 118, set data of start and goal frames of the initial animation and set data of a start frame (a current frame instructed with instruction to insertion into the initial animation flow) and a goal frame of the animation which is inserted are, together with a morphing step (which is increased as the need arises) which is the interpolating frame number during the generation and reproduction, stored in the multi-key-frame storage portion 181.

Figure 119:
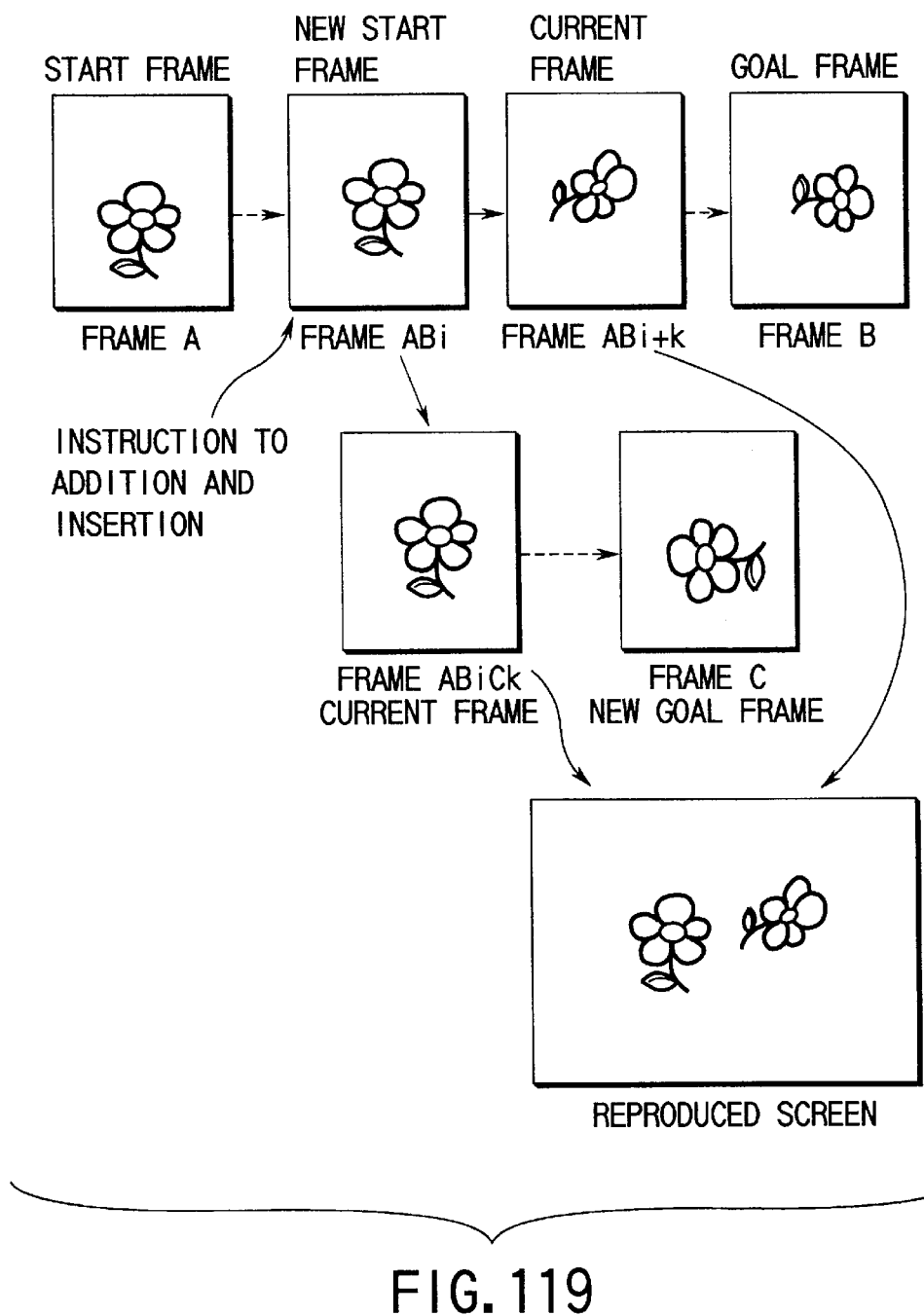
FIG. 119 is a diagram showing a process for generating an animation flow for receiving input of an instruction to addition and insertion of a flow, adding and inserting a new animation flow into an initial animation flow which is being reproduced and simultaneously reproducing the animation flows.

Referring to FIG. 119, a process for generating an animation flow will now be described in which instruction input to insert a flow is received through the input portion 177 and a new animation flow is inserted into the initial animation flow which has been reproduced to thereby reproduce both animations simultaneously.

The interpolating frame generating portion 173 generates an interpolating frame for the initial animation flow in accordance with the set (in FIGS. 118 and 119, the start frame is FrameA and the goal frame is FrameB) of the start and goal frames set for the purpose of generating the initial animation flow to the multi-key-frame storage portion 181, as shown in FIG. 119. Moreover, the interpolating frame generating portion 173 generates an interpolating frame for a new animation having a start frame which is the current frame (FrameABi) which is included in the initial animation flow instructed by the instruction of insertion and which is being reproduced and a goal frame which is key-frame FrameC instructed when the insertion instruction has been made.

The frame reproducing portion 175 simultaneously reproduces the frames which follow the current frame (FrameABi) in the initial animation flow instructed when the insertion has been instructed and which are included in the new animation flow. That is, when the present values of the morphing steps of the new animation flow (that is, value of the frame numbers of the current frame FrameABn in each flow) are i+k, k (k=1, 2, 3, . . . ,), interpolating frames (FrameABi+k) of the initial animation flow and interpolating frames (FrameABiCk) of the new animation flow are simultaneously drawn, as shown in FIG. 119.

Figure 120:
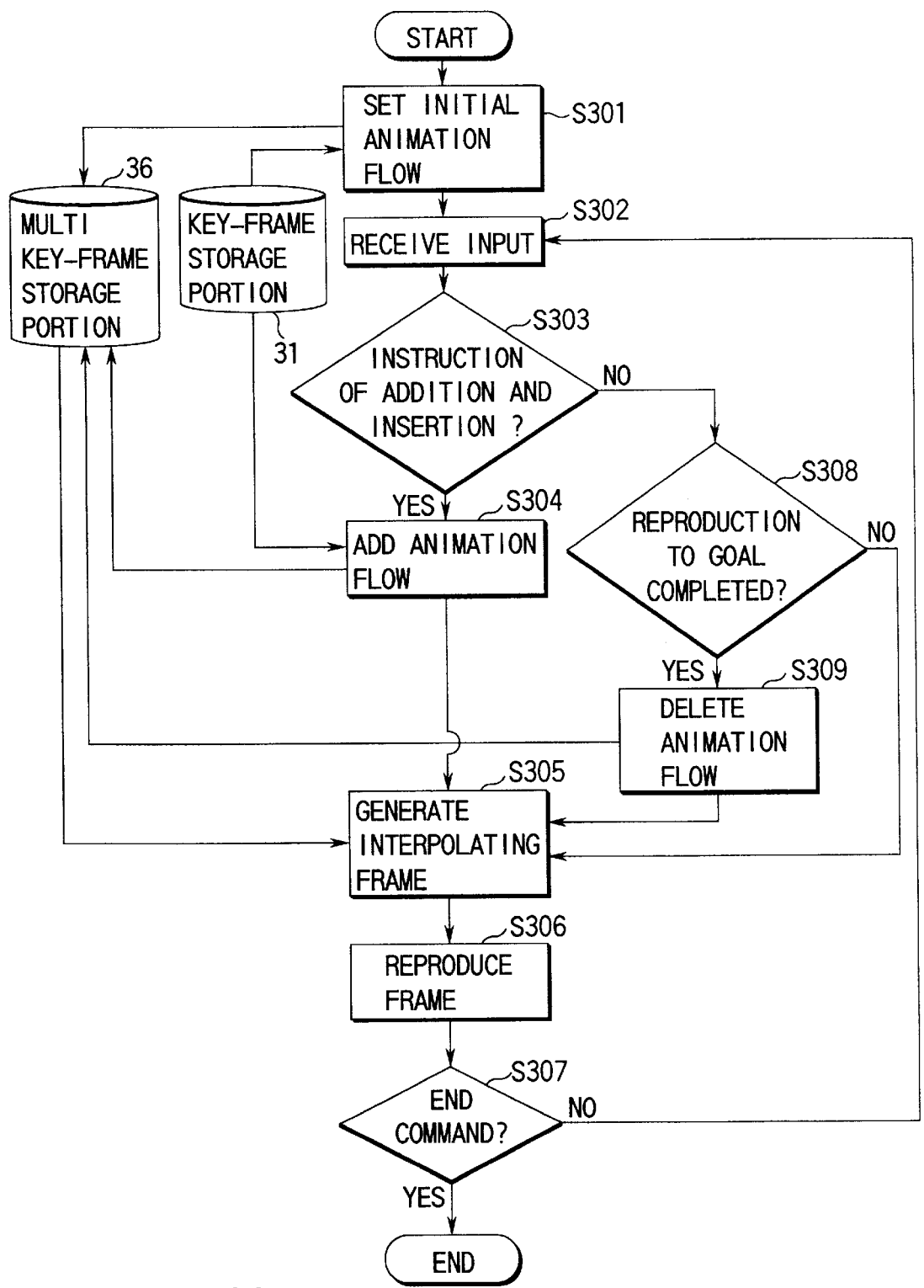
FIG. 120 is a flow chart of the manipulation of the animation producing apparatus shown in FIG. 117.

Referring to a flow chart shown in FIG. 120, the overall manipulation of the animation producing apparatus shown in FIG. 118 will now be described.

For example, two key-frames among the key-frames stored in the key-frame storage means 171 which have been instructed from the user through the input portion 177 are, as the start and goal frames for generating the initial animation flow, registered to the multi-key-frame storage portion 181. At this time, also the value of the morphing step is initialized to "0" (step S301).

Then, input of an instruction from a user (input from outside) is received (step S302). If an instruction of insertion is input (step S303), new animation is additionally registered to the multi-key-frame storage portion 181 in such a manner that the key-frame stored in the key-frame storage means 171 and instructed at this time serves as the goal frame and the current frame in the initial animation flow which is being reproduced serves as the start frame (step S304). Note that a plurality of flows of new animation can be registered in place of registering only one flow.

Then, interpolating frames are generated in the interpolating frame generating portion 173 by the number which is the same as the number of the animation flows registered to the multi-key-frame storage portion 181 (step S305). All of the frames of the generated animation flows are simultaneously reproduced (step S306). Also the number of morphing steps is increased during the foregoing process. Whether or not an instruction for completion has been issued through the input portion 177 is determined. If the instruction has not been issued, the manipulation returns to step S302, and then the following manipulations are continued.

If the instruction is not the instruction for insertion in step S303, animation flows registered to the multi-key-frame storage portion 181 which have interpolating frames which have been generated/reproduced to the goal frames are determined (step S308). The completed animation flows are deleted from the multi-key-frame storage portion 181 (step S309). As for a residual portion of the animation flows, interpolating frames are generated while the morphing steps are increased (step S305), and then the animation flow is reproduced (step S306).

If generation and reproduction of the interpolating frames of all of the animation flows are not completed in step S308, interpolating frames are generated while the morphing steps are increased (step S305), and then the animation flow is reproduced (step S306).

As described above, according to the sixteenth embodiment, the first and second key-frames among the key-frames stored in the key-frame storage means 171 are used as start and goal frames. Then, a plurality of interpolating frames for interpolating the two frames are generated so that a first animation flow from the start frame to the goal frame is generated. At least one interpolating frame among the plurality of the interpolating frames of the first animation flow and one or more third key-frames stored in the key-frame storage means 171 are instructed. Moreover, insertion of one or more second animation flows, which are different from the first animation flow, into the first animation flow is instructed. In the foregoing case, second animation flow is inserted into the first animation flow following the instructed interpolating frame, the second animation flow being formed from the instructed interpolating frame formed by generating a plurality of interpolating frames for interpolating the portion from the instructed interpolating frame in the first animation flow to the third key-frame. Thus, the user is able to employ the procedure for generating a key-frame and animation to generate frame data in a plurality of patterns. The generated key-frame is previously stored in the key-frame storage means 171. Then, the user sets the initial start and goal frames so that a plurality of animation flows are inserted and reproduced simultaneously at required timing while the animation being reproduced. As a result, animation expressing, for example, a scene in which petals are scattered can easily be generated.

Instruction data and the like which is input through the input portion 177 may be data, such as a result of rhythm analysis of music data or file data, which is not directly input, as well as data directly input through an input device, such as the keyboard, mouse, camera, microphone, data glove and MIDI device.

As described above, according to the fourteenth to sixteenth embodiments, the user is required to only generate frame data of a small number of patterns by the method of generating a key-frame/animation and to set initial start and goal frames to produce animation in an infinite numbers of patterns. Moreover, animation can interactively and smoothly be switched while the animation is being reproduced. Moreover, new animation can be generated by adding it to the original flow as well as switching permitted.

The methods according to the first to sixteenth embodiments may be formed into a program which can be executed by a computer and stored on a recording medium, such as a floppy disk, a hard disk, a CD-ROM or a semiconductor memory, which can be distributed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An animation producing apparatus for producing animation constituted by a key-frame image composed of one or more strokes and an interpolating frame image composed of interpolating strokes which are generated by interpolating a portion between the strokes of each key-frame image, said animation producing apparatus comprising:

input means for inputting one or more strokes to said key-frame image; and generating means for generating interpolating stroke for interpolating a portion between strokes input to each key-frame by said input means.

2. An animation producing apparatus for producing animation constituted by a key-frame image composed of one or more strokes and an interpolating frame image composed of interpolating strokes which are generated by interpolating a portion between the strokes of each key-frame image, said animation producing apparatus comprising:

input means for inputting one or more strokes to said key-frame;

quantizing means for quantizing each stroke input to each key-frame by said input means into unit vectors each having a predetermined length; and generating means for generating an interpolating vector for interpolating a portion between the corresponding unit vectors in accordance with an amount of change between corresponding unit vectors between the key-frames obtained by a quantization manipulation performed by said quantizing means.

3. An animation producing apparatus according to claim 2, wherein said quantizing means divides the stroke into unit vectors in accordance with the relationship between the lengths of the two corresponding strokes belonging to adjacent key-frames image.

4. An animation producing apparatus according to claim 1 or 2, wherein said input means inputs second and following line drawings in such a manner that a line drawing input previously is presented.

5. An animation producing apparatus according to claim 1 or 2, wherein the number of interpolating frames for interpolating the portion between the plural key-frames image and time intervals between reproductions of the interpolating frames are previously instructed.

6. An animation producing apparatus for producing animation composed of a plurality of image frames in accordance with one or more original images, said animation producing apparatus comprising:

first input means for inputting one or more strokes to portions along image portion of an original image required to be moved;

second input means for inputting one or more strokes which indicate shapes of changes of the strokes input by said first input means;

first generating means for generating interpolating strokes for interpolating portions between strokes input by said first and second input means; and second generating means for generating a plurality of image frames by deforming and/or moving image regions adjacent to the strokes input by said first input means in accordance with the positions and shapes of the strokes input by said second input means and those of interpolating strokes and by combining the image regions with the original image.

7. An animation producing apparatus for producing animation composed of a plurality of image frames in accordance with one or more original images, said animation producing apparatus comprising:

first input means for inputting one or more strokes to portions along image portion of an original image required to be moved;

second input means for inputting one or more strokes which indicate shapes of changes of the strokes input by said first input means;

quantizing means for quantizing the strokes input by said first and second input means into unit vectors each having a predetermined length;

first generating means for generating interpolating vectors for interpolating portions between unit vectors obtained by the quantizing manipulation performed by said quantizing means and corresponding to the strokes input by said first and second input means; and second generating means for generating a plurality of image frames by moving and/or deforming image regions adjacent to the unit vectors obtained by quantizing the strokes input by said first input means by said quantizing means in accordance with unit vectors obtained by quantizing the strokes input by said second input means by said quantizing means and the interpolating vectors and by combining the image regions with the original images.

8. An animation producing apparatus according to claim 6 or 7, wherein said second input means inputs a stroke in such a manner that a stroke input to a previous frame is presented.

9. An animation producing apparatus according to claim 6 or 7, wherein the number of the image frames which are generated and time intervals between reproductions of the image frames are previously instructed.

10. An animation producing apparatus according to claim 8, wherein said second generating means generates a plurality of image frames by moving and/or deforming image regions adjacent to the unit vectors obtained by quantizing the strokes input by said first input means by said quantizing means in accordance with the relationship of the connection between the corresponding unit vectors obtained by quantizing the strokes input by said second input means by said quantizing means and the interpolating vectors and by combining the image regions with the original images.

11. An animation producing apparatus according to claim 7, wherein said quantizing means divides the strokes into unit vectors in accordance with the relationship of the lengths of two corresponding strokes belonging to adjacent frames.

12. An animation producing apparatus according to claim 7, wherein said second generating means cuts image regions along unit vectors obtained by quantizing the strokes input by said first input means by said quantizing means and having a predetermined size and moves and/or deforms the cut image regions in accordance with the unit vectors obtained by quantizing the stroke input by said second input means by said quantizing means and the interpolating vectors and combines the image regions with the original images.

13. An animation producing apparatus according to claim 7, wherein said second generating means cuts image regions along unit vectors obtained by quantizing the strokes input by said first input means by said quantizing means and having a predetermined size and moves and/or deforms the cut image regions in accordance with the unit vectors obtained by quantizing the stroke input by said second input means by said quantizing means and the interpolating vectors and combines the image regions with the original images, and places interpolating images generated in accordance with a background image adjacent to the cut image regions into a blank region generated because the image regions having the predetermined sizes are cut.

14. An animation producing method for producing animation constituted by a key-frame image composed of one or more strokes and an interpolating frame image composed of interpolating strokes which are generated by interpolating a portion between the strokes of each key-frame image, said animation producing method comprising the step of:

generating interpolating strokes for interpolating portions between one or more strokes input from a user to the key-frame.

15. An animation producing method for producing animation constituted by a key-frame image composed of one or more strokes and an interpolating frame image composed of interpolating strokes which are generated by interpolating a portion between the strokes of each key-frame image, said animation producing method comprising the step of:

quantizing one or more strokes input from a user to the key-frame into unit vectors each having a predetermined length; and generating an interpolating vector for interpolating a portion between the corresponding unit vectors in accordance with an amount of change between the corresponding unit vectors between the key-frames.

16. An animation producing method for producing animation constituted by a plurality of image frames in accordance with one or more original images, said animation producing method comprising the steps of:

generating one or more strokes along an image portion of an original image input by a user which is required to be moved and interpolating strokes for interpolating a portion between one or more change strokes indicating change shapes of the strokes; and moving and/or deforming image regions adjacent to the one or more strokes along the image portion of the original image which is required to be moved in accordance with positions and shapes of the change strokes and the interpolating strokes so as to be combined with the original images so that a plurality of image frames are generated.

17. An animation producing method for producing animation constituted by a plurality of image frames in accordance with one or more original images, said animation producing method comprising the steps of:

quantizing one or more strokes input by a user and along an image portion of an original image which is required to be moved and one or more change strokes indicating change shapes of the strokes into unit vectors each having a predetermined length;

generating interpolating vectors for interpolating portions between the strokes and unit vectors in accordance with amounts of changes between one or more strokes along the image portion of the original images which are required to be moved and the unit vectors to which the change strokes correspond; and moving and/or deforming image regions adjacent to each of unit vectors of the one or more strokes along the image portions of the original images which are required to be moved in accordance with the unit vectors of the corresponding change strokes and the interpolating vectors so that a plurality of image frames are generated.

18. A computer program product comprising:

a computer usable medium having computer readable program code means embodied therein for causing an animation to be produced comprising key-frame images constituted by one or a plurality of strokes and interpolated frame images constituted by interpolated strokes produced by interpolating strokes of each key-frame image, said computer program product comprising:

computer readable program code means for causing a computer to input the one or a plurality of strokes with respect to the key-frames; and computer readable program code means for causing a computer to generate interpolated strokes interpolating the input of one or a plurality of strokes.

19. A computer program product comprising:

a computer usable medium having computer readable code means embodied therein for causing an animation to be produced comprising key-frame images constituted by one or a plurality of strokes and interpolated strokes produced by interpolating strokes of each key-frame image, said computer program product comprising:

computer readable program code means for causing a computer to quantize one or a plurality of strokes input by a user with respect to the key-frames into unit vectors each having a predetermined length;

computer readable program code means for causing a computer to produce interpolated vectors interpolating the corresponding unit vectors based on a changed amount between the corresponding unit vectors between the key-frames.

20. A computer program product comprising:

a computer usable medium having computer readable program code means embodied therein for causing an animation to be produced comprised of a plurality of image frames based on one or a plurality of original images, said computer program product comprising:

computer readable program code means for causing a computer to generate one or a plurality of strokes along a desired image portion in an original image to which a motion is to be applied input by a user and interpolated strokes interpolating one or a plurality of changed strokes indicating changed states of the strokes; and computer readable program code means for causing a computer to generate a plurality of image frames by moving, modifying or moving and modifying chunk neighboring the one or plurality of strokes along the desired image portion in the original image to which the motion is to be applied in accordance with a position and a shape of the changed strokes and the interpolated strokes, and by blending the resulted chunk and the original image.

21. A computer program product comprising:

a computer usable medium having computer readable program code means embodied therein for causing an animation to be produced comprised of a plurality of image frames based on one or a plurality of original images, said computer program product comprising:

computer readable program code means for causing a computer to quantize one or a plurality of strokes along a desired image portion in the original image input by a user to which a motion is to be applied, and one or a plurality of changed strokes indicating changed states of the strokes into unit vectors each having a predetermined length;

computer readable program code means for causing a computer to generate interpolated vectors interpolating the unit vectors based on the changed amount of the corresponding unit vectors of the one or a plurality of strokes along the image portion to which the motion is applied and extracted from the original image, and on the changed strokes; and computer readable program code means for causing a computer to generate a plurality of image frames by moving, modifying or moving and modifying chunk neighboring the one or plurality of strokes along the desired image portion in the original image to which the motion is to be applied in accordance with a position and a shape of the changed strokes and the interpolated strokes, and by blending the resulted chunk and the original image.

22. An animation producing apparatus for producing an animation by generating a plurality of interpolated images for interpolating strokes between the plural frame images from a plurality of the frame images each of which is composed of one or more strokes, said animation producing apparatus comprising:

input means for inputting one or a plurality of strokes to each of the frame images;

correspondence making means for making the strokes input by said input means to correspond to each other between the plural frame images; and generating means for generating an interpolating stroke for interpolating a portion between the strokes made to correspond to each other by said correspondence making means.

23. An animation producing apparatus for producing an animation by generating a plurality of interpolated images for interpolating strokes between the plural frame images from a plurality of the frame images each of which is composed of one or more strokes, said animation producing apparatus comprising:

input means for inputting one or a plurality of strokes to each of the frame images;

first correspondence making means for making the strokes input by said input means to correspond to each other between the plural frame images;

quantizing means for quantizing the strokes into unit vectors each having an arbitrary length;

second correspondence making means for making the unit vectors to each other between the strokes made to correspond to each other in accordance with the number of unit vectors of each of the strokes made to correspond by said first correspondence making means; and generating means for generating an interpolating vector for interpolating a portion between the unit vectors in accordance with the amount of change between the unit vectors made to correspond to each other by said second correspondence making means.

24. An animation producing apparatus for producing an animation by generating a plurality of frame images in accordance with one or a plurality of original images, said animation producing apparatus comprising:

first input means for inputting one or a plurality of first strokes along an image portion;

second input means for inputting one or a plurality of second strokes indicating the change shapes of the first strokes input by said first input means;

correspondence making means for making the first and second strokes to correspond to each other;

first generating means for generating an interpolating stroke for interpolating a portion between the first and second strokes made to correspond to each other by said correspondence making means;

second generating means for moving or deforming or moving and deforming an image region adjacent to the first stroke in accordance with the position and shape of the second stroke made correspond to the first stroke and those of the interpolating stroke to generate a unit image corresponding to each of the second stroke and the interpolating stroke; and third generating means for generating a frame image by blending the unit image to the original image in accordance with the second stroke or the interpolating stroke.

25. An animation producing apparatus for producing an animation by generating a plurality of frame images in accordance with one or a plurality of original images, said animation producing apparatus comprising:

first input means for inputting one or a plurality of first strokes along an image portion;

second input means for inputting one or a plurality of second strokes indicating the change shapes of the first strokes input by said first input means;

first correspondence making means for making the first and second strokes to correspond to each other;

quantizing means for quantizing the first and second strokes into unit vectors each having an arbitrary length;

second correspondence making means for making the unit vectors between the first and second strokes made to correspond to each other by said first correspondence making means in accordance with the number of the unit vectors of the first and second strokes;

first generating means for generating an interpolating vector for interpolating a portion between the unit vectors in accordance with an amount of change between the unit vectors made to correspond to each other by said second correspondence making means;

second generating means for generating a unit image corresponding to the unit vector of the second stroke and the interpolating vector by moving or deforming or moving and deforming an image region adjacent to each unit vector of the first stroke in accordance with the position and shape of the second stroke corresponding to each of the unit vectors and the interpolating vector; and third generating means for generating a frame image by blending the unit image to the original image in accordance with the unit vector of the second stroke or the interpolating vector.

26. An animation producing apparatus according to claim 25, further comprising:

second quantizing means for quantizing each of the strokes made to correspond to each other into unit vectors each having an arbitrary length in accordance with the number of the unit vectors generated by said quantizing means.

27. An animation producing apparatus according to claim 23 or 25, further comprising:

storage means for shaping the unit image into a regular shape and storing the shaped unit image, wherein when the frame image is generated, the unit image stored in said storage means is restored to the original shape and blended to the original image.

28. An animation producing apparatus according to claim 24 or 25, further comprising:

storage means for making processed data for an instructed special effect to correspond to the unit image and storing the processed data, wherein when the frame image is generated, the unit image stored in said storage means is subjected to the special effect in accordance with processed data so as to be blended to the original image.

29. An animation producing apparatus according to claim 24 or 25, further comprising:

storage means for previously shaping the unit image into a regular shape and storing the unit image, wherein when the frame image is generated, the deformed vertexes of the unit image stored in said storage means are made to correspond to each other, and then blended.

30. A recording medium on which a program is recorded which produces an animation by generating a plurality of interpolating images for interpolating the strokes between the plural frame images from the plural frame images each of which is composed of one or a plurality of strokes and which can mechanically be read, said recording medium comprising:

a program recorded thereon, said program being arranged to manipulate means for making one or a plurality of strokes to correspond to each other between the plural frame images when one or the plural strokes have been input to each of the frame images, and means for generating an interpolating stroke for interpolating a portion between the corresponding strokes.

31. A recording medium on which a program is recorded which produces an animation by generating a plurality of interpolating images for interpolating the strokes between the plural frame images from the plural frame images each of which is composed of one or a plurality of strokes and which can mechanically be read, said recording medium comprising:

a program recorded thereon, said program being arranged to manipulate means for making one or a plurality of strokes to correspond to each other between the plural frame images when one or the plural strokes have been input to each of the frame images, means for quantizing the strokes into unit vectors each having an arbitrary length, means for making the unit vectors to correspond to each other between the strokes made to correspond to each other in accordance with the number of the unit vectors of each of the strokes made to correspond to each other, and means for generating an interpolating vector for interpolating a portion between the unit vectors in accordance with an amount of change between the unit vectors made to correspond to each other.

32. A recording medium on which a program is recorded which generates a plurality of frame images in accordance with one or a plurality of original images to produce an animation and which is mechanically read, said recording medium comprising:

a program recorded thereon, said program being arranged to manipulate means for making first and second strokes to correspond to each other when one or a plurality of first strokes along an image portion of an original image required to be moved and one or a plurality of second strokes indicating the changed shapes of the first strokes have been input;

means for generating an interpolating stroke for interpolating a portion between the first and second stroke made to correspond to each other;

means for generating a unit image corresponding to the second stroke and the interpolating stroke by moving or deforming or moving and deforming an image region adjacent to the first stroke in accordance with the positions and shapes of the second stroke corresponding to the first stroke and the interpolating stroke; and means for generating a frame image by blending the unit image to the original image in accordance with the second structure corresponding to the unit image or the interpolating stroke.

33. A recording medium on which a program is recorded which generates an animation by generating a plurality of frame images in accordance with one or a plurality of original images, said recording medium comprising:

computer readable program code means recorded thereon, said computer readable program code means being arranged to cause the computer to effect:

means for making the first stroke and the second stroke to correspond to each other when one or a plurality of the first stroke along an image portion of an original image required to be moved and one or a plurality of the second strokes indicating changed shapes of the first strokes have been input;

means for quantizing the first and second strokes into unit vectors each having an arbitrary length;

means for making unit vectors to correspond to each other between the first and second stroke made to correspond to each other in accordance with the number of unit vectors of the first and second strokes;

means for generating an interpolating vector for interpolating a portion between the unit vectors in accordance with an amount of change in a portion between the unit vectors made to correspond to each other;

means for generating a unit image corresponding to each of the unit vector of the second stroke and the interpolating vector by moving or deforming or moving and deforming an image region adjacent to each of the unit vectors of the first stroke in accordance with the positions and shapes of the unit vector of the second stroke corresponding to each of the unit vectors and the interpolating vector; and means for generating a frame image by blending the unit image to the original image in accordance with the unit vector of the second stroke or the interpolating vector.

34. A recording medium according to claim 32 or 33, further comprising:

computer readable program code means recorded thereon, said computer readable program code means being arranged to effect means for quantizing each of the strokes made to correspond to each other into unit vectors each having an arbitrary length in accordance with the number of the unit vectors of the stroke.

35. A recording medium according to claim 32 or 33, further comprising computer readable program code means recorded thereon, said computer readable program code means being arranged to cause the computer to effect:

means for shaping the unit image into a regular shape and storing the unit image, and means for reading the shaped unit image to restore the original shape when the frame image is generated.

36. A recording medium according to claim 32 or 33, further comprising:

compute readable program code means recorded thereon, said computer readable program code means being arranged to cause the computer to effect:

means for making processed data of an instructed special effect to correspond to the unit image, and means for reading the unit image and processed data of the special effect corresponding to the unit image to subject the unit image to the special effect based on the processed data.

37. A recording medium according to claim 32 or 33, further comprising:

computer readable program code means recorded thereon, said computer readable program code means being arranged to blend the unit image stored in said storage means in such a manner that the deformed vertexes are made to correspond to each other.

38. An animation producing apparatus for producing an animation by generating an image for interpolating a portion between a plurality of frame images, said animation producing apparatus comprising:

first input means for inputting one or a plurality of strokes to each of the frame images;

second input means for inputting limiting information of the changed shape of the stroke when the stroke input by said first input means is interpolated between the plurality of the frame images; and generating means for generating an interpolating stroke in accordance with the interpolation position at which the stroke input by said first input means is interpolated between the plural frame images, limiting information and the stroke input by said first input means.

39. An animation producing apparatus according to claim 38, wherein limiting information is a limiting stroke for limiting the changed shape of the stroke when the stroke input by said first input means is interpolated between the plural frame images.

40. An animation producing apparatus according to claim 38, wherein limiting information is a limiting function for limiting the changed shape of the stroke when the stroke input by said first input means is interpolated between the plural frame images.

41. An animation producing apparatus according to claim 38, wherein limiting information is a limiting stroke and a limiting function for limiting the changed shape of the stroke when the stroke input by said first input means is interpolated between the plural frame images.

42. An animation producing apparatus according to any one of claims 38 to 41, wherein said generating means generates the interpolating stroke by deforming and joining the stroke input by said first input means in accordance with the interpolation position at a portion between the strokes is interpolated and limiting information.

43. An animation producing apparatus for producing an animation by generating an image for interpolating a portion between plural frame images, said animation producing apparatus comprising:

first input means for inputting one or a plurality of strokes to each of the frame images;

quantizing means for quantizing each of the strokes made to correspond to each other between the plural frame images and input by said first input means into unit vectors each having a predetermined length;

second input means for inputting a limiting condition for limiting a changed shape of the stroke when the stroke input by said first input means is interpolated between the plural frame images; and generating means for generating an interpolating vector in accordance with the interpolation position at which a portion between the strokes made to correspond to each other is interpolated, limiting information and the corresponding unit vectors of the strokes made to correspond to each other and an interpolating stroke for interpolating a portion between the stroke made to correspond to each other in accordance with the generated interpolating vector.

44. An animation producing apparatus according to claim 43, wherein limiting information is a limiting stroke for limiting the changed shape of the stroke when the stroke input by said first input means is interpolated between the plural frame images.

45. An animation producing apparatus according to claim 43, wherein limiting information is a limiting function for limiting the changed shape of the stroke when the stroke input by said first input means is interpolated between the plural frame images.

46. An animation producing apparatus according to claim 43, wherein limiting information is a limiting stroke and a limiting function for limiting the changed shape of the stroke when the stroke input by said first input means is interpolated between the plural frame images.

47. An animation producing apparatus according to claim 38 or 43, further comprising:

an interpolating image generating means for generating an image for interpolating a portion between the frame images by moving or deforming or moving and deforming an image adjacent to the stroke input by said first input means in accordance with the position and shape of the interpolating stroke generated by said generating means.

48. A recording medium on which a program is recorded which generates an animation by generating an image for interpolating a portion between a plurality of frame images and which can mechanically be read, said recording medium comprising:

a program recorded thereon, said program being arranged to manipulate
generating means for generating an interpolating stroke in accordance with the interpolation position at which the stroke is interpolated between the plural frame images, limiting information and the stroke when limiting information of the changed shape of the stroke when one or a plurality of strokes input to each of the frame images is interpolated between the plural frame images.

49. A recording medium on which a program is recorded which generates an animation by generating an image for interpolating a portion between a plurality of frame images and which can mechanically be read, said recording medium comprising:
a computer readable program code means recorded thereon, said computer readable program code means being arranged to cause the computer to effect:
quantizing means for quantizing each of strokes made to correspond to each other between a plurality of frame images into unit vectors each having a program length when one or a plurality of the strokes are input to each of the frame images: and
generating means for generating an interpolating vector in accordance with an interpolation position at which the strokes made to correspond to each other are interpolated, limiting information and the corresponding unit vectors of the strokes made to correspond to each other when a limiting condition for limiting a changed shape of the stroke when the stroke is interpolated between the plural frame images and generating an interpolating stroke for interpolating a portion between the strokes made to correspond to each other in accordance with the generated interpolating vector.

50. A recording medium according to claim 48 or 49, further comprising:
a program recorded thereon, said program being arranged to manipulate interpolating image generating means for generating an image for interpolating a portion between the frame images by blending an image in a region adjacent to the input stroke to the frame image by moving or deforming or moving and deforming the image.

51. An animation producing apparatus for producing a sequential animation composed of a plurality of image frames and a plurality of interpolating frames by generating the plurality of the interpolating frames for interpolating a portion between the plurality of the supplied image frames, said animation producing apparatus comprising:
image-frame storage means in which a plurality of image frames are stored;
first generating means for generating a first animation from a first image frame to a second image frame by generating a plurality of interpolating frames for interpolating portions between an instructed first image frame and a second image frame of the image frames stored in said image-frame storage means; and
second generating means arranged in such a manner that when at least one interpolating frame of a plurality of interpolating frames in the first animation and a third image frame stored in said image-frame storage means are instructed and branching from the first animation is instructed, said second generating means generates a plurality of interpolating frames for interpolating a portion between the instructed interpolating frame in the first animation and the third image frame so as to generate a second animation branched from the instructed interpolating frame.

52. An animation producing apparatus for generating a sequential animation composed of a plurality of image frames and a plurality of interpolating frames by generating a plurality of interpolating frames for interpolating a portion between the plurality of the supplied image frames, said animation producing apparatus comprising:
image-frame storage means for storing a plurality of image frames;
first generating means for generating a first animation from a first image frame to a second image frame by generating a plurality of interpolating frames for interpolating a portion between the first image frame of the image frames stored in the image-frame storage means and the second image frame;
second generating means arranged in such a manner that when at least one interpolating frame of a plurality of interpolating frames in the first animation and a third image frame stored in said image-frame storage means are instructed and branching from the first animation is instructed, said second generating means generates a plurality of interpolating frames for interpolating a portion between the instructed interpolating frame in the first animation and the third image frame so as to generate a second animation branched from the instructed interpolating frame; and
third generating means arranged in such a manner that when branching from the first animation is instructed, said third generating means selects one interpolating frame from the plural interpolating frames in the first animation and generates a plurality of interpolating frames for interpolating a portion between the third image frame and the selected interpolating frame so as to generate a third animation which is jointed from the second animation to the first animation.

53. An animation producing apparatus for producing a sequential animation composed of a plurality of image frames and a plurality of interpolating frames by generating the plural interpolating frames for interpolating a portion between the plurality of the supplied image frames, said animation producing apparatus comprising:
image-frame storage means in which the plural image frames are stored;
first generating means for producing a first animation from a first image frame to a second image frame by generating a plurality of interpolating frames for interpolating a portion between the instructed first image frame of the image frame stored in the image frame storage means and the second image frame;
second generating means arranged in such a manner that when at least one interpolating frame of the plural interpolating frames in the first animation and a third image frame stored in said image-frame storage means are instructed and branching from the first animation is instructed, said second generating means generates a plurality of interpolating frames for interpolating a portion between the instructed interpolating frame in the first animation and the third image frame so as to generate a second animation branched from the instructed interpolating frame;
third generating means for generating a third animation which is joined from the second animation to the first animation by selecting one interpolating frame of the plural interpolating frames in the first animation when branching from the first animation is instructed and by generating a plurality of interpolating frames for interpolating a portion between the third image frame and the selected interpolating frame; and interpolating frame number calculating means for calculating the number of interpolating frames for interpolating a portion between the instructed interpolating frame in the first animation and the third image frame and the number of interpolating frames for interpolating a portion between the third image frame and the selected interpolating frame in the first animation.

54. An animation producing apparatus for producing a sequential animation composed of a plurality of image frames and a plurality of interpolating frames by generating the plurality of the interpolating frames for interpolating a portion between the plurality of the supplied image frames, said animation producing apparatus comprising:

image-frame storage means in which a plurality of image frames are stored;

first generating means for generating a first animation from a first image frame to a second image frame by generating a plurality of interpolating frames for interpolating a portion between the instructed first image frame of the image frames stored in said image-frame storage means and the second image frame; and animation insertion means arranged in such a manner that when at least one interpolating frame of the plural interpolating frames in the first animation and one or a plurality of the third image frame stored in said image-frame storage means are instructed and insertion of one or a plurality of a second animations which are different from the first animation into the first animation is instructed, said animation insertion means inserts the second animation from the instructed interpolating frame formed by generating the plurality of the interpolating frames for interpolating a portion between the instructed interpolating frame in the first animation and the third image frame to the third image frame into the first animation following the instructed interpolating frame.

55. An animation producing method of producing a sequential animation composed of a plurality of image frames and a plurality of interpolating frames by generating the plurality of interpolating frames for interpolating a portion between the plurality of the supplied image frames, said animation producing method comprising the steps of:

generating a first animation from a first image frame to a second image frame by generating a plurality of interpolating frames for interpolating a portion between the instructed first image frame of the plurality of the supplied image frames and the second image frame; and generating a second animation branched from the instructed interpolating frame by generating a plurality of interpolating frames for interpolating a portion between the instructed interpolating frame in the first animation and the third image frame when at least one interpolating frame of the plural interpolating frames in the first animation and the third image frame of the plural image frames are instructed and branching from the first animation is instructed.

56. An animation producing method of producing a sequential animation composed of a plurality of image frames and a plurality of interpolating frames by generating the plurality of interpolating frames for interpolating a portion between the plurality of the supplied image frames, said animation producing method comprising the steps of:

generating a first animation from a first image frame to a second image frame by generating a plurality of interpolating frames for interpolating a portion between the instructed first image frame of the plurality of the supplied image frames and the second image frame;

generating a second animation branched from the instructed interpolating frame by generating a plurality of interpolating frames for interpolating a portion between the instructed interpolating frame in the first animation and the third image frame when at least one interpolating frame of the plural interpolating frames in the first animation and the third image frame of the plural image frames are instructed and branching from the first animation is instructed; and generating a third animation which is joined from the second animation to the first animation by selecting one interpolating frame from the plural interpolating frames in the first animation when branching from the first animation is instructed and by generating a plurality of interpolating frames for interpolating a portion between the third image frame and the selected interpolating frame.

57. An animation producing method of producing a sequential animation composed of a plurality of image frames and a plurality of interpolating frames by generating the plurality of interpolating frames for interpolating a portion between the plurality of the supplied image frames, said animation producing method comprising the steps of:

generating a first animation from a first image frame to a second image frame by generating a plurality of interpolating frames for interpolating a portion between the instructed first image frame of the plurality of the supplied image frames and the second image frame; and inserting a second animation from the instructed interpolating frame formed by generating a plurality of interpolating frames for interpolating a portion between the instructed interpolating frame in the first animation and the third image frame to the third image frame into the first animation following the instructed interpolating frame when at least one interpolating frame in the first animation and the third image frame of the plural image frames are instructed and insertion of one or a plurality of second animations which are different from the first animation is instructed.

58. A recording medium which is mechanically read, comprising:

a program stored therein, said program being arranged to generate a sequential animation composed of a plurality of image frames and a plurality of interpolating frames by generating the plural interpolating frames for interpolating a portion between the plurality of the supplied image frames, said program being arranged to perform the steps of:

generating a first animation from a first image frame to a second image frame by generating a plurality of interpolating frames for interpolating a portion between the instructed first image frame of the plurality of the supplied image frames and the second image frame, and generating a second animation branched from the instructed interpolating frame by generating a plurality of interpolating frames for interpolating a portion between the instructed interpolating frame in the first animation and the third image frame when at least one interpolating frame of the plural interpolating frames in the first animation and the third image frame of the plural image frames are instructed and branching from the first animation is instructed.

59. A program which is mechanically read, comprising:

a program stored therein, said program being arranged to generate a sequential animation composed of a plurality of image frames and a plurality of interpolating frames by generating the plural interpolating frames for interpolating a portion between the plurality of the supplied image frames, said program being arranged to perform the steps of:

generating a first animation from a first image frame to a second image frame by generating a plurality of interpolating frames for interpolating a portion between the instructed first image frame of the plurality of the supplied image frames and the second image frame, generating a second animation branched from the instructed interpolating frame by generating a plurality of interpolating frames for interpolating a portion between the instructed interpolating frame in the first animation and the third image frame when at least one interpolating frame of the plural interpolating frames in the first animation and the third image frame of the plural image frames are instructed and branching from the first animation is instructed, and generating a third animation which is joined from the second animation to the first animation by selecting one interpolating frame from the plural interpolating frames in the first animation when branching from the first animation is instructed and by generating a plurality of interpolating frames for interpolating a portion between the third image frame and the selected interpolating frame.

* * * * *